US009162147B2

(12) United States Patent
Okada

(10) Patent No.: US 9,162,147 B2
(45) Date of Patent: Oct. 20, 2015

(54) GAME INFORMATION CONSOLIDATION SYSTEM

(71) Applicant: Universal Entertainment Corporation, Tokyo (JP)

(72) Inventor: Kazuo Okada, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 14/244,204

(22) Filed: Apr. 3, 2014

(65) Prior Publication Data

US 2014/0287838 A1 Sep. 25, 2014

Related U.S. Application Data

(63) Continuation of application No. 13/504,795, filed as application No. PCT/JP2010/067635 on Oct. 7, 2010, now Pat. No. 8,727,889.

(30) Foreign Application Priority Data

Nov. 18, 2009 (JP) ................... 2009-262822
Feb. 16, 2010 (JP) ................... 2010-031196

(51) Int. Cl.
*A63F 13/00* (2014.01)
*A63F 13/30* (2014.01)
*G07F 17/32* (2006.01)

(52) U.S. Cl.
CPC ............ *A63F 13/12* (2013.01); *G07F 17/3206* (2013.01); *G07F 17/3237* (2013.01)

(58) Field of Classification Search
CPC ............ H04L 61/2015; H04L 61/2061; H04L 61/103; H04L 67/38; A63F 13/12; A63F 2300/401; A63F 2300/532; A63F 13/00; A63F 9/24; G06F 21/32; G06Q 30/02; G06Q 30/0209; G06Q 30/0212; G06Q 50/34; G07F 17/32; G07F 17/34; G07F 17/3244; G07F 17/3223; G07F 17/3237; G07F 17/3258; G07F 17/3262; G07F 17/3232; G07F 17/3234; G07F 17/3239; G07F 17/3276; G07F 17/3267; G07F 17/3241

See application file for complete search history.

(56) References Cited

U.S. PATENT DOCUMENTS

2008/0113771 A1* 5/2008 Baerlocher et al. ............. 463/25

FOREIGN PATENT DOCUMENTS

| JP | 08-257221 | 10/1996 |
|---|---|---|
| JP | 11-207001 | 8/1999 |
| JP | 2005-237683 | 9/2005 |
| JP | 2006-247043 | 9/2006 |

OTHER PUBLICATIONS

Japanese Patent Office, International Search Report of PCT/JP2010/067635, Mar. 15, 2011.

* cited by examiner

*Primary Examiner* — Sunit Pandya
(74) *Attorney, Agent, or Firm* — Lex IP Meister, PLLC

(57) ABSTRACT

A game playing information integration system is provided which is capable of objectively performing selection and/or settings according to preference of a player, and is capable of effectively making entry into market, based on a result of logical analysis of a gaming machine invoking demands of a player and a manger in gaming facility in a well-balanced manner. The system includes a plurality of gaming machine units and a server connected to enable communication with each of the gaming machine units. Each of the gaming machine units includes player identification information reading means, number-of-consumptions data output means, and number-of-payouts data output means. Gaming machine unit identification information is individually assigned to each of the gaming machine units. The server stores data storage means for storing each of number-of-consumptions data and number-of-payouts data in association with reception time data, player identification information, and gaming machine unit identification information.

11 Claims, 118 Drawing Sheets

FIG. 13

| TYPE OF RECEPTION DATA | CONTENTS OF RECEPTION DATA | RECEPTION TIME | PLAYER IDENTIFICATION INFORMATION | GAMING MACHINE UNIT IDENTIFICATION INFORMATION | FLAG INDICATING PLAY OF GAME IN PROGRESS |
|---|---|---|---|---|---|
| CONSUMED-AMOUNT-OF-MONEY DATA | 1,000 YEN | 2009/11/12 10:25:30 | P01 | M01 | ○ |
| CONSUMED-AMOUNT-OF-MONEY DATA | 1,000 YEN | 2009/11/12 10:26:00 | P02 | M05 | ○ |
| CONSUMED-AMOUNT-OF-MONEY DATA | 1,000 YEN | 2009/11/12 10:45:50 | P01 | M01 | — |
| CONSUMED-AMOUNT-OF-MONEY DATA | 1,000 YEN | 2009/11/12 10:46:30 | P02 | M05 | — |
| CONSUMED-AMOUNT-OF-MONEY DATA | 1,000 YEN | 2009/11/12 11:08:50 | P01 | M01 | — |
| CONSUMED-AMOUNT-OF-MONEY DATA | 1,000 YEN | 2009/11/12 11:40:30 | P02 | M05 | — |
| ... | ... | ... | ... | ... | ... |
| AMOUNT-OF-SALES DATA | 10,000 YEN | 2009/11/12 13:15:50 | P01 | M01 | × |
| AMOUNT-OF-SALES DATA | 7,500 YEN | 2009/11/12 13:30:00 | P02 | M05 | × |
| ... | ... | ... | ... | ... | ... |

FIG 14A

| TYPE OF RECEPTION DATA | CONTENTS OF RECEPTION DATA | RECEPTION TIME | PLAYER IDENTIFICATION INFORMATION | GAMING MACHINE UNIT IDENTIFICATION INFORMATION | FLAG INDICATING PLAY OF GAME IN PROGRESS | SERVICE TIME FLAG | GAME PLAYING TIME |
|---|---|---|---|---|---|---|---|
| NUMBER-OF-CONSUMPTION DATA | 250 | 2009/11/12 10:25:30 | P01 | M01 | ○ | × | — |
| NUMBER-OF-CONSUMPTION DATA | 250 | 2009/11/12 10:26:00 | P02 | M05 | ○ | ○ | — |
| START | 6 TIMES PER MINUTE | 2009/11/12 10:26:50 | P01 | M01 | — | × | — |
| START | 6 TIMES PER MINUTE | 2009/11/12 10:27:30 | P02 | M05 | — | ○ | — |
| START | 6 TIMES PER MINUTE | 2009/11/12 10:27:50 | P01 | M01 | — | × | — |
| START | 6 TIMES PER MINUTE | 2009/11/12 10:28:30 | P01 | M01 | — | ○ | — |
| SPECIAL PRIZE | IN GENERATION | 2009/11/12 10:29:00 | P02 | M05 | — | ○ | — |
| ... | ... | ... | ... | ... | ... | ... | ... |
| LIQUIDATION | 4,000 | 2009/11/12 12:15:50 | P01 | M01 | × | × | 1:50:20 |
| ... | ... | ... | ... | ... | ... | ... | ... |
| LIQUIDATION | 3,000 | 2009/11/12 12:30:00 | P02 | M05 | × | ○ | 2:14:00 |
| ... | ... | ... | ... | ... | ... | ... | ... |

FIG. 14B

| GAMING MACHINE UNIT IDENTIFICATION INFORMATION | DEVICE TYPE | MODEL (CLASSIFICATION BY MACHINE PROBABILITY) | MODEL (CLASSIFICATION BY GADGET TYPE) | MODEL (CLASSIFICATION BY BIG HIT SPECIFICATION) | MOUNT IDENTIFICATION SPECIFICATION | NEW DEVICE TYPE FLAG | NEW SERVICE TYPE FLAG |
|---|---|---|---|---|---|---|---|
| M01 | A | MAX TYPE | MIXED MACHINE | SMALL HIT INCORPORATION | G01 | × | × |
| M02 | A | MAX TYPE | MIXED MACHINE | SMALL HIT INCORPORATION | G01 | × | × |
| M03 | A | MAX TYPE | MIXED MACHINE | SMALL HIT INCORPORATION | G01 | × | × |
| M04 | B | MEDIUM TYPE | ORDINARY MACHINE | SUDDEN PROBABILITY CHANGE MACHINE | G01 | × | × |
| M05 | B | MEDIUM TYPE | ORDINARY MACHINE | SUDDEN PROBABILITY CHANGE MACHINE | G01 | × | × |
| M06 | B | MEDIUM TYPE | ORDINARY MACHINE | SUDDEN PROBABILITY CHANGE MACHINE | G01 | × | × |
| M07 | C | EASY BIG HIT DIGITAL TYPE | GADGET TYPE | SUDDEN PROBABILITY CHANGE MACHINE | G01 | ○ | ○ |
| M08 | C | EASY BIG HIT DIGITAL TYPE | GADGET TYPE | SUDDEN PROBABILITY CHANGE MACHINE | G01 | ○ | ○ |
| ... | ... | ... | ... | ... | | ... | ... |

FIG. 15A

| | GAMING MACHINE UNIT IDENTIFICATION INFORMATION | BIG HIT DEVIATION AND FREQUENCY (AVERAGE AND STANDARD DEVIATION) | CHARACTERISTICS (WAVE OF WINNING PACHINKO BALLS) | CHARACTERISTICS (MOVEMENT OF WINNING PACHINKO BALL SLUMP GRAPH) |
|---|---|---|---|---|
| TYPE OTHER THAN NEW DEVICE TYPE | M01 | 6.8 TIMES ± 3.6 TIMES PER DAY | LARGE | . |
| | M02 | 6.8 TIMES ± 4.2 TIMES PER DAY | LARGE | . |
| | M03 | 6.6 TIMES ± 3.8 TIMES PER DAY | LARGE | . |
| | M04 | 7.2 TIMES ± 2.6 TIMES PER DAY | SMALL | . |
| | M05 | 7.1 TIMES ± 2.4 TIMES PER DAY | SMALL | . |
| | M06 | 7.3 TIMES ± 1.9 TIMES PER DAY | SMALL | ... |
| | ... | ... | ... | . |
| NEW DEVICE TYPE | M07 | 6.8 TIMES ± 2.5 TIMES PER DAY | MEDIUM | . |
| | M08 | 6.8 TIMES ± 2.6 TIMES PER DAY | MEDIUM | ... |
| | ... | ... | ... | |

FIG. 15B

| | GAMING MACHINE UNIT IDENTIFICATION INFORMATION | OPERATION TIME RATE PER DAY | NUMBER OF GAME PLAYING CUSTOMERS PER DAY | AVERAGE GAME PLAYING TIME PER PLAYER (MINUTE) | BUSINESS DIVIDING NUMBER (TOTAL TIME) | BUSINESS DIVIDING NUMBER (SERVICE TIME) | OPERABILITY | STABILITY | ATTRACTION POWER VALUE OF NEW DEVICE TYPE |
|---|---|---|---|---|---|---|---|---|---|
| TYPE OTHER THAN NEW DEVICE TYPE | M01 | 86.54 | 4.5 | 150 | 13.5 | 12.2 | 90.43 | 65 | — |
| | M02 | 82.56 | 4.6 | 140 | 13.2 | 12.3 | 87.11 | 55 | — |
| | M03 | 81.67 | 4.9 | 130 | 12.9 | 12.7 | 85.02 | 40 | — |
| | M04 | 14.10 | 1.1 | 100 | 13.0 | 12.4 | 13.96 | 5 | — |
| | M05 | 13.85 | 1.2 | 90 | 12.7 | 12.4 | 13.67 | −10 | — |
| | M06 | 13.46 | 1.5 | 70 | 13.4 | 12.3 | 13.34 | 5 | — |
| | ... | ... | ... | ... | ... | ... | ... | ... | ... |
| NEW DEVICE TYPE | M07 | 95.90 | 2.2 | 340 | 14.8 | 13.1 | 110.47 | — | LARGE |
| | M08 | 92.31 | 2.4 | 300 | 15.2 | 13.2 | 105.60 | — | LARGE |
| | ... | ... | ... | ... | ... | ... | ... | ... | ... |

FIG. 16

| Device type | Gaming machine unit identification information | Target dividing number | Number of fixed customers | Number-of-fixed-customers alarm flag | Setup rate | Appropriate setup rate | Setup rate alarm flag |
|---|---|---|---|---|---|---|---|
| A | M01 | 13.3 | 80 | × | 10% | 9-13% | × |
|  | M02 |  |  |  |  |  |  |
|  | M03 |  |  |  |  |  |  |
| B | M04 | 13.2 | 8 | ○ | 8% | 0-2% | ○ |
|  | M05 |  |  |  |  |  |  |
|  | M06 |  |  |  |  |  |  |
| C | M07 | 16.0 | — | — | 12% | 15-18% | ○ |
|  | M08 |  |  |  |  |  |  |
| ⋮ | ⋮ | ⋮ | ⋮ | ⋮ | ⋮ | ⋮ | ⋮ |

FIG. 17

| PLAYER IDENTIFICATION INFORMATION | CUSTOMER CATEGORY DATA | MEMBER NAME | LOCAL AREA | SEX | AGE | OCCUPATION | AVERAGE USE AMOUNT OF MONEY | AVERAGE GAME PLAYING TIME (MINUTE) | AVERAGE VISIT FREQUENCY | AVERAGE AMOUNT OF MONEY LOST |
|---|---|---|---|---|---|---|---|---|---|---|
| P01 | FIXED CUSTOMER | ○○ | ○○ | ○○ | ○○ | ○○ | 18000 | 200 | 2.2 DAYS PER TIME | 10000 |
| P02 | FIXED CUSTOMER | ●● | ●● | ●● | ●● | ●● | 20000 | 210 | 1.3 DAYS PER TIME | 18000 |
| P03 | FIXED CUSTOMER | △△ | △△ | △△ | △△ | △△ | 25000 | 240 | 3.2 DAYS PER TIME | 23000 |
| P04 | UNFIXED CUSTOMER | — | — | — | — | — | 13000 | 120 | 10.9 DAYS PER TIME | 11000 |
| P05 | UNFIXED CUSTOMER | — | — | — | — | — | 10000 | 100 | 12.1 DAYS PER TIME | 9000 |
| P06 | UNFIXED CUSTOMER | — | — | — | — | — | 8000 | 60 | 7.2 DAYS PER TIME | 6000 |
| P07 | NOVICE | — | — | — | — | — | 2000 | 20 | 31 DAYS PER TIME | 2000 |
| P08 | NOVICE | — | — | — | — | — | 3000 | 30 | 24 DAYS PER TIME | 3000 |
| ... | ... | ... | ... | ... | ... | ... | ... | ... | ... | ... |

FIG. 30

Gaming machine comparison table

| Stability | | Operability | | | | | | | | | |
|---|---|---|---|---|---|---|---|---|---|---|---|
| | | <30 | <40 | <50 | <60 | <70 | <80 | <90 | <100 | <110 | 110≦ |
| | <11.0 | -30 | -20 | -10 | -10 | -10 | -10 | -10 | -10 | -10 | -10 |
| | <12.0 | -20 | -10 | -10 | -10 | -10 | -10 | -10 | -10 | -10 | 0 |
| | <13.0 | -10 | -10 | -10 | -10 | -10 | -10 | -10 | -10 | -5 | 5 |
| | <13.5 | 5 | 15 | 25 | 35 | 45 | 50 | 55 | 60 | 65 | 75 |
| | <14.0 | 10 | 20 | 30 | 40 | 50 | 55 | 60 | 65 | 70 | 80 |
| | <15.0 | 0 | 10 | 20 | 30 | 40 | 45 | 50 | 55 | 60 | 70 |
| Sales dividing number | <16.0 | -10 | 0 | 10 | 20 | 30 | 35 | 40 | 45 | 50 | 60 |
| | <17.0 | -10 | 0 | 10 | 20 | 30 | 35 | 40 | 45 | 50 | 60 |
| | <18.0 | -20 | -10 | 0 | 10 | 20 | 25 | 30 | 35 | 40 | 50 |
| | 18.0≦ | -30 | -20 | -10 | 0 | 10 | 15 | 20 | 25 | 30 | 40 |

FIG. 31

<table>
<tr><th colspan="12">Gaming facility comparison table</th></tr>
<tr><th rowspan="2">Stability</th><th colspan="11">Operability</th></tr>
<tr><th>0〈30</th><th>30〈40</th><th>40〈50</th><th>50〈60</th><th>60〈70</th><th>70〈80</th><th>80〈90</th><th>90〈100</th><th>100〈110</th><th>110〈</th></tr>
<tr><td>〈11.0</td><td>-70</td><td>-60</td><td>-50</td><td>-40</td><td>-30</td><td>-20</td><td>-10</td><td>-10</td><td>-10</td><td>-10</td></tr>
<tr><td>11.0〈12.0</td><td>-60</td><td>-50</td><td>-40</td><td>-30</td><td>-20</td><td>-10</td><td>-10</td><td>-10</td><td>-10</td><td>-10</td></tr>
<tr><td>12.0〈13.0</td><td>-50</td><td>-40</td><td>-30</td><td>-20</td><td>-10</td><td>-10</td><td>-10</td><td>-10</td><td>-10</td><td>-10</td></tr>
<tr><td>13.0〈13.5</td><td>-40</td><td>-30</td><td>-20</td><td>-10</td><td>0</td><td>-10</td><td>-10</td><td>-10</td><td>-10</td><td>-10</td></tr>
<tr><td>13.5〈14.0</td><td>-30</td><td>-20</td><td>-10</td><td>0</td><td>10</td><td>20</td><td>30</td><td>40</td><td>50</td><td>60</td></tr>
<tr><td>14.0〈15.0</td><td>-20</td><td>-10</td><td>0</td><td>10</td><td>20</td><td>30</td><td>40</td><td>50</td><td>60</td><td>70</td></tr>
<tr><td>15.0〈16.0</td><td>-20</td><td>-10</td><td>-10</td><td>-10</td><td>-10</td><td>0</td><td>10</td><td>20</td><td>30</td><td>40</td></tr>
<tr><td>16.0〈17.0</td><td>-50</td><td>-40</td><td>-30</td><td>-20</td><td>-20</td><td>-10</td><td>-10</td><td>-10</td><td>-10</td><td>-10</td></tr>
<tr><td>17.0〈18.0</td><td>-60</td><td>-50</td><td>-40</td><td>-30</td><td>-20</td><td>-10</td><td>-10</td><td>-10</td><td>-10</td><td>-10</td></tr>
<tr><td>18.0〈</td><td>-70</td><td>-60</td><td>-50</td><td>-40</td><td>-30</td><td>-20</td><td>-10</td><td>-10</td><td>-10</td><td>-10</td></tr>
</table>

Sales dividing number

FIG. 47

| Elapsed days | Number of shops | Shop average operation | Average operation of device type A | Shop operation deviation rate | Sales by machine | Gross profit by machine | Coin unit price | Gross profit rate |
|---|---|---|---|---|---|---|---|---|
| First day | 110 | 11,588 | 23,212 | 200.3% | 48,222 | 2,303 | 2.08 | 4.8% |
| Second day | 132 | 11,114 | 22,447 | 202.0% | 48,871 | 2,187 | 2.18 | 4.5% |
| Third day | 119 | 11,929 | 22,412 | 187.9% | 49,529 | 4,488 | 2.21 | 9.1% |
| Fourth day | 95 | 10,435 | 19,890 | 190.6% | 47,756 | 7,583 | 2.40 | 15.9% |
| Fifth day | 62 | 11,317 | 20,397 | 180.2% | 47,264 | 8,490 | 2.32 | 18.0% |
| Sixth day | 48 | 12,641 | 21,741 | 172.0% | 51,753 | 5,290 | 2.38 | 10.2% |
| Seventh day | 43 | 12,134 | 21,231 | 175.0% | 50,919 | 7,814 | 2.40 | 15.3% |
| Eighth day | 34 | 11,174 | 18,042 | 161.5% | 41,958 | 3,615 | 2.33 | 8.6% |
| Ninth day | 23 | 11,603 | 19,898 | 171.5% | 45,962 | 8,276 | 2.31 | 18.0% |
| Tenth day | 14 | 11,312 | 19,609 | 173.2% | 42,491 | 3,000 | 2.17 | 7.1% |
| Eleventh day | 11 | 11,759 | 17,501 | 148.8% | 38,479 | 4,854 | 2.20 | 12.6% |
| Twelfth day | 3 | 14,335 | 21,780 | 151.9% | 55,118 | 18,842 | 2.53 | 34.2% |
| Thirteenth day | 1 | 16,637 | 24,838 | 149.3% | 57,500 | 14,300 | 2.32 | 24.9% |

FIG. 48

| Elapsed days | Number of shops | Shop average operation | Average operation of device type A | Shop operation deviation rate | Sales by machine | Gross profit by machine | Coin unit price | Gross profit rate |
|---|---|---|---|---|---|---|---|---|
| First day | 33 | 12,027 | 22,726 | 189.0% | 47,706 | 4,688 | 2.10 | 9.8% |
| Second day | 43 | 11,338 | 23,147 | 204.1% | 48,910 | -601 | 2.11 | -1.2% |
| Third day | 37 | 12,056 | 22,528 | 186.9% | 49,469 | 3,284 | 2.20 | 6.6% |
| Fourth day | 31 | 10,928 | 21,082 | 192.9% | 48,809 | 10,862 | 2.32 | 22.3% |
| Fifth day | 22 | 11,516 | 20,273 | 176.0% | 46,201 | 6,280 | 2.28 | 13.6% |
| Sixth day | 15 | 12,862 | 21,014 | 163.4% | 48,420 | 2,697 | 2.30 | 5.6% |
| Seventh day | 9 | 12,444 | 19,820 | 159.3% | 55,194 | 17,400 | 2.78 | 31.5% |
| Eighth day | 5 | 10,574 | 15,974 | 151.1% | 39,146 | 2,199 | 2.45 | 5.6% |
| Ninth day | 3 | 9,347 | 18,507 | 198.0% | 45,822 | -3,467 | 2.48 | -7.6% |
| Tenth day | 1 | 12,563 | 22,909 | 182.4% | 42,700 | -20,600 | 1.86 | -48.2% |
| Eleventh day | 2 | 11,148 | 17,028 | 152.7% | 46,591 | 23,191 | 2.74 | 49.8% |
| Twelfth day | 1 | 21,014 | 27,028 | 128.6% | 61,300 | 10,300 | 2.27 | 16.8% |
| Thirteenth day | 1 | 16,637 | 24,838 | 149.3% | 57,500 | 14,300 | 2.32 | 24.9% |

FIG. 49A

| NAME OF BUSINESS | HALL CD | HALL NAME | PERSON IN CHARGE | DEVICE TYPE NAME | NUMBER OF SETUPS | NUMBER OF EXCHANGES | DATE OF OPENING | ELAPSED WEEK |
|---|---|---|---|---|---|---|---|---|
| SHIKOKU | 00000000 | SHOP W | ○○ ○○ | DEVICE TYPE A | 10 MACHINES | 5.0 | DEC. 14, 2009 (MON.) | FIRST WEEK |

| ITEM | FIRST DAY | SECOND DAY | THIRD DAY | FOURTH DAY | FIFTH DAY | SIXTH DAY | SEVENTH DAY | AVERAGE PER WEEK | CUMULATIVE AVERAGE |
|---|---|---|---|---|---|---|---|---|---|
| | DEC. 14 (MON.) | DEC. 15 (TUE.) | DEC. 16 (WED.) | DEC. 17 (THU.) | DEC. 18 (FRI.) | DEC. 19 (SAT.) | DEC. 20 (SUN.) | | |
| BUSINESS HOUR | 7.00 | 14.25 | 14.25 | 14.25 | 14.25 | 14.25 | 14.25 | 13.21 | – |
| TOTAL IN | 141,860 | 241,120 | 192,560 | 240,330 | 215,440 | 194,200 | 201,400 | 203,844 | – |
| TOTAL OUT | 162,740 | 230,870 | 206,800 | 238,920 | 210,460 | 198,830 | 195,890 | 206,359 | – |
| DIFFERENCE PACHINKO BALL | -20,880 | 10,250 | -14,240 | 1,410 | 4,980 | -4,630 | 5,510 | -2,514 | – |
| WINNING PACHINKO BALL RATE | 114.7% | 95.7% | 107.4% | 99.4% | 97.7% | 102.4% | 97.3% | 101.2% | – |
| SALES | 149,000 | 620,000 | 542,000 | 517,000 | 561,000 | 430,000 | 520,000 | 477,000 | – |
| PRIZE | 566,600 | 415,000 | 826,800 | 488,800 | 461,400 | 522,600 | 409,800 | 527,286 | – |
| GROSS PROFIT | -417,600 | 205,000 | -284,800 | 28,200 | 99,600 | -92,600 | 110,200 | -50,286 | – |
| BUSINESS DIVIDING NUMBER | 38.03 | 6.69 | 15.25 | 9.45 | 8.22 | 12.15 | 7.88 | 11.05 | – |
| SHOP AVERAGE OPERATION | 11,000 | 13,320 | 12,812 | 12,606 | 11,646 | 14,217 | 13,056 | 12,665 | – |

FIG. 49B

| ITEM | FIRST DAY<br>DEC. 14<br>(MON.) | SECOND DAY<br>DEC. 15<br>(TUE.) | THIRD DAY<br>DEC. 16<br>(WED.) | FOURTH DAY<br>DEC. 17<br>(THU.) | FIFTH DAY<br>DEC. 18<br>(FRI.) | SIXTH DAY<br>DEC. 19<br>(SAT.) | SEVENTH DAY<br>DEC. 20<br>(SUN.) | AVERAGE PER WEEK | CUMULATIVE AVERAGE |
|---|---|---|---|---|---|---|---|---|---|
| IN COUNT BY MACHINE | 14,186 | 24,112 | 19,256 | 24,033 | 21,544 | 19,420 | 20,140 | 20,384 | – |
| SHOP OPERATION RATIO | 129.0% | 181.0% | 150.3% | 190.6% | 185.0% | 136.6% | 154.3% | 160.9% | – |
| OUT COUNT BY MACHINE | 16,274 | 23,087 | 20,680 | 23,892 | 21,046 | 19,883 | 19,589 | 20,636 | – |
| NUMBER OF DIRREFERNCE PACHINKO BALLS BY MACHINE | -2,088 | 1,025 | -1,424 | 141 | 498 | -463 | 551 | -251 | – |
| SALES BY MACHINE | 14,900 | 62,000 | 54,200 | 51,700 | 56,100 | 43,000 | 52,000 | 47,700 | – |
| GROSS PROFIT PER MACHINE | -41,760 | 20,500 | -28,480 | 2,820 | 9,960 | -9,260 | 11,020 | -5,029 | – |
| IN COUNT PER HOUR | 2,027 | 1,692 | 1,351 | 1,687 | 1,512 | 1,363 | 1,413 | 1,578 | – |
| OUT COUNT PER HOUR | 2,325 | 1,620 | 1,451 | 1,677 | 1,477 | 1,395 | 1,375 | 1,617 | – |
| SALES COUNT PER HOUR | 2,129 | 4,351 | 3,804 | 3,628 | 3,937 | 3,018 | 3,649 | 3,502 | – |
| COIN UNIT PRICE | 1.05 | 2.57 | 2.81 | 2.15 | 2.60 | 2.21 | 2.58 | 2.34 | – |

FIG. 50

| Elapsed days | Number of shops | Shop average operation | Average operation of "device type A" | Shop operation deviation rate | Sales by machine | Gross profit by machine | Coin unit price | Gross profit rate |
|---|---|---|---|---|---|---|---|---|
| First day | 34 | 11,036 | 24,022 | 217.7% | 48,124 | 1,056 | 2.00 | 2.2% |
| Second day | 43 | 10,448 | 21,913 | 209.7% | 50,581 | 4,677 | 2.31 | 9.2% |
| Third day | 35 | 11,755 | 22,521 | 191.6% | 49,116 | 753 | 2.18 | 1.5% |
| Fourth day | 29 | 10,149 | 19,550 | 192.6% | 46,340 | 4,297 | 2.37 | 9.3% |
| Fifth day | 19 | 10,979 | 19,706 | 179.5% | 46,678 | 9,236 | 2.37 | 19.8% |
| Sixth day | 15 | 12,822 | 22,659 | 176.7% | 53,407 | 4,519 | 2.36 | 8.5% |
| Seventh day | 18 | 12,216 | 22,373 | 183.1% | 52,623 | 5,799 | 2.35 | 11.0% |
| Eighth day | 14 | 11,419 | 19,115 | 167.4% | 44,132 | 4,924 | 2.31 | 11.2% |
| Ninth day | 8 | 12,888 | 23,574 | 182.9% | 51,718 | 6,146 | 2.19 | 11.9% |
| Tenth day | 9 | 11,112 | 19,506 | 175.5% | 46,929 | 9,237 | 2.41 | 19.7% |
| Second day | 6 | 12,682 | 19,078 | 150.4% | 38,577 | 3,766 | 2.02 | 9.8% |

FIG. 51A

| NAME OF BUSINESS | HALL CD | HALL NAME | PERSON IN CHARGE | DEVICE TYPE NAME | NUMBER OF SETUPS | NUMBER OF EXCHANGES | DATE OF OPENING | ELAPSED WEEK |
|---|---|---|---|---|---|---|---|---|
| OKAYAMA | 00000000 | SHOP X | OO OO | DEVICE TYPE A | 7 MACHINES | 5.0 | DEC. 15, 2009 (TUE.) | FIRST WEEK |

| ITEM | FIRST DAY | SECOND DAY | THIRD DAY | FOURTH DAY | FIFTH DAY | SIXTH DAY | SEVENTH DAY | AVERAGE PER WEEK | CUMULATIVE AVERAGE |
|---|---|---|---|---|---|---|---|---|---|
|  | DEC. 15 (TUE.) | DEC. 16 (WED.) | DEC. 17 (THU.) | DEC. 18 (FRI.) | DEC. 19 (SAT.) | DEC. 20 (SUN.) | DEC. 21 (MON.) |  |  |
| BUSINESS HOUR | 7.75 | 13.75 | 13.75 | 13.75 | 13.75 | 13.75 | 13.75 | 12.89 | — |
| TOTAL IN | 109,900 | 186,200 | 164,500 | 116,200 | 137,900 | 172,200 | 173,600 | 151,500 | — |
| TOTAL OUT | 117,600 | 186,900 | 157,500 | 116,200 | 137,200 | 162,400 | 172,200 | 150,000 | — |
| DIFFERENCE | -7,700 | -700 | 7,000 | 0 | 700 | 9,800 | 1,400 | 1,500 | — |
| PACHINKO BALL WINNING RATE | 107.0% | 100.4% | 95.7% | 100.0% | 99.5% | 94.3% | 99.2% | 99.0% | — |
| SALES | 256,200 | 387,800 | 396,900 | 345,100 | 319,900 | 524,300 | 375,200 | 372,200 | — |
| PRIZE | 410,200 | 401,800 | 256,900 | 345,100 | 305,900 | 328,300 | 347,200 | 342,200 | — |
| GROSS PROFIT | -154,000 | -14,000 | 140,000 | 0 | 14,000 | 196,000 | 28,000 | 30,000 | — |
| BUSINESS DIVIDING NUMBER | 16.01 | 10.36 | 6.47 | 10.00 | 9.56 | 6.26 | 9.25 | 9.19 | — |
| SHOP AVERAGE OPERATION | 6,800 | 7,600 | 7,100 | 5,156 | 6,000 | 6,000 | 6,000 | 6,379 | — |

FIG. 51B

| ITEM | FIRST DAY DEC. 15 (TUE.) | SECOND DAY DEC. 16 (WED.) | THIRD DAY DEC. 17 (THU.) | FOURTH DAY DEC. 18 (FRI.) | FIFTH DAY DEC. 19 (SAT.) | SIXTH DAY DEC. 20 (SUN.) | SEVENTH DAY DEC. 21 (MON.) | AVERAGE PER WEEK | CUMULATIVE AVERAGE |
|---|---|---|---|---|---|---|---|---|---|
| IN COUNT BY MACHINE | 15,700 | 26,600 | 23,500 | 16,600 | 19,700 | 24,600 | 24,800 | 21,643 | – |
| SHOP OPERATION RATIO | 230.9% | 350.0% | 331.0% | 322.0% | 328.3% | 410.0% | 413.3% | 339.3% | – |
| OUT COUNT BY MACHINE | 16,800 | 26,700 | 22,500 | 16,600 | 19,600 | 23,200 | 24,600 | 21,429 | – |
| NUMBER OF DIRREFERNCE PACHINKO BALLS BY MACHINE | -1,100 | -100 | 1,000 | 0 | 100 | 1,400 | 200 | 214 | – |
| SALES BY MACHINE | 36,600 | 55,400 | 56,700 | 49,300 | 45,700 | 74,900 | 53,600 | 53,171 | – |
| GROSS PROFIT PER MACHINE | -22,000 | -2,000 | 20,000 | 0 | 2,000 | 28,000 | 4,000 | 4,286 | – |
| IN COUNT PER HOUR | 2,026 | 1,935 | 1,709 | 1,207 | 1,433 | 1,789 | 1,804 | 1,700 | – |
| OUT COUNT PER HOUR | 2,168 | 1,942 | 1,636 | 1,207 | 1,425 | 1,687 | 1,789 | 1,694 | – |
| SALES COUNT PER HOUR | 4,723 | 4,029 | 4,124 | 3,585 | 3,324 | 5,447 | 3,898 | 4,161 | – |
| COIN UNIT PRICE | 2.33 | 2.08 | 2.41 | 2.97 | 2.32 | 3.04 | 2.16 | 2.46 | – |

FIG. 52

| Elapsed days | Number of shops | Shop average operation | Average operation of "device type A" | Shop operation deviation rate | Sales by machine | Gross profit by machine | Coin unit price | Gross profit rate |
|---|---|---|---|---|---|---|---|---|
| First day | 22 | 10,467 | 21,900 | 209.2% | 50,511 | -262 | 2.31 | -0.5% |
| Second day | 19 | 11,208 | 21,679 | 193.4% | 48,327 | 4,194 | 2.23 | 8.7% |
| Third day | 21 | 11,113 | 21,586 | 194.2% | 48,748 | 8,836 | 2.26 | 18.1% |
| Fourth day | 18 | 8,786 | 17,568 | 200.0% | 47,916 | 9,549 | 2.73 | 19.9% |
| Fifth day | 4 | 9,754 | 19,182 | 196.6% | 46,069 | 3,250 | 2.40 | 7.1% |
| Sixth day | 5 | 10,518 | 19,537 | 185.8% | 51,211 | 8,566 | 2.62 | 16.7% |
| Seventh day | 5 | 10,627 | 19,933 | 187.6% | 47,437 | 4,928 | 2.38 | 10.4% |
| Eighth day | 4 | 10,488 | 18,939 | 180.6% | 37,600 | -11,103 | 1.99 | -29.5% |
| Ninth day | 2 | 10,800 | 18,395 | 170.3% | 47,450 | 17,504 | 2.58 | 36.9% |
| Tenth day | 1 | 7,200 | 10,900 | 151.4% | 24,900 | -3,682 | 2.28 | -14.8% |
| Eleventh day | 1 | 7,400 | 9,300 | 125.7% | 27,000 | -2,618 | 2.90 | -9.7% |

FIG. 53A

| NAME OF BUSINESS | HALL CD | HALL NAME | PERSON IN CHARGE | DEVICE TYPE NAME | NUMBER OF SETUPS | NUMBER OF EXCHANGES | DATE OF OPENING | ELAPSED WEEK |
|---|---|---|---|---|---|---|---|---|
| NAGOYA NO. 2 | 00000000 | SHOP Y | ○○ ○○ | DEVICE TYPE A | 8 MACHINES | 5.0 | DEC. 15, 2009 (TUE.) | FIRST WEEK |

| ITEM | FIRST DAY | SECOND DAY | THIRD DAY | FOURTH DAY | FIFTH DAY | SIXTH DAY | SEVENTH DAY | AVERAGE PER WEEK | CUMULATIVE AVERAGE |
|---|---|---|---|---|---|---|---|---|---|
| | DEC. 15 (TUE.) | DEC. 16 (WED.) | DEC. 17 (THU.) | DEC. 18 (FRI.) | DEC. 19 (SAT.) | DEC. 20 (SUN.) | DEC. 21 (MON.) | | |
| BUSINESS HOUR | 13.75 | 13.75 | 13.45 | 13.75 | 13.75 | 13.75 | 13.75 | 13.71 | – |
| TOTAL IN | 165,600 | 167,200 | 112,800 | 124,800 | 139,200 | 111,200 | 108,000 | 132,686 | – |
| TOTAL OUT | 154,008 | 163,856 | 117,312 | 122,304 | 139,200 | 102,320 | 111,240 | 130,034 | – |
| DIFFERENCE PACHINKO BALL | 11,592 | 3,344 | -4,512 | 2,496 | 0 | 8,880 | -3,240 | 2,651 | – |
| WINNING PACHINKO BALL RATE | 93.0% | 98.0% | 104.0% | 98.0% | 100.0% | 92.0% | 103.0% | 98.0% | – |
| SALES | 476,800 | 416,800 | 240,800 | 380,000 | 304,000 | 368,000 | 276,800 | 351,886 | – |
| PRIZE | 244,960 | 349,920 | 331,040 | 330,080 | 304,000 | 190,400 | 341,600 | 298,857 | – |
| GROSS PROFIT | 231,840 | 66,880 | -90,240 | 49,920 | 0 | 177,600 | -64,800 | 53,029 | – |
| BUSINESS DIVIDING NUMBER | 5.14 | 8.40 | 13.75 | 8.69 | 10.00 | 5.17 | 12.34 | 8.49 | – |
| SHOP AVERAGE OPERATION | 9,100 | 9,300 | 9,300 | 8,100 | 9,300 | 7,600 | 7,400 | 8,586 | – |

FIG. 53B

| ITEM | FIRST DAY<br>DEC. 15<br>(TUE.) | SECOND DAY<br>DEC. 16<br>(WED.) | THIRD DAY<br>DEC. 17<br>(THU.) | FOURTH DAY<br>DEC. 18<br>(FRI.) | FIFTH DAY<br>DEC. 19<br>(SAT.) | SIXTH DAY<br>DEC. 20<br>(SUN.) | SEVENTH DAY<br>DEC. 21<br>(MON.) | AVERAGE PER WEEK | CUMULATIVE AVERAGE |
|---|---|---|---|---|---|---|---|---|---|
| IN COUNT BY MACHINE | 20,700 | 20,900 | 14,100 | 15,600 | 17,400 | 13,900 | 13,500 | 16,586 | – |
| SHOP OPERATION RATIO | 227.5% | 224.7% | 151.6% | 192.6% | 187.1% | 182.9% | 182.4% | 193.2% | – |
| OUT COUNT BY MACHINE | 19,251 | 20,482 | 14,664 | 15,288 | 17,400 | 12,790 | 13,905 | 16,254 | – |
| NUMBER OF DIRREFERNCE PACHINKO BALLS BY MACHINE | 1,449 | 418 | -564 | 312 | 0 | 1,110 | -405 | 331 | – |
| SALES BY MACHINE | 59,600 | 52,100 | 30,100 | 47,500 | 38,000 | 46,000 | 34,600 | 43,986 | – |
| GROSS PROFIT PER MACHINE | 28,980 | 8,360 | -11,280 | 6,240 | 0 | 22,200 | -8,100 | 6,629 | – |
| IN COUNT PER HOUR | 1,505 | 1,520 | 1,048 | 1,135 | 1,265 | 1,011 | 982 | 1,210 | – |
| OUT COUNT PER HOUR | 1,400 | 1,490 | 1,090 | 1,112 | 1,265 | 930 | 1,011 | 1,186 | – |
| SALES COUNT PER HOUR | 4,335 | 3,789 | 2,238 | 3,455 | 2,764 | 3,345 | 2,516 | 3,206 | – |
| COIN UNIT PRICE | 2.88 | 2.49 | 2.13 | 3.04 | 2.18 | 3.31 | 2.56 | 2.65 | – |

FIG. 54

| Elapsed days | Number of shops | Shop average operation | Average operation of "device type A" | Shop operation deviation rate | Sales by machine | Gross profit by machine | Coin unit price | Gross profit rate |
|---|---|---|---|---|---|---|---|---|
| First day | 21 | 12,869 | 23,786 | 184.8% | 47,376 | 2,911 | 1.99 | 6.1% |
| Second day | 27 | 11,979 | 22,834 | 190.6% | 45,957 | 686 | 2.01 | 1.5% |
| Third day | 27 | 12,467 | 22,579 | 181.1% | 50,754 | 8,446 | 2.25 | 16.6% |
| Fourth day | 17 | 11,572 | 20,448 | 176.7% | 48,409 | 6,151 | 2.37 | 12.7% |
| Fifth day | 17 | 11,837 | 21,703 | 183.4% | 49,577 | 11,389 | 2.28 | 23.0% |
| Sixth day | 13 | 12,915 | 22,139 | 171.4% | 53,533 | 8,267 | 2.42 | 15.4% |
| Seventh day | 11 | 12,385 | 20,764 | 167.6% | 46,220 | 5,997 | 2.23 | 13.0% |
| Eighth day | 11 | 11,369 | 17,186 | 151.2% | 41,543 | 7,633 | 2.42 | 18.4% |
| Ninth day | 10 | 11,293 | 17,370 | 153.8% | 40,649 | 10,924 | 2.34 | 26.9% |
| Tenth day | 3 | 12,691 | 21,189 | 167.0% | 34,196 | -2,723 | 1.61 | -8.0% |
| Eleventh day | 2 | 11,561 | 16,778 | 145.1% | 33,059 | -11,775 | 1.97 | -35.6% |
| Twelfth day | 2 | 9,621 | 18,075 | 187.9% | 50,754 | 24,871 | 2.81 | 49.0% |

FIG. 55A

| NAME OF BUSINESS | HALL CD | HALL NAME | PERSON IN CHARGE | DEVICE TYPE NAME | NUMBER OF SETUPS | NUMBER OF EXCHANGES | DATE OF OPENING | ELAPSED WEEK |
|---|---|---|---|---|---|---|---|---|
| OSAKA NO. 4 | 00000000 | SHOP Z | OO OO | DEVICE TYPE A | 9 MACHINES | 5.0 | DEC. 14, 2009 (MON.) | FIRST WEEK |

| ITEM | FIRST DAY | SECOND DAY | THIRD DAY | FOURTH DAY | FIFTH DAY | SIXTH DAY | SEVENTH DAY | AVERAGE PER WEEK | CUMULATIVE AVERAGE |
|---|---|---|---|---|---|---|---|---|---|
| | DEC. 14 (MON.) | DEC. 15 (TUE.) | DEC. 16 (WED.) | DEC. 17 (THU.) | DEC. 18 (FRI.) | DEC. 19 (SAT.) | DEC. 20 (SUN.) | | |
| BUSINESS HOUR | 12.75 | 12.75 | 12.75 | 12.75 | 12.75 | 12.75 | 12.75 | 12.75 | – |
| TOTAL IN | 229,518 | 206,793 | 209,718 | 236,502 | 186,750 | 209,088 | 226,197 | 214,938 | – |
| TOTAL OUT | 216,081 | 194,022 | 212,535 | 250,947 | 193,491 | 207,432 | 239,940 | 216,350 | – |
| DIFFERENCE PACHINKO BALL WINNING | 13,437 | 12,771 | -2,817 | -14,445 | -6,741 | 1,656 | -13,743 | -1,412 | – |
| PACHINKO BALL WINNING RATE | 94.1% | 93.8% | 101.3% | 106.1% | 103.6% | 99.2% | 106.1% | 100.7% | – |
| SALES | 588,051 | 595,800 | 415,800 | 302,400 | 396,900 | 540,900 | 282,600 | 446,064 | – |
| PRIZE | 319,311 | 340,380 | 472,140 | 591,300 | 531,720 | 507,780 | 557,460 | 474,299 | – |
| GROSS PROFIT | 268,740 | 255,420 | -56,340 | -288,900 | -134,820 | 33,120 | -274,860 | -28,234 | – |
| BUSINESS DIVIDING NUMBER | 5.43 | 5.71 | 11.35 | 19.55 | 13.40 | 9.39 | 19.73 | 10.63 | – |
| SHOP AVERAGE OPERATION | 13,005 | 14,990 | 17,900 | 18,408 | 13,700 | 16,700 | 16,750 | 15,922 | – |

FIG. 55B

| ITEM | FIRST DAY DEC. 14 (MON.) | SECOND DAY DEC. 15 (TUE.) | THIRD DAY DEC. 16 (WED.) | FOURTH DAY DEC. 17 (THU.) | FIFTH DAY DEC. 18 (FRI.) | SIXTH DAY DEC. 19 (SAT.) | SEVENTH DAY DEC. 20 (SUN.) | AVERAGE PER WEEK | CUMULATIVE AVERAGE |
|---|---|---|---|---|---|---|---|---|---|
| IN COUNT BY MACHINE | 25,502 | 22,977 | 23,302 | 26,278 | 20,750 | 23,232 | 25,133 | 23,882 | – |
| SHOP OPERATION RATIO | 196.1% | 153.3% | 130.2% | 142.8% | 151.5% | 139.1% | 150.0% | 150.0% | – |
| OUT COUNT BY MACHINE | 24,009 | 21,558 | 23,615 | 27,883 | 21,499 | 23,048 | 26,660 | 24,039 | – |
| NUMBER OF DIRREFERNCE PACHINKO BALLS BY MACHINE | 1,493 | 1,419 | -313 | -1,605 | -749 | 184 | -1,527 | -157 | – |
| SALES BY MACHINE | 65,339 | 66,200 | 46,200 | 33,600 | 44,100 | 60,100 | 31,400 | 49,563 | – |
| GROSS PROFIT PER MACHINE | 29,860 | 28,380 | -6,260 | -32,100 | -14,980 | 3,680 | -30,540 | -3,137 | – |
| IN COUNT PER HOUR | 2,000 | 1,802 | 1,828 | 2,061 | 1,627 | 1,822 | 1,971 | 1,873 | – |
| OUT COUNT PER HOUR | 1,883 | 1,691 | 1,852 | 2,187 | 1,686 | 1,808 | 2,091 | 1,885 | – |
| SALES COUNT PER HOUR | 5,125 | 5,192 | 3,624 | 2,635 | 3,459 | 4,714 | 2,463 | 3,887 | – |
| COIN UNIT PRICE | 2.56 | 2.88 | 1.98 | 1.28 | 2.13 | 2.59 | 1.25 | 2.08 | – |

FIG. 67  Appearance Distribution of Pack

FIG. 72 Device type E Appearance Distribution of Pack

FIG. 75
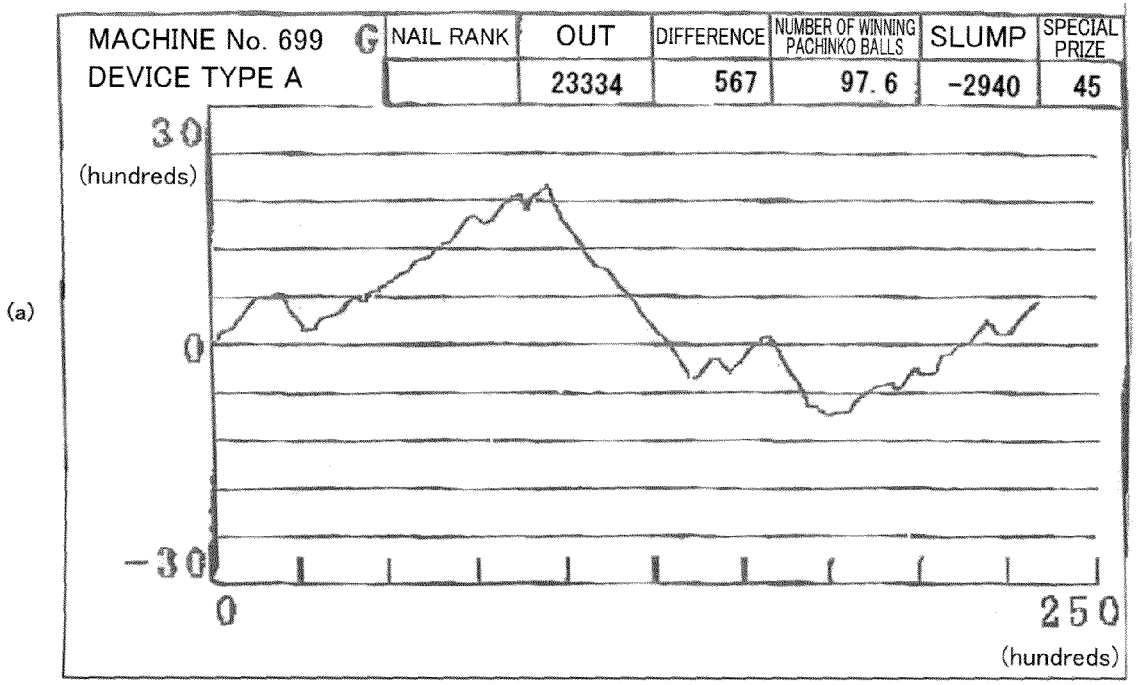
(a)
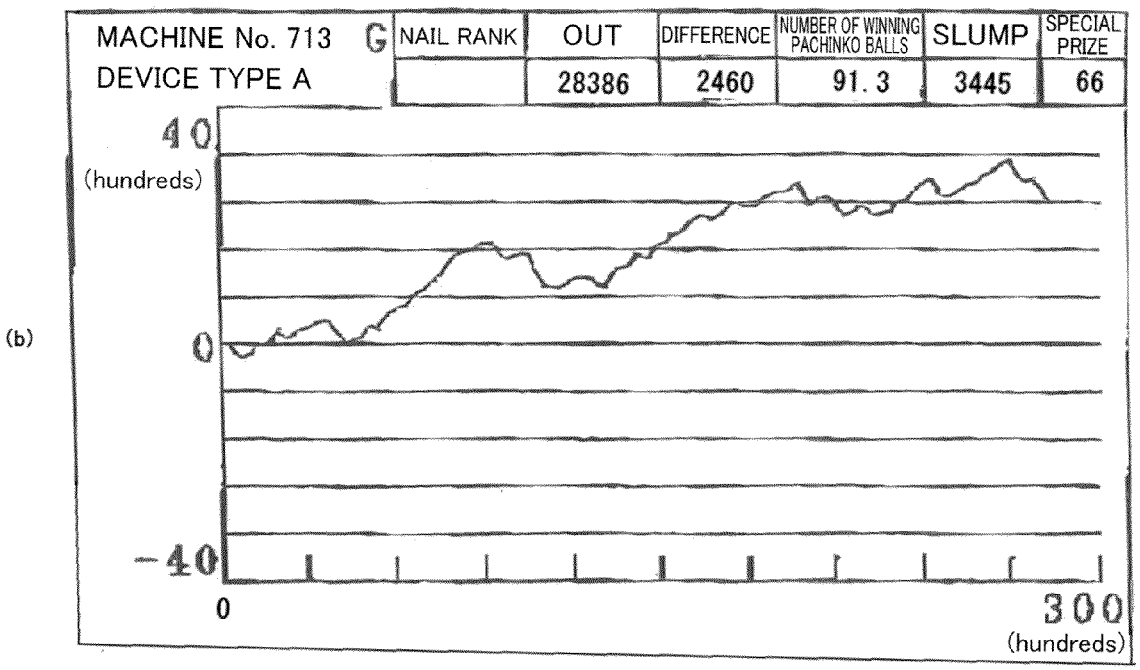
(b)

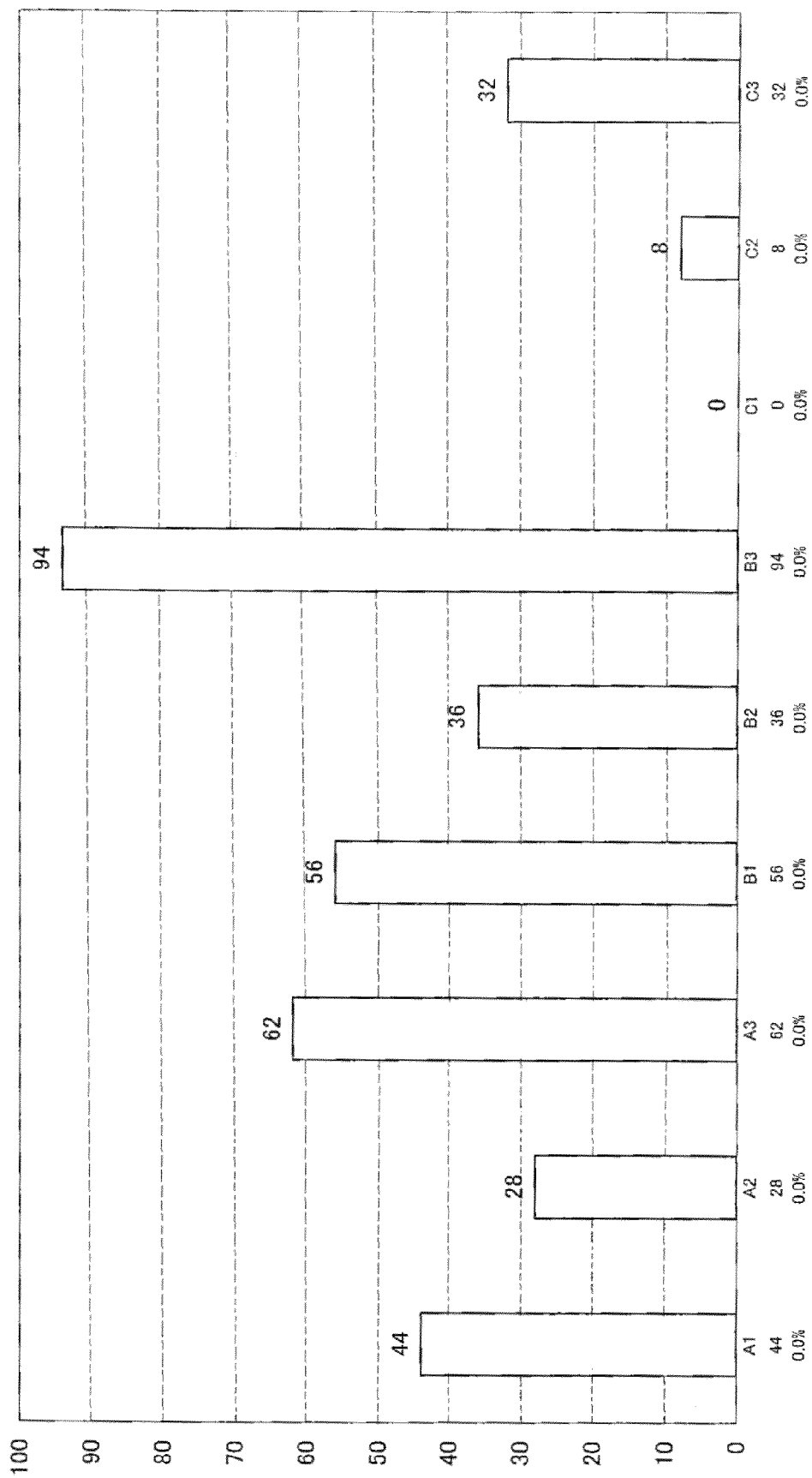
FIG. 77  Distribution by waveform type — Device type A

FIG. 78A

[NUMBER OF SETUPS]
 PS: 284 MACHINES; PC: 538 MACHINES
[CONDITION OF LOCATION]
 ALONG MAIN TRUNK LINE IN MATSUYAMA CITY, EHIME PREFECTURE (ADJACENT TO CROSSING POINT)
 MAIN VISITING METHOD: AUTOMOBILE

《TOTAL》
· OPERABILITY BY DEVICE TYPE: 16,806
· OPERABILITY BY SHOP: 12,530 (134.1%)
· SALES BY MACHINE: 42,609 YEN (2.54)
· SALES DIVIDING NUMBER: 8.90
· TOTAL NUMBER OF PLAYERS: 2,948 PLAYERS
· PRIZE EXCHANGE RATE: 29.1% (859 PLAYERS)
· PLAYER WINNING RATE: 22.2% (654 PLAYERS)

| ELAPSED DAYS | DECEMBER 14 (MONDAY) | DECEMBER 15 (TUESDAY) | DECEMBER 16 (WEDNESDAY) | DECEMBER 17 (THURSDAY) | DECEMBER 18 (FRIDAY) | DECEMBER 19 (SATURDAY) | DECEMBER 20 (SUNDAY) |
|---|---|---|---|---|---|---|---|
| TOTAL NUMBER OF PLAYERS | 132 PLAYERS | 284 PLAYERS | 250 PLAYERS | 244 PLAYERS | 208 PLAYERS | 224 PLAYERS | 208 PLAYERS |
| PRIZE EXCHANGE RATE | 48.5% (64 PLAYERS) | 27.5% (78 PLAYERS) | 31.6% (79 PLAYERS) | 29.1% (71 PLAYERS) | 21.6% (45 PLAYERS) | 27.2% (61 PLAYERS) | 36.1% (75 PLAYERS) |
| PLAYER WINNING RATE | 38.6% (51 PLAYERS) | 24.6% (70 PLAYERS) | 20.4% (51 PLAYERS) | 23.8% (58 PLAYERS) | 13.9% (29 PLAYERS) | 19.6% (44 PLAYERS) | 30.8% (64 PLAYERS) |
| BUSINESS HOUR | 8.25 | 14.25 | 14.25 | 14.25 | 14.25 | 14.25 | 14.25 |
| OPERABILITY BY DEVICE TYPE | 15,623 | 21,981 | 18,759 | 16,318 | 13,151 | 21,793 | 22,586 |
| OPERABILITY BY SHOP | — | 12,533 | 13,224 | 11,222 | 11,200 | 13,200 | 13,469 |
| SALES BY MACHINE | 36,734 | 51,047 | 47,781 | 47,718 | 33,688 | 54,937 | 50,916 |
| SALES DIVIDING NUMBER | 12.74 | 9.06 | 8.57 | 7.58 | 6.95 | 9.67 | 11.85 |
| WEATHER | SUNNY | CLOUDY | SUNNY -> RAINY | SUNNY | SUNNY -> CLOUDY | SUNNY -> CLOUDY | SUNNY -> CLOUDY |
| TEMPERATURE | 15.3–6.7 | 11.3–4.4 | 89.6–5.0 | 8.5–3.7 | 7.5–3.3 | 7.1–2.4 | 9.2–4.5 |

FIG. 78B

| ELAPSED DAYS | DECEMBER 21 (MONDAY) | DECEMBER 22 (TUESDAY) | DECEMBER 23 (WEDNESDAY) | DECEMBER 24 (THURSDAY) | DECEMBER 25 (FRIDAY) | DECEMBER 26 (SATURDAY) | DECEMBER 27 (SUNDAY) |
|---|---|---|---|---|---|---|---|
| TOTAL NUMBER OF PLAYERS | 193 PLAYERS | 189 PLAYERS | 203 PLAYERS | 170 PLAYERS | 182 PLAYERS | 245 PLAYERS | 216 PLAYERS |
| PRIZE EXCHANGE RATE | 26.4% (51 PLAYERS) | 34.9% (66 PLAYERS) | 22.2% (45 PLAYERS) | 28.2% (48 PLAYERS) | 24.7% (45 PLAYERS) | 26.1% (64 PLAYERS) | 31.0% (67 PLAYERS) |
| PLAYER WINNING RATE | 19.7% (38 PLAYERS) | 24.3% (46 PLAYERS) | 14.8% (30 PLAYERS) | 24.7% (42 PLAYERS) | 20.9% (38 PLAYERS) | 17.1% (42 PLAYERS) | 23.6% (51 PLAYERS) |
| BUSINESS HOUR | 14.25 | 14.25 | 14.25 | 14.25 | 14.25 | 14.25 | 14.25 |
| OPERABILITY BY DEVICE TYPE | 14,258 | 15,872 | 17,745 | 11,175 | 11,881 | 17,118 | 17,017 |
| OPERABILITY BY SHOP | 11,454 | | 13,500 | 9,500 | 12,900 | 14,000 | 13,500 |
| SALES BY MACHINE | 37,172 | | 51,131 | 24,975 | 31,188 | 45,344 | 41,281 |
| SALES DIVIDING NUMBER | 7.80 | | 5.82 | 11.61 | 8.54 | 8.92 | 7.23 |
| WEATHER | SUNNY -> CLOUDY | CLOUDY -> SUNNY | SUNNY -> CLOUDY | SUNNY -> CLOUDY | SUNNY -> RAINY | SUNNY | SUNNY |
| TEMPERATURE | 8.8-4.1 | 10.9-1.3 | 15.1-4.4 | 13.8-5.7 | 13.2-3.4 | 10.7-8.8 | 12.5-1.1 |

Distribution of number of exchanges (first day)

Distribution of use amount of money (first day)

FIG. 88

Number of setups: PS: 106 machines (PS-exclusive shop)
Condition of location: Shop in front of Meguro Station, Tokyo Shopping mall and Tokyo Gakugei University near this location 《 Total 》
- Operability by device type: 19,105
- Operability by shop: 8,828 (216.4%)
- Sales by machine: 53,760 Yen (2.81)
- Sales dividing number: 7.67
- Total number of players: 152 players
- Prize exchange rate: 46.1% (70 players)
- Player winning rate: 31.6% (48 players)

| Elapsed days | December 22 (Tuesday) | December 23 (Wednesday) | December 24 (Thursday) | December 25 (Friday) | December 26 (Saturday) | December 27 (Sunday) | December 28 (Monday) |
|---|---|---|---|---|---|---|---|
| Total number of players | | 18 players | 25 players | 29 players | 30 players | 21 players | 29 players |
| Prize exchange rate | | 55.6% (10 players) | 48.0% (12 players) | 41.4% (12 players) | 53.3% (16 players) | 33.3% (7 players) | 44.0% (13 players) |
| Player winning rate | | 38.9% (7 players) | 20.0% (5 players) | 31.0% (9 players) | 40.0% (12 players) | 23.8% (5 players) | 34.0% (10 players) |
| Business hour | | 12.75 | 12.75 | 12.75 | 12.75 | 12.75 | 12.75 |
| Operability by device type | | 23,830 | 18,529 | 14,941 | 18,487 | 23,389 | 15,456 |
| Operability by shop | | 11,500 | | 6,600 | | | 8,383 |
| Sales by machine | | 16,250 | 57,260 | 38,640 | 60,700 | 54,860 | 49,020 |
| Sales Dividing number | | 8.72 | 8.70 | 10.61 | 5.49 | 4.82 | 6.41 |
| Weather | | Sunny | Sunny | Sunny | Cloudy –> sunny | Cloudy | Cloudy –> sunny |
| Temperature | | 12.3–2.3 | 13.8–4.9 | 12.0–7.3 | 12.9–6.7 | 12.0–7.4 | 14.2–6.7 |

FIG. 89

| Number of setups | PS: 98 machines (exchange of 6.0 pieces), PC: 396 machines |
| Condition of location | Along Trunk Line in Street Shop with Expressway Interchange and 1 kilometer along Trunk Line from Main Stations |

《 Total 》
- Operability by device type: 25,594
- Operability by shop: 18,563 (137.9%)
- Sales by machine: 44,297 Yen (1.73)
- Sales dividing number: 11.12
- Total number of players: 168 players
- Prize exchange rate: 47.6% (80 players)
- Player winning rate: 33.3% (56 players)

| Elapsed days | December 21 (Monday) | December 22 (Tuesday) | December 23 (Wednesday) | December 24 (Thursday) | December 25 (Friday) | December 26 (Saturday) | December 27 (Sunday) | December 28 (Monday) |
|---|---|---|---|---|---|---|---|---|
| Total number of players | 5 players | 18 players | 25 players | 29 players | 30 players | 21 players | 29 players | 11 players |
| Prize exchange rate | 80.0% (4 players) | 55.6% (10 players) | 48.0% (12 players) | 41.4% (12 players) | 53.3% (16 players) | 33.3% (7 players) | 44.0% (13 players) | 54.5% (6 players) |
| Player winning rate | 60.0% (3 players) | 38.9% (7 players) | 20.0% (5 players) | 31.0% (9 players) | 40.0% (12 players) | 23.8% (5 players) | 34.0% (10 players) | 45.5% (5 players) |
| Business hour | 11.75 | 12.75 | 12.75 | 12.75 | 12.75 | 12.75 | 12.75 | 12.75 |
| Operability by device type | 22,211 | 25,883 | 25,963 | 25,316 | 25,751 | 26,323 | 27,370 | 25,936 |
| Operability by shop | 19,000 | 18,500 | 20,000 | 18,000 | 18,000 | 19,000 | 18,000 | 18,000 |
| Sales by machine | 16,250 | 49,000 | 33,875 | 82,250 | 52,750 | 29,250 | 43,750 | 47,250 |
| Sales Dividing number | 46.50 | 6.86 | 12.22 | 4.33 | 7.47 | 16.87 | 13.31 | 12.85 |
| Weather | Sunny | Cloudy –> sunny | Sunny | Sunny | Sunny | Cloudy –> sunny | Sunny –> cloudy | Rainy –> sunny |
| Temperature | 9.8–4.4 | 9.5–0.7 | 12.6–2.3 | 14.3–4.3 | 12.3–6.5 | 12.5–5.9 | 12.6–6.2 | 13.2–6.2 |

FIG. 90

[ Number of setups ] PS: 179 machines, PC: 425 machines
[ Condition of location ] 5 minutes by walk from a main station in Tokyo
Multiple floors in building (B1F and 1F)

《 Total 》
- Operability by device type: 23,319
- Operability by shop: 16,196 (144.0%)
- Sales by machine: 58,457 Yen (2.51)
- Sales dividing number: 6.80
- Total number of players: 178 players
- Prize exchange rate: 36.0% (64 players)
- Player winning rate: 18.0% (32 players)

| Elapsed days | December 21 (Monday) | December 22 (Tuesday) | December 23 (Wednesday) | December 24 (Thursday) | December 25 (Friday) | December 26 (Saturday) | December 27 (Sunday) |
|---|---|---|---|---|---|---|---|
| Total number of players | 11 players | 30 players | 17 players | 27 players | 28 players | 21 players | 44 players |
| Prize exchange rate | 63.6% (7 players) | 50.0% (15 players) | 47.1% (8 players) | 48.1% (13 players) | 25.0% (7 players) | 28.6% (6 players) | 18.2% (8 players) |
| Player winning rate | 36.4% (4 players) | 16.7% (5 players) | 23.5% (4 players) | 25.9% (7 players) | 10.7% (3 players) | 9.5% (2 players) | 15.9% (7 players) |
| Business hour | 5.75 | 13.75 | 13.75 | 13.75 | 13.75 | 13.75 | 13.75 |
| Operability by device type | 11,681 | 25,091 | 24,633 | 24,632 | 25,273 | 26,530 | 25,396 |
| Operability by shop | 12,300 | 15,749 | 17,068 | 13,549 | 15,463 | 18,493 | 20,751 |
| Sales by machine | 24,600 | 70,200 | 50,000 | 54,800 | 69,200 | 63,600 | 76,800 |
| Sales Dividing number | 11.59 | 6.09 | 9.33 | 9.26 | 4.72 | 6.77 | 4.43 |
| Weather | Sunny | Sunny | Sunny | Sunny | Sunny | Cloudy -> sunny | Cloudy |
| Temperature | 9.0-3.8 | 10.6-2.6 | 12.3-2.3 | 13.8-4.9 | 12.0-7.3 | 12.9-6.7 | 12.0-7.4 |

FIG. 91

[ Number of setups ] PS: 93 machines (exchange of 5.5 pieces), PC: 118 machines
[ Condition of location ] Front of Keio line station in Tokyo
Neighboring residential area 《 Total 》
- Operability by device type: 19,596
- Operability by shop: 11,530 (170.0%)
- Sales by machine: 41,969 Yen (2.14)
- Sales dividing number: 10.78
- Total number of players: 293 players
- Prize exchange rate: 32.4 (95 players)
- Player winning rate: 27.6% (81 players)

| Elapsed days | December 21 (Monday) | December 22 (Tuesday) | December 23 (Wednesday) | December 24 (Thursday) | December 25 (Friday) | December 26 (Saturday) | December 27 (Sunday) | December 28 (Monday) |
|---|---|---|---|---|---|---|---|---|
| Total number of players | 37 players | 43 players | 53 players | 29 players | 39 players | 38 players | 27 players | 27 players |
| Prize exchange rate | 35.1% (13 players) | 39.5% (17 players) | 35.8% (19 players) | 34.5% (10 players) | 20.5% (8 players) | 26.3% (10 players) | 33.3% (9 players) | 33.3% (9 players) |
| Player winning rate | 29.7% (11 players) | 34.9% (15 players) | 34.0% (18 players) | 27.6% (8 players) | 17.9% (7 players) | 21.1% (8 players) | 25.9% (7 players) | 25.9% (7 players) |
| Business hour | 13.75 | 13.75 | 13.75 | 13.75 | 13.75 | 13.75 | 13.75 | 13.75 |
| Operability by device type | 25,396 | 26,046 | 17,958 | 10,712 | 13,723 | 22,664 | 15,912 | 24,359 |
| Operability by shop | 15,146 | 15,537 | 11,395 | 5,048 | 6,117 | 12,578 | 10,462 | 15,960 |
| Sales by machine | 53,500 | 43,250 | 41,125 | 29,125 | 45,125 | 50,000 | 31,500 | 42,125 |
| Sales Dividing number | 12.68 | 11.24 | 13.28 | 7.79 | 3.25 | 9.56 | 15.00 | 13.87 |
| Weather | Sunny | Sunny | Sunny | Sunny | Sunny | Cloudy -> sunny | Cloudy | Cloudy -> sunny |
| Temperature | 9.0-3.8 | 10.6-2.6 | 12.3-2.3 | 13.8-4.9 | 12.0-7.3 | 12.9-6.7 | 12.0-7.4 | 14.2-6.7 |

FIG. 92
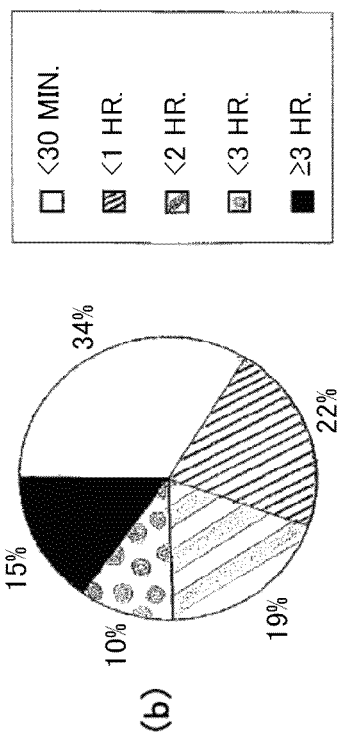
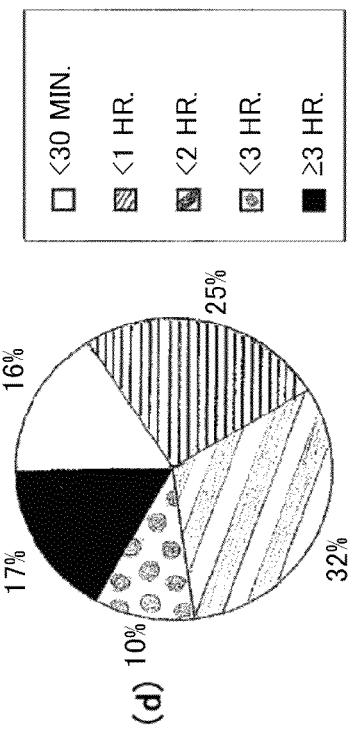
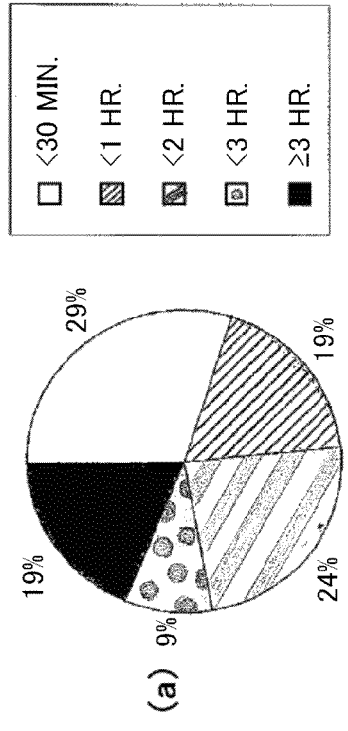
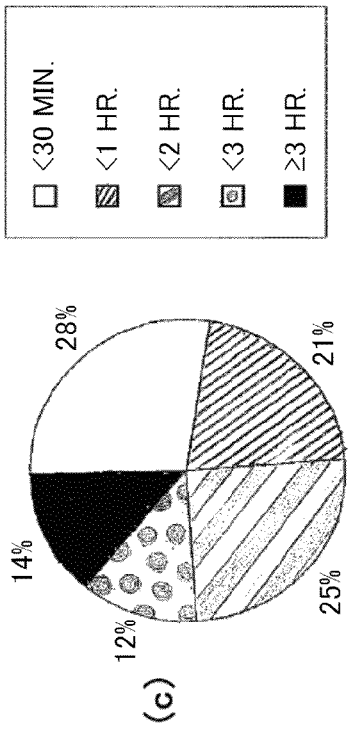

FIG. 93
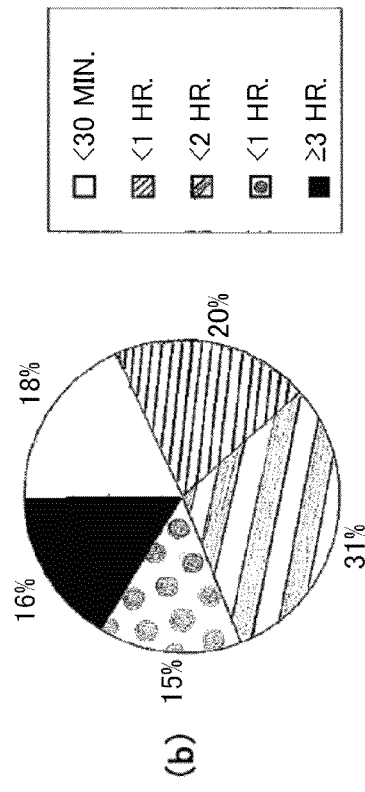
(a) GAME PLAYING TIME OF FIFTH DAY (CONTINUOUS 8 DAYS)
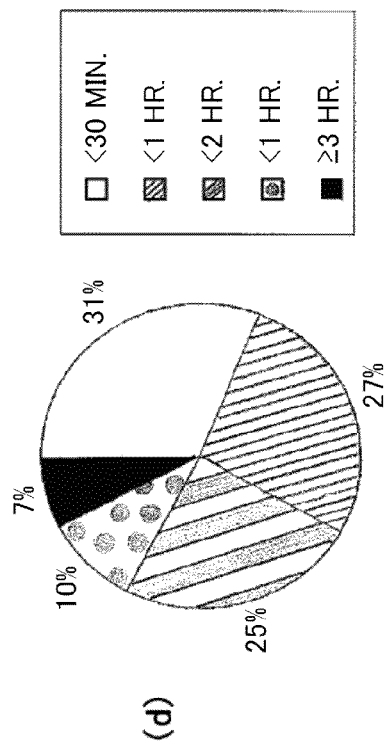
(b) GAME PLAYING TIME OF SIXTH DAY (CONTINUOUS 8 DAYS)
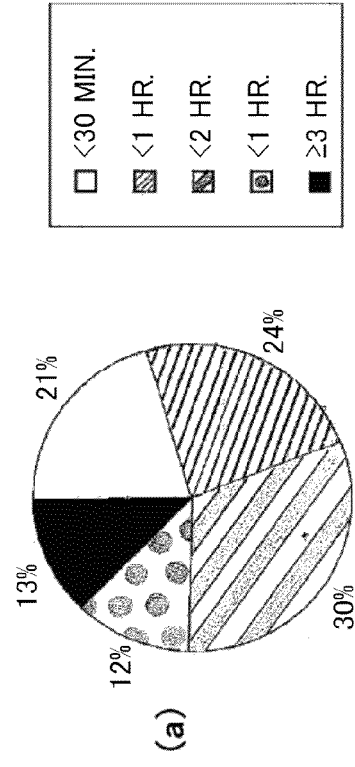
(c) GAME PLAYING TIME OF SEVENTH DAY (CONTINUOUS 8 DAYS)
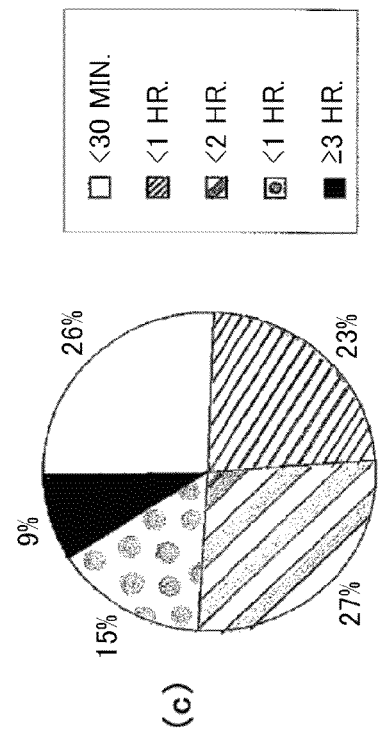
(d) GAME PLAYING TIME OF EIGHTH DAY (CONTINUOUS 8 DAYS)

FIG. 94
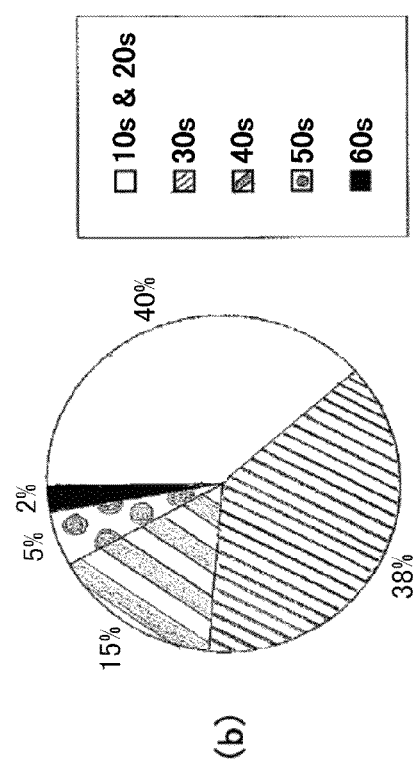
(b) AGE OF PLAYERS ON SECOND DAY (CONTINUOUS 8 DAYS)
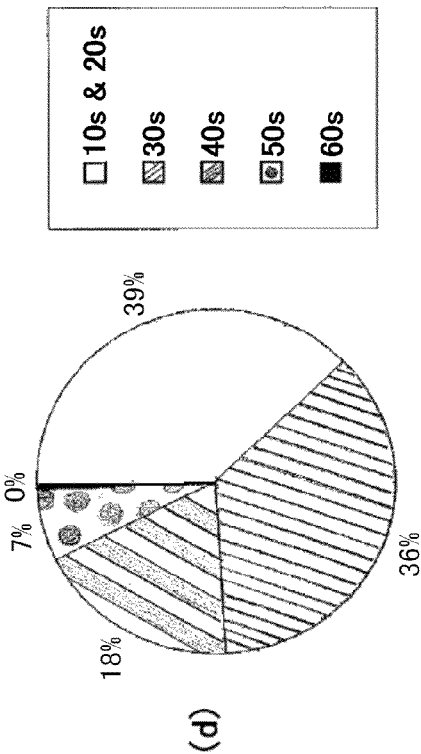
(d) AGE OF PLAYERS ON FOURTH DAY (CONTINUOUS 8 DAYS)
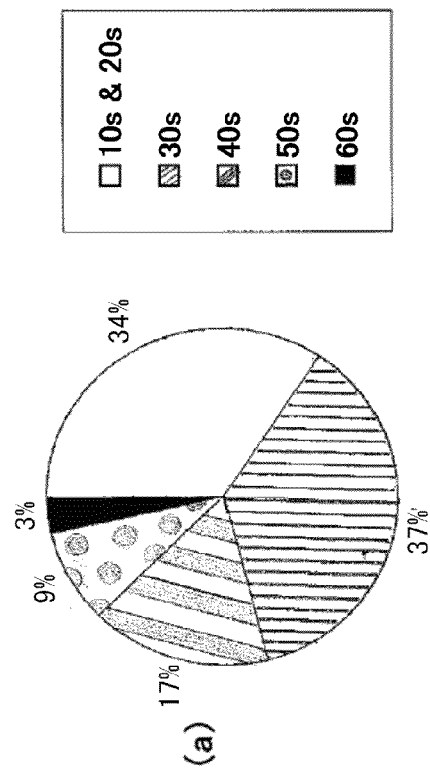
(a) AGE OF PLAYERS ON FIRST DAY (CONTINUOUS 8 DAYS)
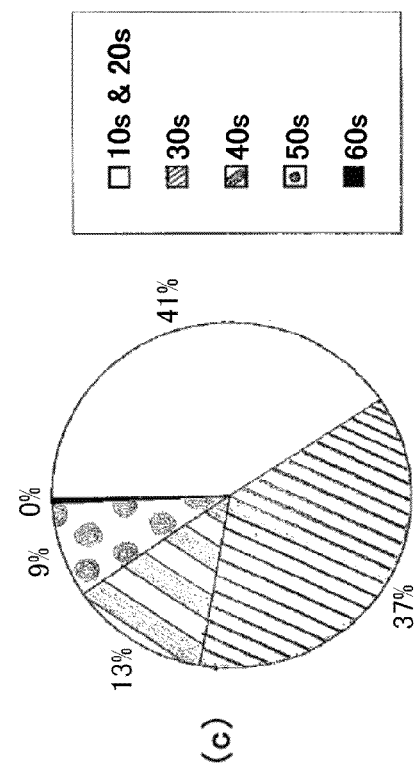
(c) AGE OF PLAYERS ON THIRD DAY (CONTINUOUS 8 DAYS)

FIG. 95
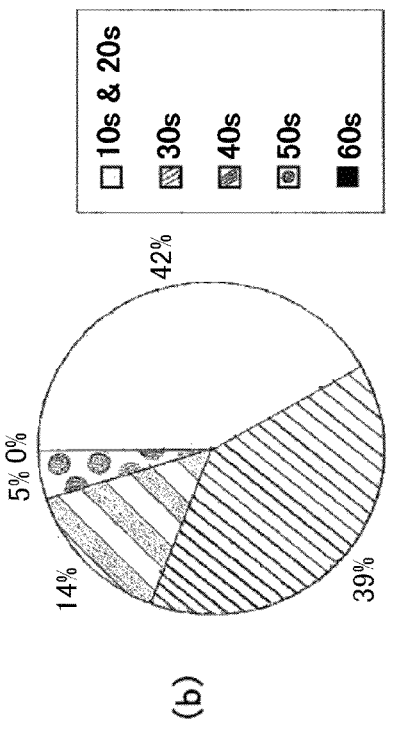
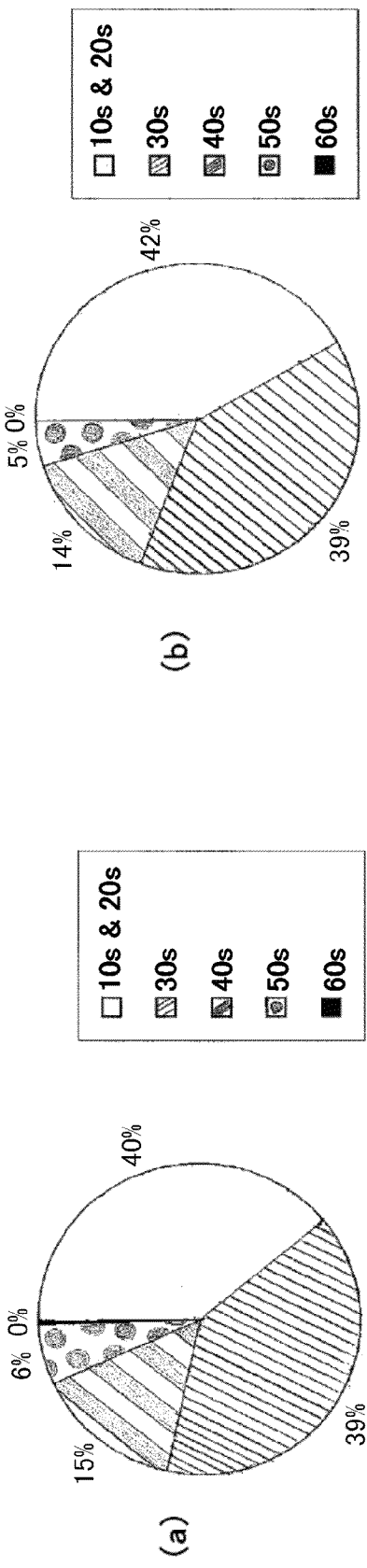
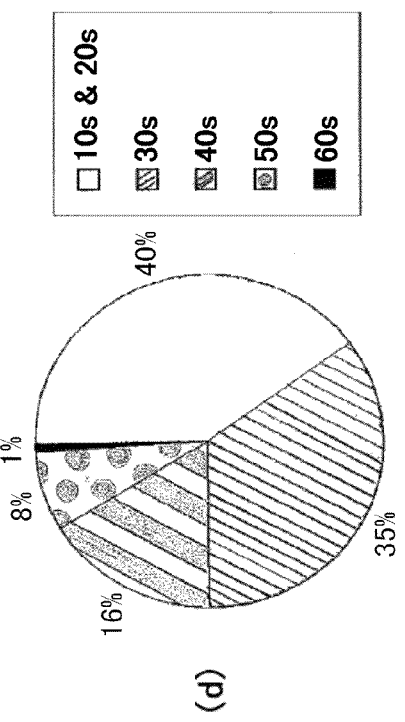
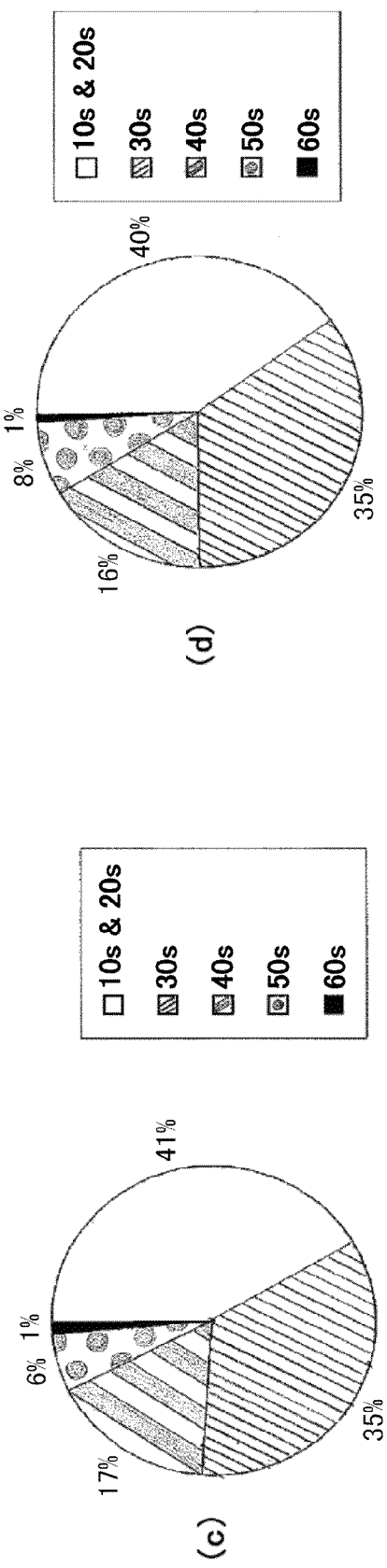

FIG. 96
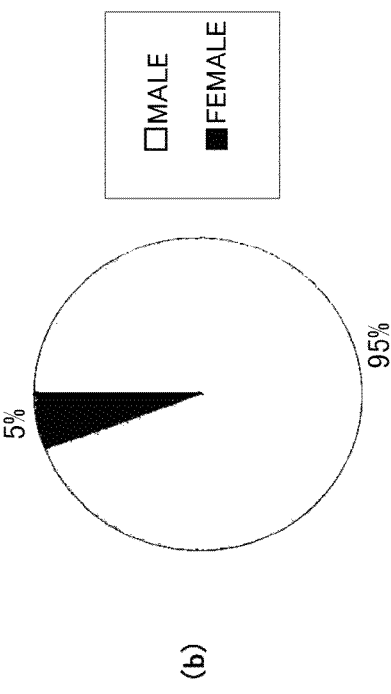
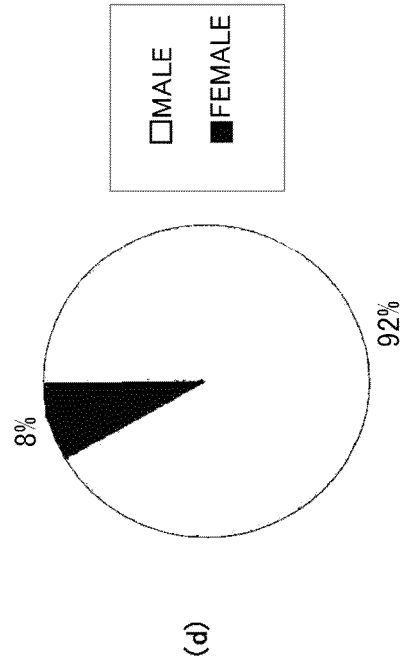
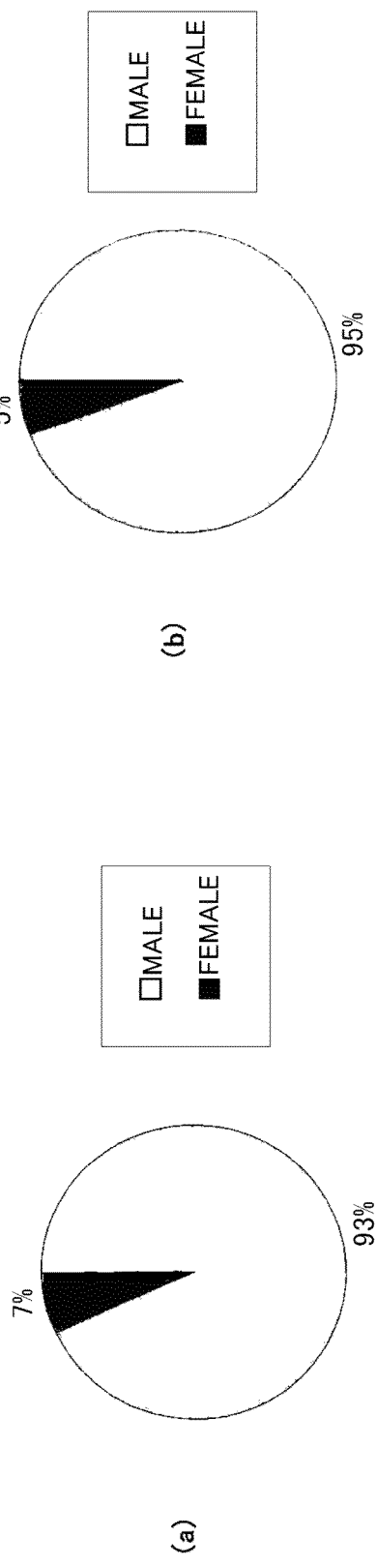
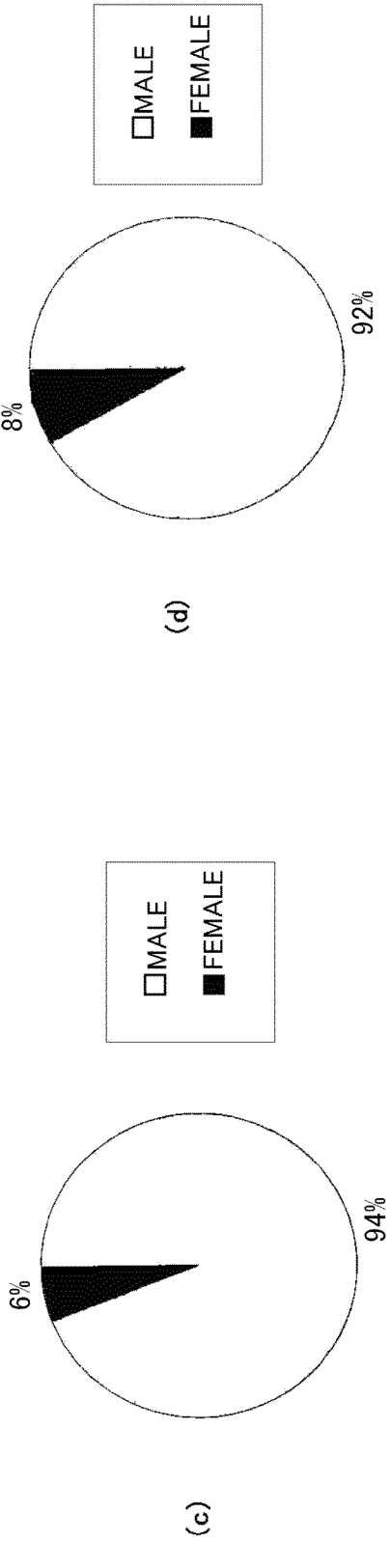

FIG. 99
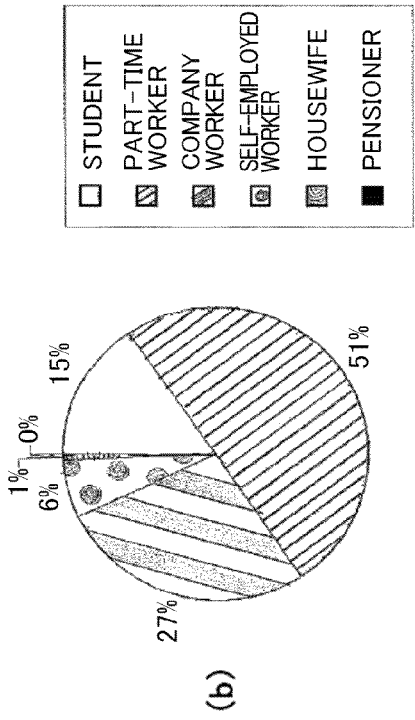
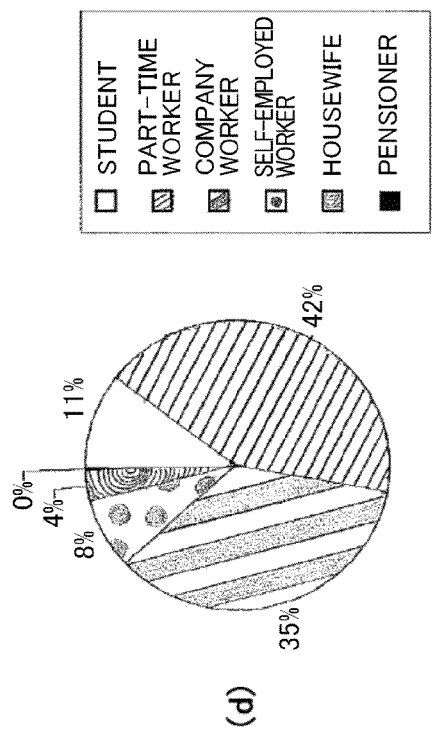
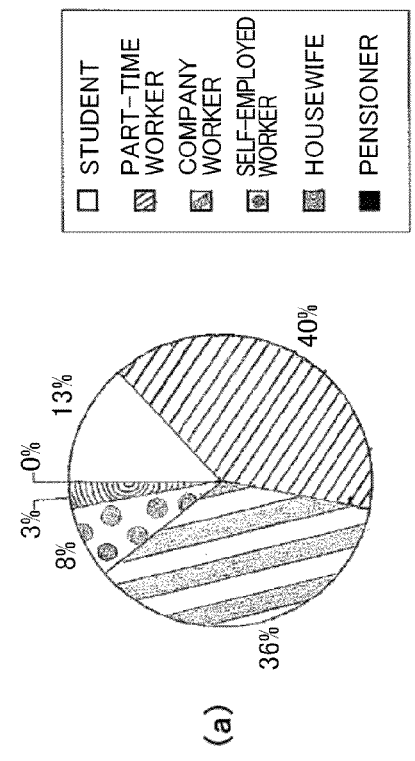
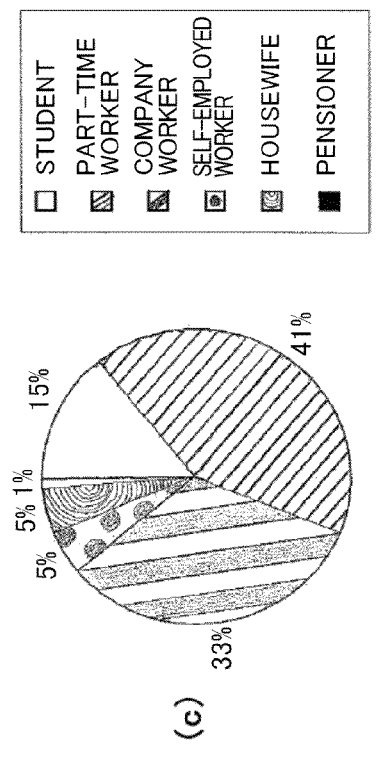

FIG. 104
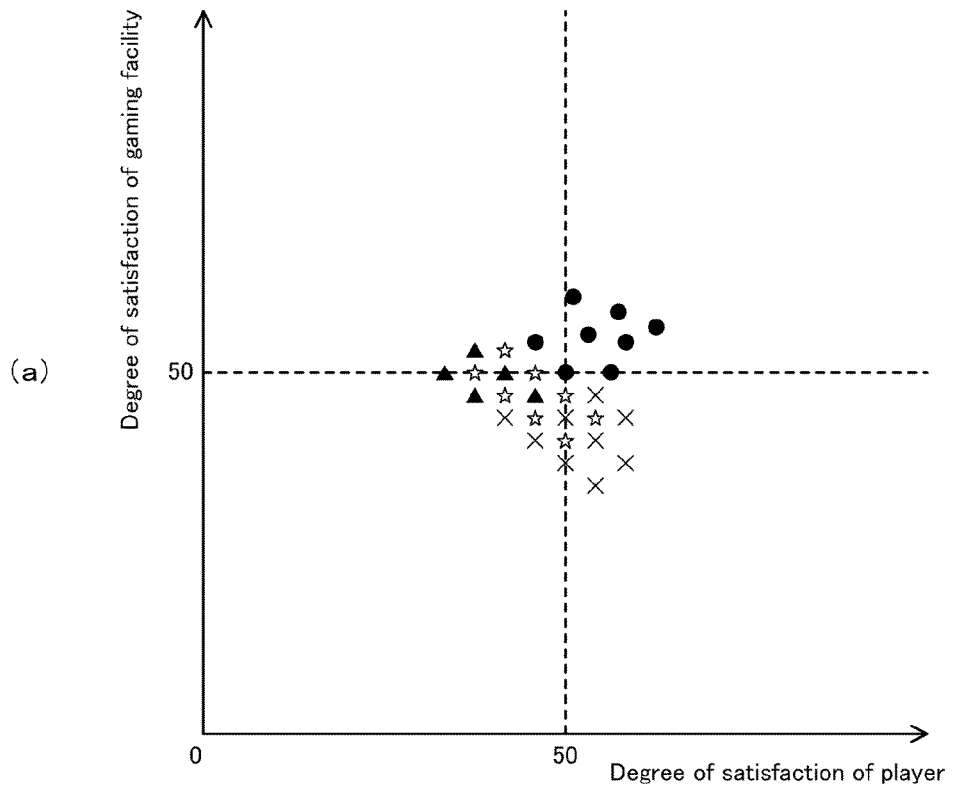
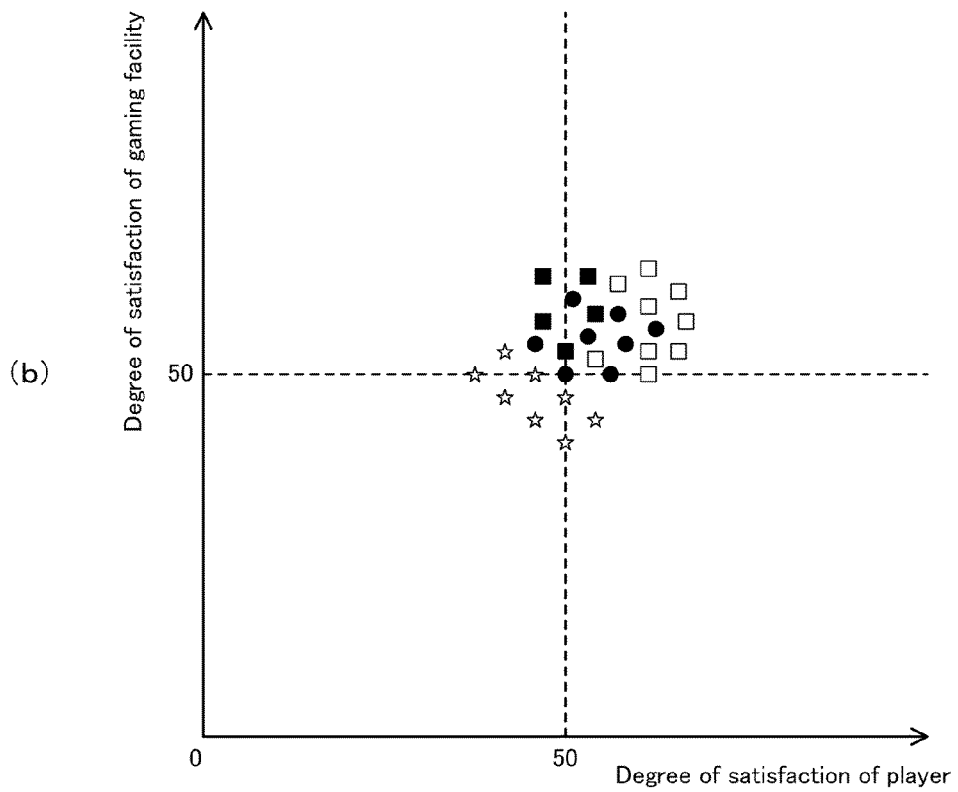

FIG. 106
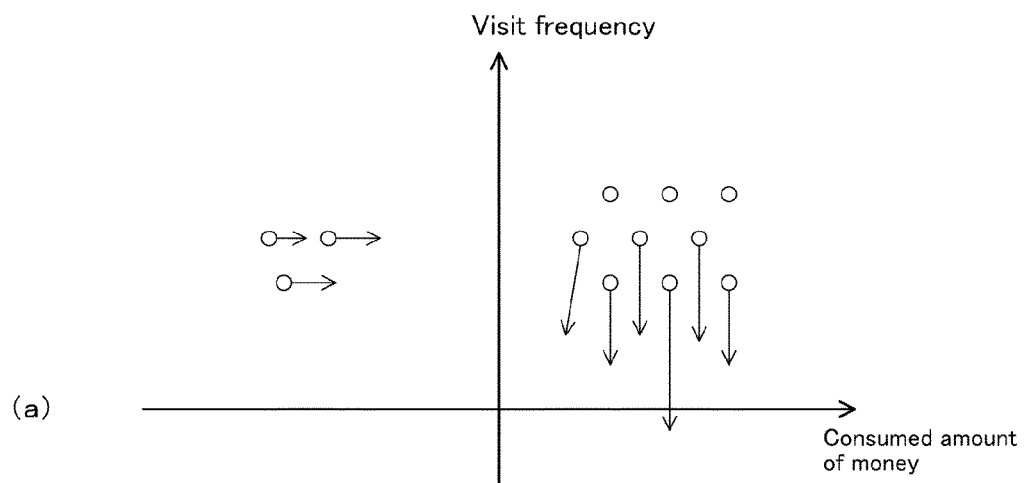
(a)
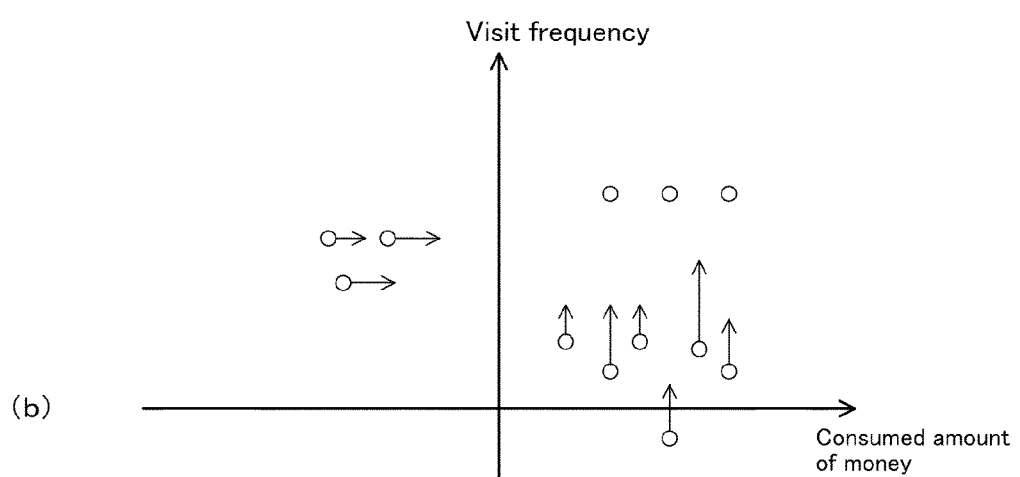
(b)

FIG. 108
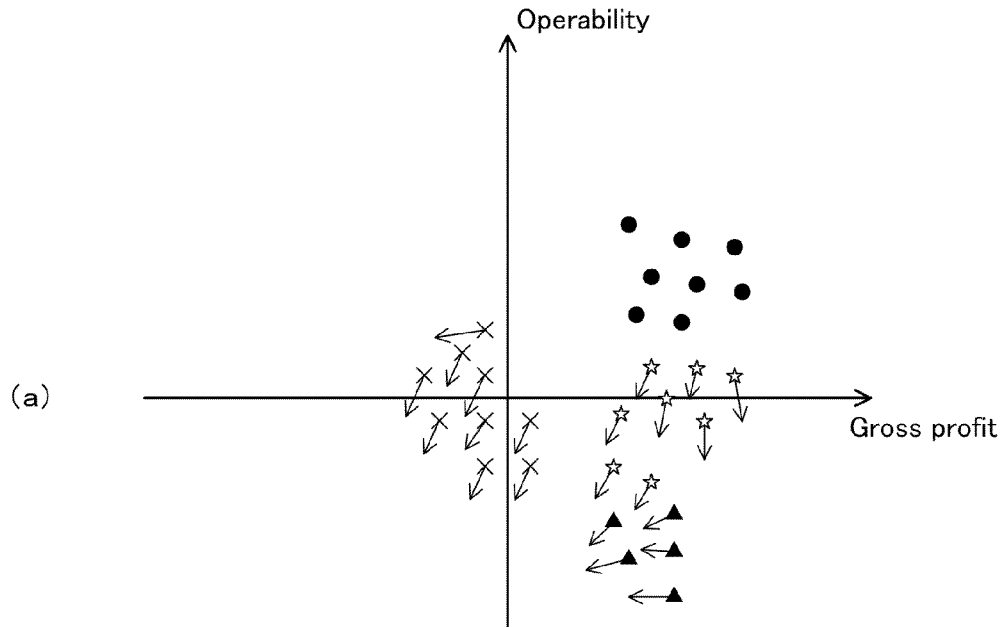
(a)
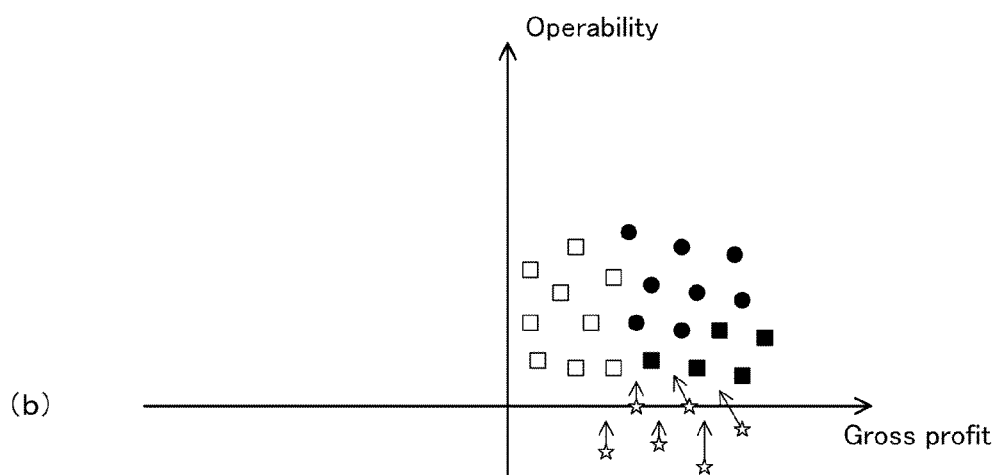
(b)

GAME INFORMATION CONSOLIDATION SYSTEM

CROSS-REFERENCES TO RELATED APPLICATION

This application is a Continuation application of U.S. patent application Ser. No. 13/504,795 filed on Apr. 27, 2012, which is a National Stage application of PCT/2010/067635 filed on Oct. 7, 2010, which claims priority to Japanese Patent Application No. 2009-262822 filed Nov. 18, 2009 and Japanese Patent Application No. 2010-031196 filed Feb. 16, 2010, the contents of which are incorporated herein by reference.

TECHNICAL FIELD

The present invention relates to a game playing information integration system for acquiring game playing information.

BACKGROUND ART (I) With respect to a game playing information integration system, it has been conventionally a proposition to design gaming machines which sell well for manufacturers to design, manufacture, and sell gaming machines. As approaches for achieving this object, it has been a routine practice to introduce new functions or stage effects to induce a sense of expectation or to promote famous copyrights in contents that are used in gaming machines while paying a large amount of license fees. However, manufacturers themselves have intuitively or experientially determined as to whether or not the device is an excellent gaming machine; and therefore, even if these approaches are employed, the popularity of gaming machines has often superseded the manufacturers' predictions.

Incidentally, for example, there are a variety of players' preferences for gaming machines such as differences in players' preferences depending on geographical conditions such as local area characteristics such as Kyushu or Tokyo or whether or not the condition of location is near universities, differences in preferences of customer categories depending on time intervals such as differences in visit time of housewives or businessmen, or differences in preferences of fixed customers (manias), unfixed customers (browsing customers), or novices (beginners), and such preferences are different depending on players. In addition, in respect of the management side of gaming facilities, requests for gaming machines that they desire to install in the gaming facilities are also different depending on the gaming facilities. For example, one gaming facility of the adjacent two gaming facilities desires to install gaming machines of such device type to stimulate gambling mind of players, whereas the other gaming facility desires to install gaming machines of such device type to enjoy the play of game over a long period of time without exerting such gambling mind. Namely, even within a same local area, the requests from the gaming facilities as to gaming machines may be different depending on management policy. Therefore, on the manufacturers' side, it is impossible to satisfy the requests of all players and gaming machines, and it is also unavoidable to design gaming machines while taking the greatest common preferences of all.

In such a present situation, in order for a gaming facility to obtain the maximal profit, the gaming facility itself must continuously install gaming machines of which device type and number is assigned in accordance with the request of that gaming facility and the preferences of players visiting the gaming facility.

However, timing of replacement with gaming machines of new device type has been conventionally determined on the basis of rule of thumb; and therefore, a difference takes place with economic efficiency related to the replacement, depending on persons who determine such replacement, and as a result, there has been apprehension that the gaming facility loses profit. In addition, while, in a gaming machine, settings which are able to change a winning probability in a predetermined range are provided at a plurality of stages in general, these settings are often adjusted on the basis of rule of thumb; and therefore, a balance between improvement of ability to attract customers by setting a current mode to a high probability mode, the profit of the gaming facility lowers, and as a result, there has been apprehension that the gaming facility loses profit. Further, there has been a problem that the manager in gaming facility takes preference to only improvement of one's own immediate profit against the manager's thought, highly sets a dividing number, and causes fixed customer to lose interest in shop in a long run.

In Patent Document 1, there is disclosure of a management apparatus for gaming facility to sum and manage work data on pachinko gaming machines.

(II) With respect to an apparatus for displaying game playing information by gaming machine, conventionally, a "cashbox" containing players' winning pachinko balls have been accumulatively placed around the players with an aim to render a stage effect to attract customers. If the amount of accumulations in this cashbox increases, it is an attractive promotion that the shop has a gaming machine that hits well; and however, there has potentially existed a problem that, if there arises a need to take refuge from shop in case of an emergency such as fire or earthquake, such cashbox becomes an obstacle, which causes delayed taking refuge. Therefore, there has existed a shop in which, if a predetermined amount in cashbox is reached, the shop staff carries the cashbox to a counting device and then the amount of money in cashbox is artificially limited to a predetermined number. On the other hand, recently, there have been more shops in which individual counting devices are provided at the respective pachinko gaming machines so as not to use the cashbox. It is inferred that such a trend will be introduced in all the related shops in the near future from the viewpoint of safety to sufficiently ensure a passageway to take refuge.

However, there has arisen a new problem that, if counting is thus performed by means of an individual counting device, it becomes impossible to visually appeal the fact that it is a fair gaming facility or there is a pachinko gaming machine that hits well by physically accumulating the cashbox.

Conventionally, it has been numerically indicated as to whether or not individual pachinko gaming machines hit well by means of input with the use of an input switch of the apparatus for displaying information by gaming machine, which is installed at an upper side of each gaming machine; and however, it has been sometimes inferior to an effect to physically display such as accumulating a cashbox as seen conventionally. In addition, there has also been a problem that, although it is possible to see the characteristics of a gaming machine which is not in play, it is difficult to see the characteristics of a gaming machine in play.

In Patent Document 2, there is disclosure of an apparatus for displaying information by gaming machine, including a function of displaying game playing information such as the number of big hits or the number of games played.

(III) In a case where there takes place a failure that no game playing pachinko ball is supplied to a gaming machine, a check work of pachinko ball jam in supply bucket or bellows and the like within a gaming machine bank is performed by the shop staff in gaming machine. The check work of pachinko ball jam is generally performed by upwardly turning a rack plate that is arranged on a front face of the supply bucket. This work is cumbersome in that, from the viewpoint of a player, concentration to the play of game is prevented or the play of game is forced to be interrupted, and it is desirable to speedily finish the work. For the gaming facility also, it is desirable to complete the check work of pachinko ball jam as speedily as possible from the viewpoint of operability. On the other hand, for the employees in gaming facility, for example, even if it is a comparatively less powerful employee such as women, it is desirable to be able to speedily complete the work.

PRIOR ART DOCUMENT

Patent Document

[Patent Document 1] Japanese Unexamined Patent Application Publication No. 11-207001
[Patent Document 2] Japanese Unexamined Patent Application Publication No. 2006-247043

SUMMARY OF THE INVENTION

Problem(s) to be Solved by the Invention (I) With respect to a game playing information integration system, in the management apparatus for gaming facility, described in Patent Document 1, it is possible to perform summing and management of operability data, and then, based on the data, perform determination of whether or not settings or the like in service time are appropriate; and therefore, it may be possible to normalize the settings or the like in service time. However, it is impossible to perform analysis as to customer category; and therefore, with respect to timing of replacement with gaming machines of new device type or adjustment of settings, it is difficult to continuously perform selections or settings according to the preferences of players, in particular, fixed customers, over a long period of time.

(II) With respect to the apparatus for displaying game playing information by gaming machine, the apparatus for displaying game playing information, which is described in Patent Document 2, is capable of displaying game playing information related to a gaming machine for a player who is playing game at the gaming machine and a player who selects a gaming machine when no game is played at the gaming machine, and is not intended to cause the surrounding players to pay their attentions to that gaming machine. Therefore, the apparatus for displaying game playing information by gaming machine, which is described in Patent Document 2, still has to be improved in that it is impossible to attract the attention of the surrounding players to the gaming machine.

(III) With respect to the apparatus for displaying information by gaming machine, as described above, there has been a case in which a calling indicator becomes actually an obstacle at the time of work with upsizing of the latest apparatus for displaying information by gaming machine (calling indicator). In addition, assuming that the apparatus for display information by gaming machine is installed in work door itself, the weight of the work door increases; and therefore, there has been a problem that work efficiency lowers.

With respect to the above item (I), it is an object of the present invention to provide a game playing information integration system for quantitatively obtaining data related to shop management of a gaming facility to be thereby able to objectively perform selection or settings according to the preferences of players, in particular, fixed players, and to be thereby able to effectively introduce a gaming machine to invoke demands of players as users and managers of gaming facilities in a well-balanced manner from a result obtained by logically analyzing the gaming machine.

In addition, with respect to the above item (II), it is an object of the present invention to provide the apparatus for displaying information by gaming machine, which is capable of attracting the attention of the surrounding players to a player even if a game is played by the gaming machine.

Further, with respect to the above item (III), it is an object of the present invention to provide the apparatus for displaying information by gaming machine, which is capable of displaying game playing information on a large screen while ensuring efficiency of pachinko ball jam-related work.

Means for Solving the Problem

<Features of Structure (1)>

In order to solve the above-described problems (I) to (III), the present invention can employ the following features of structure (1), i.e., the features of (1-1) to (1-36).

In order to solve the above-described problem (I), the present invention employed the following features.

(1-1) A game playing information integration system is provided, the game playing information integration system including:

a plurality of gaming machine units; and a server connected to enable communication with each of the gaming machine units, wherein the gaming machine unit includes:

a player identification information reading means which is capable of reading player identification information, and outputs the read player identification information;

number-of-consumptions data output means for outputting number-of-consumptions data related to a number-of-consumptions of game media; and number-of-payouts data output means for outputting number-of-payouts data related to a number-of-payouts of game media, wherein gaming machine unit identification information is assigned for each of the gaming machine units, and the server includes data storage means for storing each of the number-of-consumptions data output from the number-of-consumptions data output means and the number-of-payouts data output from the number-of-payouts data output means in association with reception time data related to data reception time, player identification information, and gaming machine unit identification information.

According to the feature of (1-1), number-of-consumptions data and number-of-payouts data are stored in association with reception time data, player identification information, and gaming machine unit identification information, thus making it possible to analyze the number-of-consumptions data and number-of-payouts data based on any one or a plurality of the reception time data, player identification information, and gaming machine unit identification information. Therefore, for example, analysis of data for each item of player identification information is performed, making it possible for a player to: perform analysis as to whether or not the player falls under the customer category of any one of customers such as a fixed customer (mania), an unfixed customer (browsing customer), and a novice (beginner); perform analysis as to stability in a predetermined reference unit (such as gaming machine, device type of gaming machine, model of gaming machine, area of gaming facility, gaming facility, or casino, for example); perform analysis of strong point of gaming machine of new device type; perform analysis of popularity information for each customer (player) as to a gaming machine other than that of new device type; perform analysis of an optimal business dividing number that is capable of handling a target; or perform analysis as to whether or not a setup number of new device type is appropriate.

It is to be noted that reception time data related to reception time of data is not limited to the one indicating reception time of data itself, and includes the one indicating data reception time intervals, for example. The reception time data related to reception time of data may be the one indicating transmission time itself from a gaming machine unit, or alternatively, may be the one indicating a time interval of transmission from a gaming machine unit, for example.

One of the essences in the present invention is timing for a player to stop the play of game. That is, the timing for a player to stop the play of game corresponds to any one of three patterns made of: 1. No money to play; 2. Big hit (bonus is won); and 3. Interest in gaming machine is lost. The present invention is characterized in that trends from the start to the completion of the play of game by players is acquired in all by integrating information, thereby objectively and logically analyzing this pattern and then utilize the analysis for stabilization of management. This puts the brake for the manager in gaming facility to seek immediate profit, and provides an environment in which a fixed customer can enjoy the play of game over a long period of time while the gaming facility obtains stable profit in long term. An increase of fixed customers is handled as a very important problem to be solved in the field as opening the way against reduction of game market scale which is questioned in future as well as being useful for long-term stable management of the gaming facility.

In order to solve this problem, according to the present invention, integrative acquisition of information is performed from each device in gaming facility (such as gaming machine unit or a variety of servers, for example); based on these items of information, analysis is performed from three points of view made of "customer" analysis, "machine" analysis, and "sales" analysis; and by integrally employing the results of these analyses, useful information is provided for determination as to whether or not to establish the current sales strategy of the gaming facility and planning of the future sales strategy to increase the number of fixed customers.

The present invention can further employ the following feature.

(1-1-1) The game playing information integration system of (1-1) is provided, wherein the data storage means further stores model data related to model of gaming machine unit in association with gaming machine unit identification information.

(1-1-2) The game playing information integration system of (1-1) is provided, wherein the data storage means further stores device type data related to device type of gaming machine unit in association with gaming machine unit identification information.

(1-1-3) The game playing information integration system of (1-1) is provided, wherein the gaming machine unit further includes number-of-games-played data output means for outputting number-of-games-played data related to the number of games played, and the data storage means further stores number-of-games-played data output from the number-of-games-played data output means in association with reception time data related to reception time of data, player identification information, and gaming machine unit identification information.

(1-1-4) The game playing information integration system of (1-1) is provided, wherein the gaming machine unit further includes winning prize number data output means for outputting winning prize number data related to the number of times of special prize, and the data storage means further stores the winning prize number data output from the winning prize number data output means in association with reception time data related to reception time of data, player identification information, and gaming machine unit identification information.

The present invention can further employ the following feature.

(1-2) The game playing information integration system of (1-1) is provided, wherein the data storage means further stores player data associated with player identification information, the player data being related to a player to which player identification information is assigned.

According to the feature of (1-2), for example, player data such as player's local area, sex, age, or occupation is stored in association with game identification information, thus making it possible analyze the preference of the player in detail. The "customer" analysis can be performed more precisely, thus making it possible to enhance integrative analysis and use efficiency of the "customer" analysis, "machine" analysis, and "sales" analysis.

The present invention can further employ the following feature.

(1-3) The game playing information integration system of (1-2) is provided, wherein the data storage means stores player identification information in association with customer category data indicating that a player to which the player identification information is assigned falls under any of the customer categories divided into plurality.

According to the feature of (1-3), customer category data is associated with player identification information, thus making it possible to classify data by customer and then perform sales according to the customer category. That is, if players who visit a gaming facility are merely handed as one group, it is difficult to perform sales according to the preference or need of each player; and however, according to the feature of (1-3), it is possible to install a gaming machine according to the preference or need of the player by customer category.

The present invention can further employ the following feature.

(1-4) The game playing information integration system of (1-3) is provided, wherein the customer categories divided into plurality include a fixed customer, and the data storing means stores data associated with customer category data indicating a fixed customer so to be classified from data associated with any other item of customer category data.

According to the feature of (1-4), data of fixed customer is stored after classified from another item of data, thereby making it possible to reliably keep track of a visit trend and a playing trend of the fixed customer, and perform management according to the preference or need of the fixed customer. In this manner, it is possible to prevent reduction of the number of fixed customers. In particular, among the fixed players, there are a plenty of players having their individual rules (such as a rule of stopping the play of game if five consecutive big hits are realized, for example); and therefore, if that rule can be understood, the related settings can be changed on the game facility side.

The present invention can further employ the following feature.

(1-5) The game playing information integration system of any one of (1-1) to (1-4) is provided, wherein the gaming machine unit further includes use amount data output means for outputting use amount data related to an amount of money used for lending a gaming medium, and the data storage means further stores the use amount data output from the use amount data output means in association with reception time data related to reception time of data, player identification information, and gaming machine unit identification information.

According to the feature of (1-5), in addition to number-of-consumptions data, use amount data is employed, thus making it possible to enhance precision of integrative analysis made of "customer" analysis, "machine" analysis, and "sales" analysis.

(1-6) The game playing information integration system of any one of (1-1) to (1-5) is provided, wherein the server further includes:

analysis processing means for performing analysis of data received from the gaming machine unit and then stored in the data storage means;

a comparison table in which a criteria of stability is set; and stability determination means for determining stability per predetermined reference unit, based on analysis result data indicating a result of analysis of the data and the comparison table.

According to the feature of (1-6), it is possible to determine the degree of stability in predetermined reference unit (such as gaming machine simplex, area, device type, model, gaming facility, or unit of chain shops made of a plurality of gaming facilities, for example). The degree of stability used here denotes a milestone of sales obtained as a result of integrative analysis made of "customer" analysis, "sales" analysis, and "machine" analysis, and denotes a quantitative milestone defined based on operability and business dividing number, for example.

For gaming facilities, it is preferable that operability be high, whereas it is not always preferable that business dividing number be high. If the business dividing number is too high, it means that a player excessively "loses", and in a long run, it causes customers losing interest in shop. That is, it is indispensable to enhance operability to its possible highest level and to include the business dividing number in an appropriate range in order to secure and increase the number of fixed customers. The stability denotes a milestone that is defied from such a point of view, the higher operability is, the higher stability is, and as long as the business dividing number is in a predetermined range, the stability increases, or alternatively, if the business dividing number is outside the range, the stability decreases.

The present invention can further employ the following feature.

(1-7) The game playing information integration system of (1-6) is provided, wherein the data storage means, in association with gaming machine unit identification information, stores a new device type identification flag for determining whether or not a gaming machine unit to which the gaming machine unit identification unit is assigned is of new device type, and the stability determination means determines stability per predetermined reference unit, based on analysis result data, which does not include analysis result data related to a gaming machine unit to which gaming machine unit identification information is assigned with which a new device type identification flag set to ON is associated, and the comparison table.

According to the feature of (1-7), integrative analysis made of "customer" analysis, "sales" analysis, and "machine" analysis can be divided according to whether or not the gaming machine is of new device type. Unlike other device types, a gaming machine of new device type may be operated by only an element of a "new gaming machine" regardless of model or property of machine. This is also true for "fixed customer" as well as the customer category classified as "visitor" or "customer aiming to earn money from new machine". Therefore, sales analysis in line with more realistic state and planning of sales strategy can be performed by classifying "customer" analysis, "sales" analysis, and "machine" analysis as to new device type and "customer" analysis, "sales" analysis, and "machine" analysis regarding as to any other device type.

The present invention can further employ the following feature.

(1-8) The game playing information integration system of (1-6) or (1-7) is provided, wherein analysis result data includes dividing number data related to a dividing number and operation data related to operability, in the comparison table, a dividing number and operability and numerally assigned stability are associated with each other, and the stability determination means numerically determines stability per predetermined reference unit, based on the dividing number data and the operation data and the comparison table.

According to the feature of (1-8), stability can be numerically determined, based on dividing number data and operability data, thus making it possible to obtain an objective analysis result for use in determination as to whether or not to establish a sales strategy.

The present invention can further employ the following feature.

(1-9) The game playing information integration system of any one of (1-6) to (1-8) is provided, wherein the server further includes target dividing number computation means for computing target dividing number per predetermined reference unit, based on analysis result data indicating a result of analysis by the analysis processing means and/or stability determined by the stability determination means.

According to the feature of (1-9), a target dividing number can be objectively computed based on analysis result data and/or stability; and therefore, by employing the target dividing number, it is possible to eliminate seeking short-term profit and then achieve a long-term and extensive sales strategy while taking a preference to secure and increase the number of fixed customers.

The present invention can further employ the following feature.

(1-10) The game playing information integration system of (1-5) is provided, wherein the server further includes:

game playing trend parameter computation means for, based on data stored in the data storage means in association with one item of player identification information, computing a game playing trend parameter indicating a game playing trend per predetermined reference unit as to a player to which the player identification information is assigned; and customer category determination means for determining a customer category of the player to which the player identification information is assigned, based on the game playing trend parameter computed by the game playing trend parameter computation means;

According to the feature of (1-10), customer category of a player can be determined, thus making it possible to classify data by the customer category and then perform sales according to the customer category.

The present invention can further employ the following feature.

(1-11) The game playing information integration system of (1-10) is provided, wherein the game playing trend parameter is a statistical value or an cumulative value of at least one of use amount of money, game playing time, game playing frequency, and amount of money lost.

According to the feature of (1-11), as a game playing trend, a statistical value or an accumulated value of these items of information is employed, thus making it possible to perform more appropriate analysis of customer category.

The present invention can further employ the following feature.

(1-12) The game playing information integration system of (1-10) or (1-11) is provided, wherein the data storage means, in association with player identification information, further stores player data related to a player to which the player identification information is assigned, and the customer category determination means determines customer category of the player to which the player identification information is assigned, based on the game playing trend parameter computed by the game playing trend parameter computation means and the player data stored in the data storage means.

According to the feature of (1-12), player data is employed to determine customer category, and thus, for example, in a case where a local area is near universities, even if a consumed amount is small, if a customer frequently visits a shop in the morning and subsequent, such customer is determined as a "fixed customer", or alternatively, in a case where an office has a large area, even if a customer visits a shop only in the evening and subsequent, if a condition is met, such customer is determined as a "fixed customer", thereby making it possible perform more precious analysis of customer category.

The present invention can further employ the following feature.

(1-13) The game playing information integration system of any one of (1-10) to (1-12) is provided, wherein the server further includes:

analysis processing means for analyzing data received from the gaming machine unit and stored in the data storage means;

a comparison table in which criteria for stability is set;

stability determination means for determining stability per predetermined reference unit, based on analysis result data indicating a result of analysis of the data and the comparison table;

target dividing number computation means for computing target dividing number per predetermined reference unit, based on analysis result data indicating a result of analysis by the analysis processing means and/or stability determined by the stability determination means; and alarm broadcasting means for performing broadcasting of alarm in a case where the number of fixed customers relative to a predetermined reference unit, which is computed based on customer category data as a result of determination by the customer category determination means, fails to meet a condition defined based on the target dividing number computed by the target dividing number computation means.

According to the feature of (1-13), in a case where the number of fixed customers fails to meet a condition defined based on the target dividing number, alarm broadcasting is performed, and thus, the manager in gaming facility does not need to daily check a relationship between the number of fixed customers and the target dividing number, and excellent convenience is realized.

The present invention can further employ the following feature.

(1-14) The game playing information integration system of (1-13) is provided, wherein the data storage means, in association with gaming machine unit identification information, stores a new device type identification flag for determining whether or not a gaming machine unit to which the gaming machine unit identification information is assigned is of new device type, and the stability determination means determines stability per predetermined reference unit, based on analysis result data, which does not include analysis result data related to a gaming machine unit to which gaming unit identification information is assigned with which a new device type identification flag set to ON is associated, and the comparison table.

According to the feature of (1-14), new device type data can be excluded from the category of determination of stability. Unlike other device types, a gaming machine of new device type may be operated by only an element of a "new gaming machine" regardless of model or property of machine. This is also true for "fixed customer" as well as the customer category classified as "visitor" or "customer aiming to earn money from new machine". Therefore, data of new device type is excluded from the category of determination of safety, thereby making it possible to perform more realistic sales analysis and planning of sales strategy.

The present invention can further employ the following feature.

(1-15) The game playing information integration system of any one of (1-1) to (1-5) is provided, wherein the data storage means, in association with gaming machine unit identification information, stores a new device type identification flag for determining whether or not a gaming machine unit to which the gaming machine unit identification information is assigned is of new device type, and the server further includes:

analysis processing means for performing analysis of data received from the gaming machine unit and then stored in the data storage means;

new device type condition determination means for determining whether or not a device type targeted for analysis meets a predetermined new device type condition, based on analysis result data indicating a result of the analysis of the data; and new device type identification flag setting means for setting a new device type identification flag to ON/OFF, based on a result of the determination by the new device type condition determination means.

The present invention can further employ the following feature.

According to the feature of (1-15), determination whether the gaming machine is of new device type is made by analysis of data, thus making it possible to perform more realistic determination in comparison with a case of performing determination as to whether or not the gaming machine is of new device type based on the number of days having elapsed from date of introduction. When performing "customer" analysis, "sales" analysis, and "machine" analysis, in order to keep track of (or eliminate) an effect of new device type, it is important to keep track of whether or not that device type is actually new.

Unlike other device types, a gaming machine of new type may be operated by only an element of a "new gaming machine" regardless of model or property of machine, and thus, when data is analyzed, it is desirable to eliminate an effect of new device type. However, it is unrealistic after all, if determination is made as to whether or not the gaming machine is of new device type based on the number of days having elapsed from date of introduction, for example, if analysis is performed by excluding device type still having influential power of new device type from the category of new device type or if device type which does not have influential power of new device type any more is included in analysis as new device type. However, according to the feature of (1-15), realistic determination of new device type is made, thus enabling realistic analysis of data.

It is to be noted that the present invention does not exclude determination as to whether or not the gaming machine is of new device type based on the number of days having elapsed from date of introduction. This is because determination as to whether or not influential power of new device may be difficult depending on device type. New device type which could not be sufficiently supported by players entails significant lowering of influential power due to an increased number of days having elapsed, thus making it possible to perform determination as to whether or not the gaming machine is of new device type comparatively easily by means of analysis of data. However, a gaming machine having acquired support from players is continuously played by such players, thus making it difficult to determine a boundary as to whether or not the gaming machine is of new device type. In such a case, determination is used together as to whether or not the gaming machine is of new device type based on the number of days having elapsed from date of introduction, thereby making it possible to normalize determination as to whether or not the gaming machine is of new device type.

The present invention can further employ the following feature.

(1-16) The game playing information integration system of (1-15) is provided, wherein the analysis processing means performs analysis of data associated with gaming machine unit identification information to which gaming machine unit identification information is assigned with which a new device type identification flag set to ON is associated, among the data received from the gaming machine unit and then stored in the data storage means, and the new device type identification flag setting means includes new device type identification flag resetting means for resetting to ON a new device type identification flag to which gaming machine unit identification information is associated, the identification information being assigned to a gaming machine unit of device type which is determined that a new device type condition is not met by the new device type condition determination means.

According to the feature of (1-16), a gaming machine for which data of an analysis result fails to meet a condition of new device type is excluded from the category of new device type, thus making it possible to perform more realistic analysis of data.

The present invention can further employ the following feature.

(1-17) The game playing information integration system of any one of (1-1) to (1-5) is provided, wherein the data storage means, in association with gaming machine unit identification information, stores a new device type identification flag for determining whether or not a gaming machine unit to which the gaming machine unit identification information is assigned, the server further comprises:

new device type analysis processing means for, among data received from the gaming machine unit and stored in the data storage means, analyzing data associated with gaming machine unit identification information to which gaming machine unit identification information is assigned with which a new device type identification flag set to ON is associated; and appropriate condition determination means for, based on new device type analysis result data as a result of analysis by the new device type analysis processing means, determining whether or not a setup number of gaming machine units to which gaming machine unit identification information is assigned with which a new device type identification flag set to ON is associated meets a predetermined appropriate condition.

According to the feature of (1-17), normalization of a setup number of new device type can be objectively and logically performed. Gaming machines of new device type and their setup number (or setup ratio) are important in sales strategy of gaming facility. This is because, in a case where the setup number of gaming machines of new device type is smaller than the number demanded from players, the setup number of gaming machines of other device types is limited, and similarly, the players loses interest in shop and then moves to another gaming facility. In addition, gaming machines of new type is introduced into market one after another, and it is not rare that a plurality of new types are installed in gaming facility at the same time, so that it has been very difficult to determine the setup number of gaming machines of new device type. On the other hand, according to the feature of (1-17), appropriate determination of the setup number of gaming machines of new type can be performed from a result of integrative analysis of "customer" analysis, "sales" analysis, and "machine" analysis, and thus, it is useful upon appropriate establishment of sales strategy.

The present invention can further employ the following feature.

(1-18) The game playing information integration system of any one of (1-1) to (1-5) is provided, wherein the gaming machine unit includes:

a gaming machine having a symbol display device that is capable of variably displaying symbols; and a device for displaying game playing information by gaming machine, which is installed upward of the gaming machine, apart from the gaming machine, the server includes acquisition number computation means for, based on the data stored in the data storage means in association with each item of gaming machine unit identification information, computing an acquisition number of gaming media at a time point in the gaming machine unit of a player who is playing at the gaming machine, the device for displaying game playing information by gaming machine includes cashbox image display control means causing the device for displaying game playing information by gaming machine, of the gaming machine unit, to display a cashbox image indicating cashboxes of which number is assigned in accordance with the acquisition number of gaming medium at a time point in each of the gaming machines, and the cashbox image display means additionally displays one cashbox image every time the acquisition number of gaming machines at a time point increases by a predetermined housing number of gaming media per cashbox, and eliminates one cashbox image every time the acquisition number of gaming media at a time point decreases by the housing number.

According to the feature of (1-18), a cashbox image is displayed on a device for displaying game playing information by gaming machine, which is provided upward of a gaming machine, thus enabling the surrounding players to focus their attentions onto that gaming machine. In addition, there is no need to actually place a cashbox in passageway, thus making it possible to ensure a passageway to take refuge and then solve a problem associated with safety.

The present invention can further employ the following feature.

(1-19) The game playing information integration system of (1-18) is provided, wherein the device for displaying game playing information by gaming machine displays a cashbox image regardless of whether or not a game is played at a gaming machine unit having the device for displaying game playing information by gaming machine.

According to the feature of (1-19), it is possible to cause attention of a player to focus on the gaming machine when a game is played.

The present invention can further employ the following feature.

(1-20) The game playing information integration system of (1-18) to (1-19) is provided, wherein when a fraction exists after an acquisition number of gaming media at a time point is divided by a predetermined housing number of gaming media per cashbox, the device for displaying game playing information by gaming machine displays a cashbox image corresponding to the fraction in a manner which is different from that of another cashbox image.

According to the feature of (1-20), it is possible to cause the surrounding players to visually and dynamically recognize a change in acquisition number of gaming media, thus enabling more attention of the players to be focused on that gaming machine.

The present invention can further employ the following feature.

(1-21) The game playing information integration system of any one of (1-18) to (1-20) is provided, wherein the device for displaying game playing information by gaming machine includes cashbox selection instruction input means which is capable of inputting an instruction for selecting a cashbox image displayed on the device for displaying game playing information by gaming machine, and which is intended for, when an instruction for selecting a cashbox image is input, outputting cashbox selection data indicating the selected cashbox image, the gaming machine unit further includes liquidation information medium output means for, when receiving liquidation information related to a liquidation result of gaming media, outputting liquidation information media to display or store the liquidation information, the sever includes liquidation processing means for performing liquidation of gaming media of which number is assigned in accordance with a cashbox image indicated by the cashbox selection data and then outputting liquidation information related to a liquidation result to the gaming machine unit, based on cashbox selection data output by the cashbox selection instruction input means and data stored in the data storage means in association with gaming machine unit identification information of a gaming machine unit having transmitted the cashbox selection data, and the device for displaying game playing information by gaming machine eliminates a cashbox image selected by an instruction input by the cashbox selection instruction input means when the gaming machine unit receives liquidation information.

According to the feature of (1-21), a player can easily perform liquidation by inputting an instruction for selecting a cashbox image, thus making it possible to realize excellent convenience. In addition, liquidation is performed via a cashbox image, and thus, even if a real cashbox is not employed, it is possible to impart reality in the course of liquidation.

The present invention can further employ the following feature.

(1-22) The game playing information integration system of any one of (1-1) to (1-5) is provided, wherein the gaming machine unit includes:

a gaming machine having a symbol display device which is capable of variably displaying symbols; and a device for displaying game playing information by gaming machine, which is installed upward of the gaming machine, apart from the gaming machine, the server includes game playing information display control means causing each device for displaying game playing information by gaming machine to display game playing information based on the data stored in the data storage means, and the game playing information that the game playing information display control means causes the device for displaying game playing information by gaming machine to display includes game playing information based on the data stored in the data storage means in association with gaming machine unit identification information assigned to one or a plurality of gaming machine units other than the gaming machine unit having the device for displaying game playing information by gaming machine.

According to the feature of (1-22), data related to another gaming machine is displayed on a device for displaying game playing information by gaming machine; and therefore, for a player who plays a game at that gaming machine, convenience is enhanced in that data related to another gaming machine can be seen without move, and it is useful for a player who is looking around there.

The present invention can further employ the following feature.

(1-23) The game playing information integration system of any one of (1-18) to (1-22) is provided, wherein a display area of the device for displaying game playing information by gaming machine is equal to or greater than a display area of the symbol display device.

According to the feature of (1-23), it is possible to cause attention of the surrounding players to be easily focused on the gaming machine.

The present invention can further employ the following feature.

(1-24) The game playing information integration system of any one of (1-18) to (1-23) is provided, wherein the plurality of gaming machine units include two or more gaming machine units disposed side by side, upward of the gaming machine units disposed side by side, a work door is provided in an openable/closable manner across a predetermined number of gaming machine units, and the device for displaying game playing information by gaming machine is supported at a site other than the work door, and is positioned on a front face of the work door when the work door is closed or is installed so as to be able to be retracted up to a position which does not interfere with the work door when the work door is opened.

According to the feature of (1-24), retraction is possible up to a position which does not interfere with a work door when the work door is opened, thus enabling setup of a large display device, for example, without any problem associated with manual elimination of jamming of carried game playing pachinko ball in game playing pachinko ball supply mechanism.

In order to solve the above-described problem (II), the present invention employs the following feature.

(1-25) A device for displaying game playing information by gaming machine, which is installed upward of a gaming machine, apart from the gaming machine, is provided, the device for displaying game playing information by gaming machine, including:

reception means for receiving data from an external device connected to enable communication with the device for displaying game playing information by gaming machine; and display means for screen-displaying an image based on the data received by the reception means, wherein the reception means receives acquisition number data indicating an acquisition number of gaming media at a time point in the gaming machine, the display means displays a cashbox image indicating cashboxes of which number is assigned in accordance with the acquisition number indicated by the acquisition number data, and the display means additionally displays one cashbox image every time an acquisition number of gaming media at a time point increases by a predetermined housing number of gaming media per cashbox, whereas the display means eliminates one cashbox image every time a acquisition number of gaming media at a time point decreases by the housing number.

According to the feature of (1-25), a cashbox image is displayed on a device for displaying game playing information by gaming machine, which is provided upward of a gaming machine, thus enabling attention of the surrounding players to be focused on that gaming machine. In addition, there is no need to actually place a cashbox in passageway, thus making it possible to ensure a passageway to take refuge and then solve a problem associated with safety.

The present invention can further employ the following feature.

(1-26) The device for displaying game playing information by gaming machine of (1-25) is provided, wherein the display means displays a cashbox image, regardless of whether or not a game is played at the gaming machine.

According to the feature of (1-26), it is possible to cause another player to focus his or her attention onto a gaming machine when a game is played.

The present invention can further employ the following feature.

(1-27) The device for displaying game playing information by gaming machine, described in (1-25) or (1-26), is provided, wherein when a fraction exists after an acquisition number of gaming media at a time point is divided by a predetermined housing number of gaming media per cashbox, the display means displays a cashbox image corresponding to the fraction in a manner which is different from that of another cashbox image.

According to the feature of (1-27), it is possible to cause the surrounding players to visually and dynamically recognize a change in acquisition number of gaming media, thus enabling more attention of the players to be focused on that gaming machine.

The present invention can further employ the following feature.

(1-28) The device for displaying game playing information by gaming machine, described in any one of (1-25) to (1-27), is provided, wherein the device for displaying game playing information by gaming machine is connected directly or indirectly to enable communication with liquidation processing means for performing liquidation of gaming media of which number is assigned in accordance with a cashbox image selected by an instruction for selecting a cashbox image displayed on the device for displaying game playing information by gaming machine, and eliminates the selected cashbox image by the selection instruction when the liquidation processing means outputs liquidation information as a liquidation result.

According to the feature of (1-28), a player can easily perform liquidation by inputting an instruction for selecting a cashbox image, thus making it possible to realize excellent convenience. In addition, liquidation is performed via a cashbox image, and thus, even if a real cashbox is not employed, it is possible to impart reality in the course of liquidation.

The present invention can further employ the following feature.

(1-29) A device for displaying game playing information by gaming machine, which is installed upward of a gaming machine, apart from the gaming machine, is provided, the device for displaying game playing information by gaming machine, including:

reception means for receiving data from an external device connected to enable communication with the device for displaying game playing information by gaming machine; and display means for screen-displaying an image based on the data received by the reception means, and the data received by the reception means includes data related to a game playing status at a time point in one or a plurality of gaming machines other than the gaming machine.

According to the feature of (1-29), data related to another gaming machine is displayed on a device for displaying game playing information by gaming machine; and therefore, for a player who plays a game at that gaming machine, convenience is enhanced in that data related to another gaming machine can be seen without move, and it is useful for a player who is looking around there.

The present invention can further employ the following feature.

(1-30) The device for displaying game playing information by gaming machine, described in any one of (1-25) to (1-29), is provided, wherein a display area of the device for displaying game playing information by gaming machine is equal to or greater than a display area of a symbol display device which is capable of variably displaying symbols.

According to the feature of (1-30), it is possible to easily attract attention of the surrounding player.

The present invention can further employ the following feature.

(1-31) The device for displaying game playing information by gaming machine, described in any one of (1-25) to (1-30), is provided, wherein lateral of the gaming machine, one or a plurality of gaming machines are disposed side by side together with the gaming machine, upward of the gaming machine disposed side by side, a work door is provided in an openable/closable manner across a predetermined number of gaming machines, and the device for displaying game playing information by gaming machine is supported at a site other than the work door, and is positioned on a front face of the work door when the work door is closed or is installed so as to be able to be retracted up to a position which does not interfere with the work door when the work door is opened.

According to the feature of (1-31), retraction is possible up to a position which does not interfere with a work door when the work door is opened, thus enabling setup of a large display device, for example, without any problem associated with manual elimination of jamming of carried game playing pachinko ball in game playing pachinko ball supply mechanism.

In order to solve the above-described problem (III), the present invention employs the following feature.

(1-32) A device for displaying game playing information by gaming machine, which is installed upward of a gaming machine, apart from the gaming machine, is provided, wherein the device for displaying game playing information by gaming machine is supported at a site other than the work door, and is positioned on a front face of the work door when the work door is closed or is installed so as to be able to be retracted up to a position which does not interfere with the work door when the work door is opened.

According to the feature of (1-32), since a device for displaying game playing information by gaming machine is installed so as to be able to be retracted up to a position which does not interfere with the work door when the work door is opened, when a pachinko ball jamming-related work is performed, the device is retracted up to the position that does not interfere with the work door, making it possible to speedily perform the work.

In addition, since the device for displaying game playing information by gaming machine is supported at a site other than the work door, the weight of the work door does not increase due to installation of the device for displaying game playing information by gaming machine. Therefore, even a comparatively less powerful employee can complete the work speedily.

The present invention can further employ the following feature.

(1-33) The device for displaying game playing information by gaming machine of (1-32) is provided, the device for displaying game playing information by gaming machine, including:

a base portion on which a main body cabinet having a display screen on a front face is installed so that the display screen faces a front face side of the gaming machine;

a mount member which is mounted on a gaming machine bank constituent element installed upward of the gaming machine so that a surface is parallel to a front face of the gaming machine; and a coupling and holding member for coupling and holding the mount member and the base portion, wherein, via a turning axis which is in parallel to and horizontal to a surface of the gaming machine bank constituent element, the coupling and holding member is turnably supported in a forward/backward direction around the turning axis relative to the mount member, and the coupling and holding member turns in the forward/backward direction, whereby the base portion is configured to be able to change from an inclined posture to an erected posture.

According to the feature of (1-33), a base portion changes from an inclined posture to an erected posture with turning of a coupling and holding member in a forward/backward direction. That is, adjustment of a viewing angle relative to a player and retraction of a device for displaying game playing information by gaming machine at the time of a pachinko ball jamming-related work can be performed by means of adjustment of an angle with the use of a same mechanism.

The present invention can further employ the following feature.

(1-34) The device for displaying game playing information by gaming machine of (1-33) is provided, wherein, lateral of the gaming machine, one or a plurality of gaming machines are disposed side by side together with the gaming machine, upward of the gaming machines disposed side by side, a work door is provided in an openable/closable manner across a predetermined number of gaming machines, and upward of each of the gaming machines, the device for displaying game paying information by gaming machine is provided, and base portions of the plurality of devices for displaying game playing information by gaming machine, which are disposed side by side, are configured so as to be able to change from an inclined posture to an elected posture at a same time.

According to the feature of (1-34), angle adjustment of the devices for displaying game playing information by gaming machine, which are disposed side by side, can be performed in all, thus making it easy to open or close a work door and realizing its excellent appearance.

The present invention can further employ the following feature.

(1-35) The device for displaying game playing information by gaming machine of (1-33) or (1-34) is provided, the device for displaying game playing information by gaming machine including a drive mechanism housing portion which is provided at a rear side of the base portion or the main body cabinet, wherein the drive mechanism housing portion includes:

a motor;

a drive control portion for driving and controlling the motor;

a drive gear included in the motor;

a gear member which is meshed with the drive gear; and a link member, one end of which is fixed to the gear member, and the other end of which is pivoted on the coupling and holding member, the link member moves in a vertical direction around a pivoting portion between the coupling and holding member and the other end of the link member when the drive gear is rotated by drive of the motor with use of the drive control portion, and the coupling and holding member is configured to turn in a forward/backward direction with the movement of the link member in the vertical direction.

According to the feature of (1-35), it is possible to easily perform turning of a heavy device for displaying game playing information by gaming machine. In particular, it is desirable that a diameter of a gear member be greater than that of a drive gear.

The present invention can further employ the following feature.

(1-36) The device for displaying game playing information by gaming machine of (1-35) is provided, the device for displaying game playing information by gaming machine including:

an erected-position sensor for directly or indirectly detecting the base portion moving to an erected position; and an inclined-position sensor for directly or indirectly detecting the base portion moving to an elected position, wherein the drive control portion performs control to stop driving of the motor upon receipt of an erected-position detection signal output from the erected-position sensor when the erected-position sensor detects the base portion, or alternatively, an inclined-position detection signal output from the inclined-position sensor when the inclined-position sensor detects the base portion.

According to the feature of (1-36), it is possible to easily perform control of a turning range of a base portion. It is to be noted that, as an erected-position sensor or an inclined-position sensor, a conventionally publicly known contact-type sensor or noncontact-type sensor can be employed.

<Features of Structure (2)>

(IV) In a case where data acquisition is performed by employing the features of structure (1), data is not always obtained as per design specification of gaming machines, and if the gaming machine is of same device type, different kinds of data may be obtained. This is because random numbers employed in lottery in a gaming machine (gaming machine unit) are hardware random numbers generated by means of a quartz oscillator or the like, and strictly speaking, physical features or use environments of quartz oscillator are different from each other, and thus, patterns of generation of random numbers in the respective gaming machines or appearance probabilities of the respective values are also different depending on the gaming machines.

Therefore, the features of structure (1) still remain to be improved as to how to execute acquisition of data that can be differentiated in their respective characteristics, in a situation in which discrepancy takes place with their characteristics even if gaming machines are of same device type.

In Patent Document 1, there is disclosure of summing data of payout and operability in individual gaming machines, and however, these items of data are a mere sales result derived from the characteristics of the respective gaming machines. In addition, there exist gaming machines which are capable of displaying a slump graph as a feature in the individual specific gaming machines, and however, the data is merely provided as the characteristics of the individual gaming machines, and even gaming machines of a same device type have their different characteristics, and therefore, individual slump data itself is further data than to state the characteristics of gaming machines of one type.

That is, it is not currently established yet as to data summing control processing of determining whether or not to have common or similar characteristics between such gaming machines for acquiring actual characteristics that are not theoretical values of a gaming machine, which are of type different from that of the gaming machine, and is called an excellent machine or data summing control processing of determining whether or not to have common or similar characteristics between gaming machines which are large and small in deviation of data.

In the feature of the above item (II), as characteristics of gaming machines, characteristics obtained from a sales result, which are not theoretical values in gaming machines of a same type, are macroscopically summed. Then, summing control processing is performed so that a result obtained by the summing control processing appears more clearly as characteristics for each type of gaming machines.

In addition, summing control processing is realized in such a manner that different characteristics are obtained even in gaming machines of a same type by its setting location for each hall, sex, age, attribute (occupation) and season parameters of many fixed customers.

Further, there is provided a summing control processing method and its related system in which, from results of various data summing operations described above, a range of a plurality of stages in a predetermined difference number is set, and a sample number of number-of-consumptions/number-of-payouts in this set range is cumulatively stored, whereby characteristic values of sales entities for each device type of gaming machine are obtained, it is found out that the characteristic values are similar to each other in gaming machines serving as excellent machines, and using the finding it is determined whether the machine is similar or not to another gaming machine played in the past so as to be thereby useful for determination or the like of a set number of gaming machines.

The characteristics described above are summed by setting location and sex, age, attribute (occupation), and season parameters of many fixed customers, thereby making it possible to output characteristic data as to which type of gaming machines played in the past is similar to the target type of gaming machines in the respective parameters. Further, by checking the characteristic values of each of the plurality of parameters, it is also possible to output characteristic data as to which type of gaming machines played in the past is similar to the target type of gaming machines by comprehensively checking the parameters.

Specifically, in order to the above-described problem of the above item (IV), the present invention can employ the following feature.

(2-1) A game playing information integration system of (1-1) is provided, wherein the server further comprises analysis means for analyzing data received from the gaming machine unit and stored in the data storage means, the analysis means comprises variation trend continuation period extraction means for extracting a variation trend continuation period, based on number-of-consumptions data and number-of-payouts data stored in the data storage means and reception time data associated with the number-of-consumptions data and the number-of-payouts data, the variation trend continuation period being a series of period in which either one of an increase trend and a decrease trend of a difference number is continuous, an absolute value of a difference number in an entire period being a predetermined reference value or more, and the data storage means stores information related to the variation trend continuation period extracted by the variation trend continuation period extraction means in association with at least one of items of player identification information and gaming machine unit identification information.

According to the feature of (2-1), analysis of gaming machines, which has been intuitively and qualitatively performed by each player, can be quantitatively and objectively performed, and further, its related results can be integrated with each other.

Conventionally, for example, when players talk with each other about the results of their own play of games, the characteristics of their one play of games are often expressed by the presence or absence of the variation trend continuation period or its related generation timing, such as an expression that "no bonus took place for one hour" or "bonus continued for 30 minutes". This is because players understand that the variation trend continuation period is an effective milestone representing characteristics of gaming machines regardless of whether the player takes care or does not take care of the matter. However, conventionally, these items of information stay in the hearts of individual players, and gaming facilities could not actively utilize them.

According to the feature of (2-1), these items of information can be quantitatively and objectively acquired and summed, thus making it possible to analyzing and evaluate gaming machines in a sense closer to that of players. It is to be noted that a series of period may be a period in units of time, and may be a period in units of the number of games played.

The present invention can further employ the following feature.

(2-2) The game playing information integration system of (2-1) is provided, wherein the series of period is a period of a normal game playing state in a game played at the gaming machine unit, a bonus game period, or a period obtained by combining a bonus game and a game playing state which is subsequent to the bonus game and is different from the normal game playing state.

According to the feature of (2-2), a period of a normal game playing status, a bonus game period, and a period obtained by combining the bonus game period and a game playing status which is different from a normal game playing status subsequent to the bonus game are handled as a series of period.

These periods are characteristics which are frequently employed when a player evaluates one's own play of game, and thus, these periods are handled as a series of period, thereby making it possible to analyze and/or evaluate gaming machines in a sense which is further closer to that of players.

The present invention can further employ the following feature.

(2-3) The game playing information integration system of (2-2) is provided, wherein when a state is shifted into the normal gaming state after completion of the bonus game as the series of period or after completion of both the bonus game as the series of period and the game playing state which is subsequent to the bonus game and is different from the normal game playing state, the variation trend continuation period extraction means, in a case where a next bonus game takes place before exceeding a specific period or the number of games played in the normal game playing state, includes the next bonus game in the series of period, and extracts a variation trend continuation period.

After completion of a bonus game, a bonus game period, or a game playing status which is subsequent to the bonus game period and is different from a normal game playing status, if a next bonus game takes place before exceeding a specific period (for example, five minutes) or the number of games played (for example, 20 games), a player often recognizes that these periods are a series of period. Therefore, in the feature of (2-3), these periods are handled as a series of period, thereby making it possible to analyze and/or evaluate a player in a sense which is further closer to that of the player.

The present invention can further employ the following feature.

(2-4) The game playing information integration system of (2-1) is provided, wherein the series of period is a period in which a difference number per predetermined unit period continuously increases or decreases over a plurality of unit periods.

In the feature of (2-4), a predetermined unit period includes both of a period based on time and a period based on the number of games played. A unit period may be prefixed as a game playing information integration system IS or may be arbitrarily set in gaming facility.

The present invention can further employ the following feature.

(2-5) The game playing information integration system of (1-1) is provided, wherein the data storage stores sample data indicating a sample pattern to be compared with a variation pattern of a difference number according to an elapse of time or the number of games in association with type data indicating a type of the sample pattern, the server further comprises analysis means for analyzing data received from the gaming machine unit and stored in the data storage means, and the analysis means comprises:

pattern data generation means for generating variation pattern data indicating a variation pattern of a difference number of the medals based on number of consumptions data and number of payouts data according to an elapse of time or the number of games, based on number-of-consumptions data and number-of-payouts data stored in the data storage means and reception time data associated with the number-of-consumptions data and the number-of-payouts data;

sample data extraction means for performing comparison between a variation pattern of a difference number indicated by the variation pattern data and a sample pattern indicated by sample data, and extracting sample data indicating a sample pattern which is the most similar to a variation pattern of the difference number; and type output means for performing an output indicating a type, based on type data associated with the sample data extracted by the sample data extraction means.

According to the feature of (2-5), characteristics of a gaming machine unit can be quantitatively and objectively analyzed by means of analysis of a variation pattern (for example, waveform of slump graph or appearance frequency or difference number of variation trend continuation period).

The present invention can further employ the following feature.

(2-6) The game playing information integration system of (2-5) is provided, wherein the analysis means further comprises sample data generation means for storing as sample data in the data storage means, variation pattern data generated by the pattern data generation means in association with type data indicating a type which is identical to that of type data associated with sample data extracted by the extraction means.

According to the feature of (2-6), variation pattern data as an actually measured value can be acquired as sample data, and thus, the sample data is accumulated, thereby making it possible to cumulatively enhance analysis precision.

The present invention can further employ the following feature.

(2-7) The game playing information integration system of (1-1) is provided, wherein the player identification information reading means intermittently or continuously reads a face of a player, and outputs obtained face data, the server comprises player identity determination means for determining identity of a player who plays a game at the gaming machine unit, based on the face data intermittently or continuously output from the gaming machine unit, and while the player identity determination means determines that a game is played by a same player by, the data storage means stores each of number-of-consumptions data output from the number-of-consumptions data output means and number-of-payouts data output from the number-of-payouts data output means in association with a same item of player identification informant, and when the player identity determination means determines a player is changed, the data storage means stores said each data in association with a different item of player identification information.

According to the feature of (2-7), the start or completion of the play of game by a player who does not desire to provide one's own information (such as membership registration) can be grasped by player identity determination means, thus enabling more precious acquisition of data.

In order to solve the above-described problem of (IV), the present invention can employ the following feature.

(2-8) A data acquisition control method, including:

a variation trend continuation period extraction step of extracting a variation trend continuation period, based on incoming and outgoing number data related to incoming and outgoing of gaming media in one gaming machine unit and time data indicating time or a time interval of incoming and outgoing of gaming media, the variation trend continuation period being a series of period during which an increase trend or a decrease trend of difference number is continuous, and an absolute value of difference number in an entire period is equal to or greater than a predetermined reference value; and a storage step of storing information related to the variation trend continuation period extracted by the variation trend continuation period extraction step in association with at least one item of player identification information and gaming machine identification information.

The present invention can further employ the following feature.

(2-9) A data acquisition control method, including:

a pattern data generation step of generating a variation pattern data indicating a variation pattern of difference number according to an elapse of time or the number of game played, based on outgoing and incoming number data related to outgoing and incoming of gaming media in one gaming machine unit and time data indicating time or a time interval of gaming media;

a sample data extraction step of performing comparison between a variation pattern of difference number indicated by the variation pattern data and a sample pattern indicated by sample data, and extracting sample data indicating a sample pattern which is the most similar to the variation pattern of the difference number, the sample data indicating a sample pattern compared with the variation pattern, associated with type data indicating a type of the sample pattern; and a type step of performing an output indicating a type, based on type data associated with the sample data extracted by the sample data extraction means.

The present invention can further employ the following feature.

(2-10) A data acquisition method, including:

a face reading step of intermittently or continuously reading a face of a player and then generating face data;

a player identity determination step of, based on the face data, determining identity of a player who plays game at a gaming machine unit;

a player continuation step of, while it is determined that a game is played by a same player by player identity determination means, storing in storage means each item of number-of-consumptions data output from the number-of-consumptions data output means and number-of-payouts data output from the number-of-payouts data output means in association with a same item of player identification information; and a player change step of when it is determined that a player is changed by the player identity determination means, storing such item of the data in associated with a different item of player identification information.

(Game Playing Information)

Hereinafter, terms related to game playing information will be described.

An "operability" (%) is computed by means of "(OUT number/(Absolute Out number per hour×business time))×100". The absolute Out number in pachinko gaming machine is 83, for example, the absolute Out number in pachinko/slot gaming machine is 33, for example.

A "safe" is referred to as game pachinko ball or coin paid out by a gaming machine. A "safe" pachinko ball is referred as game pachinko ball paid out by a gaming machine.

A "good pachinko ball" is computed by means of "number of Outs−number of Safes". In addition, "difference number" is also computed by means of "Number of outs−Number of safes", and is employed regardless of type of gaming medium.

A "winning pachinko ball rate" (%) is computed by means of "(number of safes"/number of outs)×100".

A "prize dividing number" is computed by means of "prize money (Yen)/amount of sales (Yen)".

A "machine dividing number" is computed by means of "(sales amount (Yen)−amount of money for good pachinko ball (Yen))/amount of sales (Yen) or "(sales pachinko ball−good pachinko ball)/sales pachinko ball".

An "incorrect difference pachinko ball" or "prize error" is computed by means of "(sales pachinko ball−good pachinko ball)−prize pachinko ball".

A "pachinko ball unit prize" is computed by means of "machine gross profit/number of outs".

A "pachinko ball gross profit" is computed by means of "machine gross profit/number of outs".

A "total amount of sales" is computed by means of "number of outs×pachinko ball unit price" or "total amount of sales/number of machines".

An "amount of sales by machine" is computed by means of "number of outs×pachinko ball unit price" or "total amount of sales/number of machines".

A "gross profit" is computed by means of "amount of sales−purchase amount of prize" or "amount of sales−(prize money×cost)".

A "gross profit by machine" is computed by means of "machine sales×profitability".

A "total gross profit" is computed by means of "machine operability×number of machines×number of days×gross profit by pachinko ball".

A "cost rate" is computed by means of "number of pachinko balls lent (per 100 pachinko balls)×number of pachinko balls exchanged (per 100 Yen)".

A "balance dividing number" is computed by means of "number of pachinko balls exchanged (per 100 Yen)/number of pachinko balls exchanged (per 100 Yen)" or "1/cost rate".

A "profitability" is computed by means of "gross profit/amount of sales" or "(balance dividing number−dividing number)/balance dividing number)×100".

A "Base (B)" is computed by means of "(number of safes in normal game/number of outs in normal game)×100".

A "B %" is computed by means of "100−base".

A "BY" is computed by means of "base−start×start number-of-payouts"

A "customer stay rate" is computed by "(cumulative B-service time/amount of sales"×100%.

A "TS" is computed by means of "cumulative start number/special prize number".

A "B-service time" is computed by means of "100−base×BO".

A "BO" (minutes) is computed by means of "TS/start number (one minute), BO (real number)×100".

A "TO" has a relationship of "TO (real number)/100=special prize time (minutes).

A "T10" has a relationship of "T10 (for total)/100=minutes (TO)".

A "TY" is computed by means of "number of safes in special prize−number of outs in special prize".

A "T1Y" is computed by means of "number of safes in big hit−number of outs in big hit".

A "BA" is computed by means of "number of safes in changed probability/number of outs in changed probability".

A "BOA" is computed by means of "TSA/start A".

In the present invention, game playing information is not limited to the above described matters. Data which is obtained by primarily or secondarily enhancing data output from a gaming machine unit falls under game playing information. The game playing information integration system according to the present invention is capable of generating and outputting the above-described game playing information.

In addition, the present invention may employ the following feature.

(a) A plurality of gaming machines, a gaming medium lending device provided for each of the gaming machines, and a respective one of individual counting devices provided for each of the gaming machines are connected to each other via a communication interface. Then, winning-pachinko ball data, consumption (to-be-consumed) gaming media (shooting pachinko balls or lending pachinko balls) data is received to be added from each device to gaming machine identification information, the data is stored in a storage means in such a manner as to determine what time the data is receive while in operation, based on time data obtained from a clock device included therein.

According to the feature of (a), a dividing number relative to actual operation time and operation time and nonoperation time while in business time, thereby making it easy to obtain dividing number or big hit frequency relative to actual operation time in the whole gaming facility and then numerically obtain safety in shop management.

In the feature of (a), the following feature can be further employed.

(a-1) In a case where a dividing number is obtained and then from the dividing number then stability is obtained, obtaining a dividing number actually operation for each gaming machine and obtaining non-operation time are executed. Long operation time and a greater dividing number denote that even if a dividing number is same, it is evaluated that a player loses significantly. Conversely, evaluation may be performed from operation time. In a case where predetermined stability is obtained, alarming is output and then review of settings or the like is requested.

(a-2) Further, an ID card slot for identifying a player is provided at any of the above-described devices, and the data obtained from each of the above-described devices is stored in association with player identification data. Stability of (i) is obtained only for data of fixed customer.

(a-3) Device type data is stored in association with data to be received and then stability for each device type is obtained from a relationship in settings between cumulative non-operation time and device. In this manner, popularity information for each device type can be obtained.

(a-4) Even if a dividing number is small (even if a rate of cashing back to a player is small), it may be presumed that new device type is popular due to an element other than the dividing number. Therefore, there is a need to compute time during which customer attraction by means of performance of gaming machine itself is made. In a case where stability in whole gaming facility is obtained, data of new device type is not initially considered, and however, move data at a time point at which it is determined that newness is lost is controlled so as to be employed for computation of stability. A reason for initial exclusion from data for computation of stability is that popularity in the case of new device type is not significantly influenced by a dividing number. In the case of new device type, although extended game playing tie is initially predicted from its newness, a change in operation time as the game playing time (rate of operability in whole business time or change in average unit game playing time) is compared with comparison source data, and when a predetermined change is obtained, it is determined that customer attraction due to its newness change to popularity of gaming machine itself.

In addition, as characteristic analysis of the new gaming machine, the data is compared with data of gaming machines of the past device type (for example, data obtained by computing appearance frequency of big hit, and further, difference number range margin of replacement pachinko balls and IN/OUT count pachinko balls per unit time counted by means of individual counting device). Then, a similar gaming machine name in the past is output and displayed, thereby predicting whether or not it will be a popular gaming machine. Then, from this item of information, it is artificially determined whether or not a new/old rate of setup number in shop is appropriate.

Parameters for determination in the feature of (a) include: (i) popularity information by customer hierarchy (%) (This item of data is mainly intended for fixed customer, which is based on computation of average use amount of money, average game playing time, average visit frequency, and average loss, and popularity information by device type is computed.), operation trend of machine/device type by customer category, and analysis of model and characteristics of machine (such as big hit deviation or big hit frequency, for example); and (ii) business dividing number and shop profit.

The present invention may employ the following feature.

(b) It is made of: a plurality of gaming machines (which may not be connected to the gaming machines themselves or may only be connected to a lending device or an individual counting device); an IC card reading slot which is connected to each of the gaming machines or which is adjacently disposed; a storage device for storing time intervals from an IC card being inserted into the slot to the card being removed, in association with identification data of the IC card; a determination device for determining whether or not the identification data corresponds to a specific group (fixed customer or not); a device for computing a cumulative value or average value of any one or more of use amount of money, game playing time, number of visits, and amount of loss from game playing data from a gaming machine determined that it is the specific group; and a display device for externally displaying an alarm in a case where a computation result exceeds a predetermined threshold value.

(b') Facial recognition may be performed instead of identifying fixed customer by means of IC card.

(b-1) In a sense of thinking harmony and/or balance, an instruction display to change a dividing number of gaming machine may be output at a previous stage of generating alarming. Namely, in a case where a probability adjustment function for big hit probability or the like is added to a gaming machine, the setting is changed and a dividing number is changed to an optimal one by gaming machine or by gaming machine mount.

(b-2) In case of machine withdrawal, a case in which gaming machines of same device type are withdrawn in all is also predicted. Therefore, in a case where a withdrawal target is determined for each device type, the data stored in the storage device needs to be stored in association with device type identification data as well as card identification information.

The present invention can further employ the following features.

(c) There are a plurality of gaming machines (which are not connected to the gaming machines themselves or may only be connected to a gaming medium lending device or an individual counting device); and a setting change device for turning ON/OFF a flag for identifying whether or not it is a device for determining game playing performance for each of the gaming machines, wherein settings are provided for receiving game playing data from a gaming machine which is a target for determining game playing performance, based on the received game playing data, creating comparison destination data from a relationship with the received game playing data and clock data, executing comparison processing between the comparison destination data and comparison source data, and extracting an outputting one output data pattern from a plurality of output data patterns which are prepared in advance according to a comparison result.

In the feature of (c), the following feature can be further employed.

(c-1) A display when a cashbox reaches the maximum number is made different from display data in a case of a cashbox below the maximum number.

(c-2) Display data as a target for changing the image is subjected to blinking processing while in the counting processing by means of individual counting device.

(c3) When the cashbox as a liquidation target is designated by means of a touch panel, liquidation data only for the winning pachinko ball is output, so that a liquidation sheet is printed out and output from a memory card for the liquidation is performed.

The present invention can further employ the following features.

(d) A device for displaying game playing information by gaming machine is capable of turning around an axle parallel to a surface of a work door in a case where the display device is supported at a site other than the work door, and is positioned on a front face of the work door when the work door is closed or is installed so as to be able to be retracted up to a position which does not interfere with the work door when the work door is opened.

(e) A device for displaying game playing information is constituted slidably in a vertical direction or in a horizontal direction in a case where the display device is supported at a site other than the work door, and is positioned on a front face of the work door when the work door is closed or is installed so as to be able to be retracted up to a position which does not interfere with the work door when the work door is opened. In a case where the device for displaying game playing information by gaming machine is constituted slidably in the horizontal direction, the adjacent devices for displaying game playing information by gaming machine may be constituted in an alternate retraction manner.

Advantageous Effect(s) of the Invention

According to a game playing information integration system of the present invention, it is possible to objectively perform selection and settings according to the preferences of players, in particular, fixed customers, and it is also possible to efficiently introduce gaming machines which are capable of invoking a demand for players as users and managers in gaming facilities in a well-balanced manner from a result obtained by local analysis.

According to a device for displaying game playing information by gaming machine, of the present invention, even if a game is played at a gaming machine, it is possible to attract attention of a surrounding player to the gaming machine.

BRIEF DESCRIPTION OF THE DRAWINGS

FIG. 13 is an explanatory view showing one example of sales-related database stored in the IC card server shown in FIGS. 1A to 1D.

FIGS. 14A and 14B are explanatory views showing one example of a game playing status database stored in the hall conserver shown in FIGS. 1A to 1D, respectively.

FIGS. 15A and 15B are explanatory views showing one example of a correlation database stored in the hall conserver shown in FIGS. 1A to 1D.

FIG. 16 is an explanatory view showing one example of a determination result database stored in the hall conserver shown in FIGS. 1A to 1D.

FIG. 17 is an explanatory view showing one example of a member management database stored in the member management server shown in FIGS. 1A to 1D.

FIG. 30 is a view showing one example of a gaming machine comparison table for determining stability.

FIG. 31 is a view showing one example of a gaming facility comparison table for determining stability.

FIG. 42 (b) is a side view thereof; FIG. 42 (c) is a top view thereof; and FIG. 42 (d) is a front view thereof.

FIG. 44 (b) is a side view thereof; FIG. 44 (c) is a top view thereof; and FIG. 44 (d) is a front view thereof.

FIG. 46 (b) is a side view thereof; FIG. 46 (c) is a top view thereof; and FIG. 46 (d) is a front view thereof.

FIG. 47 is a table showing an introduction shop operation state (whole) by local area.

FIG. 48 is a table showing an introduction shop operation state (residential street) by local area.

FIGS. 49A and 49B are tables showing one example of operation result by shop in residential street.

FIG. 50 is a table showing an introduction shop operation state (road side) by local area.

FIGS. 51A and 51B are tables showing one example of operation result by shop in road side.

FIG. 52 is a table showing an introduction shop operation state (front of station) by local area.

FIGS. 53A and 53B are tables showing one example of operation result by shop in front of station.

FIG. 54 is a table showing an introduction shop operation state (busy street) by local area.

FIGS. 55A and 55B are tables showing one example of operation result by shop in busy street.

FIGS. 75 (a) and (b) are slump graphs in gaming machines, respectively.

FIG. 77 is a graph depicting analysis by waveform type in gaming machines of device type A.

FIGS. 78A and 78B are tables showing data related to the number of players and winning rates or the like in shop α.

. 83 is a graph depicting a comparison result of exchange medal number by device type in shop α.

Figure 84:
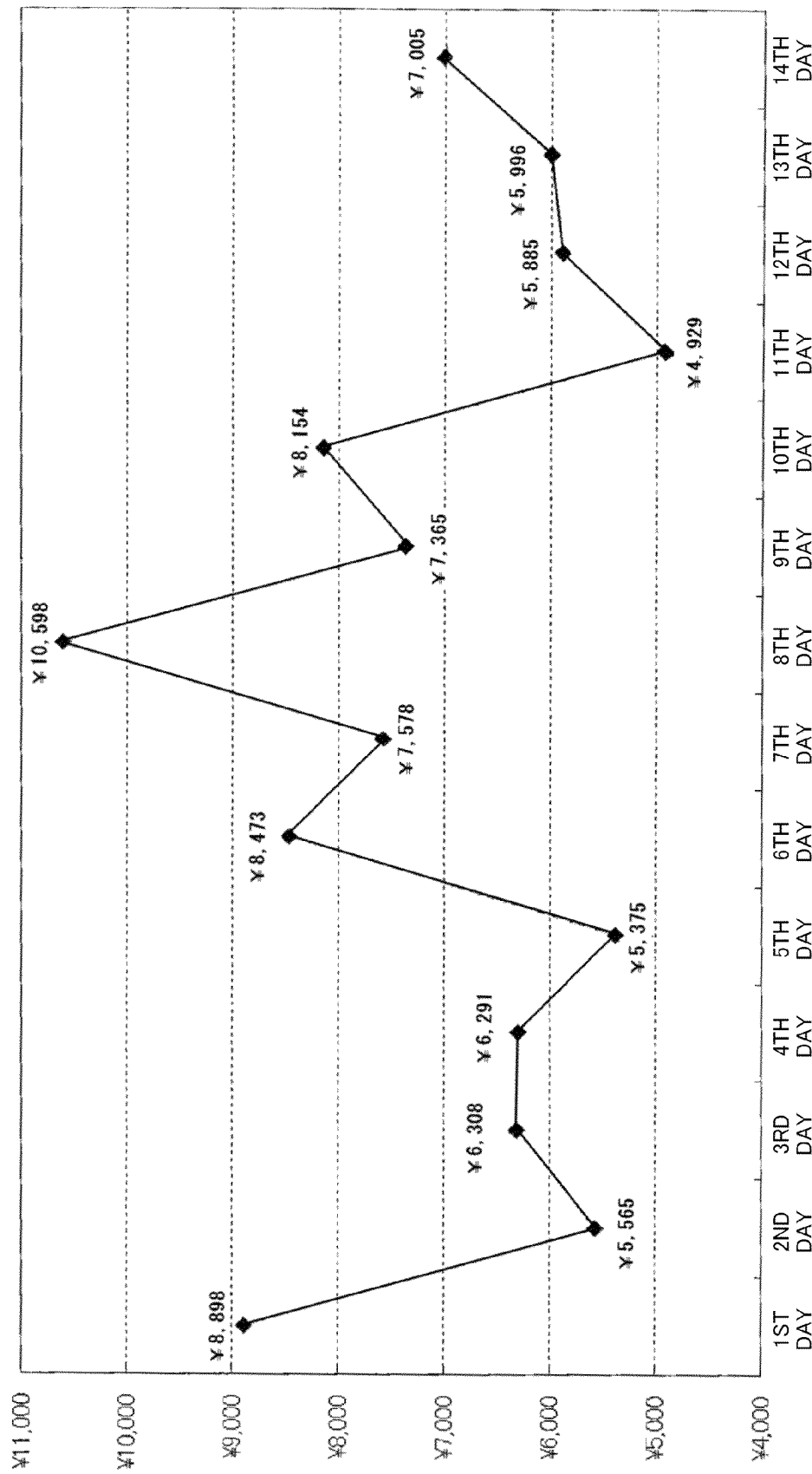

FIG. 84 is a graph depicting a state of player use amount of money by elapse of day in shop α.

Figure 85:
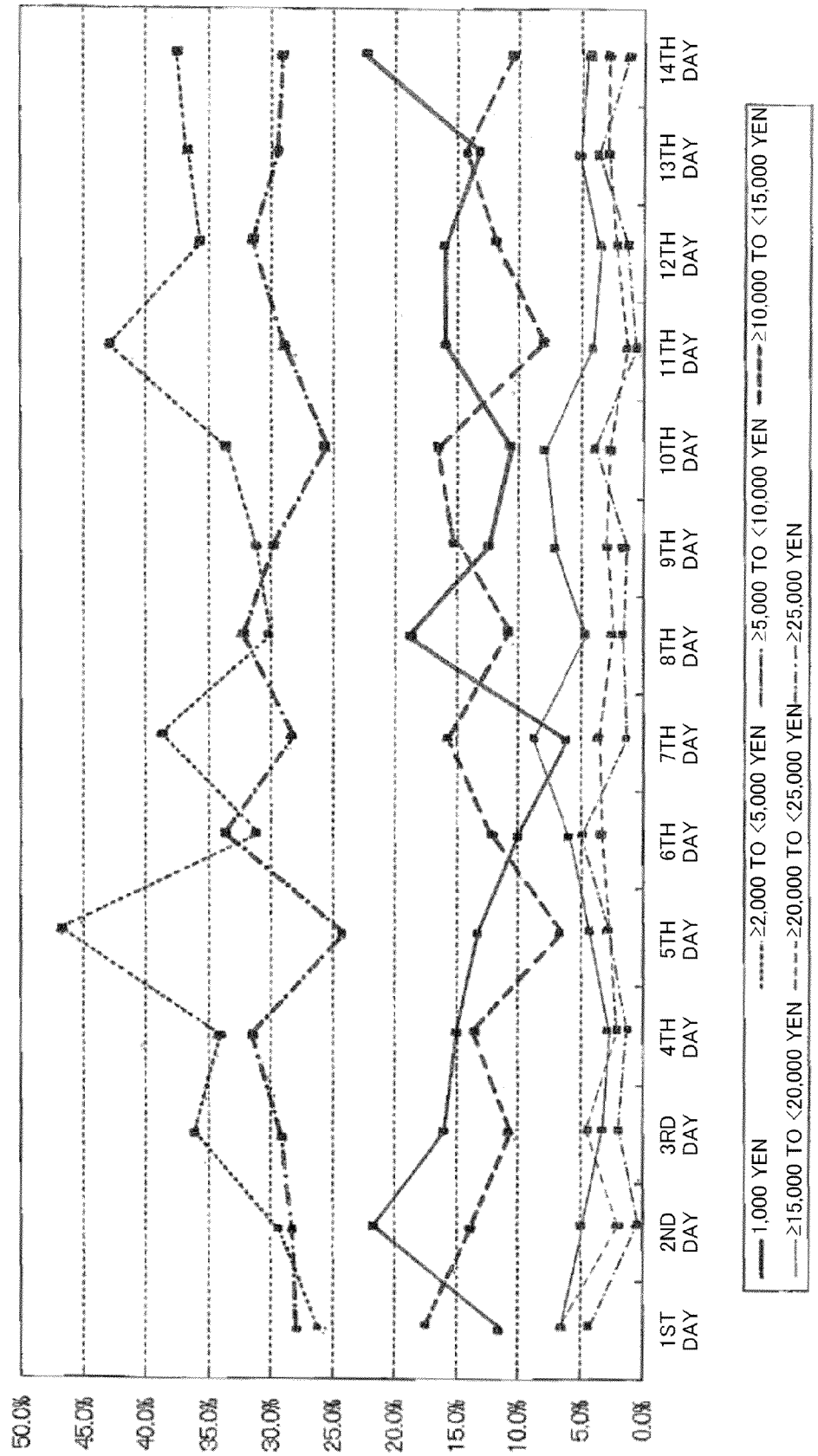

FIG. 85 is a graph depicting a rate of use amount of money by elapse of day in shop α.

Figure 86:
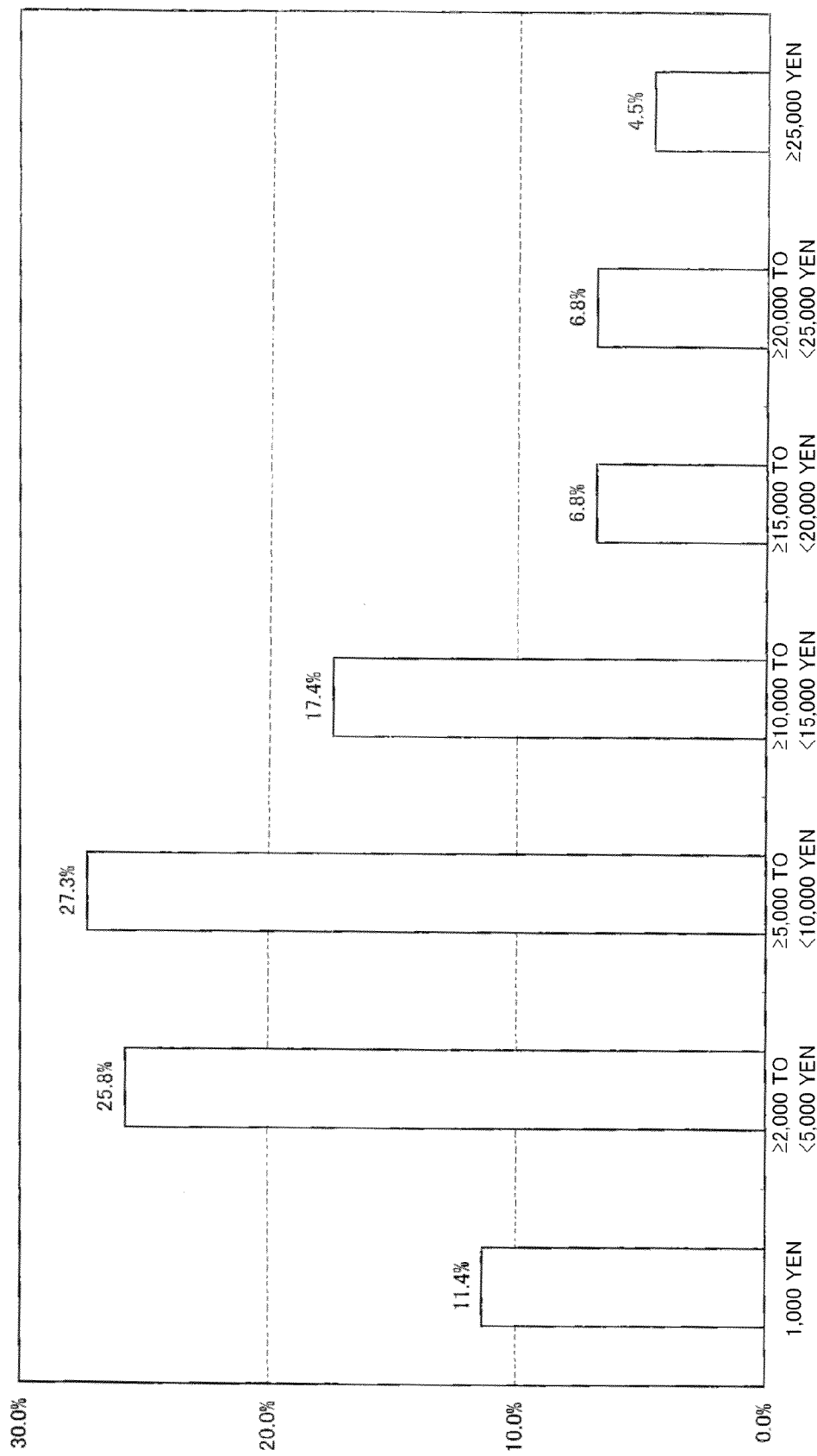

FIG. 86 is a graph depicting a player use amount of money by day (first day) in shop α.

Figure 87:
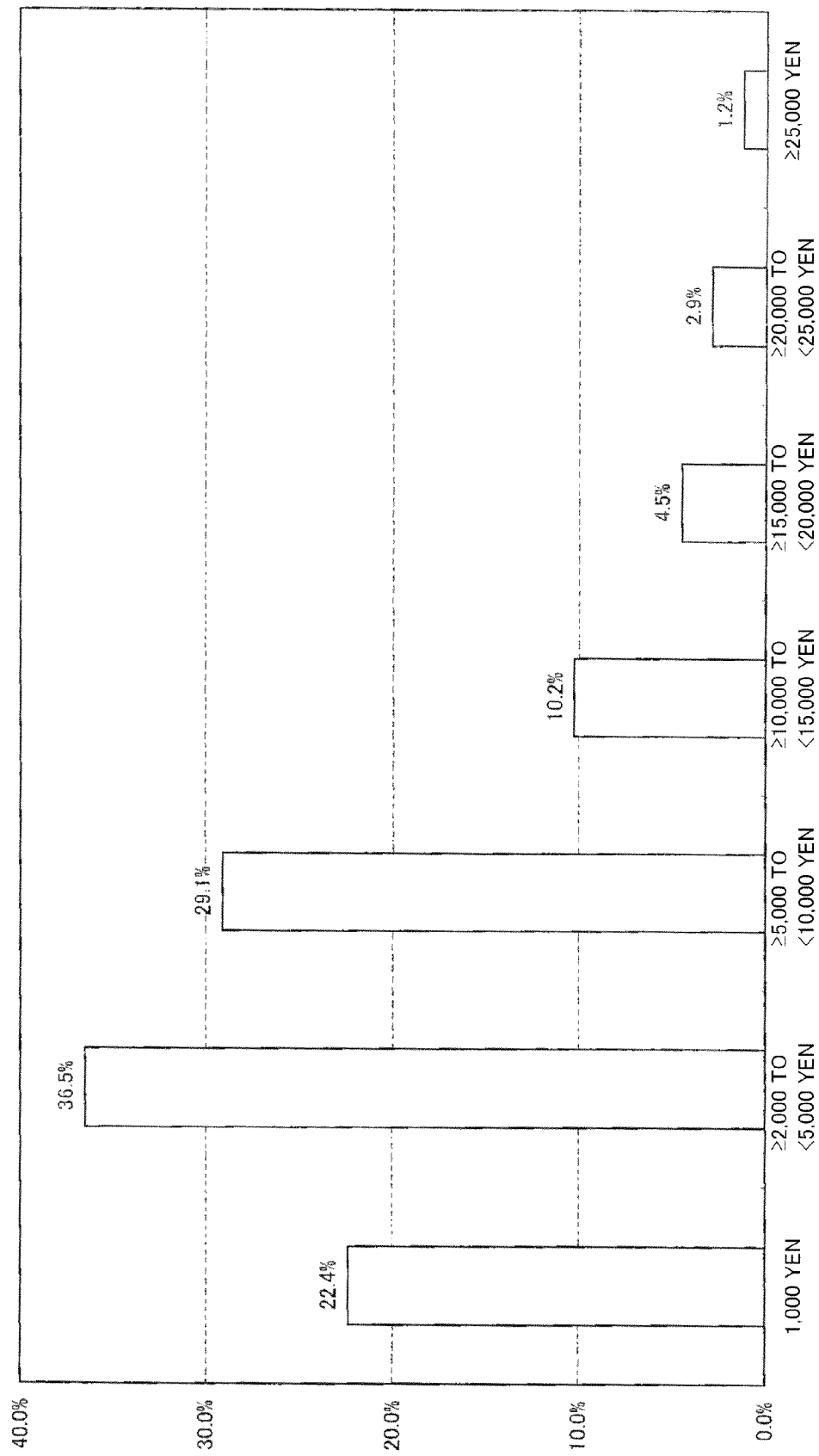

FIG. 87 is a graph depicting a player use amount of money by day in shop α.

FIG. 88 is a table showing data related to the number of players and winning rate or the like in shop β.

FIG. 89 is a table showing data related to the number of players and winning rate or the like in shop γ.

FIG. 90 is a table showing data related to the number of players and winning rate or the like in shop δ.

FIG. 91 is a table showing data related to the number of players and winning rate or the like in shop ε.

FIGS. 92 (*a*) to (*d*) are pie graphs showing ages of players by day (first to fourth days), respectively.

FIGS. 93 (*a*) to (*d*) are pie graphs showing game playing time per player by day (fifth to eighth days), respectively.

FIGS. 94 (*a*) to (*d*) are pie graphs showing ages of players by day (first to fourth days), respectively.

FIGS. 95 (*a*) to (*d*) are pie graphs showing ages of players by day (fifth to eighth days), respectively.

FIGS. 96 (*a*) to (*d*) are pie graphs showing sexes of players by day (first to fourth days), respectively.

Figure 97:
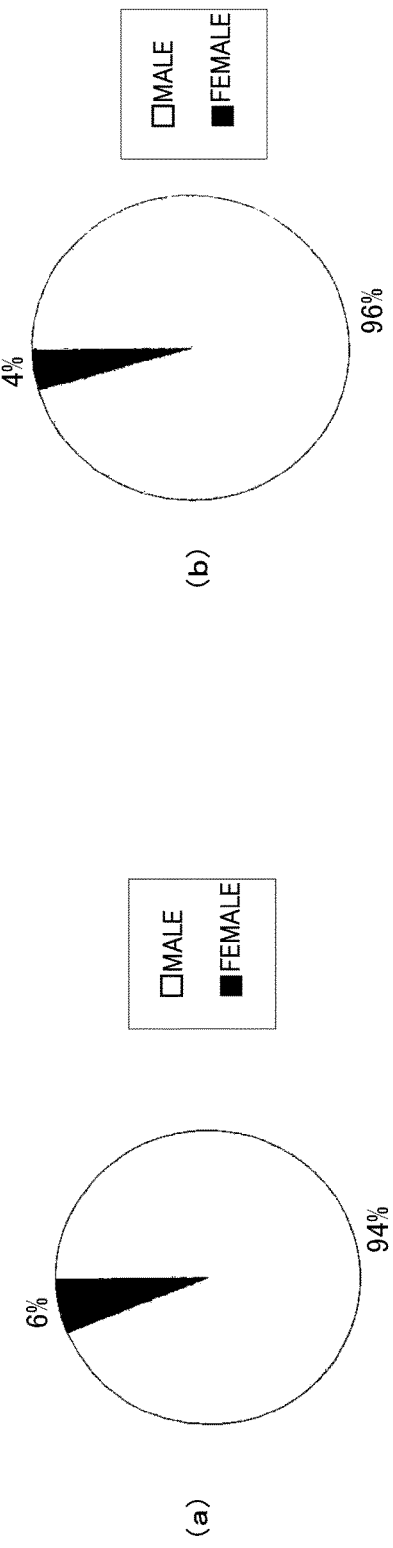

FIGS. 97 (*a*) to (*d*) are pie graphs showing sexes of players by day (fifth to eighth days), respectively.

Figure 98:
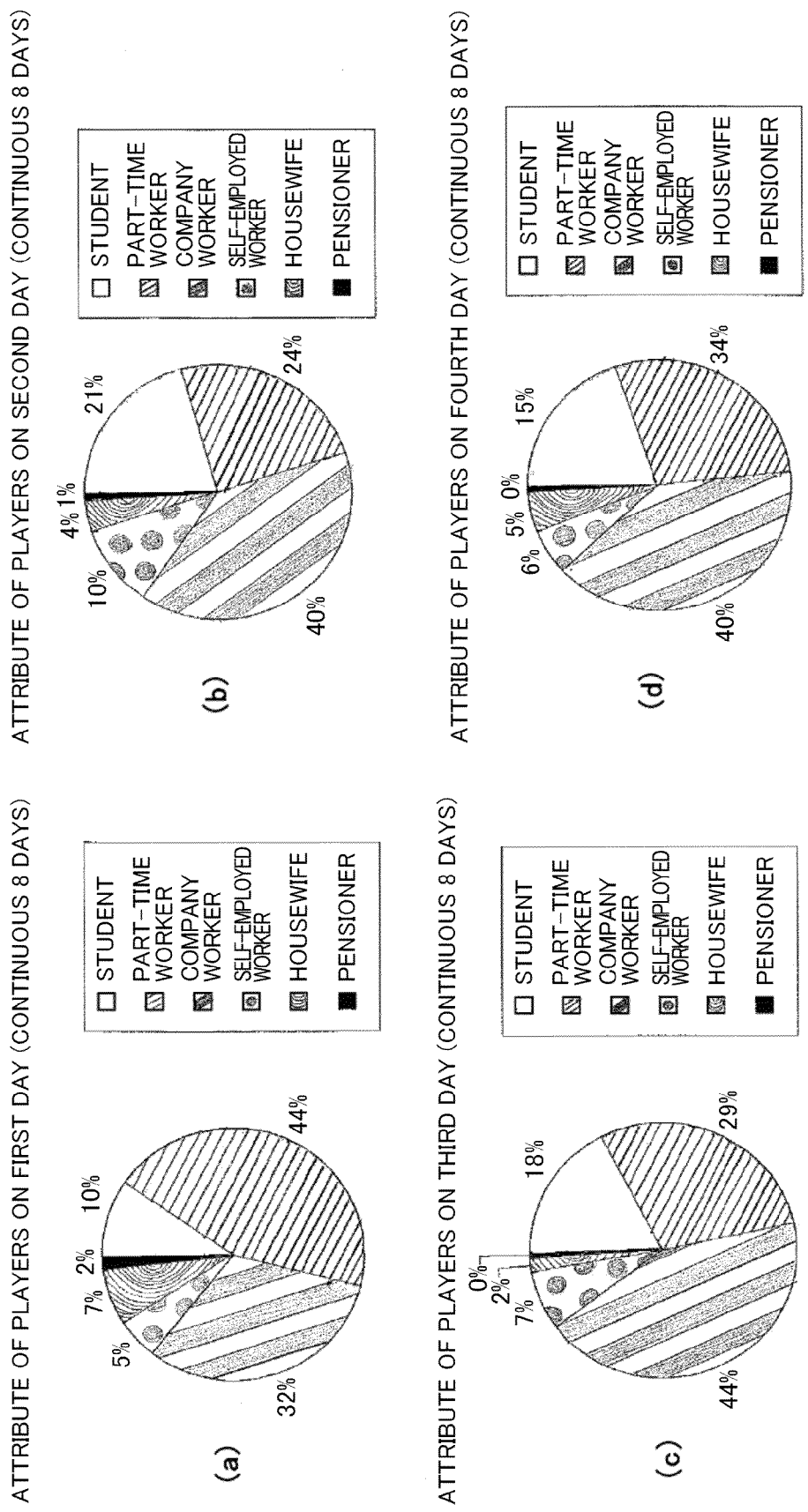

FIGS. 98 (*a*) to (*d*) are pie graphs showing attributes of players by day (first to fourth days), respectively.

FIGS. 99 (*a*) to (*d*) are pie graphs showing attributes of players by day (fifth to eighth days), respectively.

Figure 100:
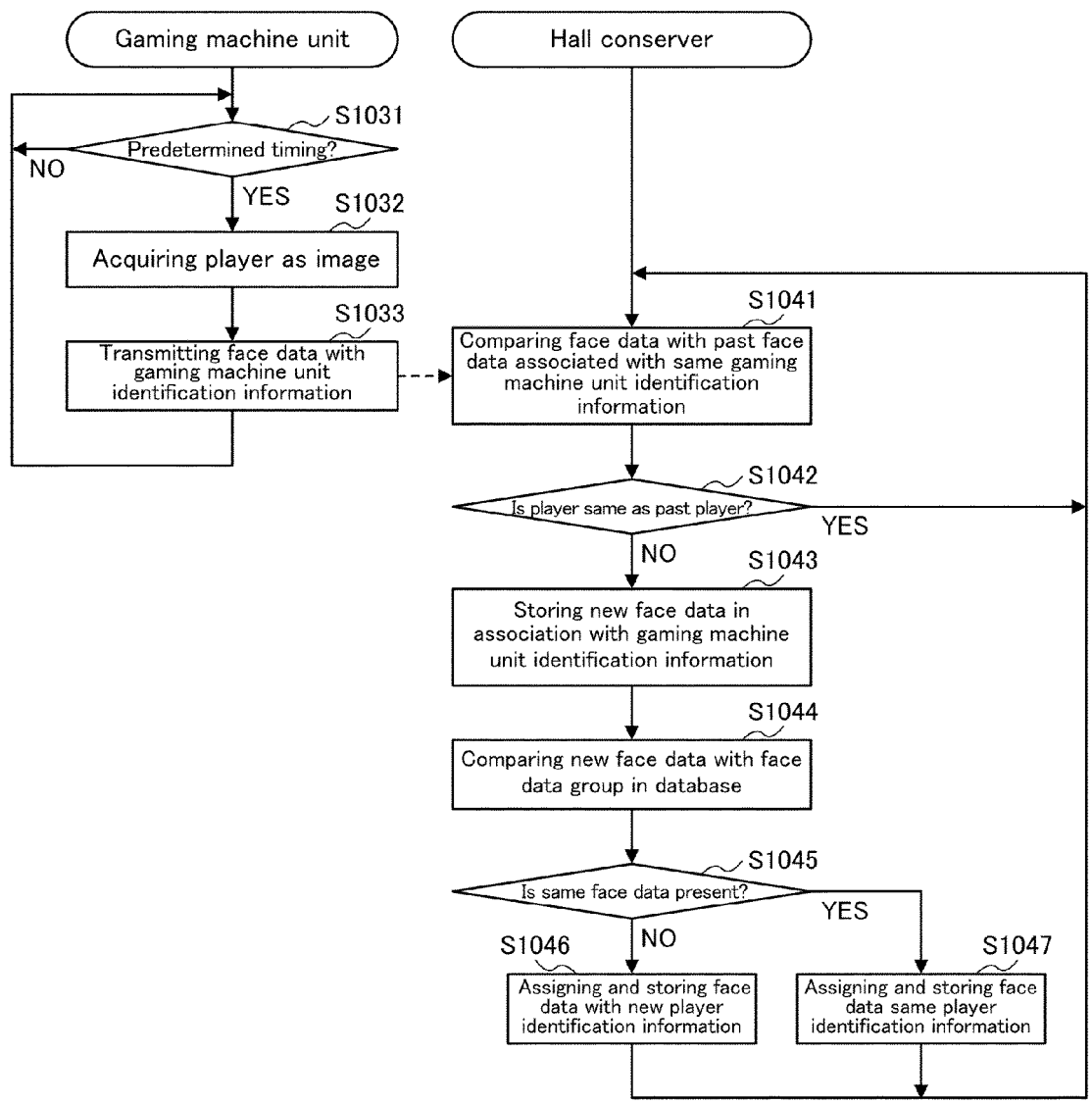

FIG. 100 is a flowchart showing player identity determination processing (1) executed by a gaming machine unit and the hall conserver shown in FIGS. 1A to 1D.

Figure 101:
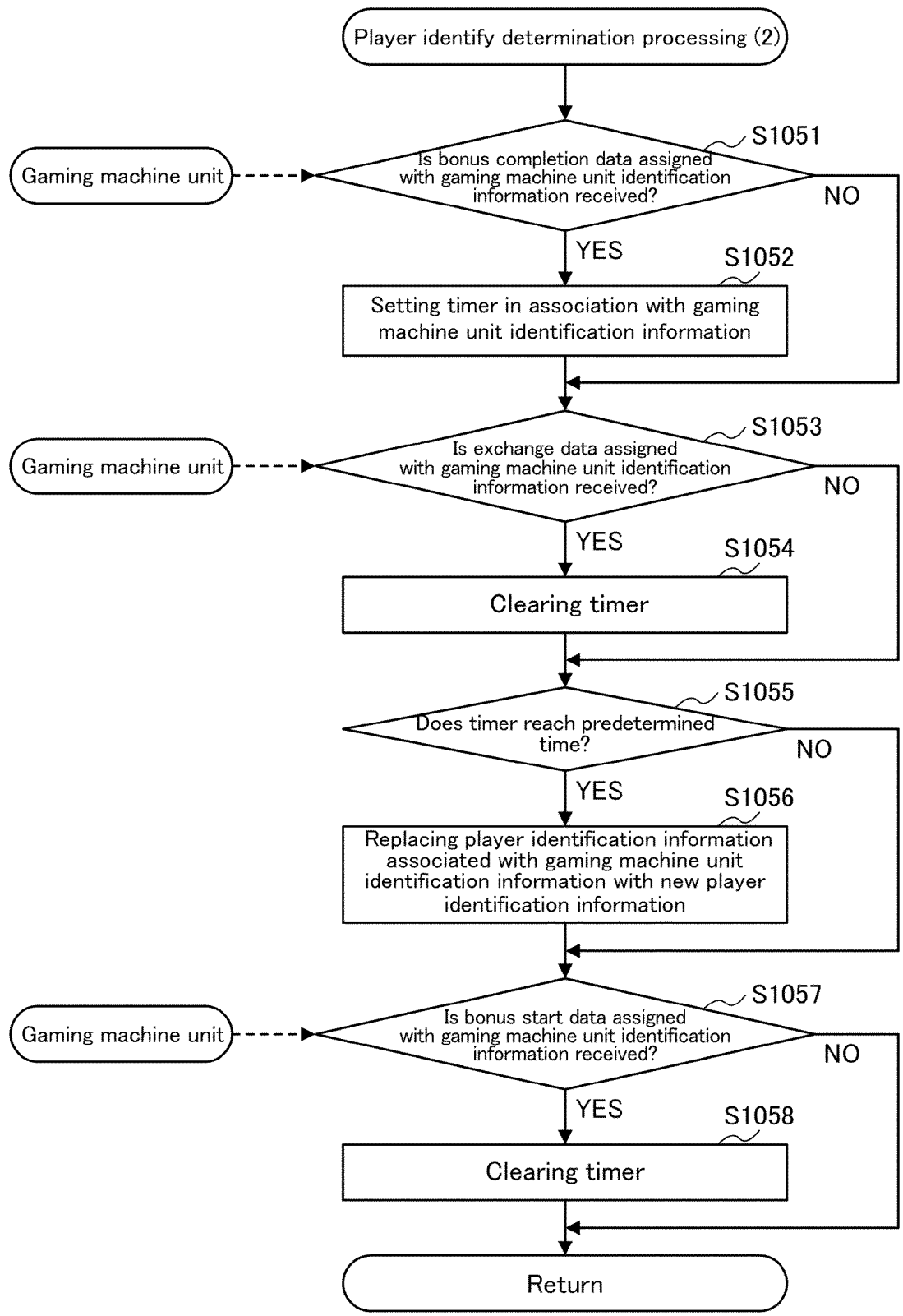

FIG. 101 is a flowchart showing player identity determination processing (2) executed in the hall conserver shown in FIGS. 1A to 1D.

Figure 102:
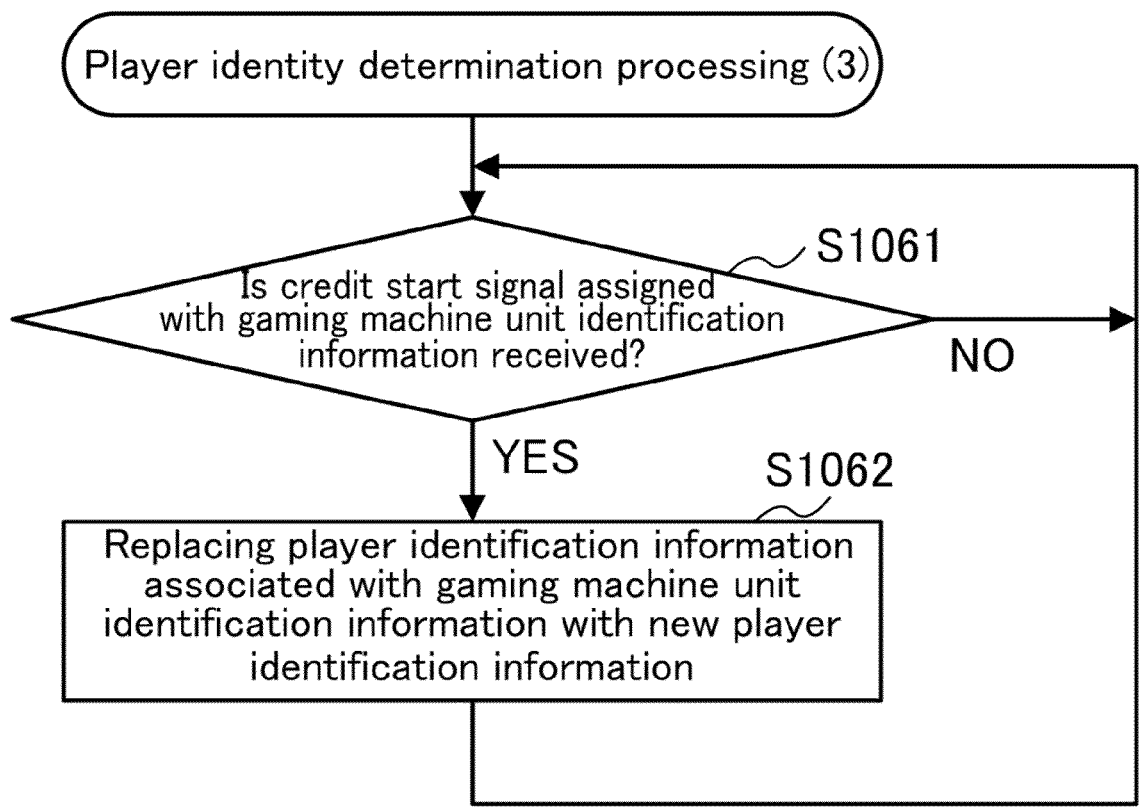

FIG. 102 is a flowchart showing player identity determination processing (3) executed in the hall conserver shown in FIGS. 1A to 1D.

Figure 103:
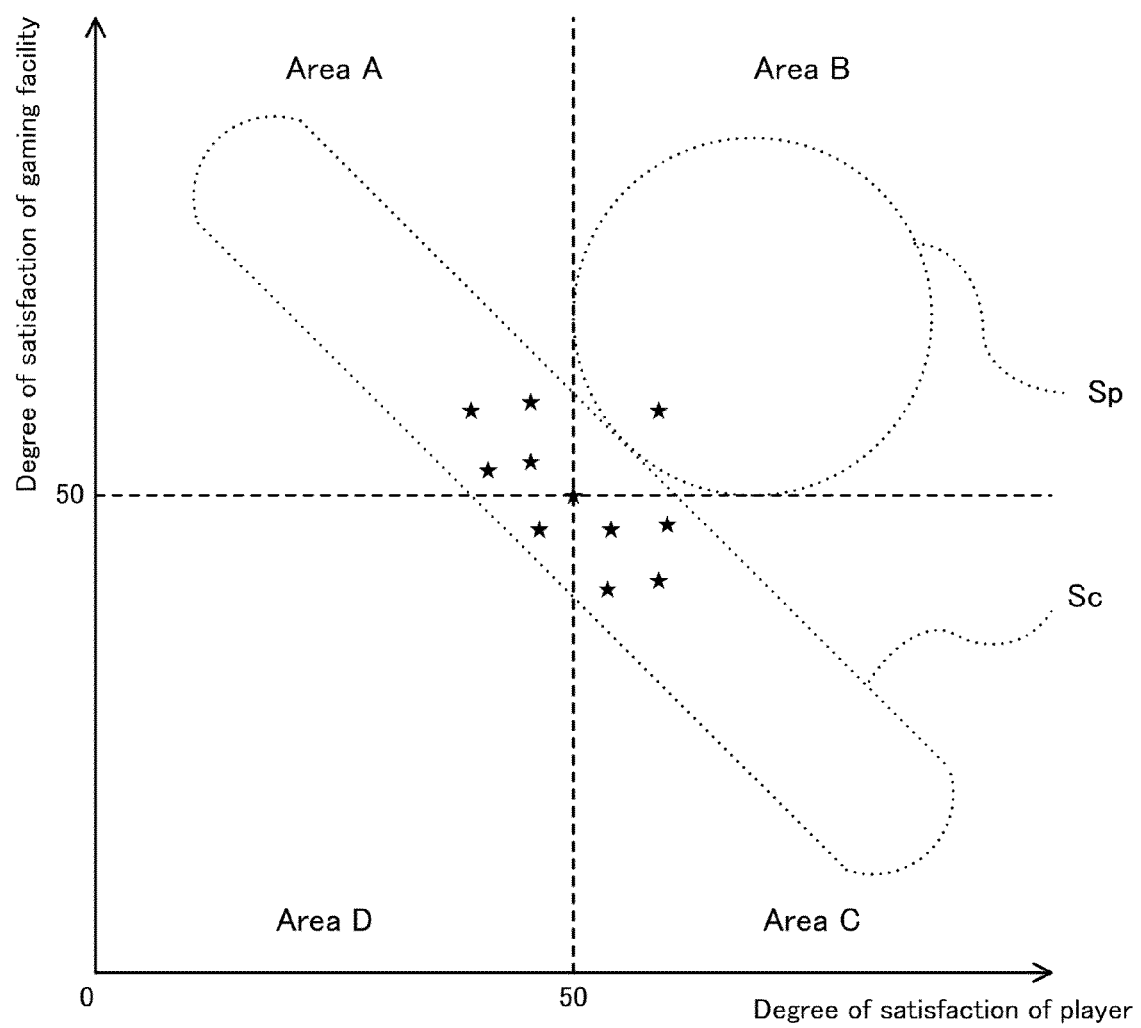

FIG. 103 is a view for explaining a relationship between a degree of satisfaction of a player and a degree of satisfaction of gaming facility.

FIGS. 104 (*a*) and (*b*) are views showing a relationship between a degree of satisfaction of a player and a degree of satisfaction of gaming facility.

Figure 105:
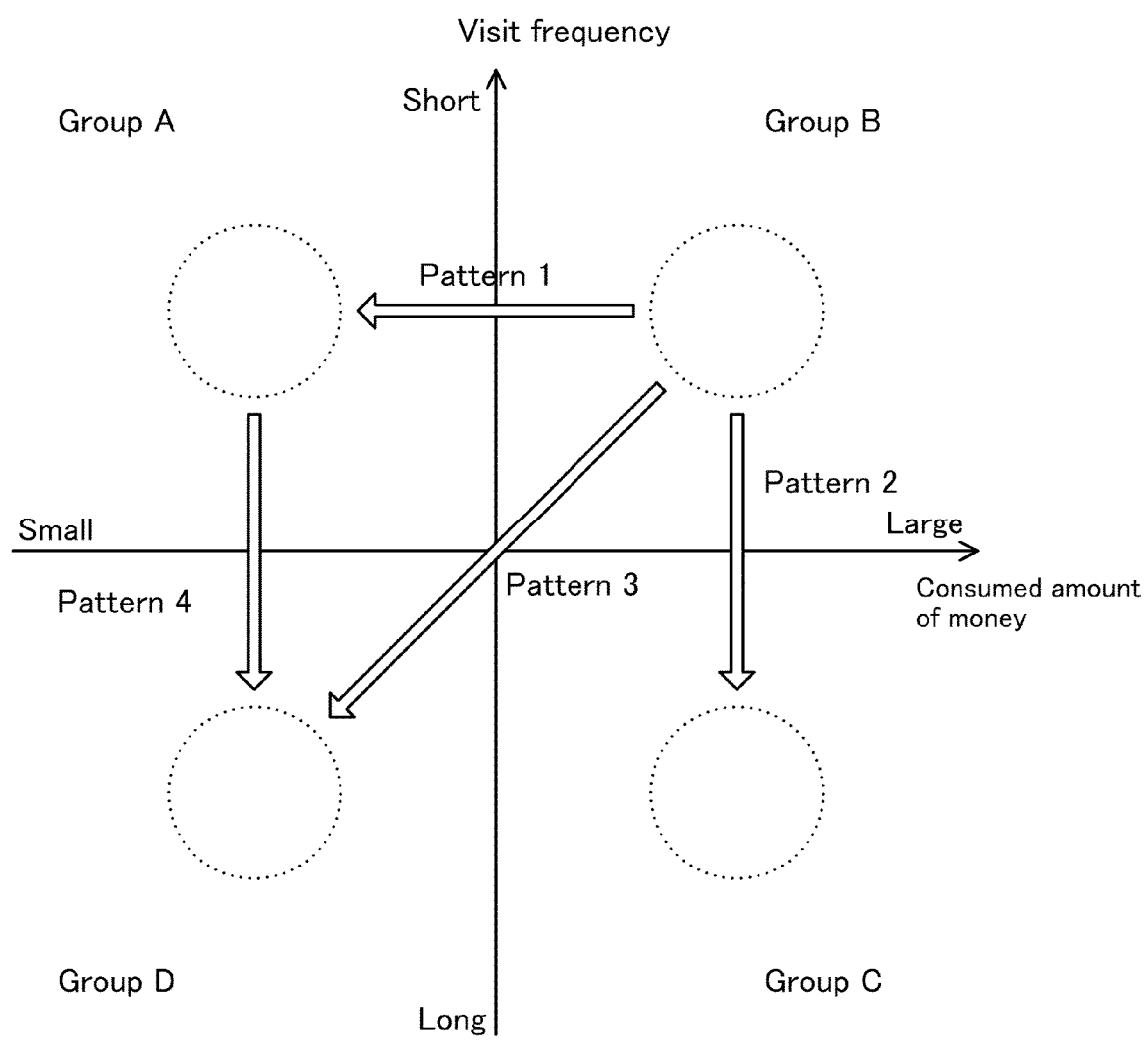

FIG. 105 is a view for explaining a life cycle of a player and its related pattern.

FIGS. 106 (*a*) and (*b*) are views showing transition of the life cycle of the player.

Figure 107:
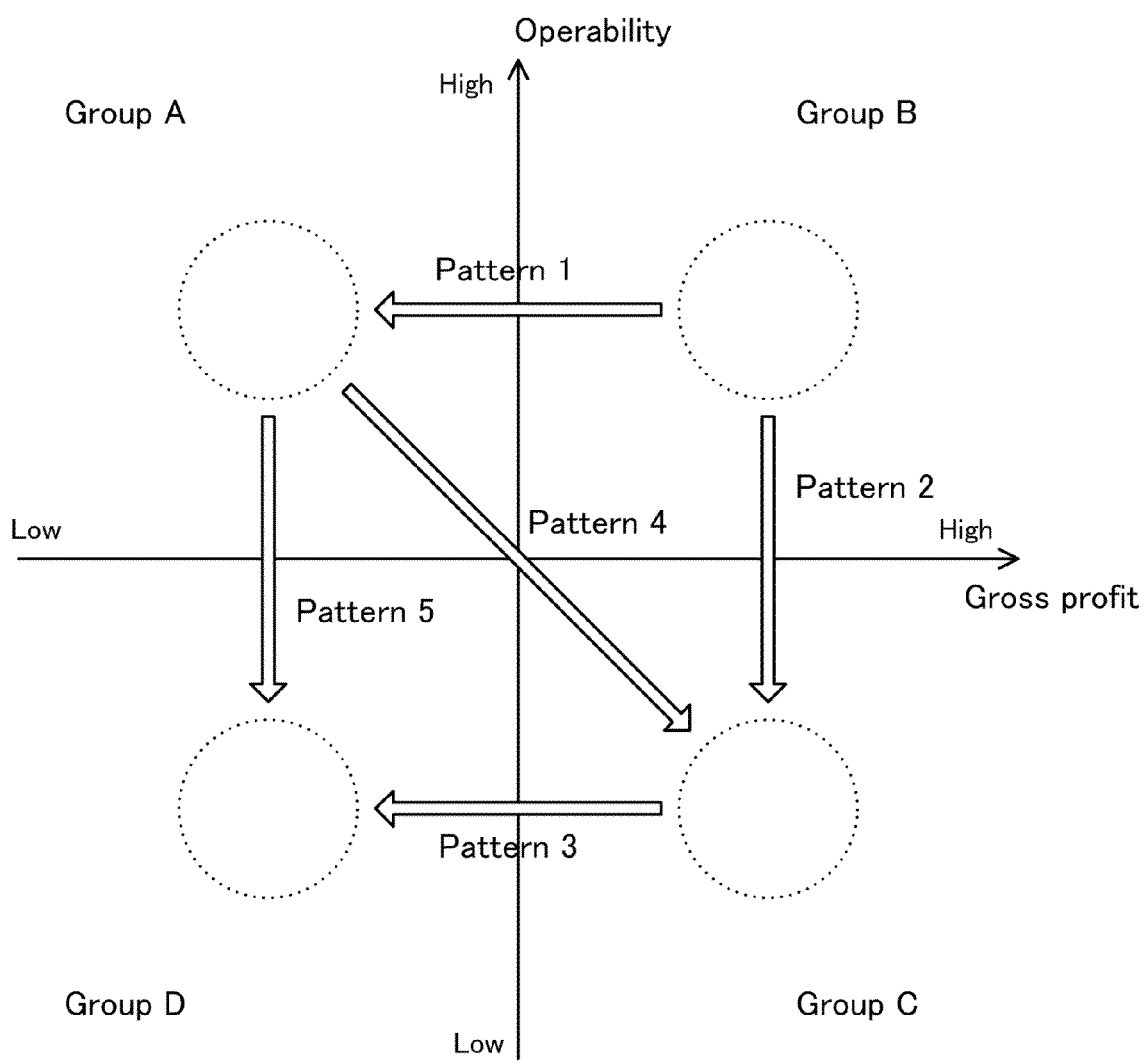

FIG. 107 is a view for explaining a life cycle of gaming machine and its related pattern.

FIGS. 108 (*a*) and (*b*) are views showing transition of the life cycle of the gaming machine.

BEST MODE FOR CARRYING OUT THE INVENTION (Game Playing Information Integration System)

FIGS. 1A to 1D are functional flowcharts showing an outline of a game playing information system.

A game playing information integration system IS includes: a plurality of gaming machine units 1; an employee management server 40; an IC card server 50; a hall conserver 60; a member management server 70; a POS server 80; a number lamp display server 90; and a plurality of devices 91 for displaying game playing information by gaming machine.

A plurality of gaming machine units 1 each include a pachinko gaming machine 10, a gaming medium lending devices 20, and an individual counting devices 30. In other words, the gaming medium lending device 20 is installed for each of the pachinko gaming machines 10 (gaming machines), and the individual counting device 10 is installed for each of the pachinko gaming machines 10 (gaming machines).

Data output from the gaming machine unit 1 includes data indicating the number of out pachinko balls, data indicating the number of safe pachinko balls, data indicating an occurrence of a special prize, data indicating start or the like, for example.

In the game playing information integration system IS, data indicating the number of pachinko balls lent, which is output from the gaming medium lending device 20, is employed as the data indicating the number of out pachinko balls, and data indicating a count value, which is output from the individual counting device 30, is employed as the data indicating the number of safe pachinko balls. The data indicating an occurrence of a special prize and the data indicating start are output from the pachinko gaming machine 10. The gaming medium lending device 20 is capable of reading player identification information from an IC card (not shown) owned by a player.

It is to be noted that in the present invention the gaming machine unit 1 is not limited to this example as long as the unit includes at least a gaming machine. The gaming machine is not limited thereto in particular, and includes a pachinko gaming machine, a pachinko/slot gaming machine, a slot machine, a gaming machine or the like, for example.

Reading of player identification information in the gaming medium lending device 20 does not always need to be performed via an IC card. A medium to store player identification information is not limited in particular. In addition, player identification information does not always need to be recognized by a player. For example, in a case where a new IC card is provided from a gaming medium lending device to a player, the IC card stores identification information of the IC card itself, and the identification information of the IC card itself is not recognized by a player. However, the game playing information integration system IS recognizes a player by employing identification information itself of a medium. In such a case the identification information of the medium functions as player identification information.

Player identification information is not limited to identification information of a medium. The gaming machine unit 1 may be constituted so that a password is input from a player. In this case, the password functions as player identification information. In addition, a face authentication system can also be employed. The face authentication system is superior to any other item of player identification information in that it is capable of identifying a player without need to cooperate the player. In this case, data obtained by acquiring a player's face as an image or data obtained by processing that data functions as player identification information.

An employee management server 40 is a server to manage an employee manager, and is capable of making wireless communication with a portable terminal device 41 owned by the employee manager. The portable terminal device 41 is not limited in particular, and includes a portable terminal device provided with a touch panel, for example (such as iPhone (registered trademark, for example). A wireless communication system is not limited in particular, and includes Wi-Fi or the like, for example. Data or the like of an analysis result, which is obtained by the game playing information integration system IS, is distributed from the employee management server 40 to each of the portable terminal devices 41, whereas the employee management server 41 is capable of setting an information access privilege by employee manager or by manager, and setting a priority level for each item of distribution information. For example, a higher access privilege may be set to a respective one to owner in order, head office staff, shop manager, manager, and chief so that the higher information security is not transmitted to a portable terminal device 41 to which an access privilege less than the corresponding higher level is set.

An IC card server 50 stores data related to a use amount of money and data related to an amount of sales in association with reception time data, player identification information, and gaming machine unit identification information. The data related to a use amount of money and data related to an amount of sales are generated based on data indicating the number of out pachinko balls and data indicating the number of save pachinko balls, which are outputted from the gaming machine unit 1. In addition, the IC card server, in association with player identification information, stores data indicating the number of saved pachinko balls (or saved medals) to which the player identification information is assigned.

A hall conserver 60 stores data indicating the number of out pachinko balls, data indicating the number of safe pachinko balls, data indicating the number of times of special prize, and data indicating the number of times of start in association with reception time data, player identification information, and gaming machine unit identification information. In addition, the hall conserver 60 stores data indicating game playing time in associated with player identification information and gaming machine unit identification information.

Game playing time is generated from time when data reception from the gaming machine unit 1 is started and time when data reception from the gaming machine unit 1 completes, for example, based on data transmitted from the gaming machine unit 1. In this manner, in the game playing information system IS, information such as the number of out pachinko balls related to operation, i.e., game playing by customer at gaming machine is output from the gaming machine unit 1 to the hall conserver 60.

A member management server (cumulative) 70 stores data related to players such as member' name, local area, sex, age, occupation or the like of each player in association with player identification information. In addition, in the member management server 70, customer category data is stored for each item of player identification information. As the customer category, for example, fixed customer (mania), unfixed customer (browsing customer), and novice (beginner) or the like are set. Player identification information and player data to which customer category data indicating fixed customer is stored after classified from player identification information and player data with which another item of customer category data is associated.

A POS server 80 is connected to enable communication with the member management server 70, and stores data related to the number of prizes in association with player identification information. The data related to the number of prizes is not limited to data automatically or manually input in a gaming facility, and may be data automatically or manually input out of the gaming machine.

A number lamp display server 90 performs display and control of a device 91 for displaying game playing information by gaming machine, which functions as a number lamp display. The device 91 for displaying game playing information by gaming machine is installed upward of a gaming machine unit 1, a cashbox image is displayed, and game playing information related to another gaming machine unit 1 is displayed with predetermined timing (such as timing with which an instruction for requesting display of game playing information is input, for example). Among items of data generated by means of the game playing information integration system IS, for example, predetermined game playing information (such as game playing information which may be disclosed to a player, for example) may be displayed on the device 91 for displaying game playing information by gaming machine.

Next, processing operation executed in the game playing information integration system IS will be continuously described with reference to FIGS. 1A to 1D. Herein, a case in which the hall conserver 60 executes the above processing will be described. It is to be noted that in the present invention, entity of executing each processing operation is not limited to the hall conserver 60, and may be performed by any one of other devices (such as employee management server 40, IC card server 50, member management server 70, POS server 80, or number lamp display server 90, for example). In addition, the above processing operation may be performed by any two or more devices from among the employee management server 40, the IC card server 50, the hall conserver 60, the member management server 70, the POS server 80, and the number lamp display server 90 in a cooperative or sharing manner.

The processing operations in the game playing information integration system include: operation analysis processing operations (popular machine analysis) A1 to A9; optimal sales strategy determination processing operations B1 to B7; and processing operations C1 to C5 related to normalization of new device type installation state as well as processing operations (data storage/analysis processing) of storing data from the gaming machine unit 1 described above or data obtained by analyzing the data in each of the servers 40 to 90. In data storage/analysis processing, data storage into each of the servers 40 to 90 and analysis processing for obtaining data employed in operation analysis processing and optimal sales strategy determination processing on the downstream side are performed. In operation analysis processing, "customer" analysis, "machine" analysis, and "sales" analysis are performed, and further, analysis of correlation of three elements of "customer", "machine", and "sales" is performed. In optimal sales strategy determination processing determination is made as to current sales strategy, and according to a result of the determination, establishment and planning of optimal (target) sales strategy is possible. In this manner, in the game playing information integration system IS, analysis of data, analysis of correlation of three elements, and determination of analysis result are performed in order.

In the game playing information integration system IS, except a case in which it is limited in the present specification in particular, analysis of data can be performed on the basis of any of predetermined reference units (such as gaming machine, device type of gaming machine, model of gaming machine, area of gaming facility, gaming facility, or casino, for example). Of course, the present invention is not limited to this example. As to unit time as a base for data analysis as well, except in a case in which it is limited in the present specification in particular, such analysis can be performed on the basis of any unit. In addition, while processing operations each are designated by reference numerals, such reference numerals are merely assigned for the sake of convenience, and it is to be noted that the order of reference numeral represents the order of these processing operations.

In A1, sales and operation data in predetermined reference units (such as gaming machine, device type of gaming machine, model of gaming machine, area of gaming facility, gaming facility, or casino, for example) is generated, and is stored in the hall conserver 60 in a system which is capable of recognizing the reference unit, based on: data related to a use amount of money and data related to an amount of sales, which are stored in the IC card server 50; data related to the number of out pachinko balls, data related to the number of safe pachinko balls, data related to the number of times of special prize, data related to the number of times of start, and data related to game playing time, which are stored in the hall conserver 60.

In the game playing information integration system IS, sales and operation data (mainly sales data) is generated based on information from the gaming medium lending device 20. In the figure, the term "lending" denotes a main information transmission source. It is to be noted that the present invention is not limited to this example, and for example, sales data may be input from an individual counting device 30 to the IC card server 50.

In A2, a business dividing number is computed based on the sales and operation data generated in A1. In A2, it is possible to compute a business dividing number per predetermined unit time as to a predetermined reference unit (such as one day, one week, or one month, for example). The business dividing number may be computed while service time or event and the like and normal game playing are classified from each other, or alternatively, may be computed while new device type and another device type are classified from each other. The sales and operation data generated in A1 and the business dividing number computed in A2 each are equivalent to a result of "sales" analysis in gaming facility.

In A3, analysis of model and characteristics of machine is performed based on: the sales and operation data generated in A1; big hit deviation (for example, standard deviation) and big hit frequency (for example, average value), which is computed in A4 (to be described later); and popularity information by customer, which is generated in A5 (to be described later). The term "model" denotes elements as to mechanical specification, and includes: elements classified by winning probability of special prize in machine; elements classified by gadget type; elements classified by big hit specification or the like, for example. Elements classified by winning probability of special prize in machine include max type, medium type, and easy big hit digital type or the like, for example. Elements classified by gadget type include mixed machine, ordinary machine, and wing-type or the like, for example. Elements classified by big hit specification are small hit incorporation, and sudden probability change incorporation or the like, for example. The term "characteristics" denotes elements different from "model", and includes whether wave of winning pachinko balls is wild or gentle, and appearance frequency of movement of winning pachinko ball slump graph (for example, whether or not wave of slump graph is wild or how appearance frequency of variation trend continuation period (pack) is) or the like. It is to be noted that the characteristics in the present invention is not a result of qualitative evaluation, but a result of quantitative evaluation, and are expressed as character data by means of stepwise evaluation (such as large, medium, or small, for example) data or numeric evaluation data obtained by performing computation employing a predetermined computation formula (such as a function, for example) or performing processing such as referring to table data, with the use of sales and operation data, big hit deviation and big hit frequency, and popularity information by customer. The stepwise or numeric evaluation used here is performed by employing standards which are different depending on model.

In A4, big hit deviation and big hit frequency are computed based on data related to the number of times of special prize, which is stored in the hall conserver 60, and reception time data associated with the data related to the number of times of special prize.

In A5, popularity information is generated based on: the characteristic data generated in A3; data related to fixed customer, which is created in A6 (to be described later); and an analysis result of machine operation in A7 (to be described later). Unlike other device types, new device type may be operated by only an element of a "new machine", regardless of machine model or characteristics. Therefore, in the game playing information integration system IS, the element of new device type is excluded when popularity information by customer is generated. Specifically, data related to gaming machine units of new device type is not employed to generate popularity information by customer. Of course, the present invention is not limited to this example.

In A6, determination of customer category (such as fixed customer, unfixed customer, or beginner, for example) is performed based on data stored in the member management server 70 (and data stored in the hall conserver 60). In particular, determination of fixed customer is performed. Specifically, computation of average use amount of money, average game playing time, average visit frequency, average amount of money lost or the like) is performed for each player (player identification information. It is to be noted that determination of customer category (in particular, fixed customer) may be performed by employing a rate of preference by customer category. The rate of preference by customer category may be stepwise evaluation such as large, medium, or small, for example. Customer category analysis (fixed customer analysis) in A6 is equivalent to "customer" analysis in gaming facility.

In A7, operation of machine is analyzed based on the characteristic data generated in A3 and the popularity information by customer, which is generated in A5. The operation of machine includes data or the like indicating operability, for example. In addition, it may be expressed as graph or function and the like indicating a change with an elapse of time of predetermined parameters. The parameters are not limited in particular, and include the number of consumptions, the number of payouts, the number of times of start, the number of big hits (number of times of special prize), use amount of money, game playing time, the number of players, and average amount of money lost or the like. A span of change with an elapse of time is not limited in particular, for example, and analysis of one month, one week, and one day or the like during a period from a time point of machine introduction to a current time point is possible.

Analysis of model and characteristics of machine in A3 and analysis of operation of machine in A7 are equivalent to "machine" analysis in gaming facility.

In A8, attraction power (degree of attraction power) of new device type is determined based on a result of analysis of model and characteristics of machine in A3 and a result of analysis of fixed customer in A6. This determination is performed only for new device type.

For example, table data with which an analysis result of fixed customer and degree of attraction power of new device type are associated is stored for each class of machine classified based on the model and characteristics of machine. Then, a table according to the results of analysis of the model and characteristics of machine I A3 is selected, and referring to the selected table, the degree of attraction power of new device type associated with the analysis result of fixed customer is extracted. The degree of attraction power of new device type is stored as data indicating stepwise evaluation (such as large, medium, and small, for example). Evaluation of attraction power of new device type and evaluation result in the present invention is not limited to this example.

In design of a gaming machine such as pachinko gaming machine 10 or the like, there may be performed selection of so called character, requiring a large amount of license fee relative to copyright. The animation character of new device type has strong element as new device type in particular, game playing trend of player is also different depending on animation character type or the like, and thus, it is desirable to employ the presence or absence of animation character for determination of degree of attraction power of new device type as well.

In A9, determination of stability is performed.

As described above, in A1 to A7, "customer" analysis, "machine" analysis, and "sales" analysis are performed. In its process, for example, a result of "sales" analysis performed in A1 is employed for "machine" analysis in A3, and in other words, an analysis result of each element is employed for analysis of another element. Then, in A9, analysis of stability is performed based on the business dividing number analyzed in A2, the characteristic data generated in A3, and the analysis result of operation of machine in A7. In the game playing information integration system IS, the term "stability" numerically indicates stability of management as to predetermined reference unit, and is a milestone of sales obtained as a result of integrative analysis of "customer" analysis, "sales" analysis, and "machine" analysis. The higher operability is the higher stability is, and as long as the business dividing number is within a predetermined range, the stability rises, whereas as long as the business dividing number is outside of the range, the stability lowers.

In B1, determination of optima business dividing number is performed based on stability data generated in A9. The optimal business dividing number is a target business dividing number, and the stability is maximized in a case where an actual business dividing number becomes an optimal business dividing number (target business dividing number).

In B2, an increase of fixed customers before and after performing setting of machine based on the optimal business dividing number determined in B1 is determined based on average use time of player, average game playing time, average visit time, and average amount of money lost or the like, and it is determined whether or not the number of fixed customers increases.

In this manner, a harmony and balance between fixed customer and profit is obtained (step B3) by using a combination of determination of optimal business dividing number (step B1) and increase of fixed customer (B2), stabilization of management in predetermined reference unit is realized (step B4).

In B5, a decrease of fixed customer before and after performing setting of machine based on the optimal business dividing number determined in B1 is determined based on average use time of player, average game playing time, average visit time, and average amount of money lost or the like, and it is determined whether or not the number of fixed customers decreases. For example, broadcasting of alarm is performed for a portable terminal device 41.

Setting of machine is changed as triggered by broadcasting of alarm in B5, and in a case where an increase of fixed customer is realized (step B2), a harmony and balance between fixed customer and profit is obtained (step B3), and stabilization of management in predetermined reference unit can be realized (step B4); and however, in a case where decreasing of fixed customers continues or if the number of fixed customers does not increase even if setting of machine is changed, withdrawal of machine is performed (step B6), introduction of new device type or the like is performed, and it is determined whether or not investment is recovered, that is, whether profit is gained or whether a loss takes place (step B7).

In respect of C1 to C5, based on the degree of attraction power of new device type (and average use amount of money, average game playing time, average visit (game playing) frequency), and average amount of money lost in A6) which are generated in A8, determination is made as to extended game playing time (step C1), determination is made as to distribution of customer category (step C2), and it is determined whether or not popularity of that device type decreases (step C3). For example, in a case where average use amount of money, average game playing time, average game playing frequency, and average amount of money lost lower and the distribution of customer category changes (for example, in a case where the number of fixed customers playing game decreases), it is determined that popularity of device type decreases (step C4). On the other hand, in a case where the number of customers is large (step C3), it is determined whether or not an in-shop installation number rate is appropriate (step C5).

[Embodiment(s)]
Game Playing Information Integration System

Figure 1A:
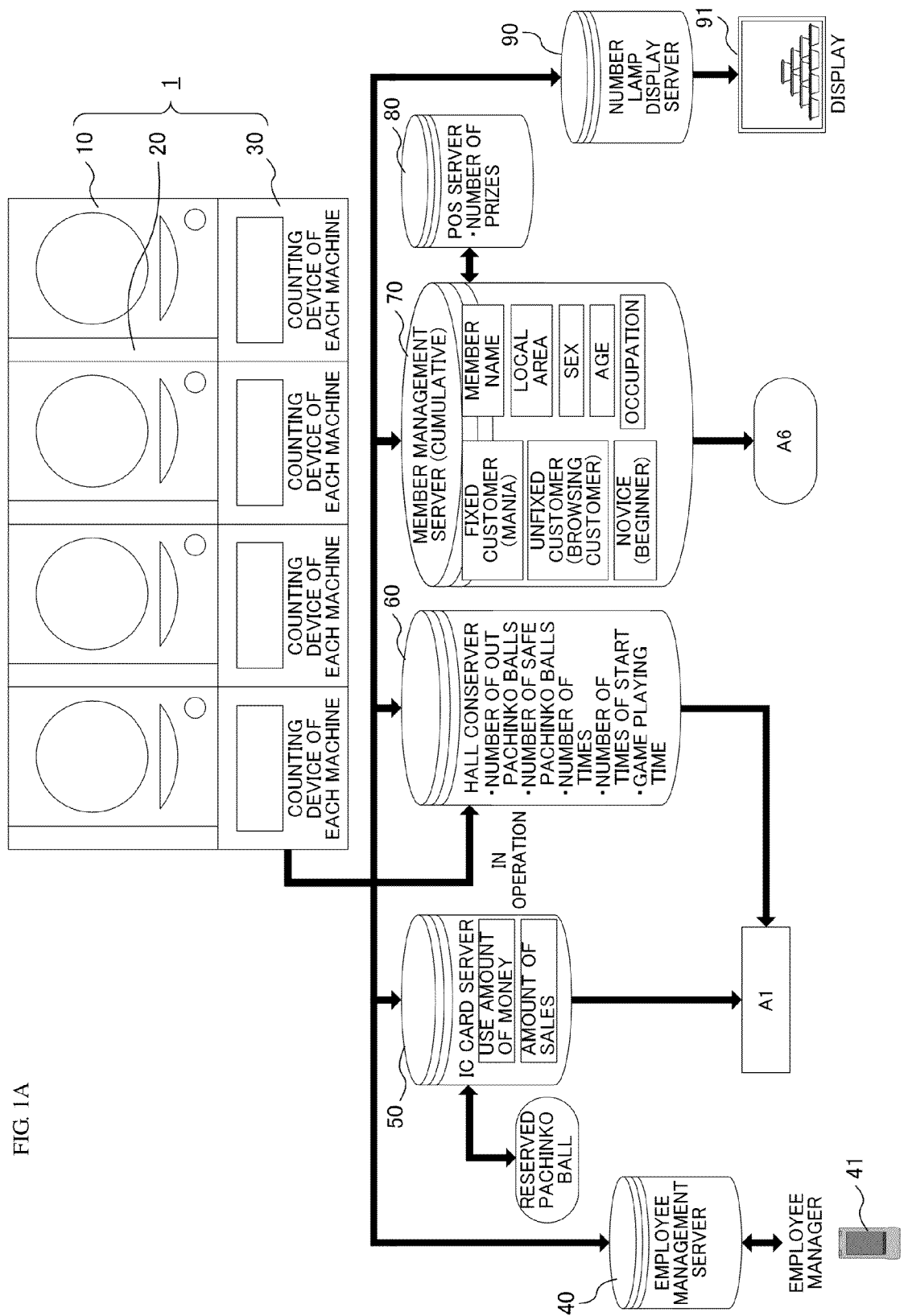
FIGS. 1A to 1D are functional flowcharts showing an outline of a game playing information integration system.
Figure 1B:
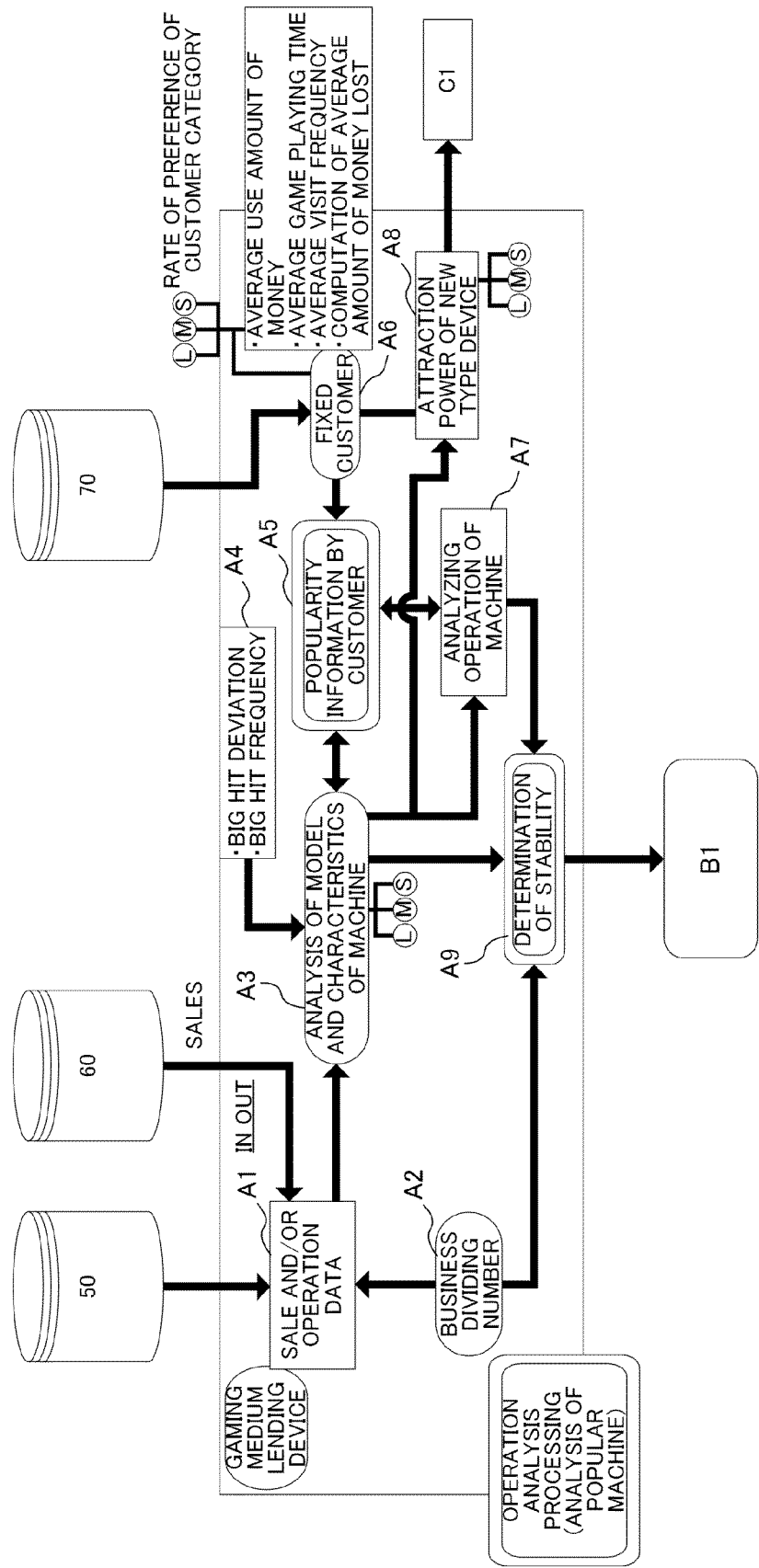
Figure 1C:
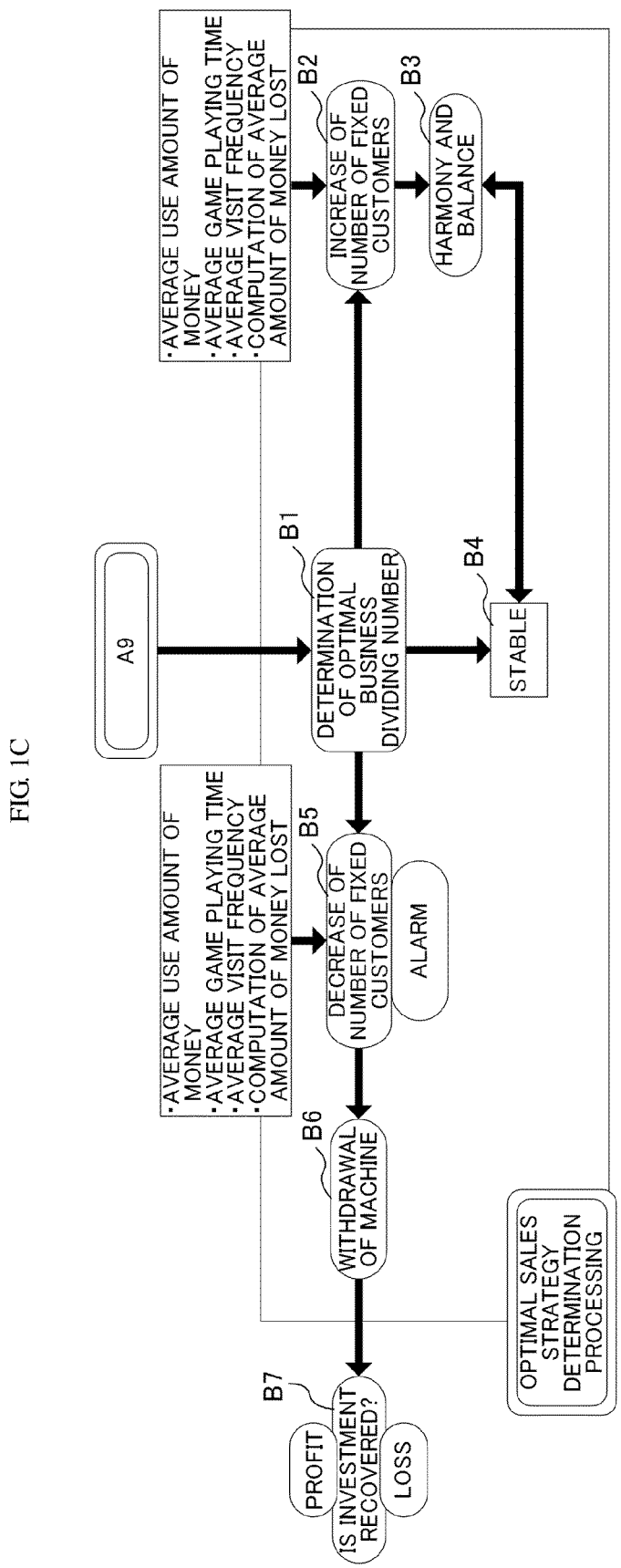
Figure 1D:
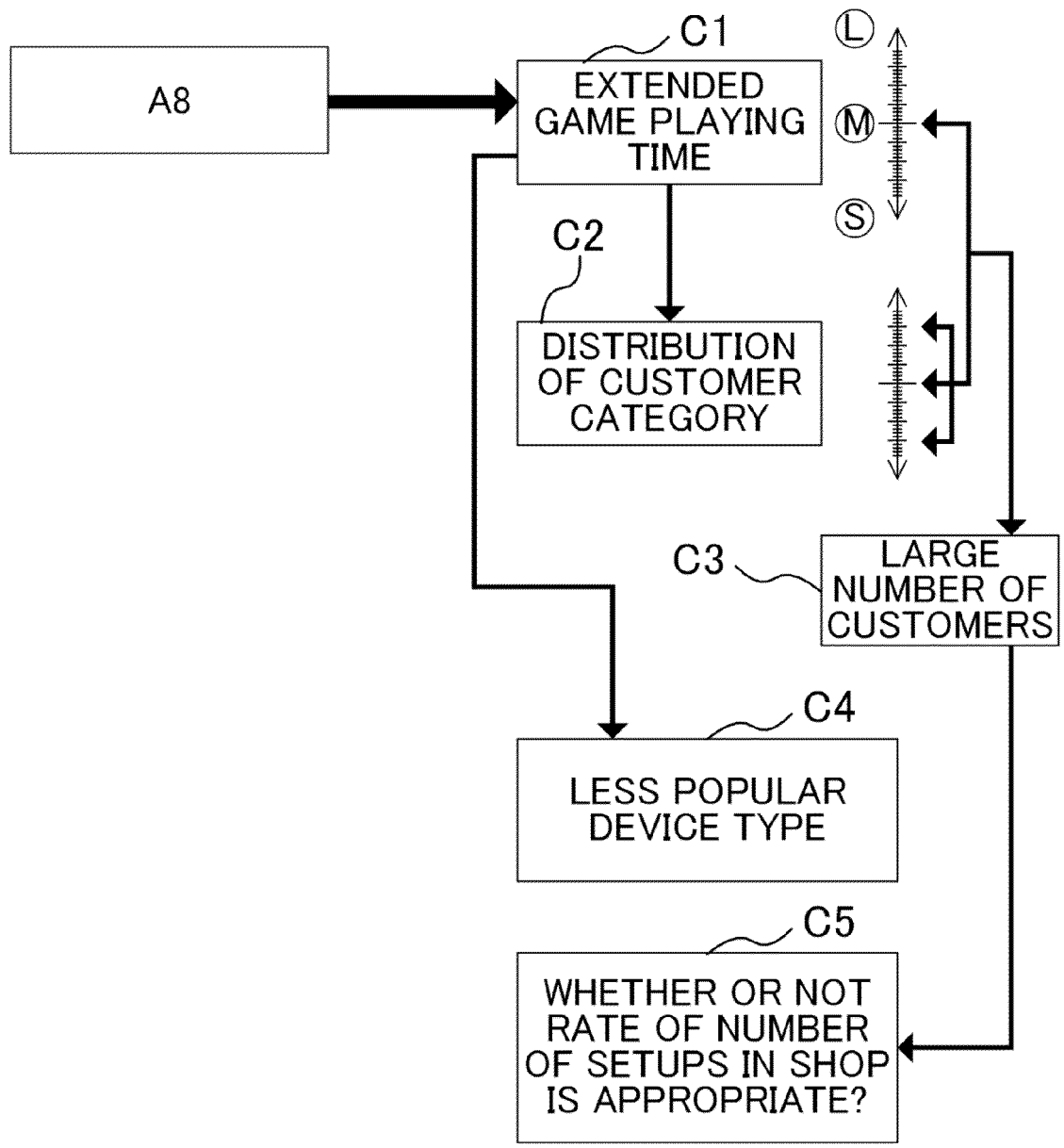
Figure 2:
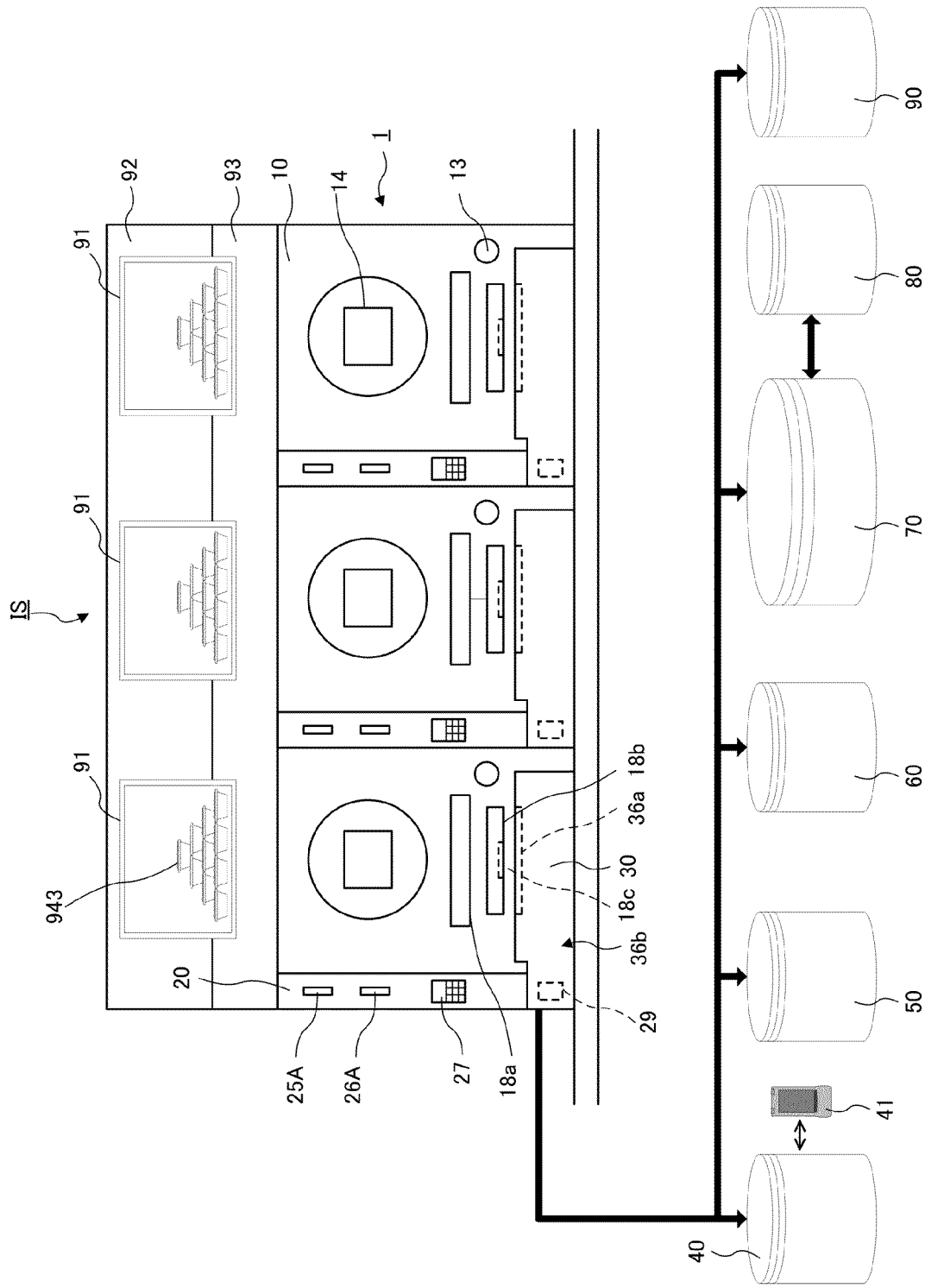
FIG. 2 is a network configuration view showing one example of a game playing information integration system according to the embodiment.

FIG. 2 is a network configuration view showing one example of a game playing information integration system IS according to the embodiment.

The game playing information integration system IS includes a plurality of gaming machine units 1, an employee management server 40, an IC card server 50, a hall conserver 60, a member management server 70, a POS server 80, and a number lamp display server 90, and the gaming machine unit 1 transmits a signal (data) to each of the servers 40 to 90. In addition, the servers 40 to 90 can communicate with each other.

A plurality of gaming machine units 1, although not shown, are disposed in a back-to-back facing manner in pair, and these plurality of paired gaming machine units 1 are disposed side by side, thereby constituting a gaming machine bank (a so called "bank"). Upward of the gaming machine units 1 that are disposed side by side, a work door 92 is provided in an openable/closable manner across a predetermined number of gaming machine units 1 (three machines in the figure). A device 91 for displaying game playing information by gaming machine is a 15-inch liquid crystal display device; is supported at a site other than the work door 92, that is, on a front face side of a plate member 93 installed between the work door 92 and a pachinko gaming machine 10; and is positioned on a front face of the work door 92 when the work door 92 is closed or is installed so as to be able to be retracted up to a position which does not interfere with the work door 92 when the work door 92 is opened. A cashbox image 943 is displayed on the device 91 for displaying game playing information by gaming machine. It is to be noted that a display area of the device 91 for display game playing information by gaming machine is equal to or greater than a display area of a display device 14 of the pachinko gaming machine 10. The plate member 93 is equivalent to a gaming machine bank constituent element in the present invention. The gaming machine bank constituent element is not limited in particular, and for example, may be the work door 92.

A plurality of gaming machine units 1 each are include a pachinko gaming machine 10, a gaming medium lending device 20, and an individual counting device 30. Specifically, the gaming medium lending devices 20 are provided at the packing gaming machines 10, respectively, and the individual counting device 30 is mounted on each of the gaming medium lending devices 20. The gaming medium lending devices 20 each are installed corresponding to the adjacent pachinko gaming machines 10, and are connected to enable communication with the corresponding pachinko gaming machines 10. The gaming medium lending devices 20 each are connected to enable communication with the servers 40 to 90 that performs system management or sales management of the gaming medium lending device 20 in the entire hall.

The pachinko gaming machine 10 includes an 8-inch display device 14 at a front center thereof, and a game playing pachinko ball wins a gadget (start chucker) in the play of game, a start signal is output from an external end. The start signal is equivalent to number-of-games-played data related to the number of games played. The pachinko gaming playing device 10 includes number-of-games-played data output means for outputting number-of-games-played data related to the number of games played.

In addition, if a special prize is won by lottery as triggered by a winning prize, the pachinko gaming device 10 outputs a signal for special prize generation from an external end. The signal for special prize generation is equivalent to number-of-times-of-special-prize data related to the number of times of special prize. The pachinko gaming machine 10 included number-of-times-of-special-prize data related to the number of times of special prize.

At each of the gaming medium lending device 20, there is provided: a card insertion slot 26A which is capable of accepting an IC card issued by means of a card airplane (not shown) in hall, for example, a bill entry slot 25A which is capable of bill entry, and a Ten-numeric key operation unit 27 or the like. An IC card stores medium identification information of the IC card itself, and the medium identification information is employed as player identification information in the game playing information integration system IS.

A player can receive lending of game playing pachinko balls as gaming media required for the play of game by entering an information card or a predetermined amount of bills into a card insertion slot 26A or a bill entry 25A. In this case, the gaming medium lending device 20 supplies an instruction for paying out the number of game playing pachinko balls according to the entered amount of money or a specified number of game playing pachinko balls to a pachinko gaming machine 10 which is provided together via the information card, whereby in the pachinko gaming machine 10, the game playing pachinko balls of which number is assigned in accordance with the entered amount of money is paid out onto the corresponding top plate 18a. In this manner, the player can play a game by employing the game playing pachinko balls paid out. In addition, in the gaming medium lending device 20, an IC card is stored separately, and in a case where a player receives lending of game playing pachinko balls by entering a bill without inserting an IC card, the gaming medium lending device 20 provides the stored IC card to the player by ejecting it to the outside of the gaming machine. At this time, the gaming medium lending device 20 may read or may not read player identification information from the IC card. It is to be noted that in a case where medium identification information is stored in a medium such as an IC card is employed as player identification information, the medium identification information read in the game playing information integration system IS before that medium is provided is employed to identify a player after the medium has been provided to the player, and thus, corresponds to player identification information.

At each of the gaming medium lending devices 20, a removable mount portion 29 which is capable of removably mounting an individual counting device 30 is provided so as to be able to mount the individual counting device 30. When the individual counting device 30 is mounted at a removable mount portion 28 of the gaming medium lending device 20, the individual counting device 30 and the gaming medium lending device 20 are connected to enable communication with each other. Each of the individual counting devices 30 is provided downward of a bottom plate 18b of the pachinko gaming device 10 that corresponds to the gaming medium lending device 20.

The individual counting device 30 is entirely constituted in a substantially rectangular parallelepiped shape, and at a top face part thereof, an introduction opening portion 36a is provided for introducing game playing pachinko balls (player-owned pachinko balls) ejected via an opening portion 18c at which an opening and closing shutter provided at a bottom face part of the bottom plate 18b is provided.

The individual counting device 30 counts the number of owned pachinko balls introduced via the introduction opening portion 36a. Upon a counting result from the individual counting device 30, the gaming medium lending device 20 stores the number of owned pachinko balls in the IC card inserted at that time, as the number of player-owned pachinko balls. In this manner, the number of player-owned pachinko balls ejected from the bottom plate 18b of the pachinko gaming machine 10 is stored as information in the IC card. The owned pachinko balls when counting completes are ejected from an ejection portion 36b of the individual counting device 30 and then are discharged into so called a groove for re-collection from the gaming medium lending device 20. Accordingly, the player-owned pachinko balls are stored as information in the IC card without being stacked in a conventionally-used ball-box.

When an instruction for employing the counted own pachinko balls for the play of game again is input to the individual counting device 30, the instruction is transmitted from the individual counting device 30 to the gaming medium lending device 20. In the gaming medium lending device 20 having received this operation result, an instruction for paying out own pachinko balls of which number is stored in an IC card that is inserted into the gaming medium lending device 20 is transmitted to the pachinko gaming machine 10. In the gaming medium lending device 20, game playing pachinko balls are lent in predetermined unit of amount of money (such as in units of 1,000 Yen, for example), thus supplying an instruction of payout to the pachinko gaming machine 10 in lending number units according to the amount of money. Thus, in a case where the number of own pachinko balls that are stored in an IC card includes a fraction which cannot be divided into unit number for supplying the instruction for payout from the gaming medium lending device 20 to the pachinko gaming machine 10, that fraction component is made to be paid out as redundant pachinko balls in the individual counting device 30. In this manner, such fraction component is made to be paid out after distributed into the pachinko gaming machine 10 (top plate 18a) and the individual counting device 30, in accordance with data of the number of the player's own pachinko balls that are stored in the IC card.

The employee management server 40 is a server for managing an employee manager, and is capable of making wireless communication with the portable terminal device 41 that is owned by the employee manager.

The IC card server 50 stores data related to a use amount of money and data related to an amount of sales in association with reception time data, player identification information, and gaming machine unit identification information.

The hall conserver 60 stores: data indicating the number of out pachinko balls; data indicating the number of safe pachinko balls; data indicating the number of times of special prize; and data indicating the number of times of start, in association with reception time data, player identification information, and gaming machine unit identification information. In addition, the hall conserver 60 stores data indicating game playing time in association with player identification information and gaming machine unit identification information.

The member management server 70 stores data related to players such as member name, local area, sex, age, and occupation of each player in association with player identification information. In the member management server 70, customer category data is stored for each item of player identification information. As the customer category, for example, fixed customer (mania), unfixed customer (browsing customer), and novice (beginner) or the like are set. Player identification information and player data with which customer category data indicating fixed customer is associated is stored after classified from player identification information and player data with which another item of customer category is associated.

The POS server 80 is connected to enable communication with the member management server 70, and stores data related to the number of prizes in association with player identification information.

The number lamp display server 90 performs display and control of the device 91 for displaying game playing information by gaming machine, which functions as a number lamp display.

It is to be noted that the gaming media in the present invention are not limited to tangibles such as game playing pachinko balls, metals, coins, or tokens, for example. The gaming media may be tangibles or intangibles such as data as long as they are media of value unit in the play of game. For example, so called credits for amusement equipment such as gaming machine also fall under the gaming media in the present invention.

(Pachinko Gaming Machine)

Figure 3:
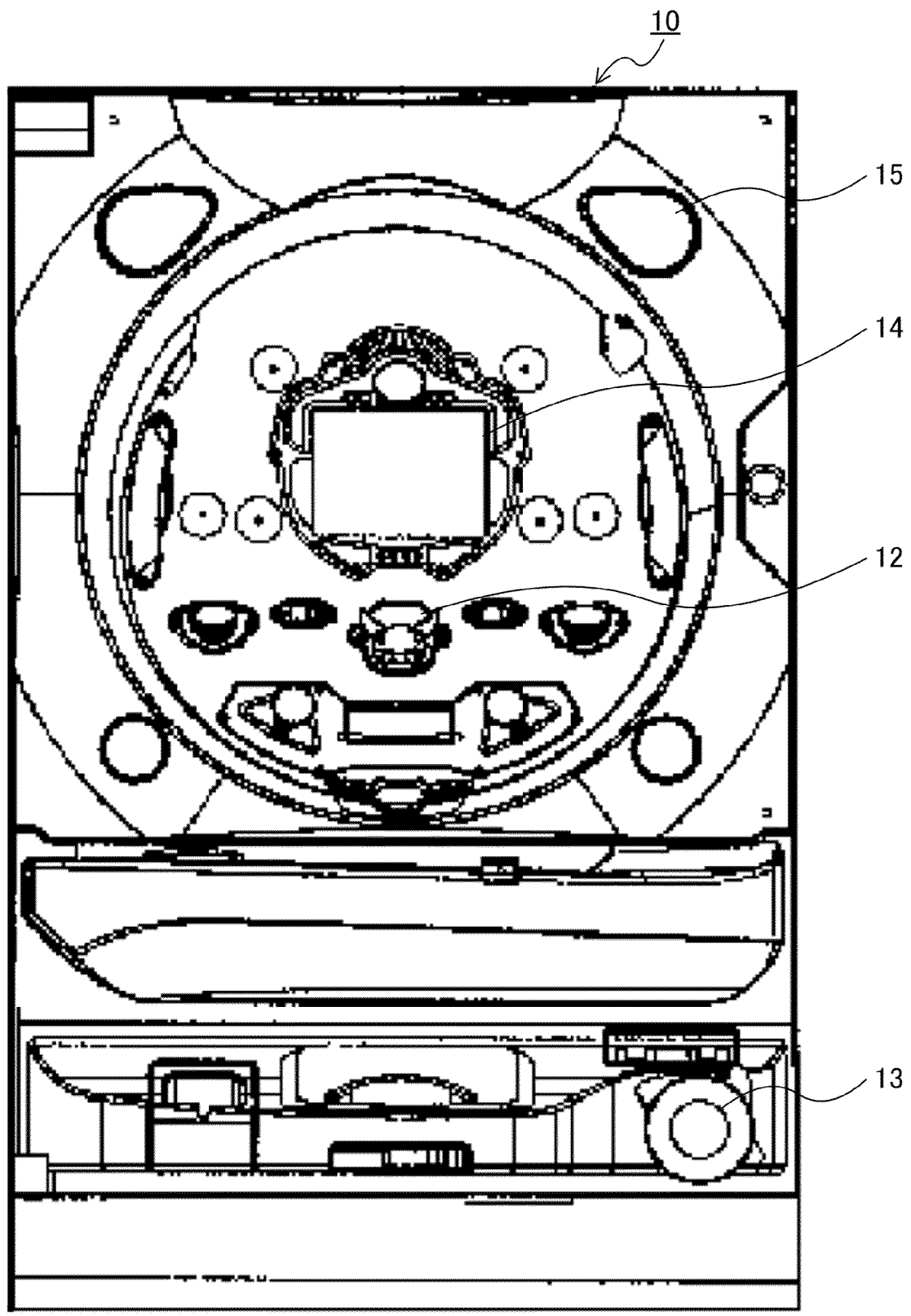
FIG. 3 is a perspective view schematically showing one example of a pachinko gaming machine shown in FIGS. 1A to 1D.

FIG. 3 is a perspective view schematically showing one example of a pachinko gaming machine shown in FIGS. 1A to 1D.

A gadget device 12 including a start detection sensor 12S (not shown) is provided on a gaming board of a front face of a pachinko gaming machine 10, and a display device 14 is installed at a center portion of the gaming board. The display device 14 of the pachinko gaming machine 10 is equivalent to a symbol display device which is capable of variably displaying symbols. A shooting handle 13 is provided at a lower right of the front face of the pachinko gaming device 10, and speakers 15 are provided on an upper left and an upper right of the front face of the pachinko gaming device 10.

Figure 4:
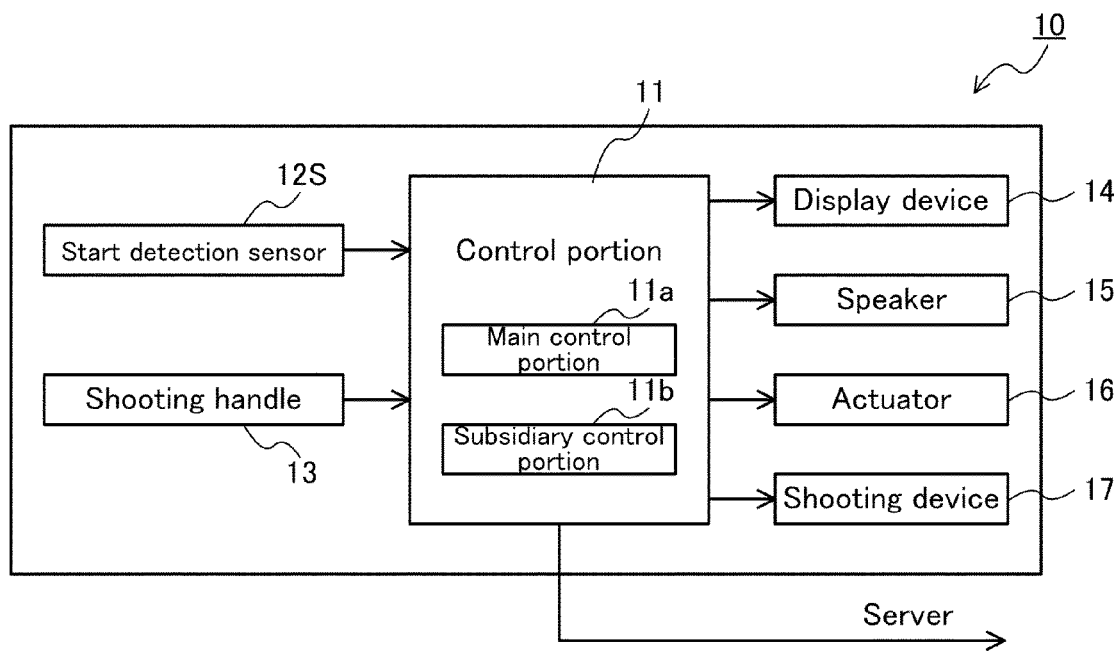
FIG. 4 is a block diagram depicting an internal structure of the pachinko gaming machine shown in FIGS. 1A to 1D.

FIG. 4 is a block diagram depicting an outline of an internal structure of the pachinko gaming machine shown in FIGS. 1A to 1D. The shooting handle 13 is connected to a control portion 11, an angle signal indicating a turning angle of the shooting handle 13 is converted to a predetermined signal, and then, the converted signal is input to the control portion 11. A start detection sensor 12S is also connected to the control portion 11, and when a gaming pachinko ball passes through the gadget device 12, the start detection sensor 12S outputs a detection signal.

The control portion 11 includes a main control portion 11a (so called main board) and a subsidiary control portion 11b (so called subsidiary board). The main control portion 11a performs big hit determination, and supplies a command to the control portion 11b or the like, and the subsidiary control portion 11b mainly performs control of stage effect. The main control portion 11a includes a CPU, a ROM, and a ROM or the like, and the ROM stores a control program for controlling flow of the entire play of game in a pachinko gaming machine. The ROM stores values of flags or variables for use in the program described above. The subsidiary control portion 11b includes a CPU, a ROM, and a RAM or the like, and the ROM stores image data displayed on the display device 14 or sound data or the out output from the speakers 15.

The display device 14, the speakers 15, an actuator 16, and a shooting device 17 are connected to the control portion 11, and a drive signal or drive power is supplied to control each of the devices described above, in accordance with a result of computation processing in the control portion 11. In addition, the control portion 11 transmits a start signal and a special prize generation signal to the hall conserver 60.

(Gaming Medium Lending Device)

Figure 5:
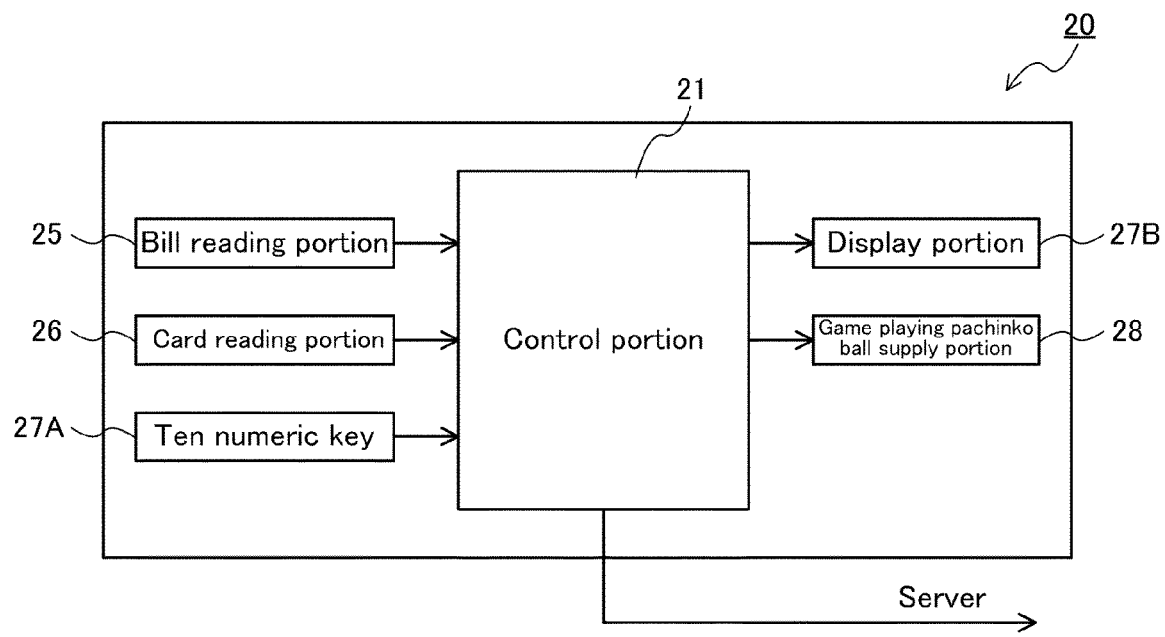
FIG. 5 is a block diagram depicting an internal structure of a gaming medium lending device shown in FIGS. 1A to 1D.

FIG. 5 is a block diagram depicting an internal structure of the gaming medium lending device 20 shown in FIGS. 1A to 1D.

A bill reading portion 25, a card reading portion 26, and Ten numeric keys 27A are connected to a control portion 21. The bill reading portion reads a bill entered into a bill entry slot 25A. The card reading portion 26 reads player identification information that is stored in an IC card inserted into the card reading portion 26. In addition, the card reading portion 26 may perform data writing into an IC card in addition to reading of the data stored in the IC card. Ten numeric keys 27A are operated by a player enables input of an instruction related to lending game playing pachinko balls. The card reading portion 26 is capable of reading of player identification information, and functions as a player identification information reading means for outputting the read player identification information.

A display portion 27B and a game playing pachinko ball supply portion 28 are connected to the control portion 21. The display portion 27 displays data such as use amount of money or number of pachinko balls lent, for example. The game playing pachinko ball supply portion 28 is controlled by means of the control portion 21, and supplies game playing pachinko balls of which number is assigned in accordance with the use amount of money. The control portion 21 includes a CPU, a ROM, and a RAM or the like, and controls each of the devices connected to the control portion 21. The control portion 21 outputs data related to use amount of money and data related to the number of pachinko balls lent to the IC card server 50. The data related to the number of pachinko balls lent is employed as number-of consumptions data in the game playing information integration system IS. The control portion 21 of the gaming medium lending device 20 functions as a number-of-consumptions data related to the number of consumptions of gaming media. In addition, the control portion 21 of the gaming medium lending device 20 functions as a use-amount-of-money data output means for outputting use-amount-of-money data related to the amount of money used to lend gaming media.

(Individual Counting Device)

Figure 6:
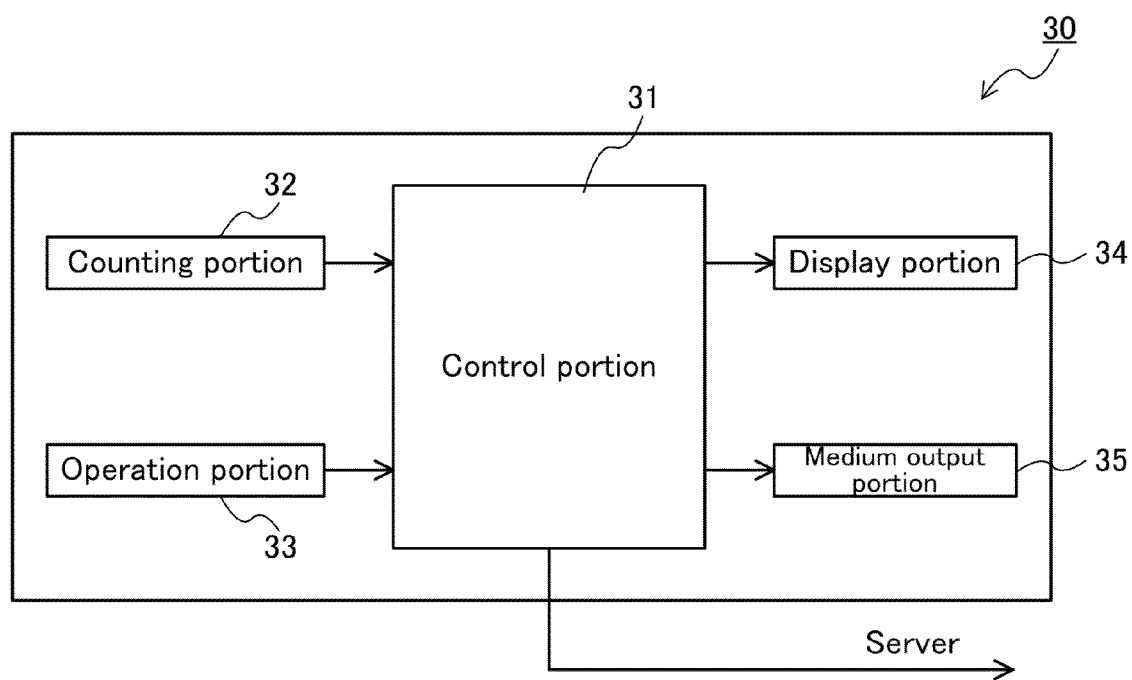
FIG. 6 is a block diagram depicting an internal structure of an individual counting device shown in FIGS. 1A to 1D.

FIG. 6 is a block diagram depicting an internal structure of the individual counting device 30 shown in FIGS. 1A to 1D.

A counting portion 32 and an operation portion 33 are connected to a control portion 31. The counting portion 32 counts the number of game playing pachinko balls when the game playing pachinko balls flow into the counting portion. The operation portion 33 is capable of inputting an instruction such as an instruction related to liquidation or an instruction related to reuse of the counted game playing pachinko balls.

A display portion 34 and a medium output portion 35 are connected to the control portion 31. The display portion 34 displays the number of game playing pachinko balls read or the like, for example. The medium output portion 35 outputs media (such as receipt, for example) for displaying the number of gaming media acquired by a player, based on a result obtained by performing liquidation by means of an instruction related to liquidation. The control portion 31 outputs a count value as number-of-payouts data to the hall conserver 60. The control portion 31 of the individual counting device 30 functions as a number-of-payouts data output means for outputting number-of-payouts data related to the number of payouts of game playing media.

In the gaming machine unit 1, gaming machine unit identification information is individually assigned for each of the gaming machine units 1, and the pachinko gaming machine 10, the gaming medium lending device 20, and individual counting device 30, which constitute the same gaming machine unit 1, employ at least the same gaming machine unit identification information when making communication with the servers 40 to 90.

(Server)

The employee management server 40, the IC card server 50, the hall conserver 60, the member management server 70, the POS server 80, and the number lamp display server 90 are equivalent to "servers" in the present invention. It is to be noted that the servers in the present invention may be made of a plurality of nodes, or alternatively, may be made of a single node. Hard disks 45, 55, 65, 75, 85, and 95 function as "data storage means" in the present invention.

Figure 7:
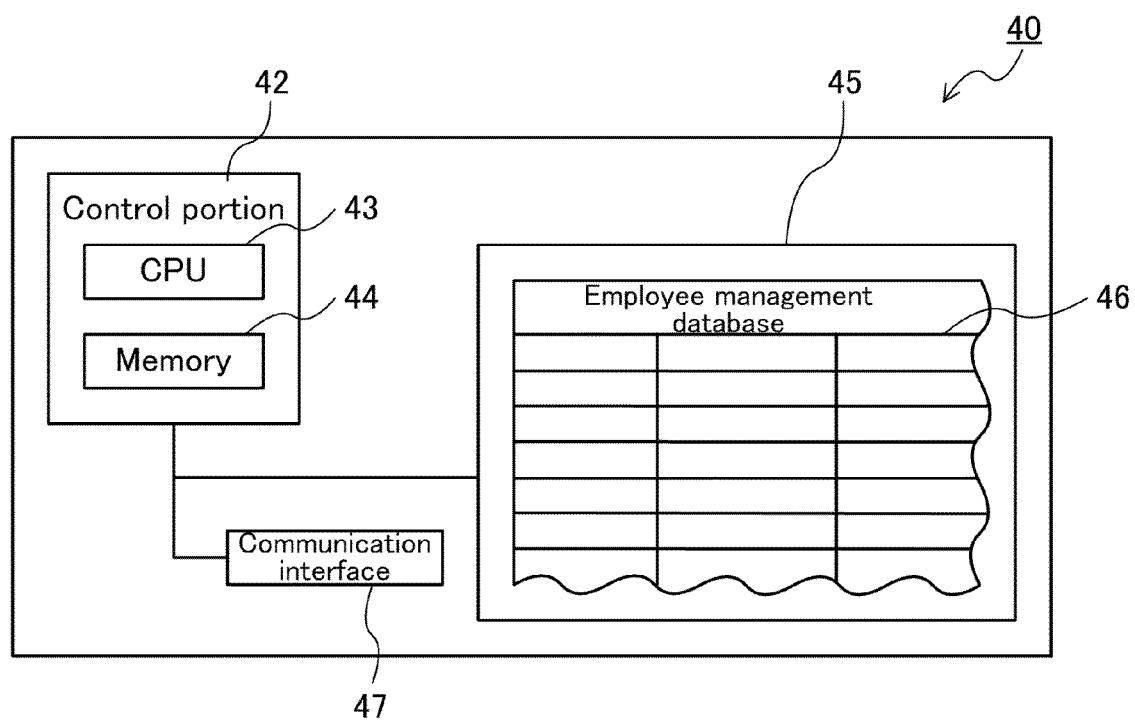
FIG. 7 is a block diagram depicting an internal structure of an employee management server shown in FIGS. 1A to 1D.

FIG. 7 is a block diagram depicting an internal structure of the employee management server 40 shown in FIGS. 1A to 1D. The employee management server 40 includes a control portion 42, a hard disk 45, and a communication interface 47, and the control portion 42 includes a CPU 43 and a memory 44. The hard disk 45 stores a variety of programs or data, and the control portion 42 reads out and executes these programs, and performs a variety of processing operations. The hard disk 45 stores an employee management database 46. In the employee management database 46, information of employees including employee managers is stored in association with a communication address of a portable terminal device 41. In addition, employee information includes data of executive managers (such as owner, head office staff, shop manager, manager, and/or chief, for example), and different information access privileges are set for each executive manager. The employee management server 40 transmits data indicating a result of analysis or determination in the game playing information integration system IS to the portable terminal device 41. The employee management server 40 determines security of information, based on type (item) of data indicating the analysis or determination in the game playing information integration system IS and then transmits data indicating the result of the analysis or determination to a communication address of an employee manager to which an information access privilege exceeding security of information is set, in a relationship between security of information and information access privilege.

Figure 8:
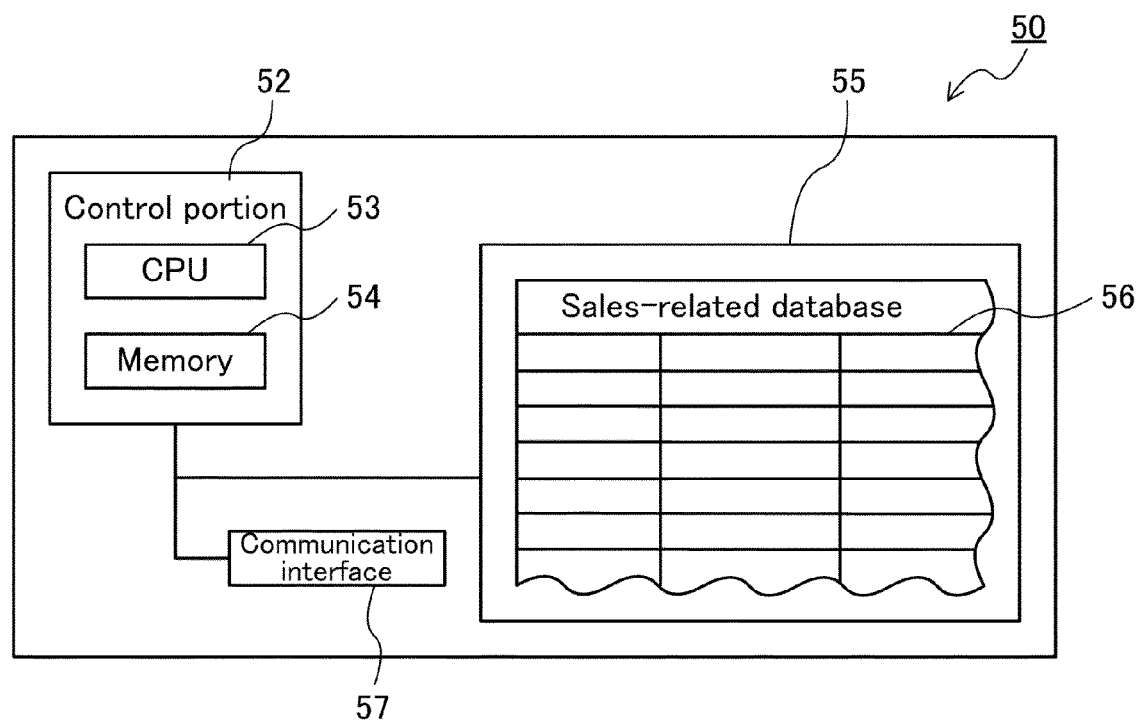
FIG. 8 is a block diagram depicting an internal structure of an IC card server shown in FIGS. 1A to 1D.

FIG. 8 is a block diagram depicting an internal structure of the IC card server 50 shown in FIGS. 1A to 1D.

The IC card server 50 includes a control portion 52, a hard disk 55, and a communication interface 57, and the control portion 52 includes a CPU 53 and a memory 54. The hard disk 55 stores a variety of programs or data, and the control portion 52 reads out and executes these programs, and performs a variety of processing operations. The hard disk 55 stores a sales-related database 56. In the sales-related database 56, for example, consumed-amount-of money data or sales-amount data, reception time data, player identification information, gaming machine unit identification information, and a flag indicating the play of game in progress or the like are stored in association with each other. In the hard disk 55 of the IC card server 50, further, data related to the number of saved pachinko balls or data related to member points may be stored in association with player identification information.

Further, the data storage means stores use-amount-of-money data output from the use-amount-of-money data output means, in association with reception time data related to reception time of data, player identification information, and gaming machine unit identification information.

Figure 9:
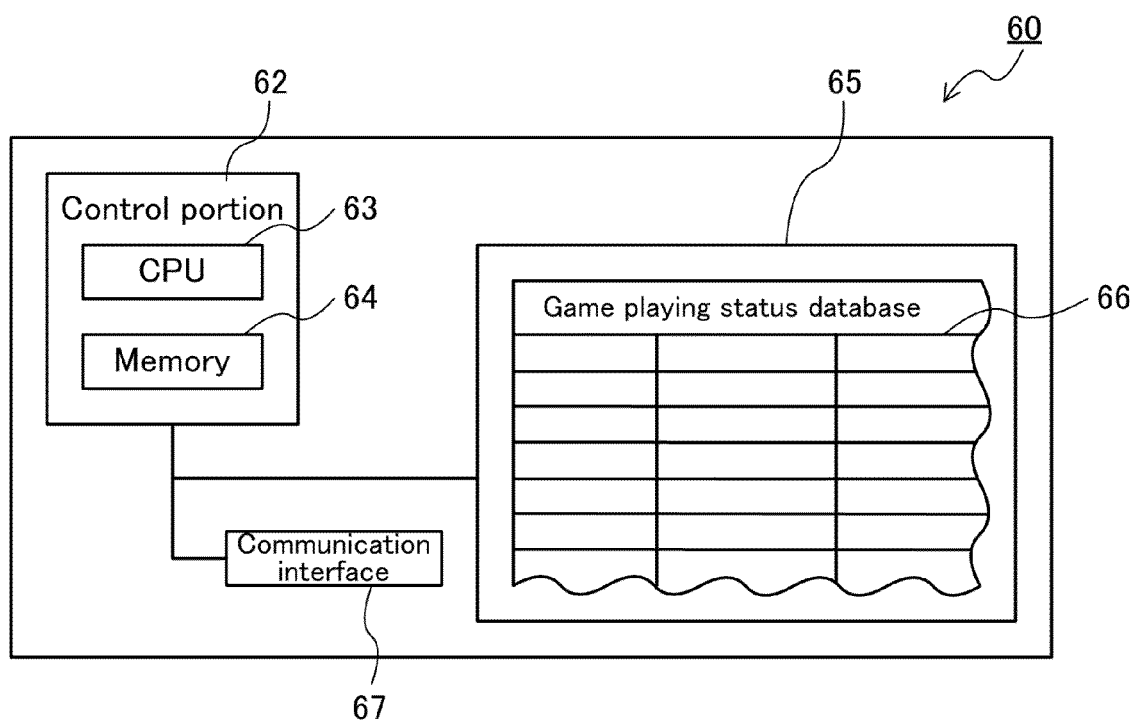
FIG. 9 is a block diagram depicting an internal structure of a hall conserver shown in FIGS. 1A to 1D.

FIG. 9 is a block diagram depicting an internal structure of the hall conserver 60 shown in FIGS. 1A to 1D. The hall conserver 60 includes a control portion 62, a hard disk 65, and a communication interface 67, and the control portion 62 includes a CPU 63 and a memory 64. The hard disk 65 stores a variety of programs or data, and the control portion 62 reads out and executes these programs, and performs a variety of processing operations.

The hard disk 65 stores a game playing status database 66. In the game playing status database 66, for example, number-of-consumptions data, number-of-payouts data, number-of-times-of-start data, number-of-times-of-prize data, and game playing information data or the like, data output from a gaming machine unit 1 or data obtained when the data is processed, reception time data, player identification information, gaming machine unit identification information, a flag indicating the play of game in progress, and a service type flag are stored in association with each other. Further, device type data, model data, gaming machine mount identification information, a new device type flag, and a service time flag or the like are stored therein.

Data storage means stores each item of number-of-consumptions data output from number-of-consumptions data output means and number-of payouts data output from number-of-payouts data output means in association with reception time data related to reception time of data, player identification information, and gaming machine unit identification information.

In addition, the hard disk 65 stores a correlation database. In the correlation database, for example, gaming machine identification information, big hit deviation and frequency, characteristics, an operation time rate per predetermined unit time, the number of game playing customer per predetermined unit time, average game playing time per player, business time, operability, stability, and values of attraction power of new device type or the like are stored in association with each other.

Further, the hard disk 65 stores a determination result database. In the determination result database, device type, gaming machine unit identification information, target dividing number, the number of fixed customers, an alarm flag indicating the number of fixed customers, setup rate, appropriate setup rate, and setup rate alarm flag or the like are stored in association with each other.

Figure 10:
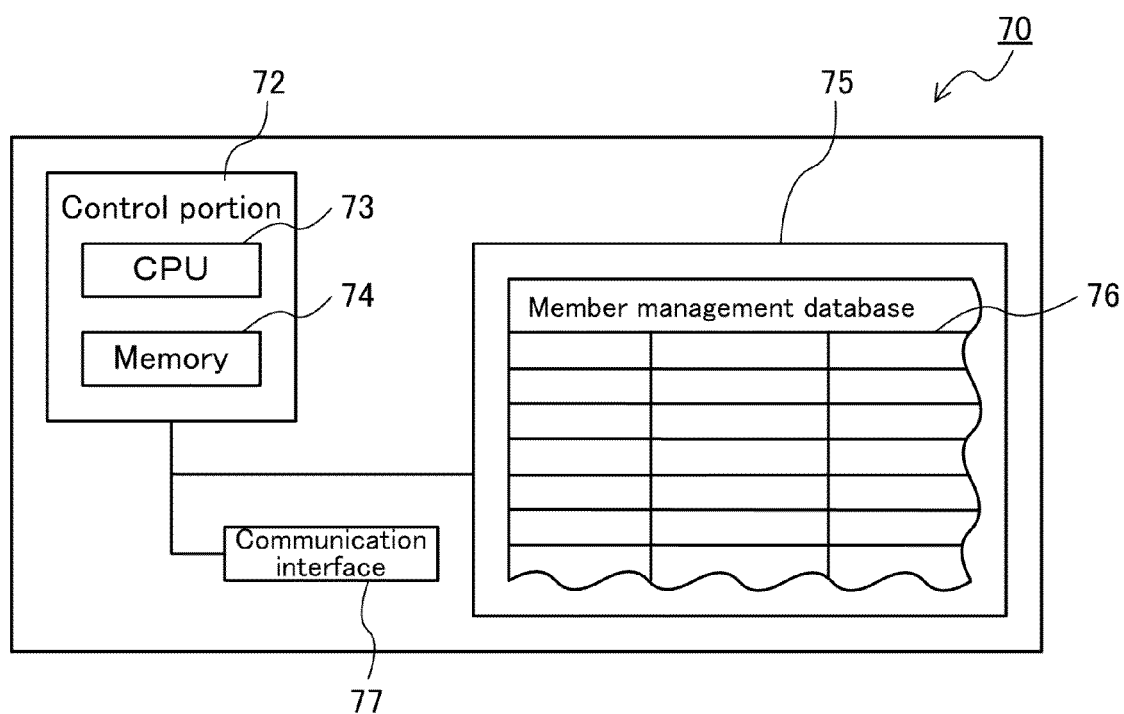
FIG. 10 is a block diagram depicting an internal structure of a member management server shown in FIGS. 1A to 1D.

FIG. 10 is a block diagram depicting an internal structure of the member management server 70 shown in FIGS. 1A to 1D.

The member management server 70 includes a control portion 72, a hard disk 75, and a communication interface 77, and the control portion 72 includes a CPU 73 and a memory 74. The hard disk 75 stores a variety of programs or data, and the control portion 72 reads out and executes these programs, and performs a variety of processing operations.

The hard disk 75 stores the member management database 76. In the member management database 76, for example, player data such as player identification information, customer category data, member's name, local area, sex, age, and occupation is stored in association with each other. In addition, the member management database 76, in association with player identification information, stores average use time, average game playing time, average visit frequency, and average amount of money lost or the like to which the player identification information is assigned.

Data storage means, further, in association with player identification information, stores player data related to a player to which the player identification information is assigned. In addition, the data storage means stores customer category data indicating which one of the customer categories classified in plurality the player to which the player identification information is assigned falls under, in association with player identification information.

Figure 11:
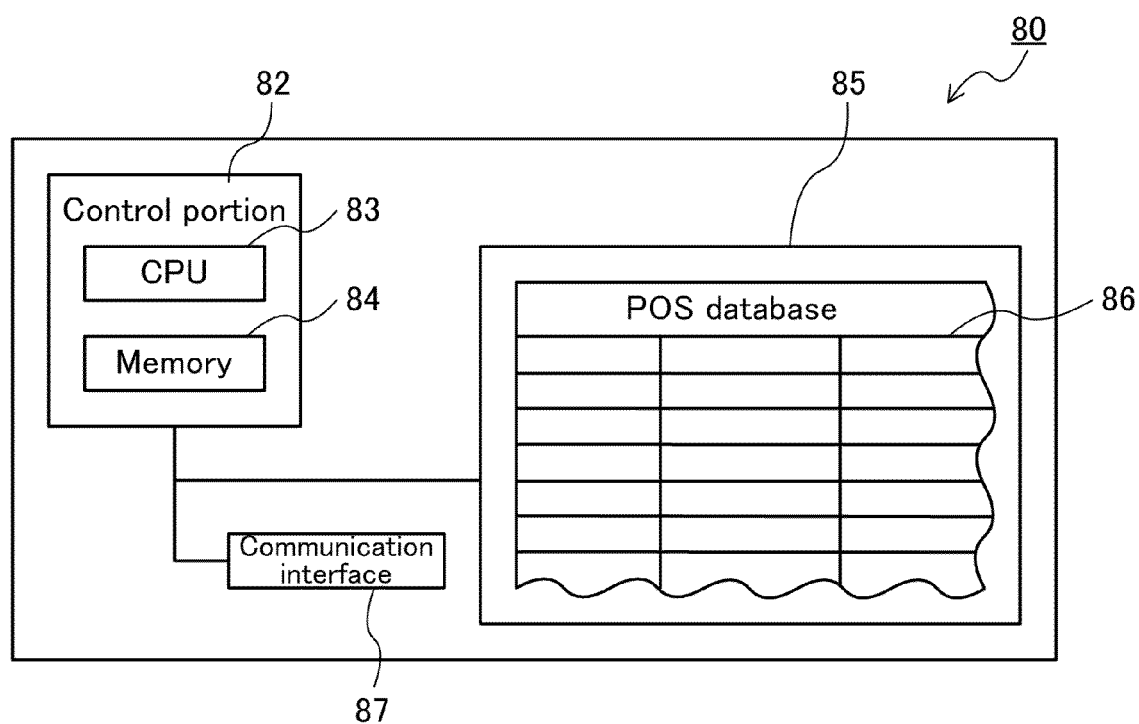
FIG. 11 is a block diagram depicting an internal structure of a POS server shown in FIGS. 1A to 1D.

FIG. 11 is a block diagram depicting an internal structure of the POS server 80 shown in FIGS. 1A to 1D.

The POS server 80 includes a control portion 82, a hard disk 85, and a communication interface 87, and the control portion 82 includes a CPU 83 and a memory 84. The hard disk 85 stores a variety of programs or data, and the control portion 82 reads out and executes these programs, and performs a variety of processing operations. The hard disk 85 stores the POS database 85. The POS database 86 stores data related to prizes in association with player identification information.

Figure 12:
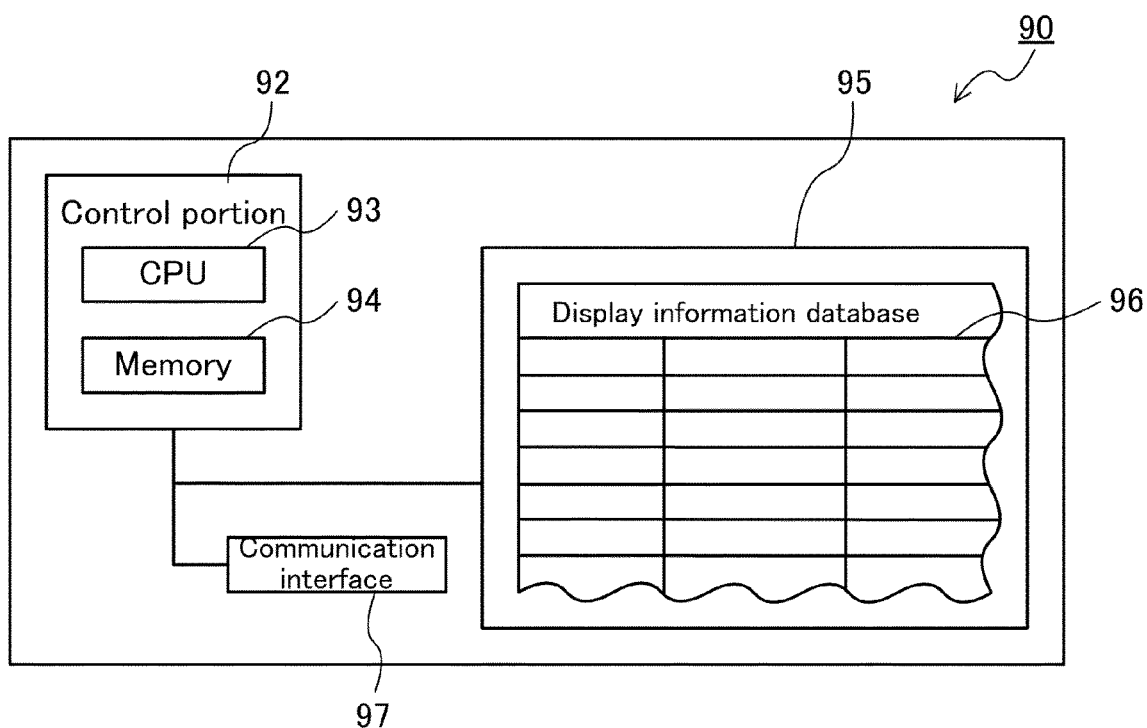
FIG. 12 is a block diagram depicting an internal structure of a number lamp display server shown in FIGS. 1A to 1D.

FIG. 12 is a block diagram depicting an internal structure of the number lamp display server 90 shown in FIGS. 1A to 1D.

The number lamp display server 90 includes a control portion 92, a hard disk 95, and a communication interface 97, and the control portion 92 includes a CPU 93 and a memory 94. The hard disk 95 stores a variety of programs or data, and the control portion 92 reads out and executes these programs, and performs a variety of processing operations. The hard disk 95 stores a display information database 96. The display information database 96 stores information displayed on a device 91 for displaying game playing information by gaming machine.

(Database)

FIG. 13 is an explanatory view showing one example of sales-related database 56 stored in the IC card server 50 shown in FIGS. 1A to 1D.

In the sales-related database 56, every time the IC card server 50 receives consumed-amount-of-money data or amount-of-sales data from a gaming machine unit 1, the consumed-amount-of-money data or the amount-of-sales data is stored in association with reception time data indicating reception time, player identification information, and gaming machine unit identification information. In addition, when the play of game is started in a gaming machine unit 1 of which flag indicating the play of game in progress is set to OFF (x), the flag indicating the play of game in progress is set to ON (o), whereas when no data is transmitted over a predetermined period of time from the gaming machine unit 1 of which flag indicating the play of game in progress is set to ON (o), the flag indicating the play of game in progress is set to OFF (x). It is to be noted that timing with which the IC card server 50 receives data from the gaming machine unit 1 is not limited in particular, and for example, the timing may be serially received every time consumption of money or sales occur or may be received in all every predetermined time.

FIGS. 14A and 14B are explanatory views showing one example of a game playing status database stored in the hall conserver 60 shown in FIGS. 1A to 1D.

In the game playing status database 66, for example, every time data from a gaming machine unit 1, such as number-of-consumptions data, number-of-payouts data, number-of-times-start data, number-of-times-special-prize data, or game playing information data, is received, the received data is stored in association with reception time data indicating reception time, player identification information, and gaming machine unit identification information. In addition, when the play of game is started in a gaming machine unit 1 of which flag indicating the play of game in progress is set to OFF (x), the flag indicating the play of game in progress is set to ON (o), whereas when no data is transmitted over a predetermined period of time from the gaming machine unit 1 of which flag indicating the play of game in progress is set to ON (o), the flag indicating the play of game in progress is set to OFF (x). When the flag indicating the play of game in progress is set to OFF (x), game playing time is computed and then the computed time is stored in association with another item of data. In addition, in a case where data is received from a gaming machine unit 1 in service time (or event), a service time flag is set to ON (o), or alternatively, in a case where data is transmitted to a gaming machine unit 1 in service time (or event), the service time flag is set to OFF (x). Further, in the game playing status database 66, for example, device type data, model data, gaming machine mount identification information, new device type flag, and service time flag or the like are stored in association with gaming machine unit identification information. In addition, although not shown, in the game playing status database 66, data of date of entry into market is stored in association with device type data.

In addition, in the game playing status database 66, further, based on game playing time, for example, there may be stored cumulative operation time of gaming machine unit 1, cumulative nonoperation time, and rate between cumulative operation time and cumulative nonoperation time or the like. Further, rate of dividing number of gaming machine unit 1 relative to cumulative operation time, cumulative nonoperation time or rate between cumulative operation time and cumulative nonoperation time is computed. In this manner, dividing number relative to nonoperation time can be computed.

FIGS. 15A and 15B are explanatory views showing a correlation database stored in the hall conserver 60 shown in FIGS. 1A to 1D.

In the correlation database, for example, gaming machine identification information, big hit deviation and frequency, characteristics, operation time rate per predetermined unit time, the number of game playing customer per predetermined unit time, average game playing time per player, business time, operability, stability, and values of attraction power of new device type or the like are stored in association with each other. The big hit deviation and frequency indicates average value and standard deviation of the number of times of big hit per day. As the characteristics, function data is stored indicating stepwise evaluation data of wave of winning pachinko balls and movement of winning pachinko ball slump graph. The operation time rate per day indicates a rate of operation time with respect to business time. Stability and degree of attraction power of new device type will be described later.

FIG. 16 is an explanatory view showing one example of a determination result database stored in the hall conserver 60 shown in FIGS. 1A to 1D.

In the determination result database, device type data, gaming machine unit identification information, target dividing number, the number of fixed customers, number-of-fixed-customers alarm flag, setup rate, appropriate setup rate, setup rate alarm flag are stored in association with each other. The number of fixed customers and the number-of-fixed-customers alarm flag are not set for new device type. The setup rate, appropriate setup rate, and installation alarm flag are set for all device types. In the present invention, the setup rate, appropriate setup rate, and installation alarm flag may be set only for new device type.

FIG. 17 is an explanatory view showing one example of a member management database stored in the member management server 70 shown in FIGS. 1A to 1D.

In the member management database 76, player data such as player identification information, customer category data, member's name, local area, sex, age, and occupation or the like is stored in association with each other; the stored data is further associated with player identification information; and average use time, average game playing time, average visit frequency, and average amount of money lost or the like, to which the player identification information is assigned, is stored. The customer categories classified in plurality include fixed customer, and data associated with the customer category data indicating fixed customer is stored after classified from data associated with another item of customer category data.

Figure 18:
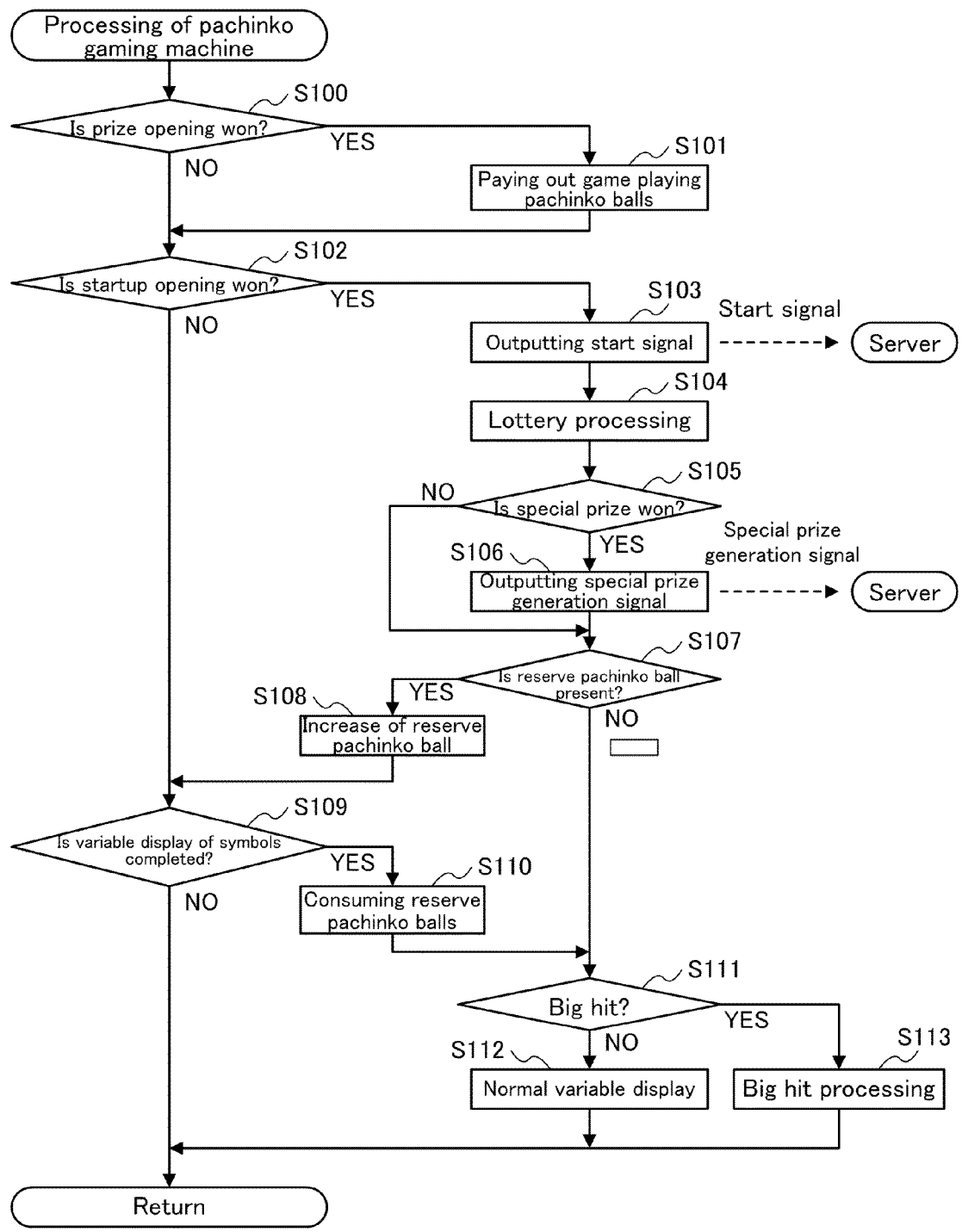
FIG. 18 is a flowchart showing one example of processing executed in the pachinko gaming machine shown in FIGS. 1A to 1D.

FIG. 18 is a flowchart showing one example of execution executed in the pachinko gaming machine 10 shown in FIGS. 1A to 1D.

First, a control portion 11 determines whether or not a game playing pachinko ball wins a prize opening (step S100). In a case where a gaming machine determines that the pachinko ball wins a prize opening, payout of game playing pachinko balls is performed (step S101).

In a case where the game playing pachinko ball does not win the prize opening in step S100 or in the case where the processing of step S101 is executed, the control portion 11 determines that the game playing pachinko ball wins a startup opening (step S102). Specifically, it is determined whether or not a detection signal output when a start detection sensor 12S provided at a gadget device 12 is received. In a case where it is determined that the game playing pachinko ball is detected, the control portion 11 outputs a start signal to the hall conserver 60 (step S103). Next, the control portion 11 performs lottery processing for determine whether or not the result is a big hit (step S104), and determines whether or not a special prize (big hit) takes place (step S105). In a case where it is determined that the special prize takes place, the control portion 11 outputs a special prize generation signal to the hall conserver 60 (step S106).

In a case where it is determined that no special prize takes place in step S105 or in a case where the processing of step S106 is execute, the control portion 11 determines whether or not a reserve pachinko ball is present (step S107). The reserve pachinko ball is data indicating a lottery result when a prize for startup opening takes place when symbols are variably displayed on a display device 14, and is stored in memory of the control portion 11. In a case where no reserve pachinko ball is present in step S107, the control portion 11 stores the reserve pachinko ball in memory, thereby increase the number of reserve pachinko balls (step S108).

In a case where it is determined that no prize for startup opening is present in step S102 or in a case where the processing of step S108 is executed, it is determined whether or not variable display of symbols in the display device 14 completes (step S109). In a case where variable display of symbols does not complete, this subroutine is completed, or alternatively, in a case where it is determined that variable display of symbols completes, the reserve pachinko balls stored in memory of the control portion 11 is consumed (step S110), the routine advances to step S111.

In a case where it is determined that the game playing pachinko ball is present in step S107 or in a case where the processing of step S110 is executed, it is whether or not the prize is a big hit (special prize) (step S111), in a case where it is not a big hit, normal variable display of symbols is performed (step S112), or alternatively, in a case where it is a big hit, big hit processing is performed (step S113). After the processing of step S112 or step S113 has been executed, this subroutine is completed.

It is to be noted that a special prize generation signal is transmitted to the hall conserver 60 at a time point when a special prize is won in the figure, the special prize generation signal may be transmitted to the hall conserver 60 at a time when the occurrence of big hit is displayed on the display device 14 in big hit processing.

In addition, data may be transmitted from a pachinko gaming machine 1 to the hall conserver 60 in all every predetermined time.

Figure 19:
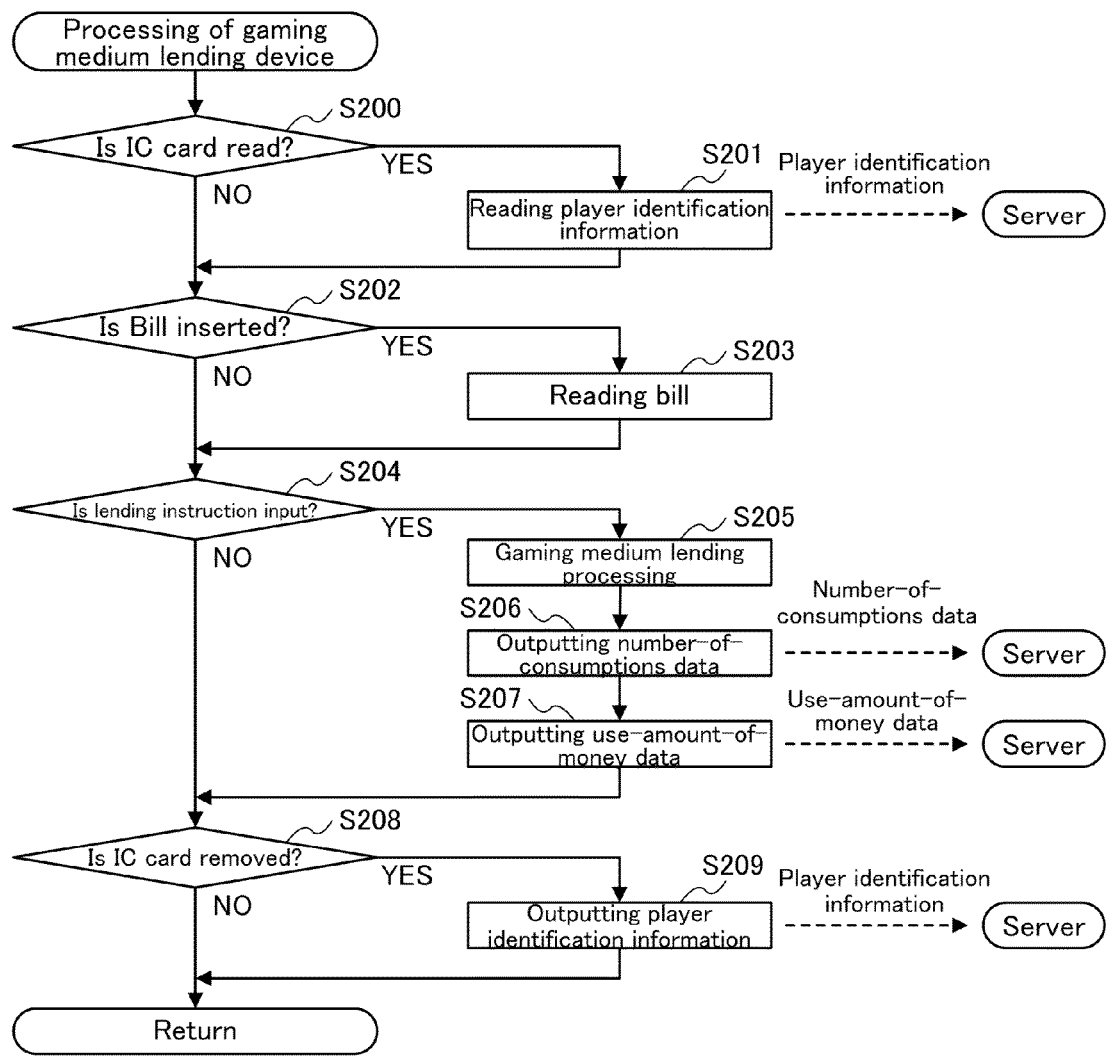
FIG. 19 is a flowchart showing one example of processing executed in the gaming medium lending device shown in FIGS. 1A to 1D.

FIG. 19 is a flowchart showing one example of processing executed in the gaming medium lending device 20 shown in FIGS. 1A to 1D.

First, the control portion 21 determines whether or not to read an IC card (step S200). Specifically, when an IN card inserted into a card insertion slot 26A is detected, the control portion 21 determines that the IC card is read. In a case where it is determined that the IC card is read, a card reading portion 26 reads player identification information (step S201). The control portion transmits the read player identification information to an IC card server 50.

In a case where it is determined that the IC card is not read in step S200 or in a case where the processing of step S201 is executed, the control portion 21 determines whether or not a bill is inserted into a bill entry slot 25 (step S202). In a case where it is determined that the bill is inserted, the control portion 21 reads the bill by means of a bill reading portion, and stores amount-of-money data in memory of the control portion 21 on condition that it is a legitimate bill.

In a case where no bill is inserted in step S202 or in a case where it is determined that the processing of step S203 is performed, the control portion 21 determines whether or not an instruction for lending game playing pachinko balls is input via Ten numeric keys 27A (step S204). In a case where the instruction for lending game playing pachinko balls is input, the control portion 21 performs lending processing of game playing pachinko balls of which number is equivalent to the amount of money input via the Ten numeric keys 27A by means of the game playing pachinko ball supply portion 28 (step S205). Next, the control portion 21 outputs data indicating the number of game playing pachinko balls lent to the IC card server 50 (step S206). The data indicating the number of game playing pachinko balls lent is handled as number-of-consumptions data in the game playing information integration system IS. Subsequently, the control portion 21 outputs use-amount data to the IC card server 50 (step S207).

In a case where no lending instruction is input in step S204 or in a case where the processing of step S207 is execute, the control portion 21 determines whether or not an instruction for removing an IC card is input via the Ten numeric key 27A (step S208). In a case where the instruction for removal is input, player identification information is transmitted to the IC card server 50 (step S209), the IC card is ejected, and this subroutine is completed. In step S208, even in a case where the instruction for removing the IC card is input, this subroutine is completed.

Figure 20:
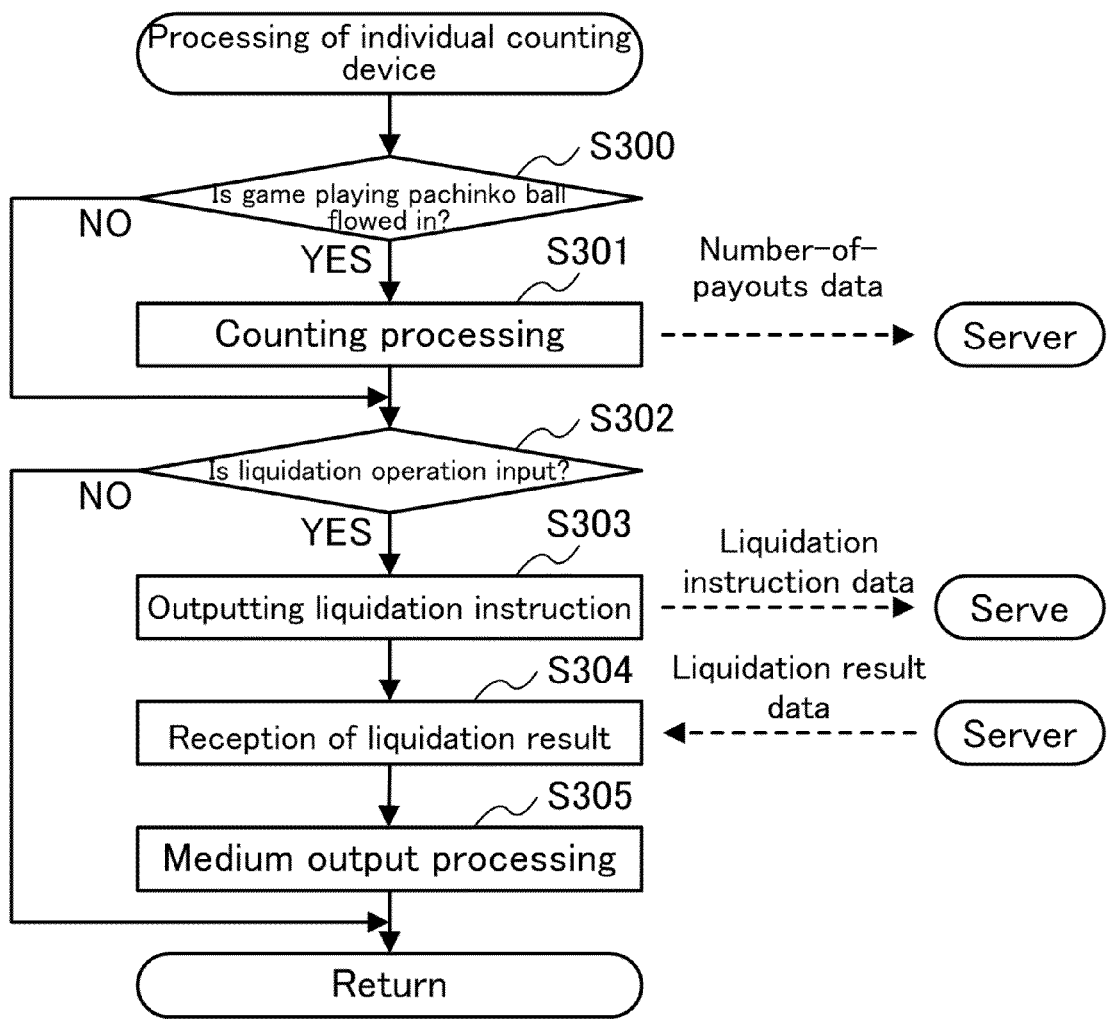
FIG. 20 is a flowchart showing one example of processing executed in the individual counting device shown in FIGS. 1A to 1D.

FIG. 20 is a flowchart showing one example of processing executed in the individual counting device 30 shown in FIGS. 1A to 1D.

First, the control portion 31 determines whether or not a game playing pachinko ball flows into a counting portion 32 (step S300), and in a case where it is determined that the game playing pachinko ball flows into the counting portion, counting processing of game playing pachinko balls is performed (step S301). At this time, the control portion transmits a count value together with gaming machine unit identification information to the hall conserver 60. The count value is handled as number-of-payouts data in the game playing information integration system IS.

Next, the control portion 31 determines whether or not operation of liquidation is input via the Ten numeric keys 27A (step S302). In a case where operation of liquidation is input, the control portion 31 outputs an instruction for liquidation to the IC card server 50.

Upon receipt of liquidation instruction data, the IC card server 50 performs liquidation processing according to the contents of liquidation instruction data, and outputs liquidation result data to the individual counting device 30. When the control portion 31 receives the liquidation result data (step S304), media of which liquidated number of game playing pachinko balls is displayed is output by means of a medium output portion 35 (step S305).

(Base Processing)

Figure 21:
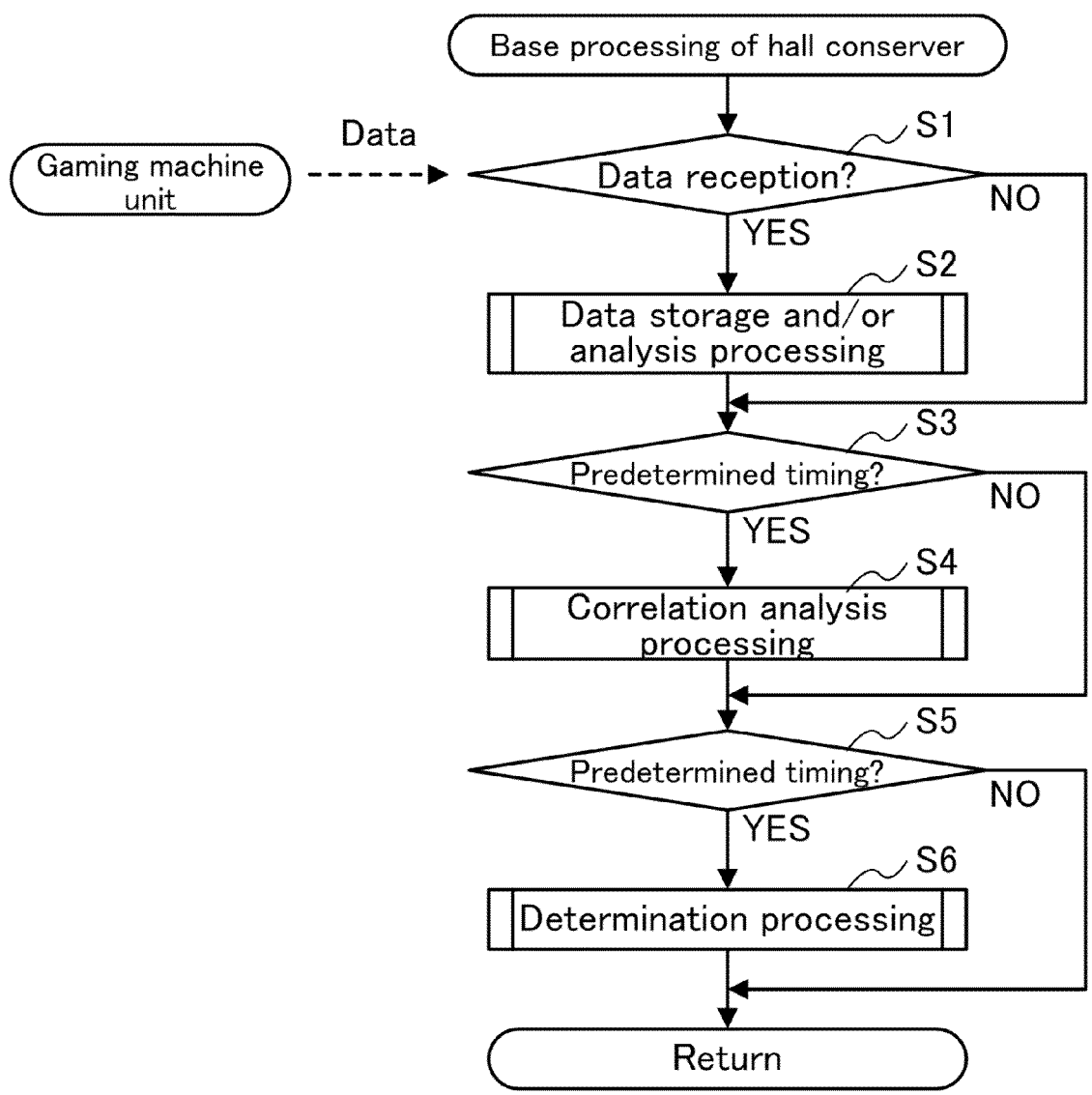
FIG. 21 is a flowchart showing a routine of base processing executed in the hall conserver shown in FIGS. 1A to 1D.

FIG. 21 is a flowchart sowing a routine of base processing executed in the hall conserver 60 shown in FIGS. 1A to 1D.

First, a control portion 62 of the hall conserver 60 determines whether or not data is received from a gaming machine unit 1 (step S1). In a case whether it is determined that data is received, the control portion 62 performs data storage and/or analysis processing (step S2). The data storage and/or analysis processing will be described later.

In a case where it is determined that no data is received in step S1 or in a case where the processing of step S2 is executed, the control portion 62 determines whether or not a predetermined timing is reached (step S3). The predetermined timing includes timing when an instruction for executing analysis of data is input to the hall conserver 60 or timing when a predetermined period of time elapses or the like, for example. In a case where it is determined to be the predetermined timing, the control portion 62 performs correlation analysis processing (step S4). The correlation analysis processing will be described later.

In a case where it is determined not to be the predetermined timing in step S3 or in a case where the processing of step S4 is executed, the control portion 62 determines whether or not predetermined timing is reached (step S5). The predetermined timing includes timing when an instruction for determination as to data to the hall conserver 60 or timing when a predetermined period elapsed or the like, for example. In a case where it is determined to be the predetermined timing, the control portion 62 performs determination processing (step S6). The determination processing will be described later. In a case where it is determined not to be the predetermined timing in step 5 or in a case where the processing of step S6 is executed, this subroutine is completed.

Figure 22:
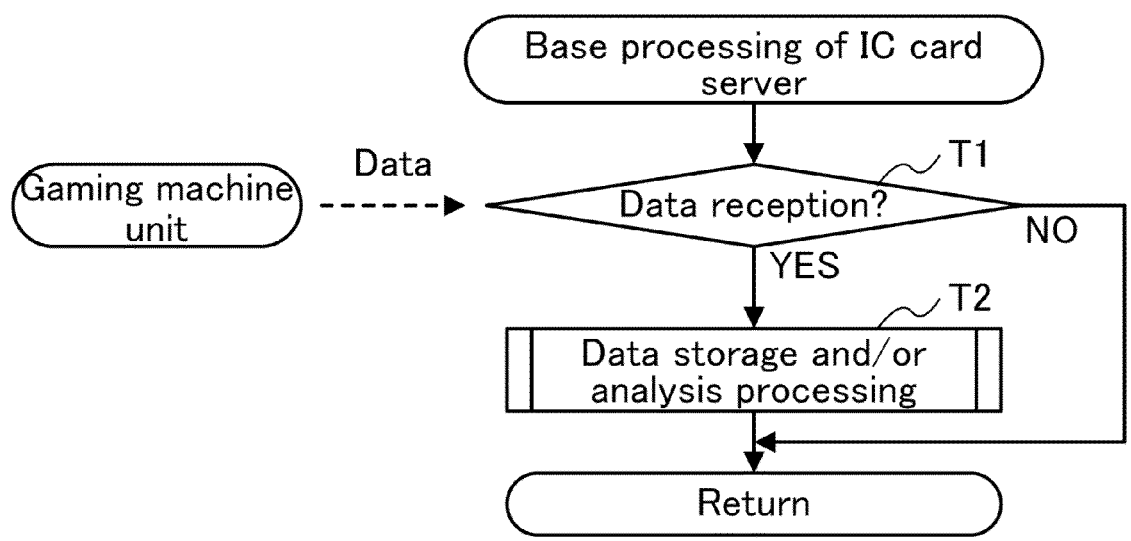
FIG. 22 is a flowchart showing a routine of a routine of base processing executed in the IC card server shown in FIGS. 1A to 1D.

FIG. 22 is a flowchart showing a routine of base processing executed in the IC card server 50 shown in FIGS. 1A to 1D.

First, a control portion 52 of the IC card server 50 determines whether or not data is received from a gaming machine unit 1 (step T1). In a case where it is determined that data is received, the control portion 52 performs data storage and/or analysis processing (step T2). The data storage and/or analysis processing will be described later. In a case where it is determined that no data is received in step T1 or in a case where processing of step T2 is executed, this subroutine is completed.

(Data Storage and/or Analysis Processing)

Figure 23:
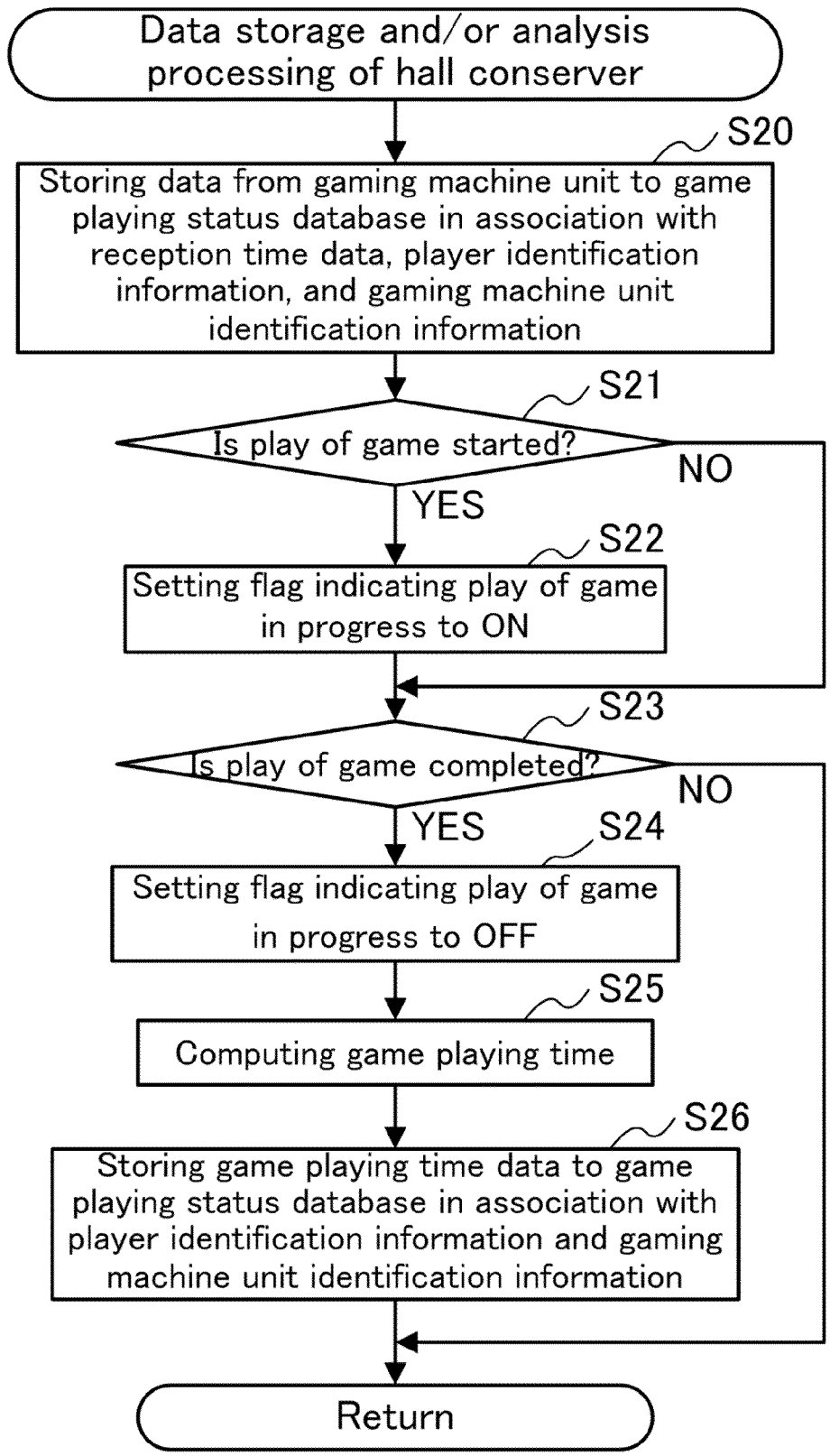
FIG. 23 is a flowchart showing a subroutine of data storage and/or analysis processing executed in step S2 of base processing in the hall conserver shown in FIG. 21.

FIG. 23 is a flowchart showing a subroutine of data storage and/or analysis processing executed in step S2 of base processing in the hall conserver 60 shown in FIG. 21.

First, a control portion 62 of the hall conserver 60 stores data from a gaming machine unit 1 in a game playing status database 66 (refer to FIG. 14B in association with reception time data, player identification information, and game playing unit identification information (step S20).

Next, the control portion 62 determines whether or not the play of game is started in the gaming machine unit 1 (step S21). Specifically, in a case where player identification information read from an IC card inserted into a gaming medium lending device 20 is received from the gaming medium lending device 20, the control portion 62 determines that the play of game is started. It is to be noted that determination of start of the play of game in the present invention is not limited to this example, for example, and in a case where data is received from a gaming machine unit 1 to which gaming machine unit identification information of which flag indicating the play of game in progress is set to OFF (x) is assigned, it may be determined that the play of game is started.

In a case where it is determined that the play of game is started in step S21, the control portion 62 performs processing of setting the flag indicating the play of game in progress to ON (o) (step S22).

In a case where it is determined that the play of game is not started in step S21 or in a case where the processing of step S22 is executed, the control portion 62 determines whether or not the play of game is completed in the gaming machine unit 1 (step S23). Specifically, in a case where player identification information output from the gaming medium lending device 20 is received when an IC card is ejected, the control portion 62 is determined that the play of game completes. It is to be noted that in a case where data is not received for predetermined time intervals or more from a gaming machine unit 1 to which gaming machine unit identification information 1 of which flag indicating the play of game in process is set to ON (o), it may be determined that the play of game completes.

In a case where the play of game completes in step S23, the control portion 62 performs processing of setting the flag indicating the play of game in progress is set to OFF (x) (step S24). Next, the control portion 62 computes game playing time, based on time when the flag indicating the play of game in progress is set to ON (o) and time when the flag indicating the play of game is set to OFF (x) (step S25). Subsequently, the control portion 62 stores game playing time data in the game playing status database 66 in association with player identification information and gaming machine unit identification information (step S26). In a case where it is not determined to be completion of the play of game in step S23 or in a case where the processing of step S26 is executed, this subroutine is completed.

When data storage and/or analysis processing shown in FIG. 23 is executed, the control portion 62 of the hall conserver 60 functions an analysis processing means for analyzing data received from the gaming machine unit 1 and stored in a hard disk 65 (data storage means).

Figure 24:
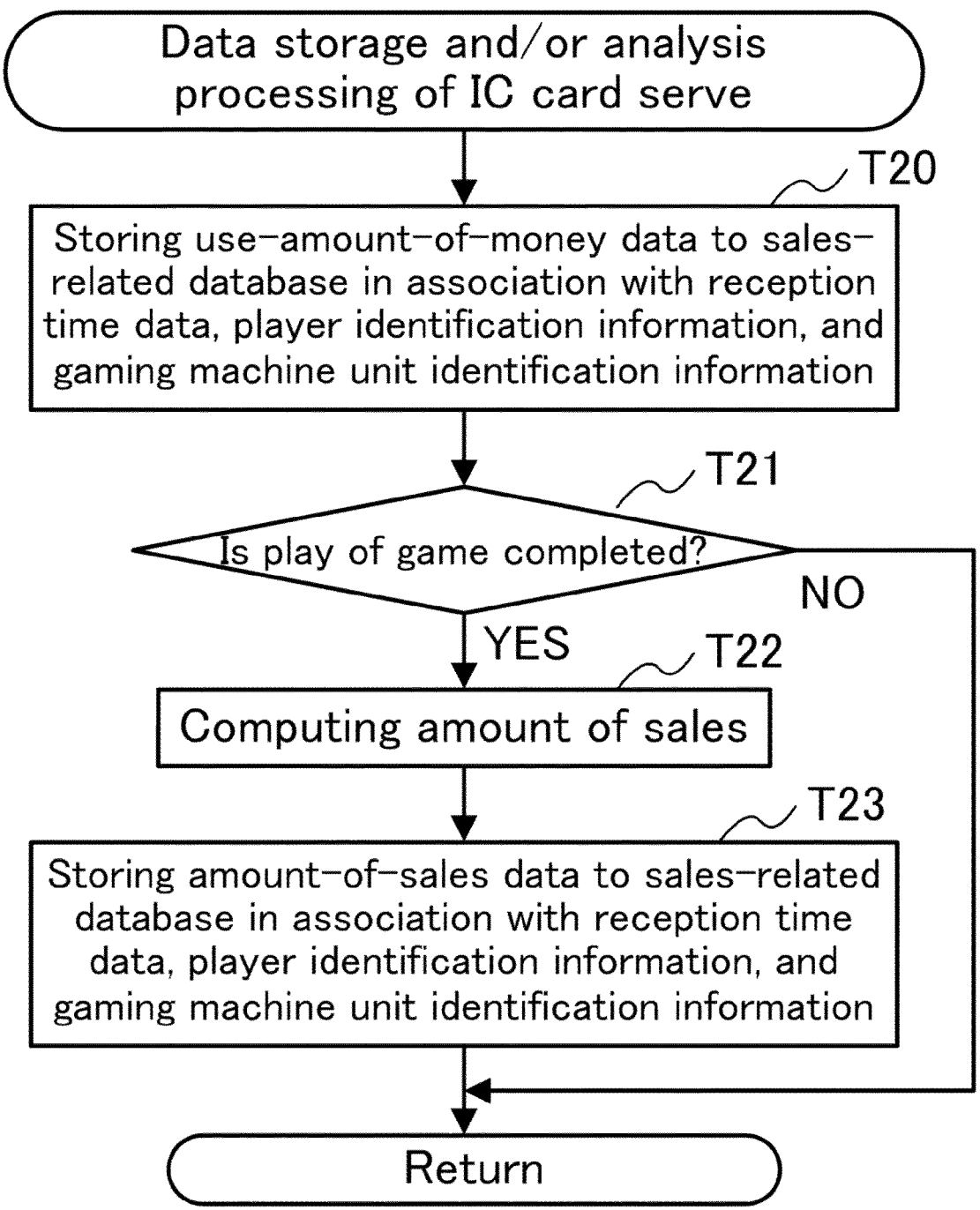
FIG. 24 is a flowchart showing a subroutine of data storage and/or analysis processing executed in step T2 of base processing in the IC card server shown in FIG. 22.

FIG. 24 is a flowchart showing a subroutine of data storage and/or analysis processing executed in step T2 of base processing in the IC card server 50 shown in FIG. 22.

First, the control portion 52 of the IC card server 50 stores use-amount-of-money data received from the gaming medium lending device 20 of the gaming machine unit 1 in a sales-related database 56 in association with reception time data, player identification information, and gaming machine unit identification information (step T20).

Next, the control portion 52 determines whether or not the play of game completes (step T21). Determination of completion of the play of game may be made in the same manner as that of the processing (step S23) in the hall conserver 60, or alternatively, a result of the processing in the hall conserver 60 may be referred to. In a case where it is determined that the play of game does not complete this subroutine is completed. On the other hand, in a case where it is determined that the play of game completes the control portion 52 performs processing of computing an amount of sales (step S22). Specifically, the control portion 52 computes the amount of sales, based on use-amount-of-money data stored in the sales management database 56 and number-of-consumptions data and number-of-payouts data in the game playing status database 66 of the hall conserver 60 (step S22). Next, the control portion 52 stores the sales-amount data indicating the compute amount of sales in the sales-related database 56 in association with reception time data, player identification information, and gaming machine unit identification information (step T23), and this subroutine is completed.

When the data storage and/or analysis processing shown in FIG. 24 is executed, the control portion 52 of the IC card server 50 functions as an analysis processing means for analyzing data received from a gaming machine unit 1 and stored in a hard disk 55 (data storage means).

(Correlation Analysis Processing)

Figure 25:
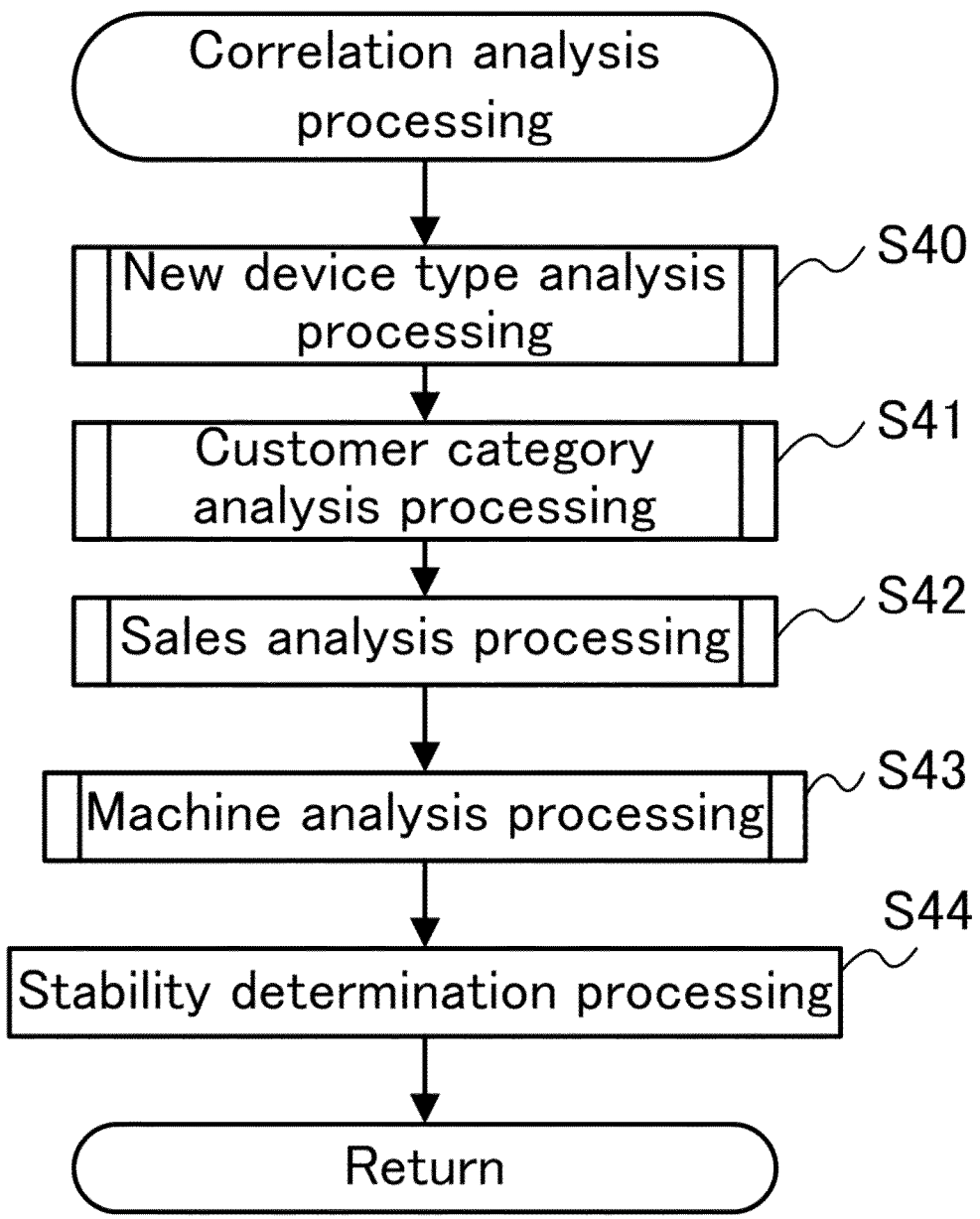
FIG. 25 is a flowchart showing a subroutine of correlation analysis processing in step S4 of base processing in the hall conserver shown in FIG. 21.

FIG. 25 is a flowchart showing a subroutine of correlation analysis processing executed in step 4 of base processing in the hall conserver 60 shown in FIG. 21.

It is to be noted that sequential orders are assigned to the processing operations of steps S40 to S43 for clarity, whereas in the present invention, the processing operations of steps S40 to S43 can be executed irrespective of the sequential orders anytime.

Figure 26:
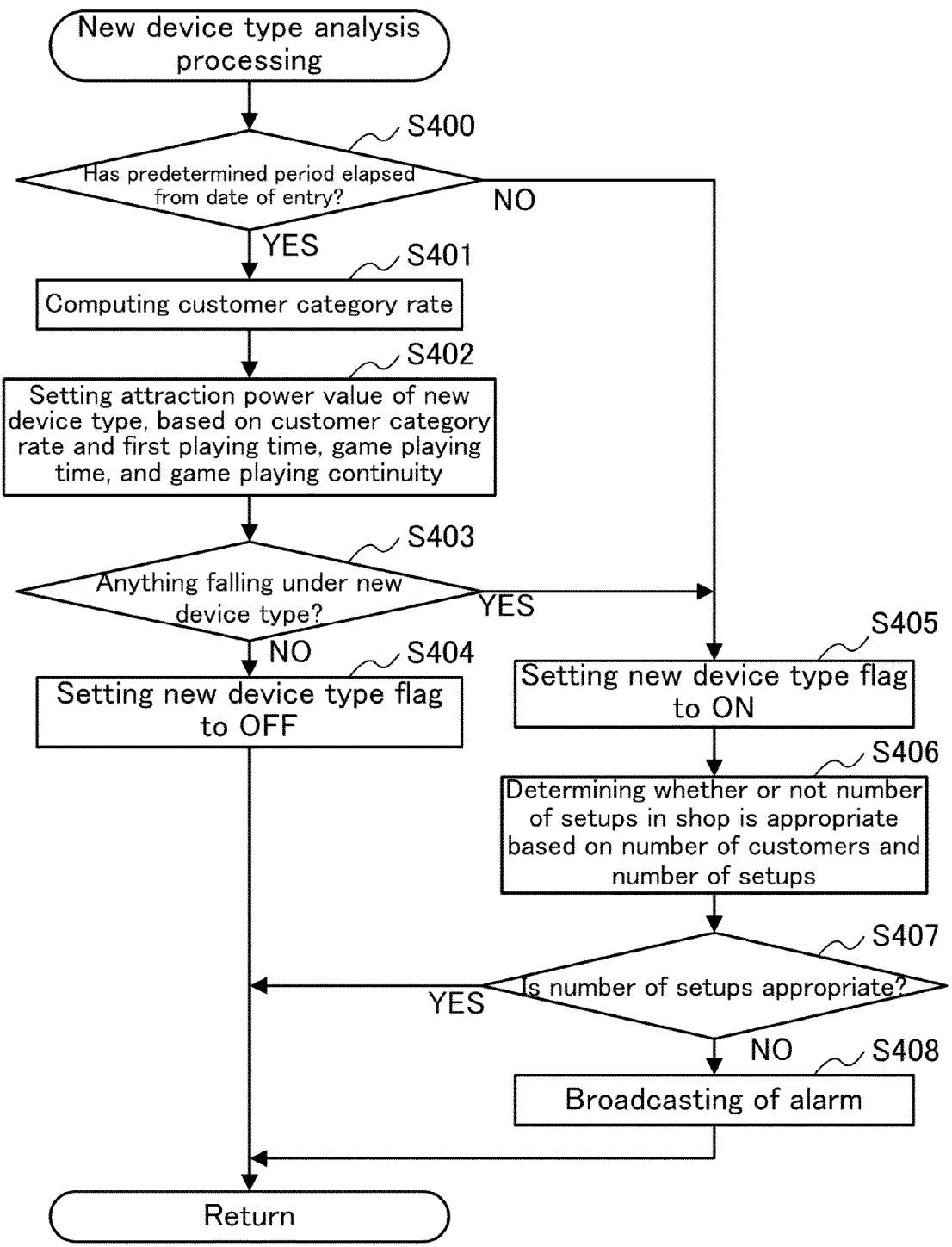
FIG. 26 is a flowchart showing a subroutine of new device type analysis processing invoked and executed in step S40 in the correlation analysis processing shown in FIG. 25.

First, the control portion 62 of the hall conserver 60 performs processing of analyzing new device type (step S40). FIG. 26 is a flowchart showing a subroutine of processing of analyzing new device type, which is invoke and executed in step S40 in the correlation analysis processing shown in FIG. 25.

The control portion 62 of the hall conserver 60 determines whether or not a predetermined period of time elapses from date of entry into market of the new device type as to each gaming machine unit 1, based on the game playing status database 66 (step S400). In the game playing information integration system IS, it is determined to be the new device type until the predetermined period of time elapses. However, this period of time is set to be very short, and determination of whether or not all of them fall under new device type is made as to the gaming machine unit 1 of which predetermined period of time elapses from the date of entry into market. It is to be noted that the present invention is not limited to this example, and for example in determination of new device type, a condition may not be set as to the elapsed period of time from the date of entry into market.

Next, the control portion 62 determines a customer category rate of the device type (step S401). Specifically, the control portion 62 computes the customer category rate as to a player who has played game from a predetermined time point (such as 1 day before, 1 week before, date of introduction to gaming facility, or date of entry into market, for example) up to now in the gaming machine unit 1 of the device type, based on the customer category data stored in a member management database 76 of a member management server 70. The customer category rate includes rate of fixed customer in all, rate of unfixed customer in all, rate of beginner in all, and rate between fixed customer and unfixed customer or the like.

Next, the control portion 62 sets a value of attraction power of new device type, based on customer category rate and first playing time and game playing time and game playing continuity (step S402).

With respect to customer category rate, for example, if browsing customers and beginners are large in number, the degree of attraction power of new device type is regarded to be high, and the degree of attraction power of new device type can be set by means of stepwise or numerical evaluation. Of course, evaluation criteria or evaluation method of the value of attraction power of new device type, based on customer category rate, is not limited to this example.

The first playing period is a period of time from date of entry into market or date of introduction to gaming facility, for example, up to date when a player first plays game at the pachinko gaming machine 10, and can be computed from the data stored in the game playing status database 66. With respect to the first playing period, for example, the shorter the first playing time is, the higher the degree of attraction power of new device type is, and the degree of attraction power of new device type can be set by means of stepwise or numerical evaluation.

As the game playing time, for example, game playing time at one time is employed. A player, in general, has newness or a sense of freshness for new device type, it takes time to understand rule, and thus, game playing time at one time can be extended. If the game playing time is short in spite of the fact, there is a high possibility that the player determines that it is not interesting. Therefore, with respect to the game playing time, the longer the game playing time is, the higher the degree of attraction power of new device type is, and the degree of attraction power of new device type can be set by means of stepwise or numerical evaluation.

As the game playing continuity, for example, frequency (average value) of playing game in the device type is employed, and it is evaluated that the higher the frequency is, the higher the continuity is. Evaluation of continuity is evaluation of presence of repeater, and the presence of repeater becomes a milestone indicating that new device type has attraction power. Therefore, with respect to game playing continuity, for example, the higher the continuity is, the higher the degree of attraction power of new device type is, the degree of attraction power of new device type can be set by means of stepwise or numeric evaluation.

With respect to stepwise or numeric evaluation as to the abovementioned customer category rate and first playing time and game playing time and game playing continuity, for example, the degree of attraction power of new device type can be set by cumulatively or statistically performing analysis and performing stepwise or numeric evaluation.

In step S402, the control portion 62 functions as a means for analysis processing of new device type, for analyzing data associated with gaming machine unit identification information to which gaming machine unit identification is assigned with which a new device type identification flag set to ON is associated, among the data received from a gaming machine unit 1 and stored in the data storage means.

Next, based on the degree of attraction power of new device type, obtained in step S402, the control portion 62 determines whether or not the device type meets a condition for new device type (step S403). In a case where the degree of attraction power of new device type is a predetermined rank or a predetermined value or more, the control portion 62 determines that it falls under new device type, or alternatively, in a case where the degree is less than the predetermined rank or predetermined value, the attraction power of new device type is already lost, and thus, the control portion determines that it does not fall under new device type. In step S403, the control portion 62 functions as a new device type condition determination means for determining whether or not device type targeted for analysis meets a predetermined condition for new device type.

In a case where it is determined that it does not fall under new device type, the control portion 62 sets a new device type flag of the device type to OFF (step S404), and this subroutine is completed. On the other hand, in a case where it is determined that a predetermined period of time does not elapse from date of entry into market in step S400 or in a case where it is determined that it falls under new device type in step S403, the control portion 62 sets a new device type flag of the device type to ON (step S405). In step S405, the control portion 62 functions as a new device type identification flag setting means for setting a new device type identification flag to ON/OFF, based on a result of determination the new device type condition determination means.

Next, the control portion 62 determines whether or not the number of setups in shop is appropriate, based on the number of customers relative to a gaming machine unit 1 of the device type and the number of setups in gaming facility (step S406). In a case where the number of customers is large relative to the number of setups, it is presupposed that there is a time interval at which a customer playing rate reaches 100%, and potential players are lost. On the other hand, in a case where the number of customers is smaller relative to the number of setups, it is presupposed that excessive number of setups of new device type is pressing the number of setups of other device types. Therefore, in step S406, a range of appropriate number of setups is computed based on rate of the number of customers relative to the number of setups (customer playing rate), and it is determined whether or not the number of setups is included in the range of appropriate number of setups. For example, in a case where a total number of gaming machines in gaming facility is 400, and the number of customers of new device type is 20, the range of rate of appropriate number of setups, computed from rate of the number of customers relative to the number of setups (customer playing rate) is obtained as 5.3% to 10%. It is determined whether or not the setup rate is included in that range.

At this time, the control portion 62 functions as an appropriate condition determination means for determining whether or not the number of setups of gaming machine units to which game machine unit identification information is assigned with which a new device type identification flag set to ON is associated meets a predetermined appropriate condition, based on new device type analysis result data as a result of analysis by new device type analysis processing means. That is, the appropriate condition in the embodiment is based on whether or not setup rate of a gaming machine unit to which gaming machine unit identification information is assigned with which a new device type identification flag set to ON is associated, whereas the appropriate condition in the present invention is not limited to this example.

In a case where the number of setups is appropriate (step S407, YES), this subroutine is completed. On the other hand, in a case where it is determined that the number of setups is not appropriate (step S407, NO), a setup rate alarm flag is set to ON (o), whereby broadcasting of alarm is performed (step S408), and this subroutine is completed. When the alarm flag is set, the employee management server 40 transmits data indicating that the setup rate is not appropriate, to a portable terminal device 41.

In the embodiment, the following processing operations of steps S41 to S44 are performed while data with which a new device type flag is associated is excluded.

Subsequent to step S40, the control portion 62 performs customer category analysis processing (step S41).

Figure 27:
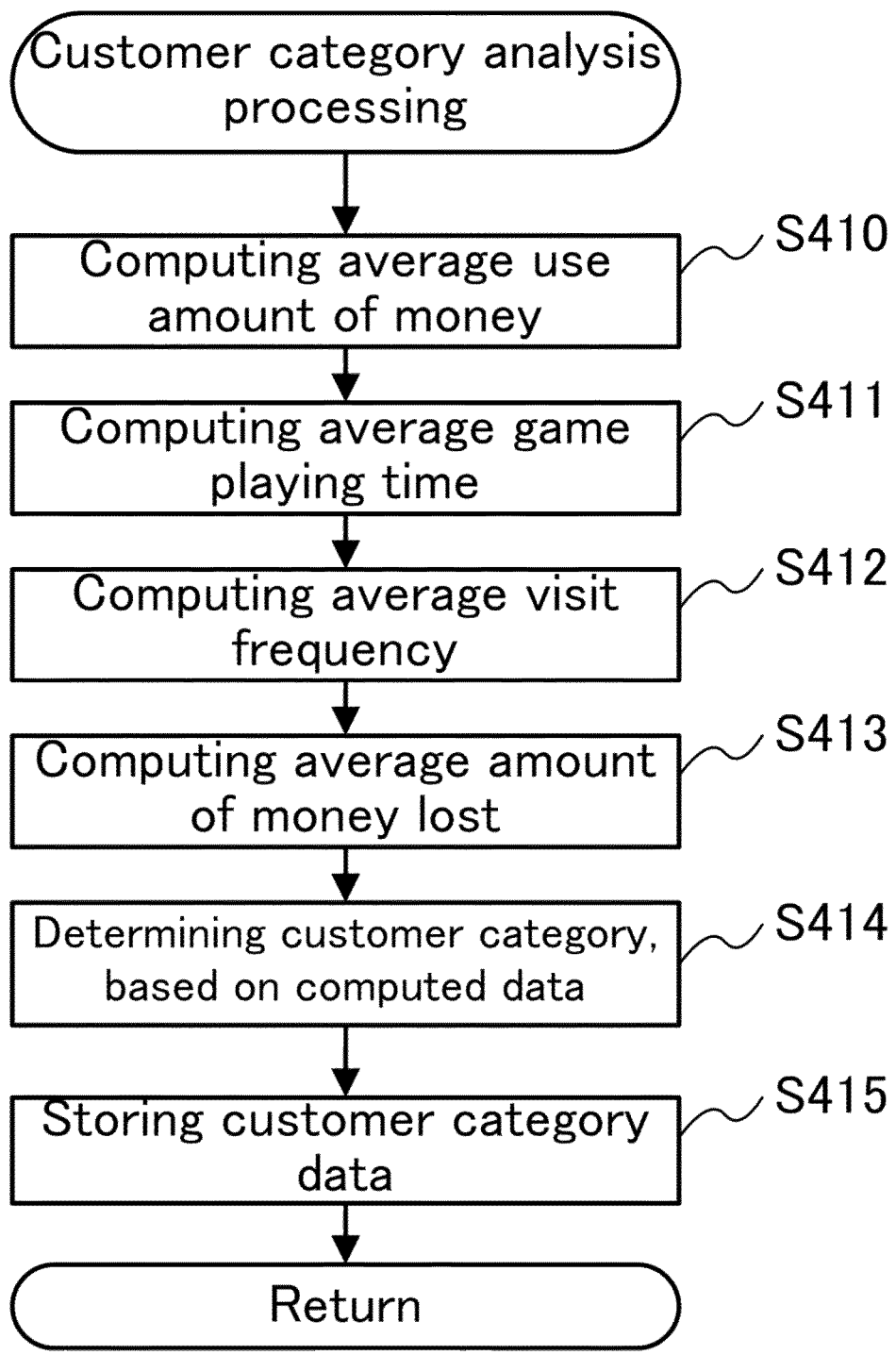
FIG. 27 is a flowchart showing a subroutine of customer category analysis processing invoked and executed in step S41 in the correlation analysis processing shown in FIG. 25.

FIG. 27 is a flowchart showing a subroutine of the customer category analysis processing invoked and executed in step S41 in the correlation analysis processing shown in FIG. 25.

First, the control portion 62 of the hall conserver 60 computes average use amount of money, based on the use-amount-of-money data stored in the sales management database 56 of the IC card server 50 (step S410). Next, the control portion 62 computes average game playing time, based on the game playing time data store in the game playing status database 66 (step S411). Next, the control portion 62 computes average visit frequency, based on the game playing time data stored in the game playing status database 66 (step S412). The average visit frequency is handled as average game playing frequency in a case where a predetermined reference unit is a gaming machine or device type. Net, the control portion 62 computes average amount of money lost, based on the amount-of-sales data stored in the sales management database 56 of the IC card server 50 (step S413). The data computed in steps S410 to S413 is stored in the member management database 76 of the member management server 70.

The average use amount of money, average game playing time, average game playing frequency, and average amount of money lost each are equivalent to a game trend parameter in the present invention. In the present invention, the game playing trend parameter is not limited to this example, and includes at least one statistical value or cumulative value or the like of use amount of money, game playing time, game playing frequency, and amount of money lost.

In steps S410 to S413, the control portion 62 functions as a game playing trend parameter computation means for computing a game playing trend parameter indicating a game playing trend per predetermined reference unit as to a player to which the game identification information is assigned, based on the data stored in the data storage means in association with one item of player identification information.

Next, the control portion 62 performs determination of customer category, based on the computed data (step S414). In the game playing information integration system IS, three customer categories of fixed customer, unfixed customer and novice are set. The three customer categories are different from each other in game playing trend. Fixed customer is high in average game playing time and average visit frequency, for example. Unfixed customer has deviation in average use amount of money, average game playing time, and average visit frequency, and is low in average visit frequency, for example. Novice is low in average use amount of money, has deviation in average game playing time, is short in average game playing time and low in average visit time, bus has deviation in average amount of money lost, for example. As to the data computed in steps S410 to S413, numeric or stepwise evaluation based on such trend is performed, and determination of customer category is performed. It is to be noted that in the present invention, it may be determined to be fixed customer with the fact that a customer is member-registered (recording of player data is present). In addition, fixed customer may be changed to unfixed customer with the fact that no visit is made over a predetermined period of time.

In step S414, the control portion 62 functions a customer category determination means for determining customer category of a player to which the player identification information is assigned, based on the game playing trend parameter.

Criteria which are different depending on player data may be employed as criteria for performing numeric or stepwise evaluation. For example, criteria for numeric or stepwise evaluation may be employed depending on whether a player is male or female. At this time, customer category of a player with which player identification information is assigned is determined based on the game playing trend parameter and player data.

The control portion 62 stores the obtained customer category data in a member management database 76 of the member management server 70 (step S415). Afterwards, this subroutine is completed.

Subsequent to step S41 (customer category analysis processing shown in FIG. 27), the control portion 62 performs sales analysis processing (step S42).

Figure 28:
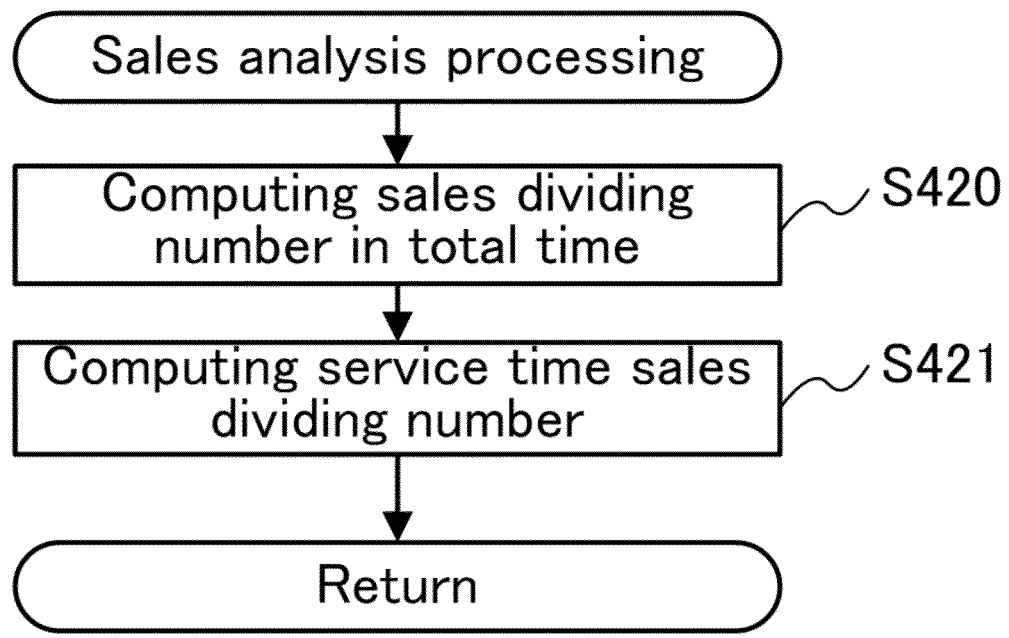
FIG. 28 is a flowchart showing a subroutine of sales analysis processing invoked and executed in step S42 in the correlation analysis processing shown in FIG. 25.

FIG. 28 is a flowchart showing a subroutine of sales analysis processing invoked and executed in step S42 in the correlation analysis processing shown in FIG. 25.

Next, the control portion 62 computes business dividing number in total time intervals (step S420). In the game playing information integration system IS according to the embodiment, the number of game playing pachinko balls lent in the gaming medium lending device 20 is handled as the number of outs (number of consumptions). Therefore, the business dividing number is computed by means of ((number of pachinko balls lent−(number of outs−number of safes))/number of pachinko balls lent)×10=number of payouts/number of consumptions)×10.

The control portion 62 then computes business dividing number in service time (step S421). Afterwards, this subroutine is completed.

Subsequent to step S42 (customer category analysis processing shown in FIG. 28), the control portion 62 performs machine analysis processing (step S43).

Figure 29:
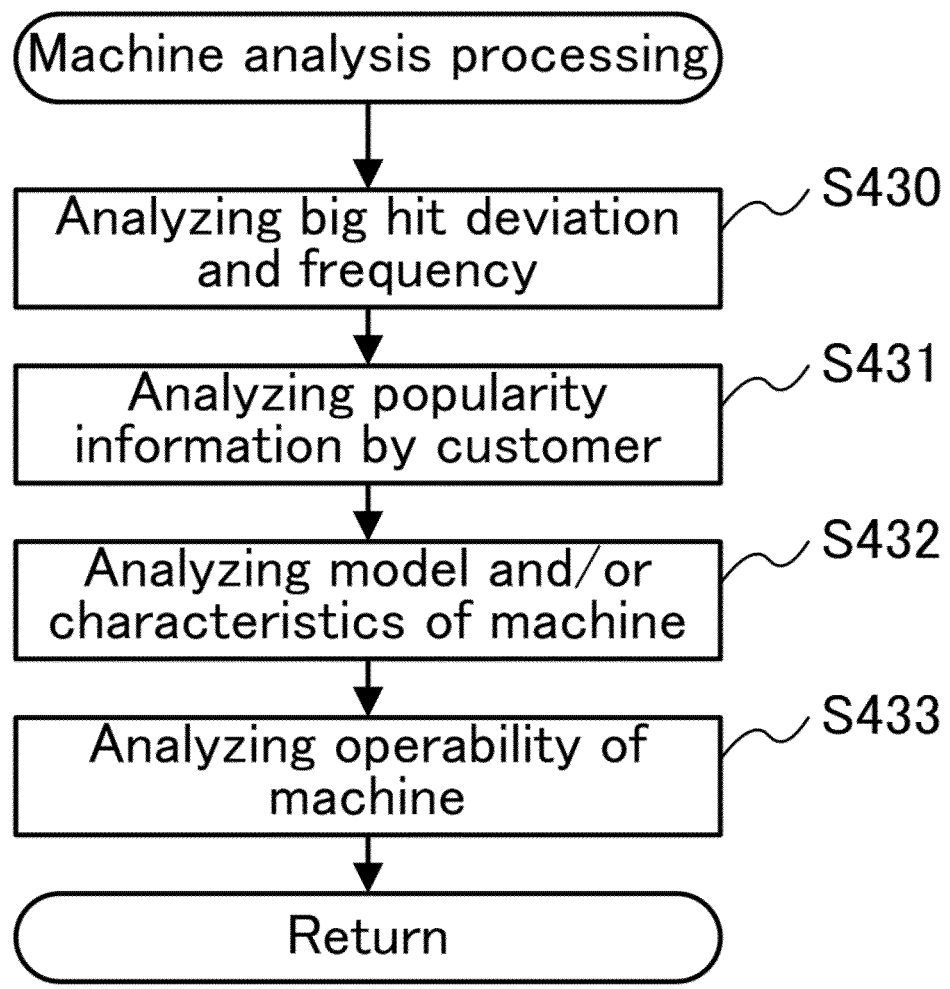
FIG. 29 is a flowchart showing a subroutine of machine analysis processing invoked and executed in step S43 in the correlation analysis processing shown in FIG. 25.

FIG. 29 is a flowchart showing a subroutine of machine analysis processing invoked and executed in step S43 in the correlation analysis processing shown in FIG. 25.

The control portion 62 of the hall conserver 60 performs analysis of big hit deviation (standard deviation) and frequency (average value), based on a special prize generation signal and its related reception time data (step S430). Next, the control portion 62 performs analysis of popularity information by customer (step S431). Then, popularity information by customer is generated. Unlike other device types, new device type may be operative by only an element of a "new machine" regardless of model or characteristics of machine. Therefore, in the game playing information integration system IS, this element of new device type is excluded when popularity information by customer is generated. Specifically, data related to gaming machine unit of new device type is not employed for generation of popularity information by customer. That is, with respect to popularity information by customer, for example, computation of parameters such as average use amount of money, average game playing time, average game playing frequency, and average amount of profit from the shop side is performed by gaming machine (gaming machine identification information). Popularity information by customer is set by means of stepwise or numeric evaluation of these parameters.

Next, the control portion 62 performs analysis of model and characteristics of machine, based on data related to sales and operation stored in the sales management database 56 of the IC card server 50, data related to big hit deviation and frequency computed in step S430, and popularity information by customer (step S432).

Subsequently, analysis of operability of machine is performed (step S433). In the game playing information integration system IS, operability (%) is computed by means of (number of consumptions/Absolute number of outs per hour× business time))×100. Afterwards, this subroutine is completed.

When the processing operations of steps S40 to S43 are executed, the control portion 62 of the hall conserver 60 functions as an analysis processing means for analyzing data received from a gaming machine unit 1 and stored in a hard disk 65 (data storage means).

Subsequent to step S43 (machine analysis processing shown in FIG. 29), the control portion 62 performs stability determination processing (step S44).

In the game playing information integration system IS according to the embodiment, determination of stability is performed by employing a comparison table in which at least stability and business dividing number and numeric stability are associated with each other. In the hard disk 65 of the hall conserver 60, for example, a plurality of comparison tables are stored according to device type, model, and gaming facility or the like, and in determination of stability, a comparison table according to a determination target is employed. In addition, in determination of stability, input of balance dividing number may be accepted in advance from the gaming facility side.

FIG. 30 is a view showing one example of gaming machine comparison table for determining stability. In the gaming machine comparison tables shown in FIG. 30 and FIG. 31, balance dividing number of gaming facility is set to 13.5.

In the gaming machine comparison table, stability is set in association with operability and business dividing number. For example, if operability is less than 30% and business dividing number is 11 or less, the customer game playing rate is low, and no profit is obtained, and thus, evaluation of stability is obtained as minus (−30). In addition, if operability is less than 30% and business dividing number is 18 or more, it is presupposed that too much profit is obtained, and customers losing interest in play takes place, and thus, evaluation of stability is obtained as minus (−30).

On the other hand, in a case where operability is 110% and business dividing number is 11 or less, customer playing rate is good, but profit is not obtained, and thus, stability is obtained minus (−10). If operability is 110% or more and business dividing number is 18 or more, customer playing rate is good, and profit is obtained, and thus evaluation of stability is plus (40). However, such state does not last long, and thus, continuous monitoring is required. It is to be noted that in a case where both of operability and business dividing number are high, stability may be set so as to be minus.

FIG. 31 is a view showing one example of gaming facility comparison table for determining stability.

The comparison table of FIG. 31 is employed for evaluation of stability of gaming facility, and thus, irrespective of operability, business dividing number which lowers balance dividing number is not permitted. Therefore, in a case where business dividing number is less than 13.5, evaluation of stability is obtained as minus. In addition, in the entire gaming facility, business in dividing number which much exceeds balance dividing number is not preferable from the viewpoint of increasing and securing fixed customer. Therefore, in a case where business dividing number is 16 or more, evaluation of stability is obtained as minus.

In a case where business dividing number is 13.5 or more and less than 16, business dividing number itself is stable, and however, if operability is low, management is not stable, and thus, stability is obtained as minus.

As shown in FIG. 30 and FIG. 31, evaluation of stability is different depending on target. Therefore, for example, determination of stability of the entire gaming facility is performed, and in a case where an evaluation result of stability is obtained as minus, determination of stability by gaming machine, device type, or model is performed, and investigation of cause of which the stability of the entire gaming facility is obtained as minus is performed, thereby making it possible to use evaluation of stability of gaming facility and pachinko gaming machine 10.

In the comparison tables shown in FIG. 30 and FIG. 31, criteria for stability are set. In step S44, the control portion 62 of the hall conserver 60 functions as a stability determination means for determining stability per predetermined reference unit, based on analysis result data indicating a result of analysis of data and the comparison tables.

In the embodiment, the stability determination means determines stability per predetermined reference unit, based on analysis result data, which does not include analysis result data related to a gaming machine unit to which gaming machine unit identification information is assigned with which a new device type identification flag set to ON is associated, and the comparison tables. It is to be noted that the present invention is not limited to this example, and may include data related to new device type.

In addition, analysis result data includes dividing number data related to dividing number and operation data related to operability. In the comparison table, dividing number and operability and numeric stability are associated with each other. Further, in step S44, the stability determination means numerically determines stability per predetermined reference unit based on the dividing number data and operation data and the comparison table.

(Determination Processing)

Figure 32:
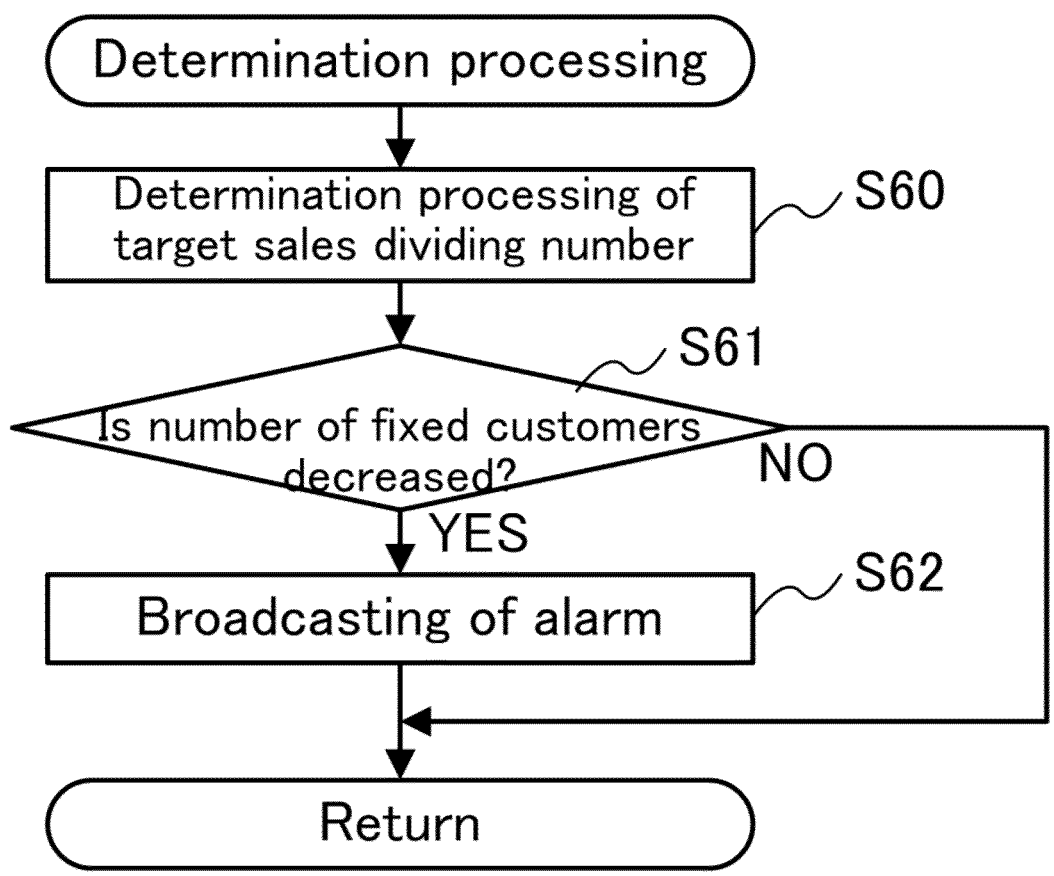
FIG. 32 is a flowchart showing a subroutine of determination processing invoked and executed in step S6 of base processing in the hall conserver shown in FIG. 21.

FIG. 32 is a flowchart showing a subroutine of determination processing invoked and executed in step 6 of base processing in the hall conserver 60 shown in FIG. 21. In the determination processing, the control portion 62 first performs target business dividing number determination processing (step S60). The processing of step S60 is performed for gaming facility or a variety of device types or models of pachinko gaming machines 10 (or each pachinko gaming machine 10). The target business dividing number is determined, thereby making it possible an objective milestone for setting change. For example, the pachinko gaming machine 10 of device type or model I which operability is high and business dividing number is low may be able to enhance the business dividing number by means of strict setting in order to enhance stability. In addition, the pachinko gaming machine 10 of device type or model in which operability is low and business dividing number is high may be able to enhance operability by means of gentle setting in order to enhance stability.

At this time, the control portion 62 functions as a target dividing number computation means for computing target dividing number per predetermined reference unit, based on analysis result data indicating a result of analysis and/or stability determined by the stability determination means.

Next, the control portion 62 determines whether or not the number of fixed customers decreases (step S61). Determination of customer category is performed in customer category analysis processing (refer to FIG. 27), and in step S61, it is determined whether or not the number of fixed customers decreases as a result of customer category analysis processing. In a case where the number of fixed customers does not decrease, this subroutine is completed, or alternatively, in a case where the number of fixed customers decreases, a number-of-fixed-customers alarm flag is set to ON (o) in the determination result database (refer to FIG. 16), whereby alarm broadcasting is performed (step S62) and then this subroutine is completed.

(Device for Displaying Game Playing Information by Gaming Machine)

Figure 33:
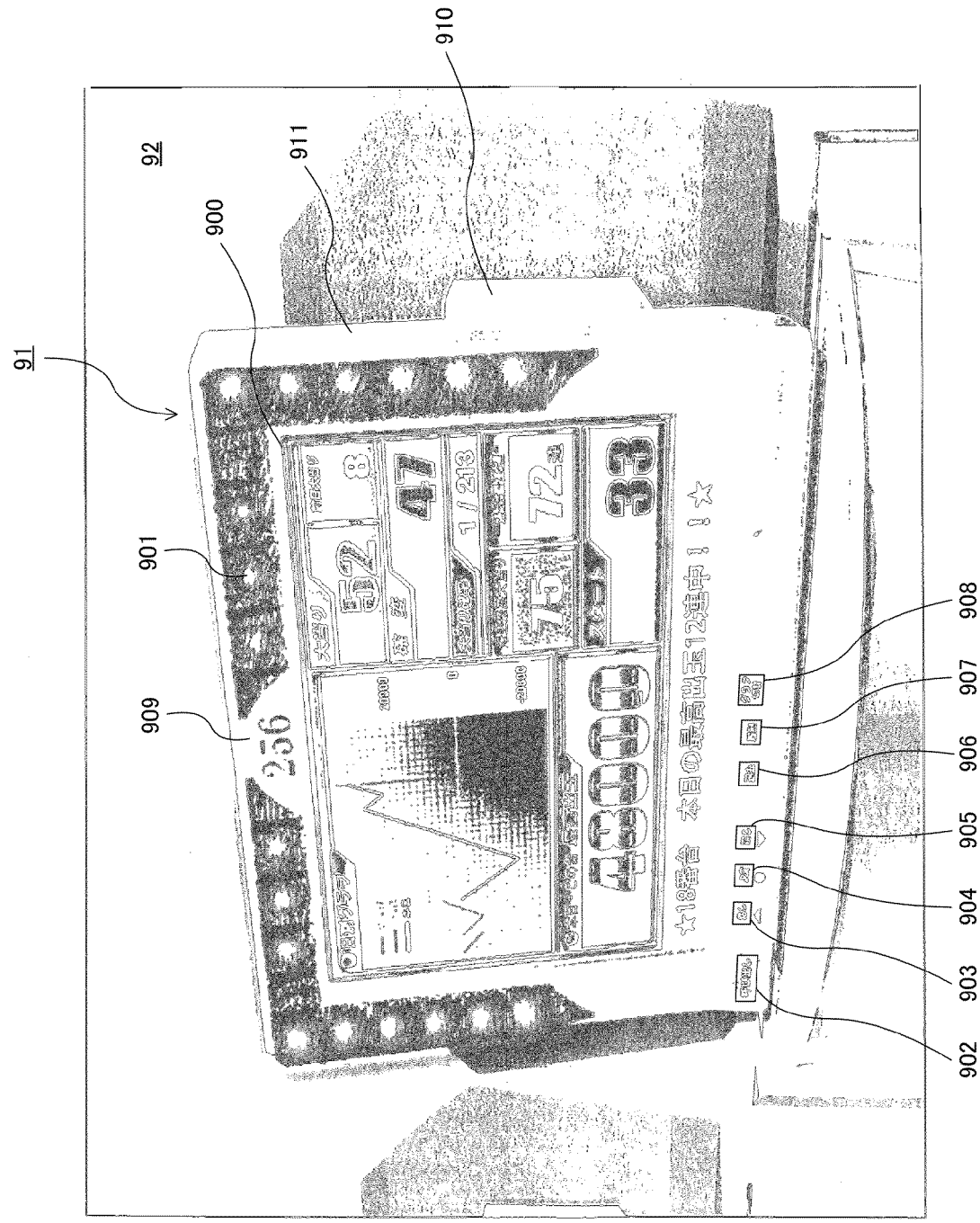
FIG. 33 is a perspective view schematically showing one example of a device for displaying game playing information by gaming machine, according to the embodiment.
Figure 34:
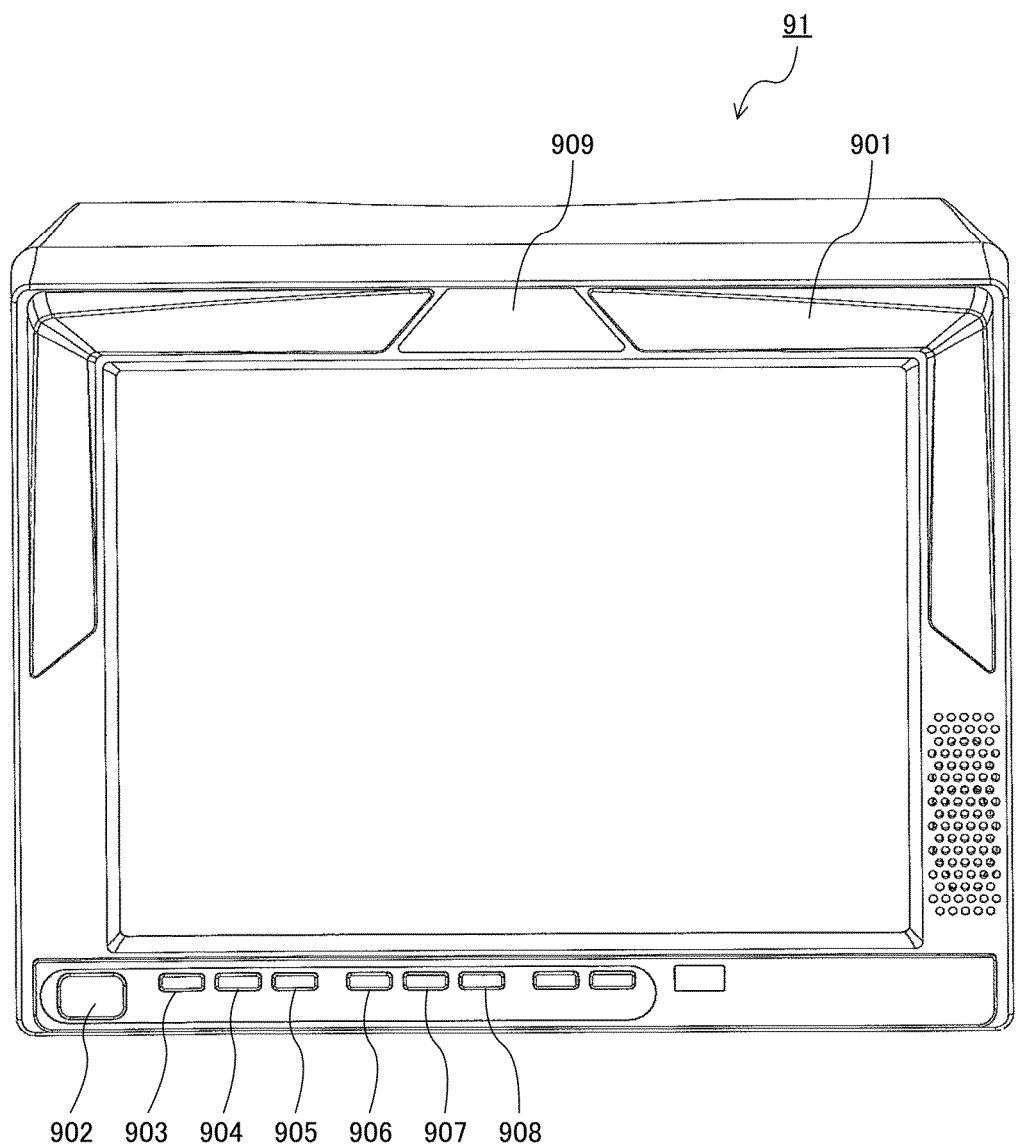
FIG. 34 is a front view schematically showing the device for displaying game paying information by gaming machine, shown in FIG. 33.
Figure 35:
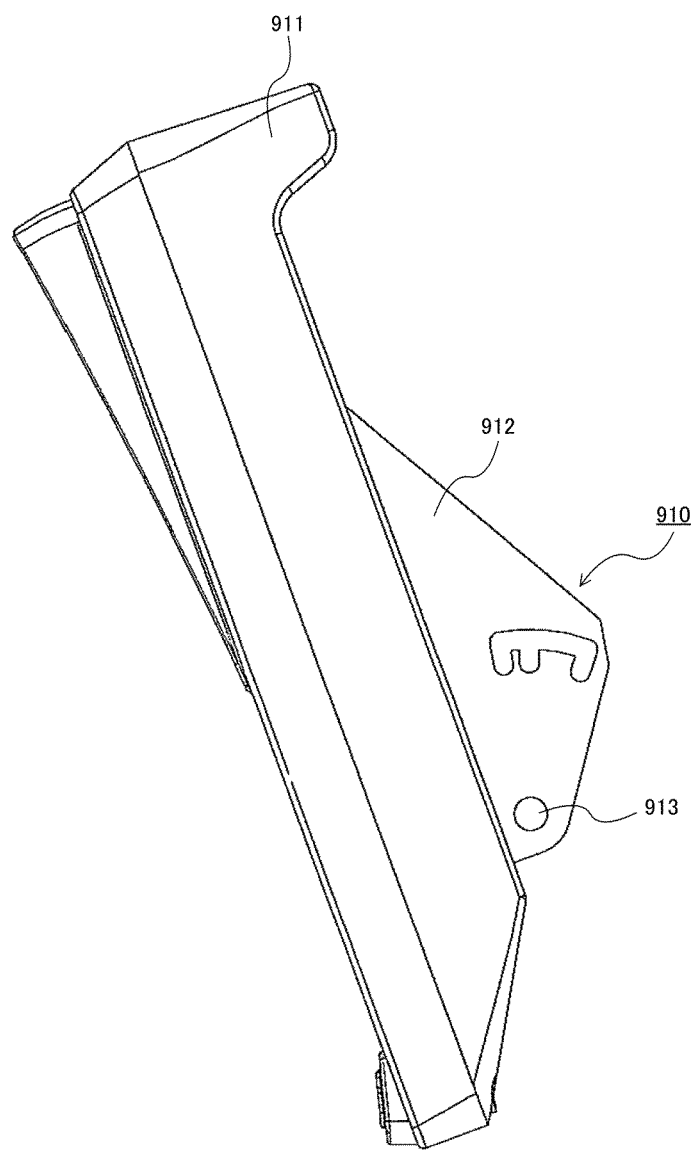
FIG. 35 is a side view schematically showing the device for displaying game paying information by gaming machine, shown in FIG. 33.

FIG. 33 is a schematic view schematically showing one example of a device 91 for displaying game playing information by gaming machine, according to the embodiment; FIG. 34 is a front view schematically showing the device 91 for displaying game playing information by gaming machine, shown in FIG. 33; and FIG. 35 is a side view schematically showing the device 91 for displaying game playing information by gaming machine, shown in FIG. 33.

The device 91 for displaying game playing information by gaming machine has: a main body cabinet 911 having a display screen 900 on its front view and a support portion 910; and is installed so as to positioned on a front face of a work door 92 upward of a pachinko gaming machine (not shown in FIG. 33) via the support portion 910.

Upward of the display screen 900, a machine number display portion 909 for displaying machine number is provided, and around the display screen 900, lamps 901 are provided at the left and right of the machine number display portion 909.

In addition, at a front face lower side of the main body cabinet 911, a plurality of buttons 902 to 908 are disposed side by side. Specifically, in order from the left side, a call button 902, a "forward" button 903, a determination button 904, a "back" button 905, a "past" button 906, a "history" button 907, and a "graph change" button 908 are provided. In addition, on a front face of the display screen 900, a touch panel 924 is provided. The touch panel 924 enables input of an instruction for selection of a cashbox image 943 displayed on the display 91 for displaying game playing information by gaming machine, and when the instruction for selection of the cashbox image 943 is input, this touch panel functions as a cashbox selection instruction input means for outputting cashbox selection data indicating the selected cashbox image 943.

On the display screen 900 shown in FIG. 33, a "daily graph" is displayed at its upper left side, and "today's machine: Maximum winning pachinko balls: 48,000" is displayed at its lower side. In addition, at the right side of the display screen 900, in order from the top, the number of times of big hit of the day, the number of times of big hit of the previous day, the number of times of probability change, big hit probability, the number of times of maximum big hit in the past, maximum continuation in the past, and start are displayed.

Further, on the lower side of the display screen, "18th machine: Maximum winning pachinko balls of today: 12 consecutive hits! !" is displayed as a so called telop. This information is not information about the pachinko gaming machine 10, and is information in another pachinko gaming machine 10. It is to be noted that the telop is not limited to this example, and for example, information to be displayed as a telop may be downloaded via the Internet.

In addition, as shown in FIG. 35, the support portion 910 is installed on a rear face of the main body cabinet 911. The support portion 910 has a turning shaft 913 and a support member 912 into which the turning axis 913 is to be inserted in a horizontal direction. The support member 912 is fixed to a plate member 93 (not shown in FIG. 35) between a work door 92 and a pachinko gaming machine 10, and is not supported by means of the work door 92. Therefore, turning operation of the device 91 for displaying game playing information by gaming machine and opening and closing operation of the work door 92 can be performed independently. The present invention is not limited to this example, and the device 91 for displaying game playing information by gaming machine may be installed at the work door 92.

At the rear face side of the main body cabinet 911, a drive motor (not shown) is installed, and by means of the drive motor, the main body cabinet 911 rotates around the turning shaft 913 to be thereby able to change a display angle. It is to be noted that adjustment of display angle may be performed independently by means of the respective device 91 for displaying game playing information by gaming machine, and may be performed by devices 91 for displaying game playing information by gaming machine, disposed side by side.

Functions of the device 91 for display game playing information by gaming machine can be roughly divided into two categories, data display functions and a number lamp functions.

Figure 38:
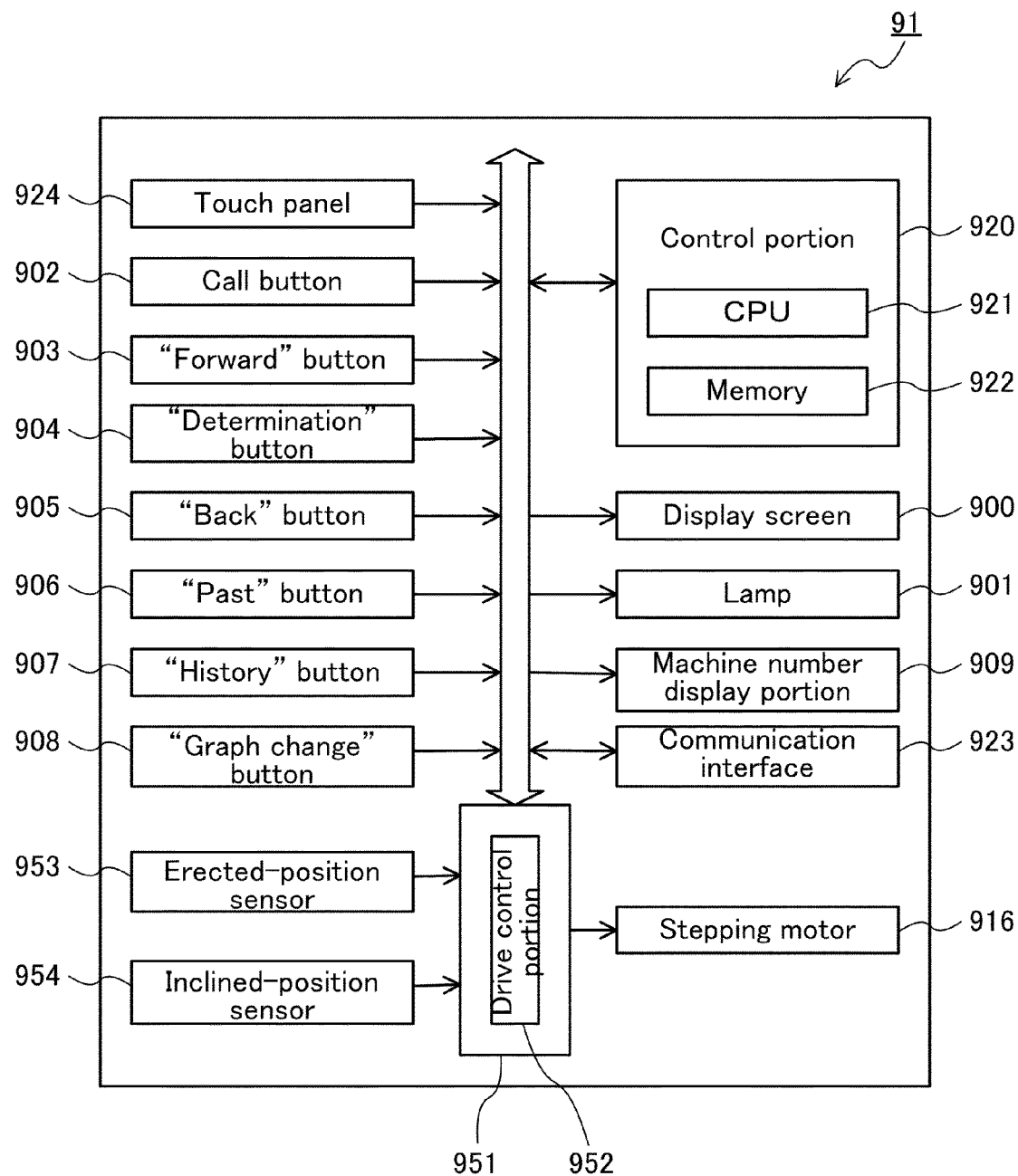
FIG. 38 is a block diagram depicting an internal structure of the device for displaying game paying information by gaming machine, shown in FIG. 33.

As the data display functions, for example, there can be exemplified the following functions (A) to (C):

(A) A function of storing in memory 922 (refer to RAM; FIG. 38) numeric data supplied from each of servers 40 to 80 of the hall conserver 60 or the like via a number lamp display server 90;

(B) A function of variably displaying a display method or an aspect in accordance with an instruction input via a plurality of buttons 902 to 908 or the touch panel 924 or status of data or the like from the number lamp display server 90; and (C) A function of displaying a cashbox image 943 (refer to FIG. 36 and FIG. 37) if an own call (safe pachinko ball) is present according to information from the gaming medium lending device 20 (that is, information from the IC card server 50 or hall server 60).

As the number lamp functions, for example, there can be exemplified the following functions of (D) to (F):

(D) A function of displaying a door of a pachinko gaming machine 10;

(E) A function of transmitting call display and ON/OFF information to the hall conserver 60; and (F) A function of displaying a hit or continuation.

The device 91 for displaying game playing information by gaming machine acquires status of the pachinko gaming machine 10 via each of the servers 40 to 90, and changes the contents of display on the display screen 900.

While in standby, for example, in a case where an own pachinko ball (safe pachinko ball) is present, the cashbox image 943 is displayed, or alternatively, in a case where no sufficient own pachinko ball is present, another item of information is displayed.

When the front door of the pachinko gaming machine 10 is opened, the display of the display screen 900 moves to display of door opening, or alternatively, when the front door is closed, it returns to a state immediately before moving.

When the call button 902 is operated, the display of the display screen 900 moves to a call display, and when the button is set to OFF, it returns to a state immediately before moving.

While in hitting, the display of the display screen 900 moves to a hitting display, and it returns to a standby state due to the completion of hit.

While in challenge, the display of the display screen 900 moves to a display indicating continuation in progress, and it returns to a standby state due to the completion of continuation.

A plurality of buttons 902 to 908 are operated, and when an instruction for selection of display of history of the day or week data is input, the specified information is displayed, or alternatively, in a case where no instruction is input for predetermined time intervals (for example, 20 seconds), it returns to a standby state.

The device 91 for displaying game playing information by gaming machine displays the following in the play of game, for example.

First, when the play of game is started, a standby image is displayed in a state in which no sufficient own pachinko balls are present.

Figure 36:
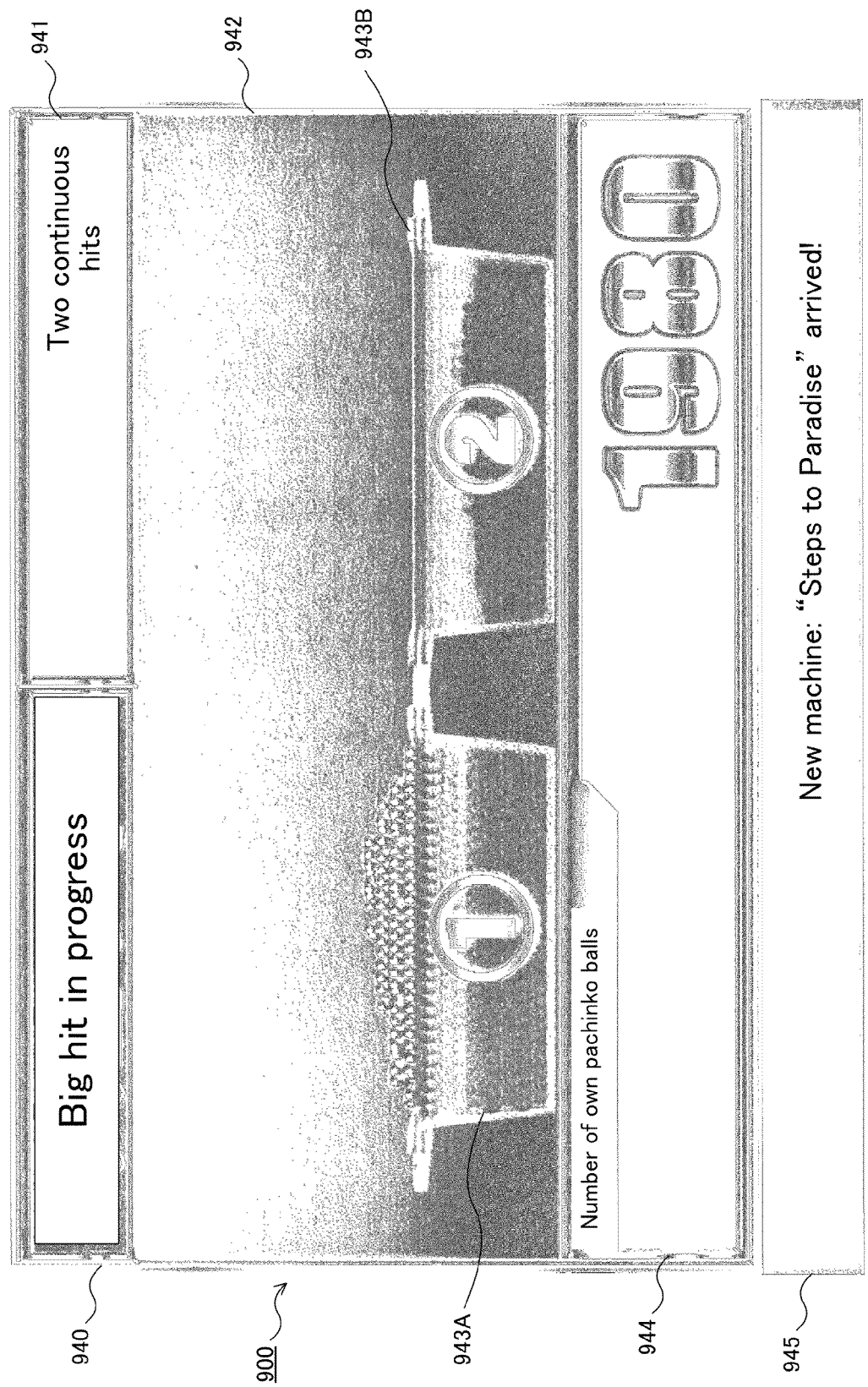
FIG. 36 is a view schematically showing one example of a screen displayed on the device for displaying game paying information by gaming machine, shown in FIG. 33.
Figure 37:
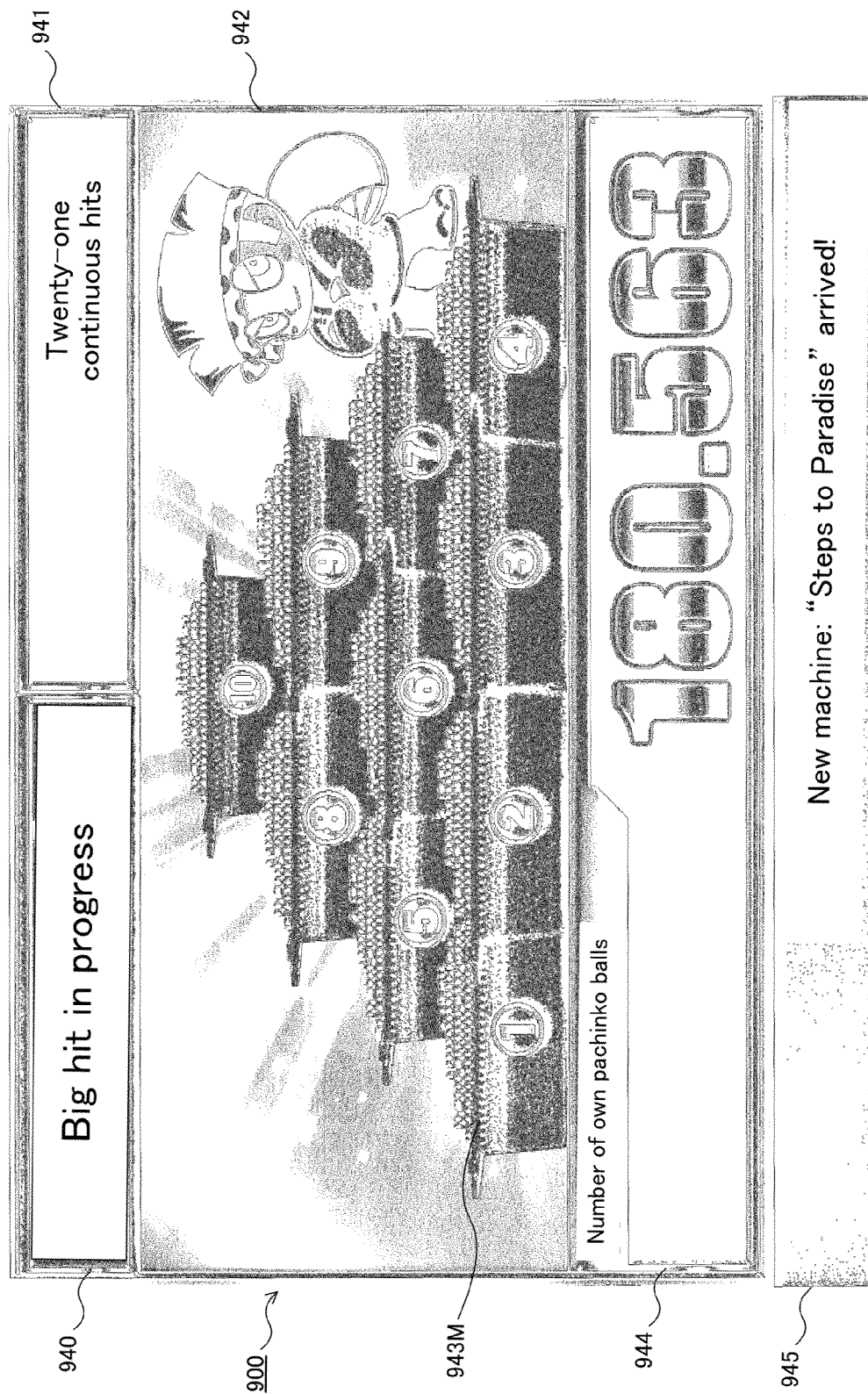
FIG. 37 is a view schematically showing one example of a screen displayed on the device for displaying game paying information by gaming machine, shown in FIG. 33.

Then, if a probability change big hit takes place, first, a big hit display is performed in a state in which no sufficient own pachinko balls are present, and subsequently, it moves to a big hit display in own pachinko balls are present (FIG. 36 and FIG. 37).

Then, if a probability change takes place, a challenging display is performed in a state in which own pachinko balls are present.

Then, a normal big hit takes place, a big hit display is performed in a state in which own pachinko balls are present.

Then, a short time state takes place, a challenging display is performed in a state in which own pachinko balls are present.

Then, after the short time state completes, if a normal play mode is restored, a standby display is performed in a state in which own pachinko balls are present.

It is to be noted that as to the presence or absence of own pachinko balls in the display of the device 91 for displaying game playing information by gaming machine, if the number of own pachinko balls is a predetermined number (for example, 400), it falls under the state in which own pachinko balls are present, and if the number is less than the predetermined number, it falls under the state in which no sufficient own pachinko balls are present. In a case where the number of own pachinko balls is 0, another image is further displayed.

As to an image displayed on the display screen 900 of the device 91 for displaying game playing information by gaming machine, while in standby in the state in which own pachinko balls are present, a cumulative number of times of big hit, the number of times of start at a current time point, the number of own pachinko balls (number of safes) or the like is displayed, and the cashbox image 943 according to the number of own pachinko balls is displayed.

While in standby in the state in which no sufficient own pachinko balls are present, for example, there are displayed: a slump graph; own pachinko balls of which number is a predetermined number or less (however, the maximum number of winning pachinko balls of the day in a case where the number of own pachinko balls is 0); the number of times of big hit; the number of times of big hit of the previous day; the number of times of probability change; big hit probability, maximum number of big hit in the past; maximum number of continuations in the past; and the number of times of start or the like.

While in big hit or in challenging in the state in which own pachinko balls are present, for example, start, the number of times of big hit, the number of times of continuation, and the number of own pachinko balls or the like are displayed, and the cashbox image 943 according to the number of own pachinko balls is displayed. While in big hit or challenging in the state in which no sufficient own pachinko balls are present, for example, a slump graph in standby display image in the state in which no sufficient own pachinko balls are present is replaced with a big hit display or challenging display, and the resulting image is displayed.

As the history of the day, data handling one set of the number of times of continuation and the number of acquisitions can be displayed up to about 30 sets, dating back to the past.

In addition, as week data, the number of times of big hit of each day, the number of times of probability change, a cumulative number of times of start, the maximum winning pachinko balls, and a slump graph can be displayed up to seven days, dating back to the past.

In addition, as to display of the cashbox image 943, the housing number of game playing pachinko balls per cashbox is not limited in particular, and for example, 1,200, 1,600, and 2,000 or the like can be exemplified. Further, when the number of cashbox image 943 displayed on the display image 900 is a predetermined number (for example, 20) or more, type of cashbox image may be changed. For example, a cashbox image may be changed to a box-of-1000-ryo image or dollar-bag image and the like.

FIG. 36 is a view schematically showing one example of the maximum number of winning pachinko balls of the day screen displayed on the device 91 for displaying game playing information by gaming machine, shown in FIG. 33.

Two cashbox images 943A and 943B are disposed in a cashbox image display region 942 at the center of the display screen 900 shown in FIG. 36, and at its lower side, "1980" is displayed as a number-of-own pachinko balls image 944. In addition, information of pachinko gaming machine 10 of new device type is disposed as a telop image 945. In addition, a big hit display region 940 is installed on the upper left of the display screen 900, and a number-of-times-of-continuation display region 941 is installed on the upper right of the display screen 900.

FIG. 37 is a view schematically showing one example of the screen displayed on the device 91 for displaying game playing information by gaming machine, shown in FIG. 33.

A plurality of cashbox images 943M is disposed in the cashbox image display region 942 at the center of the display screen 900 shown in FIG. 37, and at its lower side, "180,563" is displayed as the number-of-own-pachinko balls image 944. In addition, information of pachinko gaming machine 10 of new device type is disposed as the telop image 945. Further, the big hit display region 940 is installed on the upper left of the display screen 900, and the number-of-times-of-continuation display region 941 is installed at the upper right of the display screen 900.

FIG. 38 is a block diagram depicting an internal structure of the device 91 for displaying game playing information by gaming machine, shown in FIG. 33.

The device 91 for displaying game playing information by gaming machine includes a control portion 920, and the control portion 920 includes a CPU 921 and memory 922. In addition, to the control portion 920, there are connected: a touch panel 924; a call button 902; a "forward" button 903; a "determination" button 904; a "back" button 905; a "past" button 906; a "history" button 907; and "graph change" button 908.

The display screen 900, a lamp 901, a machine number display portion 909, and a communication interface 923 are connected to the control portion 920.

The "forward" button 903, the "determination" button 904, and the "back" button 905 are buttons for selection and determination of display data.

The "past" button 906 is a button for displaying week data.

The "history" button 907 is a button for display the history of the day.

The "graph change" button 908 is a button for instructing display change of slump graph.

In addition, the control portion 920 is connected to a drive control portion 952 mounted on a drive control board 951 of the device 91 for displaying game playing information by gaming machine. The drive control portion 952 is made of microcomputers or the like. The drive control portion 952 is connected to: an erected-position sensor 953 for detecting that the device 91 for displaying game playing information by gaming machine moves to an erected position (refer to FIG. 41 and FIG. 42); and an inclined-position sensor 954 for detecting that the device 91 for displaying game playing information by gaming machine moves to an inclined position (FIG. 45 and FIG. 46), and is further connected to a stepping motor 916.

Figure 39:
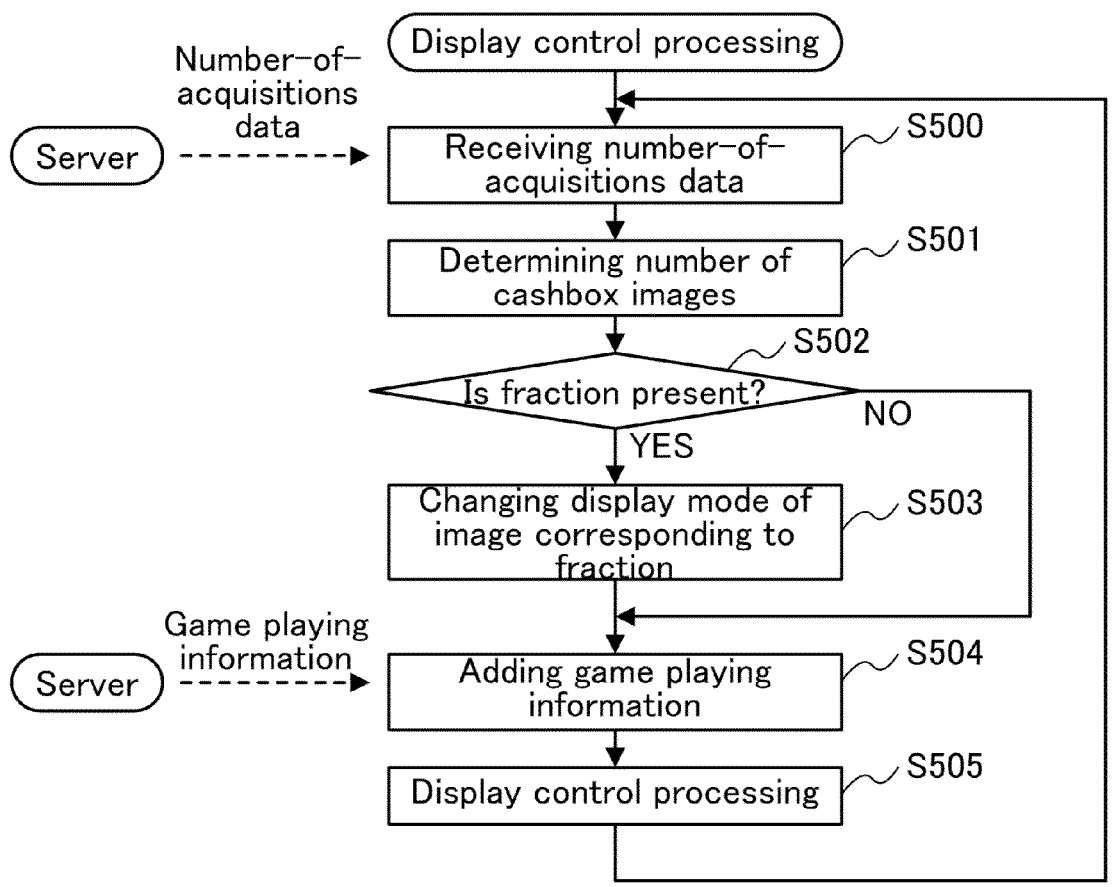
FIG. 39 is a flowchart showing a routine of display control processing executed in the device for displaying game paying information by gaming machine, shown in FIG. 33.

FIG. 39 is a flowchart showing a routine of display control processing executed in the device 91 for displaying game playing information by gaming machine, shown in FIG. 33. It is to be noted that this flowchart is executed irrespective of whether or not a game is played in the gaming machine unit 1.

The control portion 62 of the hall conserver 60 generates number-of-acquisitions data, based on the number of consumptions and the number of payouts every time data related to change of the number of consumptions or the number of payouts is received from the gaming machine unit 1, and the control portion of the number lamp display server 90 transmits number-of-acquisitions data to the device 91 for displaying game playing information by gaming machine, provided upward of the gaming machine unit 1. Herein, the control portion 62 of the hall conserver 60 functions as a number-of-acquisitions computation means.

A control portion 920 of the device 91 for displaying game playing information by gaming machine receives number-of-acquisitions data from the number lamp display server 90 (step S500). Upon the receipt of the number-of-acquisitions data, the control portion 920 stores the number-of-acquisitions data in memory 922. Next, the control portion 920 determines the number of cashbox images by dividing the number of acquisitions indicated by the number-of-acquisitions data by the housing number of game playing pachinko balls per predetermined cashbox, and then, expands the determined cashbox images in the memory 922 (step S501). Next, the control portion 920 determines whether or not a fraction takes place I computation of cashbox images in step S501 (step S502). In a case where the fraction takes place, the control portion 920 changes the cashbox images in the memory 922 so as to change a display mode of the cashbox image corresponding to that fraction (step S503). In this manner, the cashbox image corresponding to the fraction is displayed in a mode different from that of another cashbox image. In step S502, in a case where no fraction takes place, the routine moves to step S504.

Next, the control portion 920 receives the game playing information stored in the servers 40 to 80, via the number lamp display server 90, and adds the game playing information to image data in the memory 922 (step S504). At this time, the number lamp display server 90 functions as a game playing information display control means. It is to be noted that the game playing information received from the servers 40 to 80 is different depending on the gaming machine unit 1. That is, the game playing information transmitted to the device 91 for displaying game playing information by gaming machine, corresponding to the game playing unit identification information to which customer category data of fixed customer is assigned is different from the game playing information transmitted to the device 91 for displaying game playing information by gaming machine, corresponding to the game playing unit identification information to which another item of customer category data of fixed customer. Specifically, part of the game playing information transmitted to the device 91 for displaying game playing information by gaming machine, corresponding to the game playing unit identification information to which customer category data of fixed customer is not transmitted to the device 91 for displaying game playing information by gaming machine, corresponding to the game playing unit identification information to which another item of customer category data of fixed customer. That is, fixed customer has many more quantity and/or types of game playing information than those obtained by a player other than the fixed customer.

Some of the players, even if they are fixed customers, may be those who do not desire registration of member information. Advantage to be able to obtain many more items of game playing information is provided to such a player, whereby incentive for fixed customer (member of gaming facility herein) can be imparted.

Next, the control portion 920 displays the image data stored in the memory 922, on the display screen 900 (step S505). In this manner, with respect to the display screen 900, for example, the images shown in FIG. 36 and FIG. 37 are displayed on the display screen 900. Afterwards, the routine reverts to step S500, and similar processing is repeated. At this time, the control portion 920 functions as a cashbox image display control means, and one cashbox image is additionally displayed every time the number of acquisitions of gaming media at that time point increases by the housing number of gaming media per cashbox, or alternatively, one cashbox image is eliminated every time the number of acquisitions of gaming media at that time point decreases by the housing number.

Figure 40:
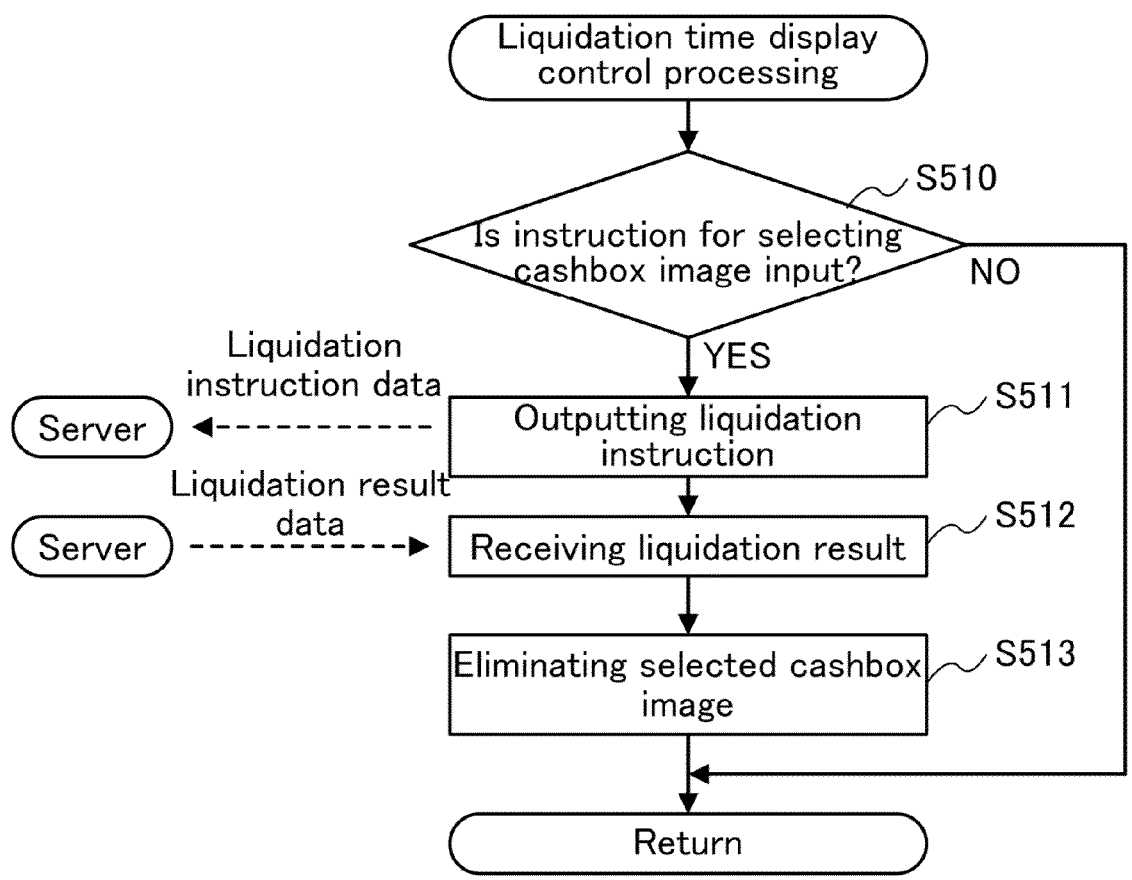
FIG. 40 is a flowchart showing a routine of liquidation time display control routine executed in the device for displaying game paying information by gaming machine, shown in FIG. 33.

FIG. 40 is a flowchart showing a routine of liquidation time display control processing executed in the device 91 for displaying game playing information by gaming machine, shown in FIG. 33.

The control portion 920 determines whether or not an instruction for selecting the cashbox image 943, via the touch panel 924 (step S510). In a case where it is determined that no instruction is input, this subroutine is completed.

In a case where it is determined that the instruction for selecting the cashbox image 943 is input in step S510, the control portion 920 outputs an instruction for liquidation to the IC card server 50 (step S511). The IC card server 50 outputs the instruction for liquidation. Upon receipt of liquidation instruction data, the IC card server 50 performs liquidation processing according to the contents of the liquidation instruction data, and outputs liquidation result data to the device 91 for displaying game playing information by gaming machine and the individual counting device 30. The control portion 52 of the IC card server 50 functions as a liquidation processing means. Upon receipt of the liquidation result data (step S512), the control portion 920 eliminates the selected cashbox image 943 (step S513), and this subroutine is completed. In the individual counting device 30, media of which liquidated number of game playing pachinko balls is displayed is output (step S305 of FIG. 20).

(Structure of Support Portion of Device for Displaying Game Playing Information by Gaming Machine)

Next, a structure of the support portion 910 of the device 91 for displaying game playing information by gaming machine will be described with reference to FIG. 41 to FIG. 46.

Figure 41:
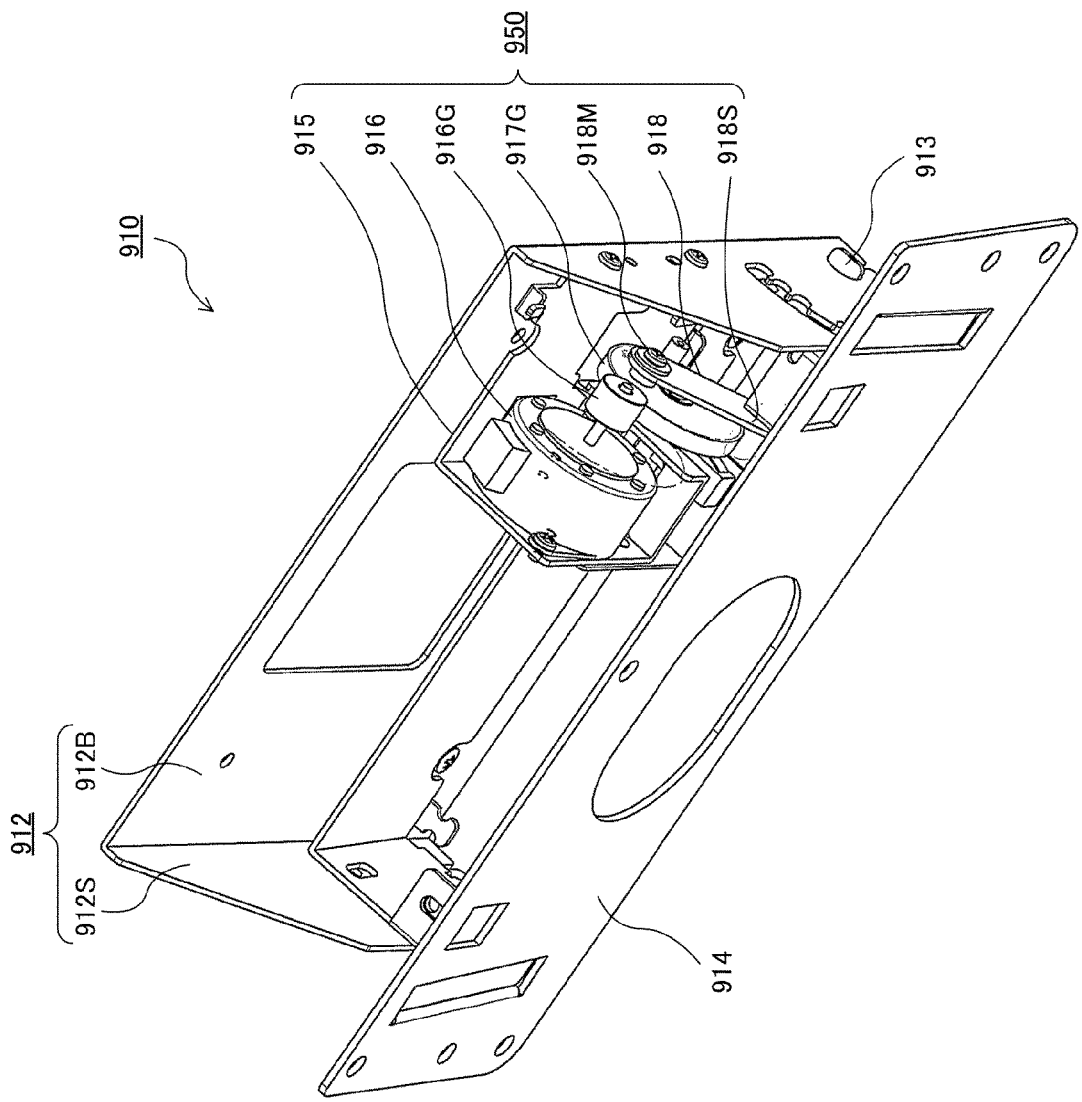
FIG. 41 is a perspective view schematically showing an appearance of a support portion when the device for displaying game paying information by gaming machine, shown in FIG. 33, is inclined forward at 5 degrees.

FIG. 41 is perspective view schematically showing an appearance of a support portion when the device 91 for displaying game playing information by gaming machine, shown in FIG. 33, is included forward at 5 degrees. In addition, FIG. 42 (*a*) is a sectional view taken along the line A-A (refer to FIG. 42 (*d*)) of the support portion shown in FIG. 41; FIG. 41 (*b*) is a side view thereof; FIG. 41 (*c*) is a top view thereof; and FIG. 41 (*d*) is a front view thereof.

Figure 43:
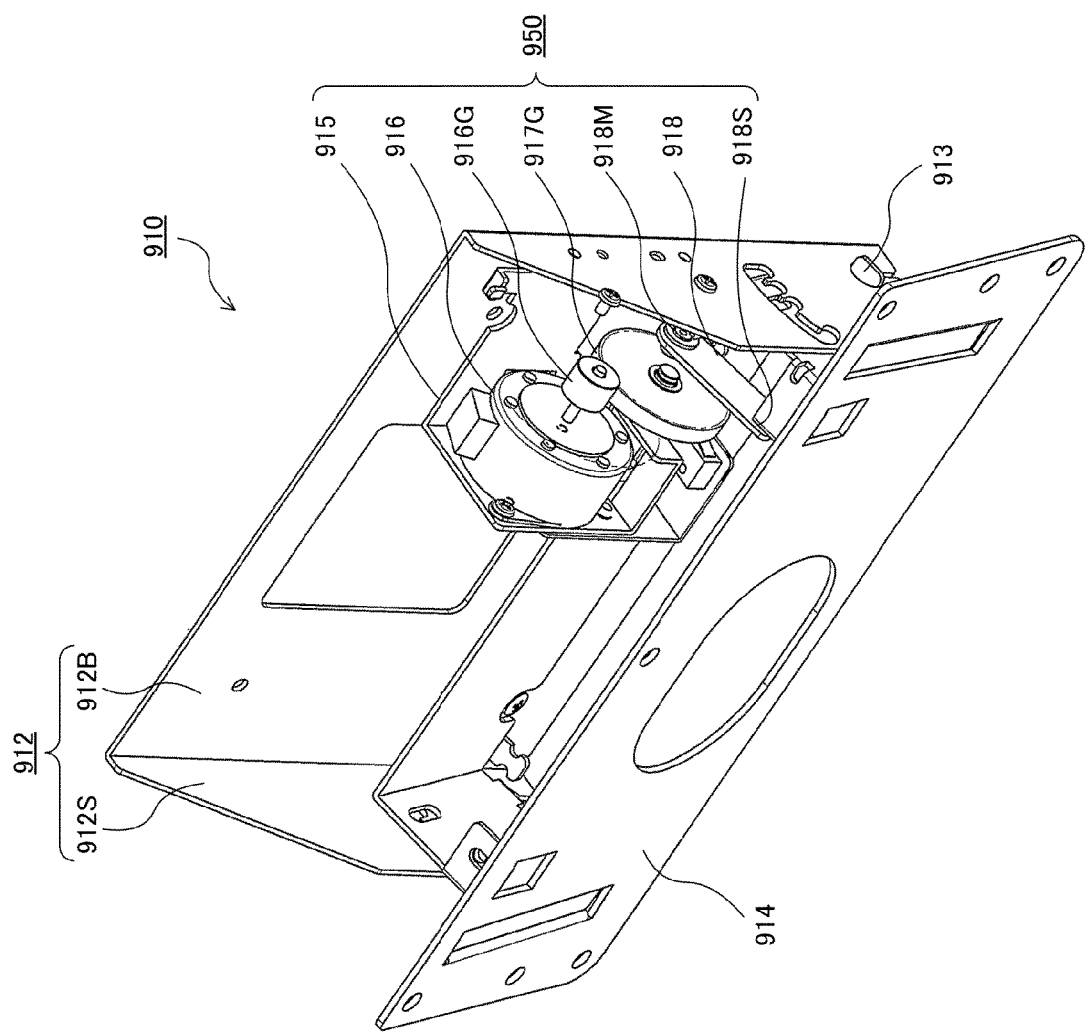
FIG. 43 is a perspective view schematically showing an appearance of the support portion when the device for displaying game paying information by gaming machine, shown in FIG. 33, is inclined forward at 15 degrees.
Figure 44:
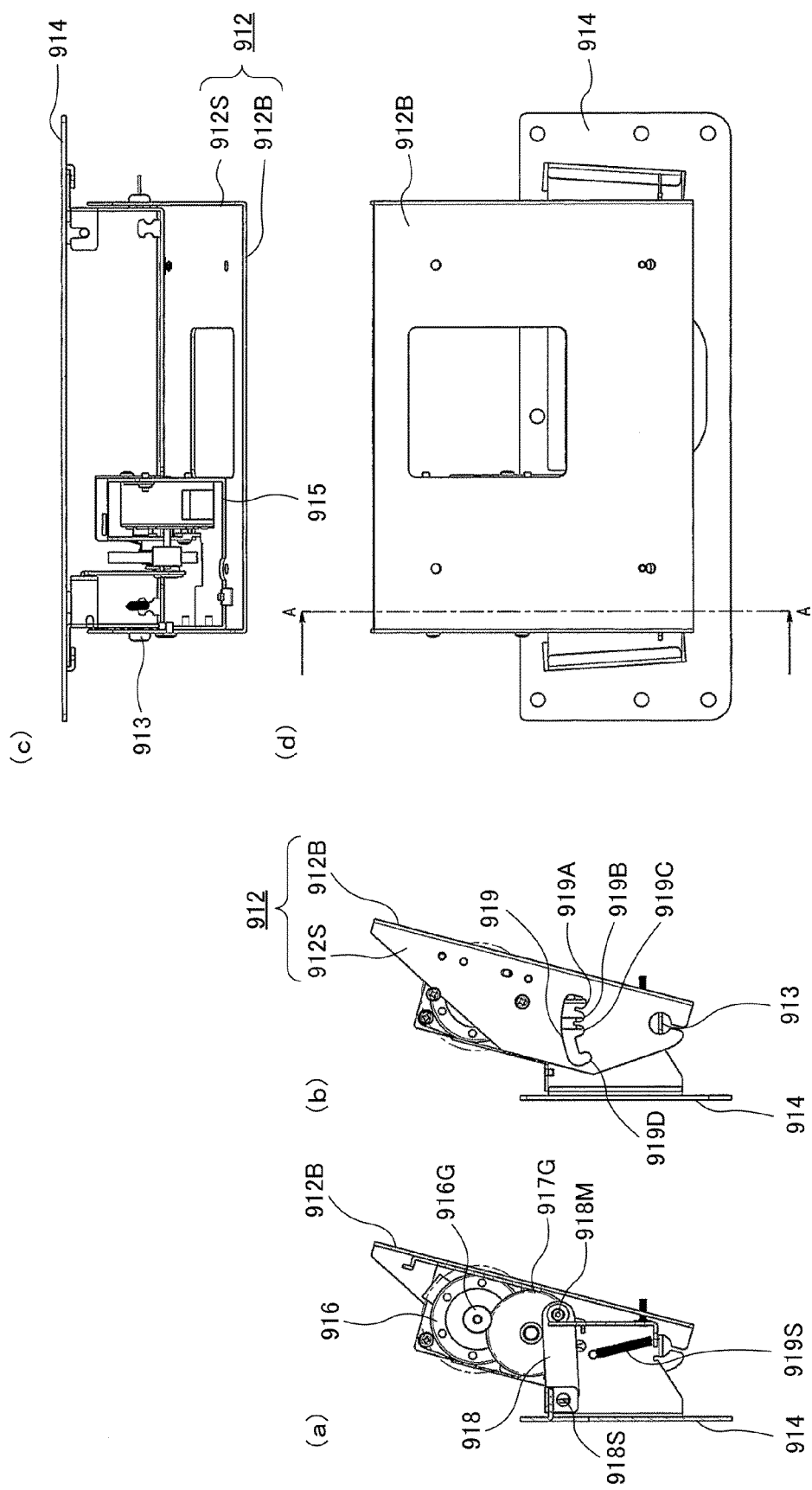
FIG. 44 (a) is a sectional view taken along the line A-A (refer to FIG. 44 (d)) of the support portion shown in FIG. 43.

FIG. 43 is a perspective view schematically showing an appearance of a support portion when the device 91 for displaying game playing information by gaming machine, shown in FIG. 33, is included forward at 15 degrees. FIG. 44 (*a*) is a sectional view taken along the line A-A (refer to FIG. 44 (*d*)) of the support portion shown in FIG. 43; FIG. 44 (*b*) is a side view thereof; FIG. 44 (*c*) is a top view thereof; and FIG. 44 (*d*) is a front view thereof.

Figure 45:
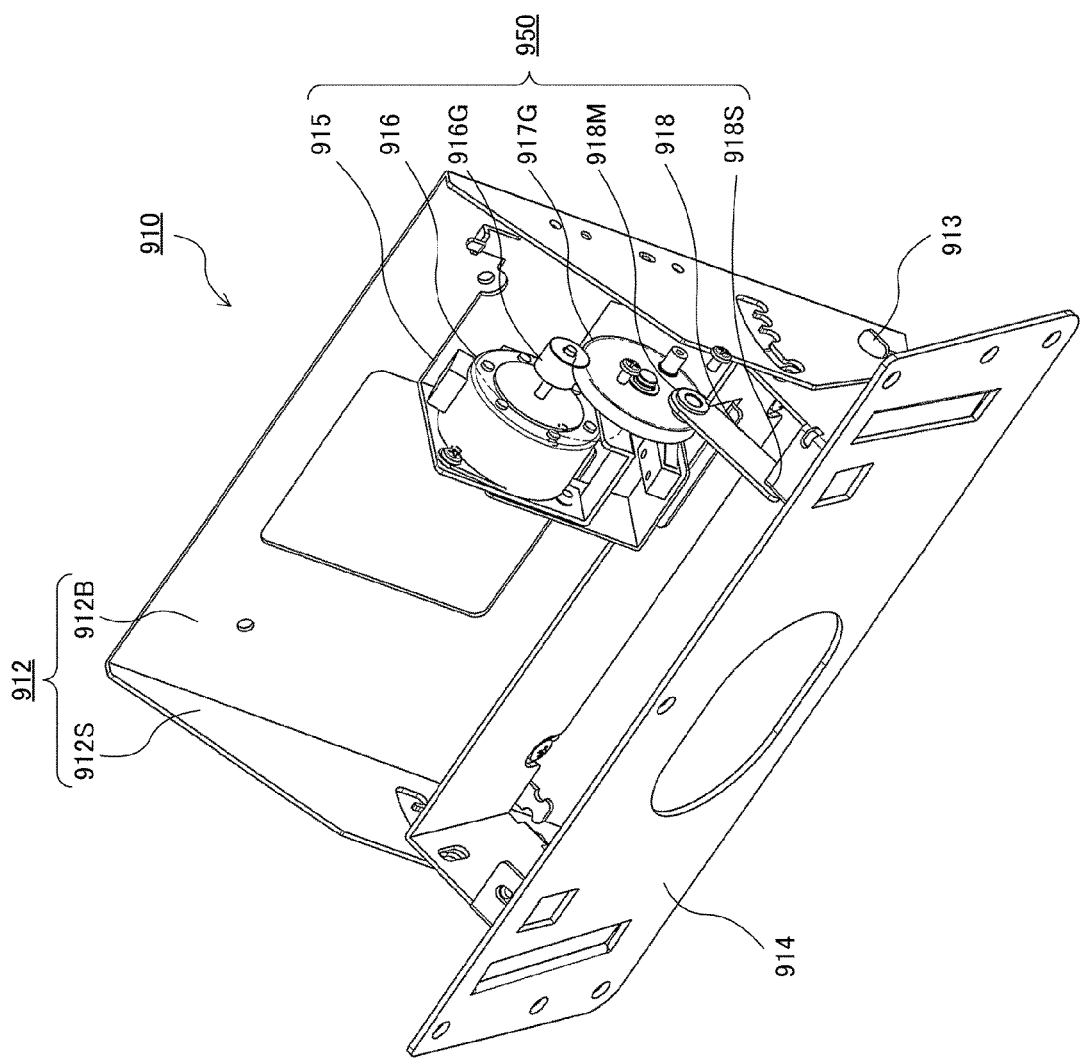
FIG. 45 is a perspective view schematically showing appearance of the support portion when the device for displaying game paying information by gaming machine, shown in FIG. 33, is inclined forward at 40 degrees.
Figure 46:
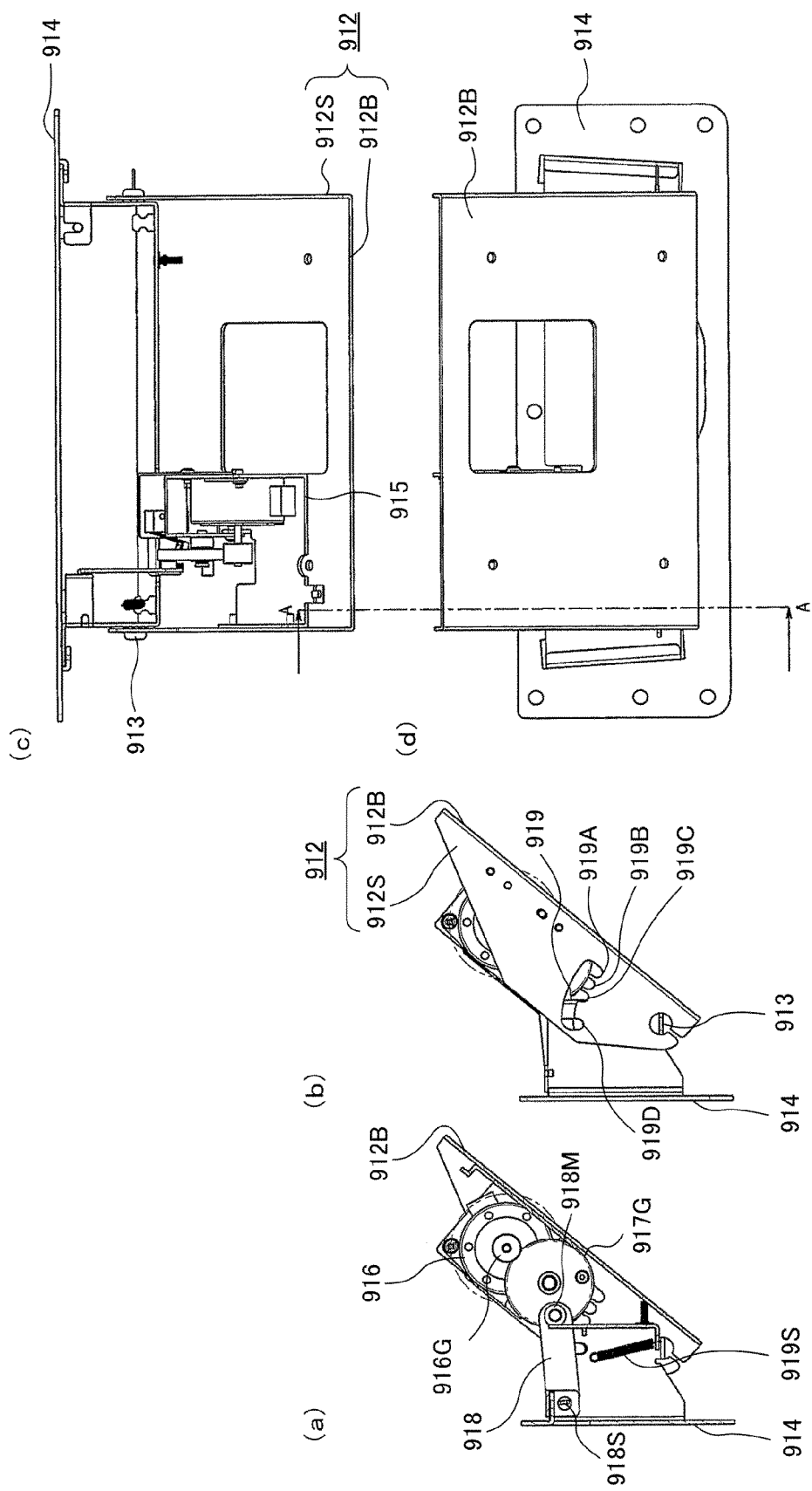
FIG. 46 (a) is a sectional view taken along the line A-A (refer FIG. 46 (d)) of the support portion shown in FIG. 45.

FIG. 45 is a perspective view schematically showing an appearance of a support portion when the device 91 for displaying game playing information by gaming machine, shown in FIG. 33, is included forward at 40 degrees. FIG. 46 (*a*) is a sectional view taken along the line A-A (refer to FIG. 46 (*d*)) of the support portion shown in FIG. 45; FIG. 46 (*b*) is a side view thereof; FIG. 46 (*c*) is a top view thereof; and FIG. 46 (*d*) is a front view thereof.

The support portion 910 of the device 91 for displaying game playing information by gaming machine includes: a base portion 912B provided with a main body cabinet 911 (not shown) of the device 91 for displaying game playing information by gaming machine; a drive mechanism housing portion 950 provided on a rear face (in the front side in FIG. 41); a mount plate 914 mounted to a plate member 93 (not shown) which is provided between a gaming machine bank, that is, a work door 92 (not shown), and a pachinko gaming machine 10 (not shown); and a coupling holding plate 912S for coupling and holding the mount plate 914 and the base portion 912B. The coupling holding plate 912S and the base portion 912B constitute a support member 912. In addition, the coupling holding portion 912S turnably couples and holds the mount plate and the base portion in a forward and backward direction around a turning shaft 913 via the mount plate 914 and the turning shaft 913. The mount plate 914 is equivalent to the mount member in the present invention.

The drive mechanism housing portion 950 includes: a drive control board 951 (not shown); a stepping motor 916; a dive gear 916G included in the stepping motor 916; and a gear member 917G meshed with the drive gear 916G. A movable side end portion 918M is fixed to the gear member 917G, whereas a fixed side end portion 918S is pivoted to the coupling holding plate 912S. A bracket 915 which is provided on a rear face of the base portion 912B fixedly supports the stepping motor 916.

When the drive gear 916G rotates due to driving of the stepping motor 916, a link member 918 moves in a vertical direction around the fixed side end portion 918S of the link member 918 that is coupled with the coupling holding plate 912S, and thus, an angle of a display device also varies from an incline posture (for example, 40 degrees or the like, refer to FIG. 45 and FIG. 46) to an erected posture (for example, 5 degrees or the like, refer to FIG. 41 and FIG. 42) concurrently.

That is, the angle of the display device is variable from the included posture to the erected posture due to reciprocating movement in the vertical direction of the link member 918.

An erected-position sensor 953 (not shown) and an inclined-position sensor 954 (not shown) are provided at the other end of the drive mechanism housing portion 950. When the base portion 912B moves up to the erected position (for example, 5 degrees), the erected-position sensor 953 comes into contact with the base portion 912B to thereby detect the base portion 912B, and by means of contact detection, a drive control portion 952 (not shown) which is mounted on the drive control board 951 stops driving of the stepping motor 916. When the base portion 912B moves to the inclined position (for example, 40 degrees), the inclined-position sensor 954 comes into contact with the base portion 912B to thereby detect the base portion 912B, and by means of contact detection, the drive control portion 952 stops driving of the stepping motor 916. Driving of the drive control portion 952 is performed by means of remote control employing the portable terminal device 41 of the staff in gaming facility or an instruction to be input to the device 91 for displaying game playing information by gaming machine.

Figure 42:
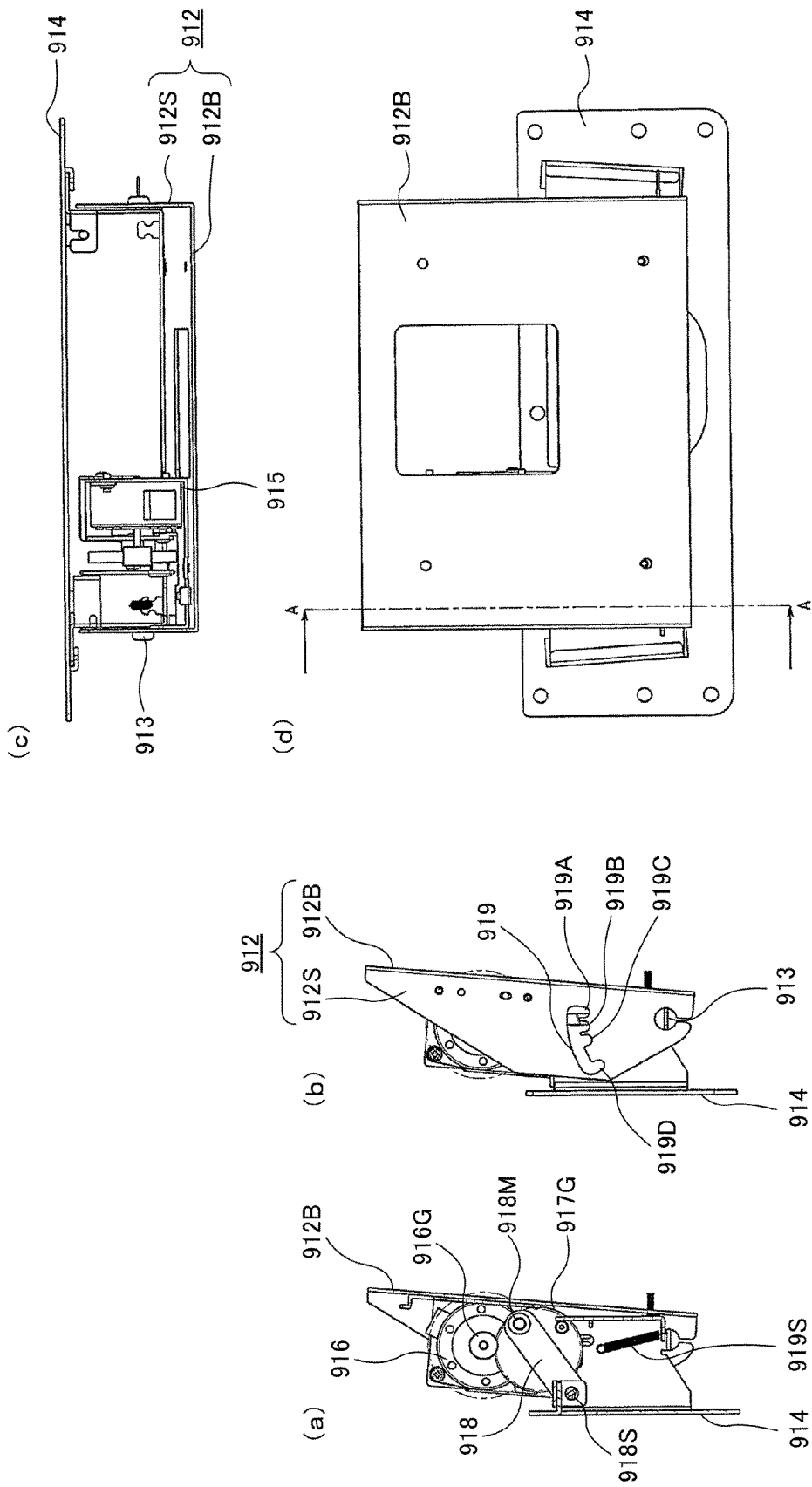
FIG. 42 (a) is a sectional view taken along the line A-A (refer to FIG. 42 (d)) of the support portion shown in FIG. 41.

As shown in FIG. 42 (b), FIG. 44 (b), and FIG. 46 (b), an opening portion 919 is formed on a side face of the coupling holding portion 912S. The opening portion 919 has an arc shape expanding upward around the turning shaft 913, and further, recessed portions 919A, 919B, 919C, and 919D cut out in the direction of the turning shaft 913, respectively, is formed at a position at which the base portion 912B in the opening portion 919 is included at 0 degrees, 5 degrees, 15 degrees, and 49 degrees. As shown in FIG. 42 (a), FIG. 44 (a), and FIG. 46 (a), a spring 919S is provided in the drive mechanism housing portion 950. A lower end side of the spring 919S is fixed in the vicinity of the turning shaft 913 in the base portion 913B, whereas an engaging lock member (not shown) is provided on an upper end side of the spring 919S. The engaging lock member is biased downward by means of the spring 919S; the member is engagingly locked with the recessed portion 919A when the base portion 912B is inclined at 0 degrees; the lock member is engagingly locked with the recessed portion 919B when the base portion 912B is inclined at 5 degrees; the lock member is engagingly locked with the recessed portion 919C when the base portion 912B is inclined at 1 degree; and the lock member is engagingly locked with the recessed portion 919D when the base portion 912B is inclined at 40 degrees. In this manner, the base portion 912B is fixed at an inclined angle of any one of 0 degree, 5 degrees, 15 degrees, and 40 degrees.

(Acquisition Data)

Next, data actually acquired by means of the abovementioned game playing information integration system IS will be described with reference to FIG. 47 to FIG. 55B.

The game playing information integration system employed when data is actually acquired is a system installed over a plurality of gaming facilities, and the game playing information integration system IS in each gaming facility is connected via a network.

Hereinafter, network connection of the game playing information integration systems IS in a plurality of gaming facilities is referred to as a game playing information integration network system INS.

In the game playing information integration network system INS, the servers 40 to 90 of any one of the respective game playing information systems IS (such as hall conserver 60, for example) may perform summing and/or processing or the like of data of each game playing information integration system IS, or alternatively, may be a separately installed server other than the servers 40 to 90 of each game playing information integration system IS.

In the game playing information integration system IS in each gaming facility, identification information of gaming facility is stored in association with acquired data, enabling identification of a source of data acquisition. In addition, in the game playing information integration network system INS, with respect to each gaming machine, item data indicating address or local area attribute is stored, and based on each item data, data extraction and rearrangement (sorting) can be performed. Data indicating address can include data indicating name of prefecture and name of city, town, or village or the like, for example. Data indicating local area attribute can include data indicating residential street, road side, front of station, and busy street or the like, for example.

Data acquisition was performed for 14 days after date of introduction of gaming machines of device type A. That is, device type A is a so called new device type. Tables shown in FIG. 47 to FIG. 55B do not include data if operation time is less than 10 hours due to reduction of business hour and data of shop if the number of operations in shop is 5,000.

FIG. 47 is a table showing an introduction shop operation status (entire) by local area.

Data shown in FIG. 47 include data acquired in the game playing information network system INS.

In order from the left column of the table, there are shown: elapsed number of days; number of shops; shop average operation; average operation of device type A; operation deviation rate by shop; sales by machine; gloss profit by machine; coin unit price; and gloss profit rate.

Average operation by shop is average value of average machine operation of all device types in each shop (number of consumptions of gaming media per gaming machine).

Average operation of device type A is average value of average machine operation of device type A in each shop.

Operation deviation rate by shop indicates rate of average machine operation of device type A relative to average machine operation of all device types. In the table shown in FIG. 47, deviation rate of device type A exceeds 100%, and thus, it is found that device type A is popular in comparison with gaming machines of other device types. On the other hand, deviation rate of device type A is prone to gradually lower, and thus, it is also found that its popularity gradually lower after installation.

Sales by machine are sales per gaming machine.

Gross profit by machine is gross profit per gaming machine.

Coin unit price is unit price of gaming medium.

Gross profit rate (%) is (gross profit by machine/sales by machine)×100.

FIG. 48 is a table showing an introduction shop operation state (residential street) by local area. FIGS. 49A and 49B are tables showing one example of operation result by shop in residential street.

The data shown in FIG. 48 is data of the game playing information integration system IS in gaming facility in which "residential street" is set as a local area attribute, among the data acquired in the game playing information integration network system INS. The data shown in FIGS. 49A and 49B is data acquired in the game playing information integration system IS in shop W in which "residential street" is set as a local area attribute. The data shown in FIG. 48 is a summation of data in each shop as shown in FIGS. 49A and 49B.

FIG. 50 is a table showing an introduction shop operation state (read side) by local area. FIGS. 51A and 51B are tables showing one example of operation result by shop on road side.

The data shown in FIG. 50 is data of the game playing information integration system in gaming facility in which "road side" is set as a local area attribute. The data shown in FIGS. 51A and 51B is data acquired in the game playing information integration system IS in shop X in which "road side" is set as a local area attribute. The data shown in FIG. 50 is a summation of data in each shop as shown in FIGS. 51A and 51B.

FIG. 52 is a table showing an introduction shop operation states by local area (front of station). FIGS. 53A and 53B are tables showing one example of operation result by shop in front of station.

The data shown in FIG. 52 is data of the game playing information integration system IS in gaming facility in which "front of station" is set as a local area attribute, among the data acquired in the game playing information integration network system INS. The data shown in FIGS. 53A and 53B is data acquired by the game playing information integration system IS in shop Y in which "front of station" is set as a local area attribute. The data shown in FIG. 52 is a summation of data in each shop as shown in FIGS. 53A and 53B.

FIG. 54 is a table showing an introduction shop operation states by local area (busy street). FIGS. 55A and 55B are tables showing one example of operation result by shop in busy street.

The data shown in FIG. 54 is data of the game playing information integration system IS in gaming facility in which "busy street" is set as a local area attribute, among the data acquired in the game playing information integration network system INS. The data shown in FIGS. 53A and 53B is data acquired by the game playing information integration system IS in shop Z in which "busy station" is set as a local area attribute. The data shown in FIG. 54 is a summation of data in each shop as shown in FIGS. 55A and 55B.

A manager in gaming facility can understand in a qualitative sense that, for example, the shop average operation in shop (FIG. 52) in front of station is lower than shop in another local area attribute or that shop average operation of new device type (device type A) in busy street (FIG. 54) is high. However, only the qualitative sense of the manager in gaming facility lacks quantitative information, and thus, it is difficult to determine a management policy of gaming facility, and in management based on the sense of the manager in gaming facility, there is a risk that management does not work well. However, according to the data shown in FIG. 48, FIG. 50, FIG. 52, and FIG. 54, for example, it is possible to quantitatively evaluate how the shop average operation in shop in front of station is lower than that in shops in another local area attribute or how the shop average operation of new device type in busy street is higher than that therein. In addition, these items of data are not based on a theoretical value, and are actually measured values, and thus, are high in reliability.

Figure 56:
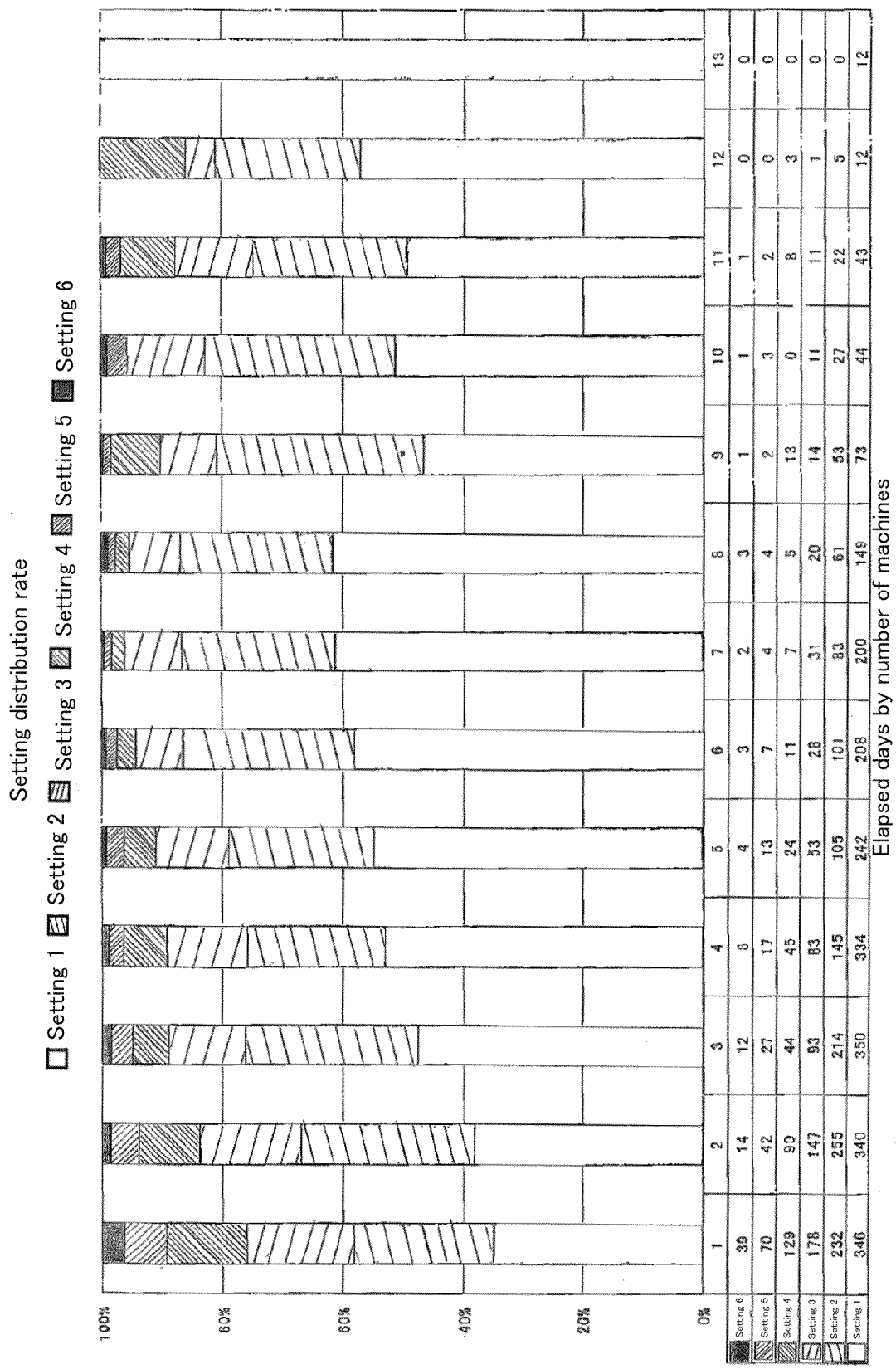
FIG. 56 is a graph depicting a dividing rate of settings of gaming machines.
Figure 57:
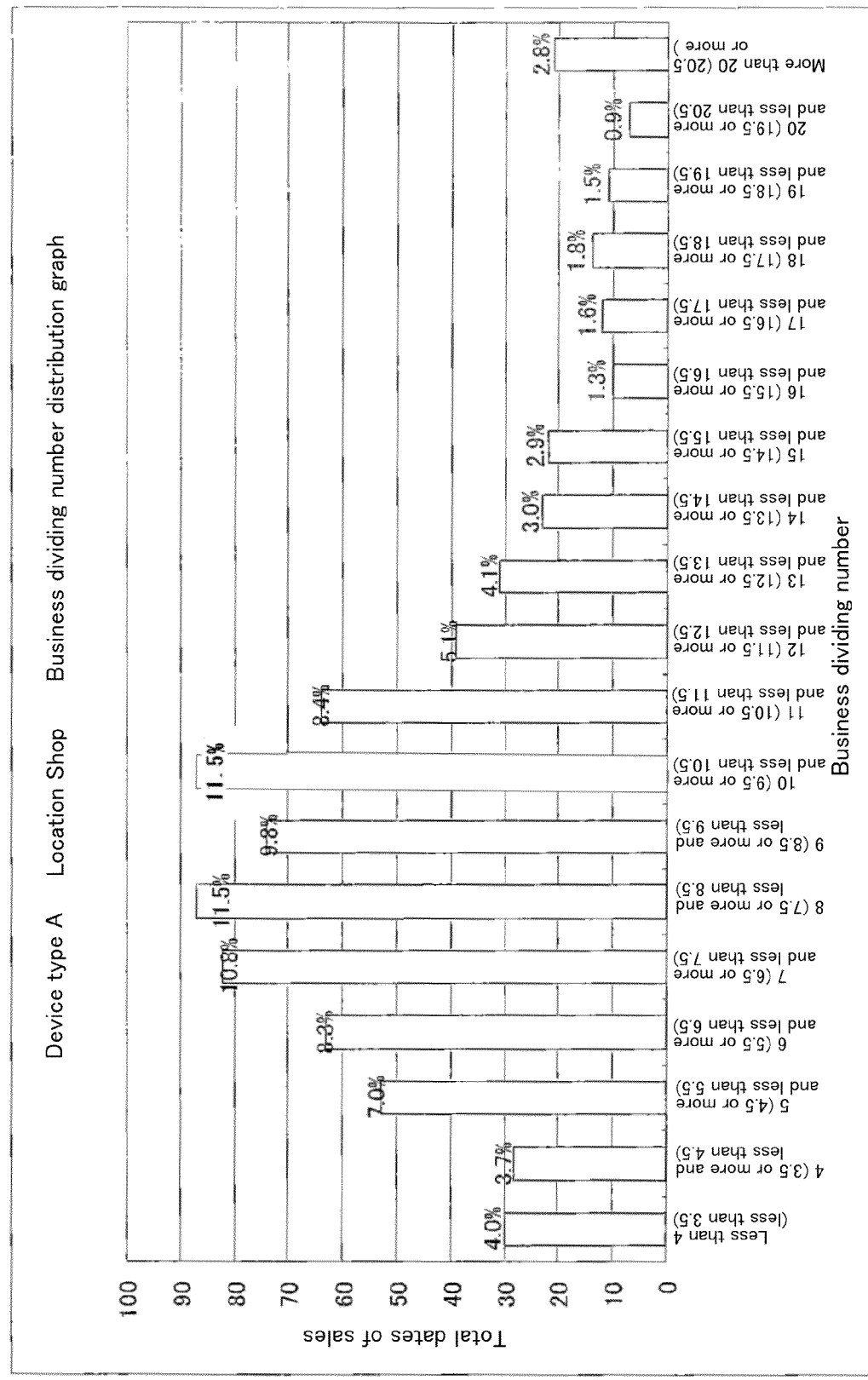
FIG. 57 is a graph depicting distribution of business dividing numbers of gaming machines.

FIG. 56 is a graph depicting distribution rate of settings of gaming machine, and FIG. 57 is a graph depicting distribution of business dividing number in gaming facility.

The settings of gaming machine is a value defined stepwise by means of probability at which a bonus game takes place (probability at which a big hit is won), and in general, the higher the settings are, the higher the probability of occurrence of a bonus game is. The settings are also important elements depending on the characteristics of gaming machine. In the game playing information integration system IS, the data indicating the settings I stored in association with game machine unit identification information. The graph shown in FIG. 56 is a summation of data indicating the settings. The graph shown in FIG. 57 is a graph depicting distribution of business dividing number as to device type A. In the game playing information integration system IS, it is possible to compute business dividing number in each gaming machine unit 1, and the data indicating business dividing number in each gaming machine unit can be stored in association with gaming machine identification information.

(Analysis of Variation Trend Continuation Period)

A variation trend continuation period is a series of period in which either one of increase trend and decrease trend of difference number is continuous, and an absolute value of difference number in the whole period is a predetermined reference value or more.

Variation trends of difference number (increase trend or decrease trend) are referred to as variation trends per predetermined period, and the period used here includes a period based on time and a period based on game. For example, in a case where a variation tend is determined by 10 games, even if the difference number of the first 4 games is plus and the difference number of the remaining 6 games is minus, it is determined that the variation trend is plus as long as the difference number of the whole 10 games is plus.

A phenomenon that either one of the increase trend and the decrease trend is continuous is referred to the one that a state in which the difference number is plus or a state in which the difference number is minus continues. Therefore, for example, in a case where the difference number of the first 10 games is plus 50, the difference number of the next 10 games is plus 30, and the difference number of the second next 10 games is plus 70, the degree of increase trend varies, whereas the increase trend itself in these 30 games is continuous.

With respect to a series of period, for example, after completion of a bonus game or after completion of a subsequent game playing state which is different from a normal game playing state, the routine shifts to the normal game playing state, and in that normal game playing state, in a case where a next bonus game takes place before exceeding a special period or the number of games played, the next bonus game may be included in a series of period. That is, in a case where two periods of increase trend are adjacent to each other via a special period or an increase trend of the number of games played, the two periods of increase trend and one period of decrease tend may be handled as a series of period. In addition, the two periods of increase tend may be handled as a series of period, excluding such one period of decrease trend.

The whole period indicated by absolute value of difference number in the whole period designates a series of the whole period. In addition, a predetermined reference value is not limited in particular, and can be individually set in gaming facility, and for example, 500 medals or the like can be exemplified as to a pachinko/slot gaming machine.

The variation trend continuation period defined as described above is a period in which strong impression is imparted to a player. This fact can be understood because when players talks with other persons about a result of the play of game, they often talk about variation trend continuation period such as "no bonus game can be played over 1 hour or more" or "bonus game lasts for long period of time", for example. In other words, players perform analysis and/or evaluation of gaming machine by employing the variable trend continuation period irrespective of whether or not to take care of the matter. However, this analysis is a mere analysis and/or evaluation of individual players, and conventionally, it has been difficult to keep track of such analysis and/or evaluation on the gaming facility side. The present invention is characterized by quantitatively and qualitatively obtaining result of intuitive analysis of the individual players and then performing analysis and/or evaluation of gaming machine in a sense which is closer to players.

Next, processing executed in the game playing information integration system IS will be described.

Figure 58:
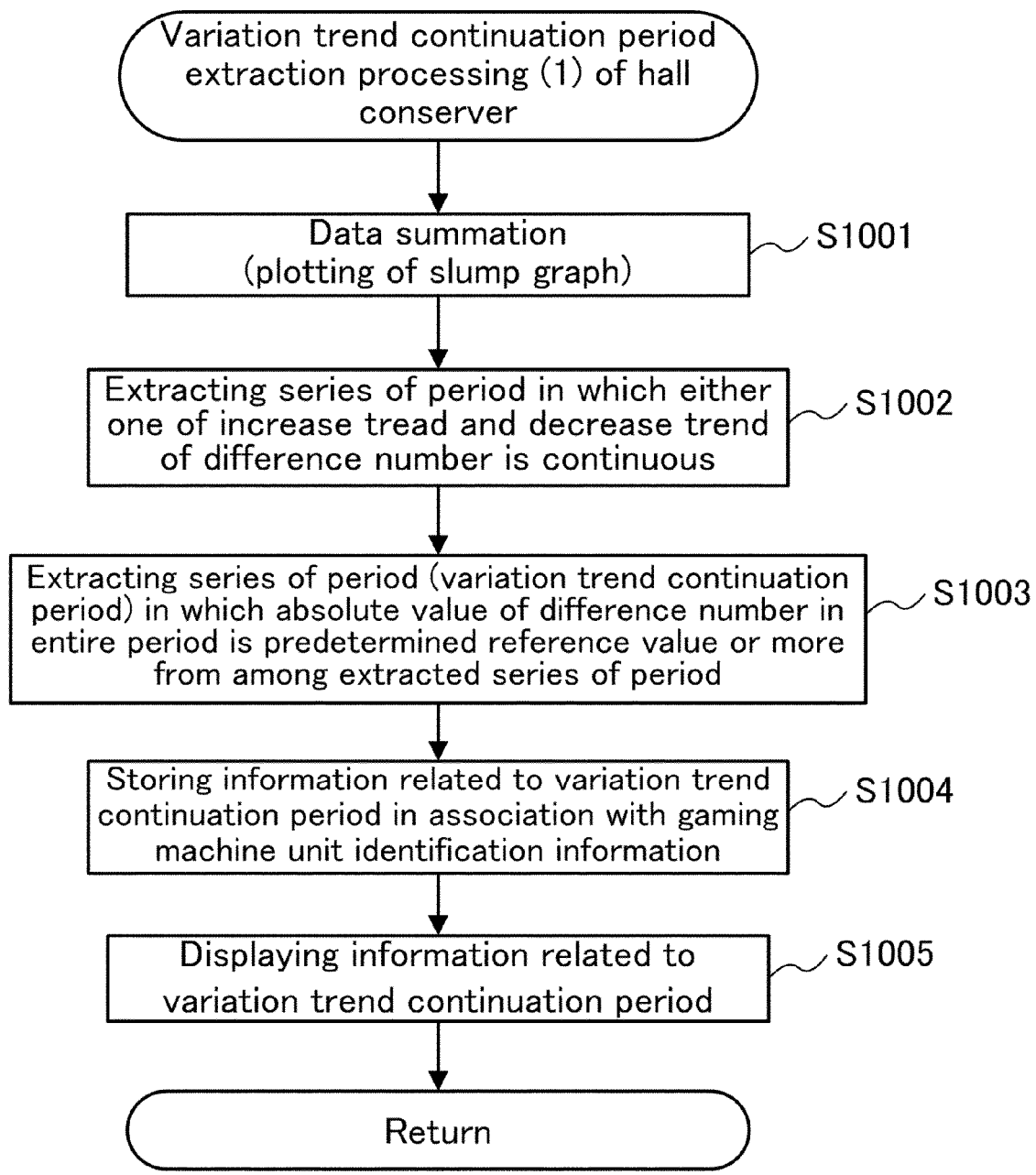
FIG. 58 is a flowchart showing variation trend continuation period extraction processing (1) executed in the hall conserver shown in FIGS. 1A to 1D.

FIG. 58 is a flowchart showing variable trend continuation period extraction processing (1) executed in the hall conserver shown in FIGS. 1A to 1D. This processing is executed when an instruction related to extraction of variable trend continuation period is input by a manager or the like in gaming facility.

Figure 59:
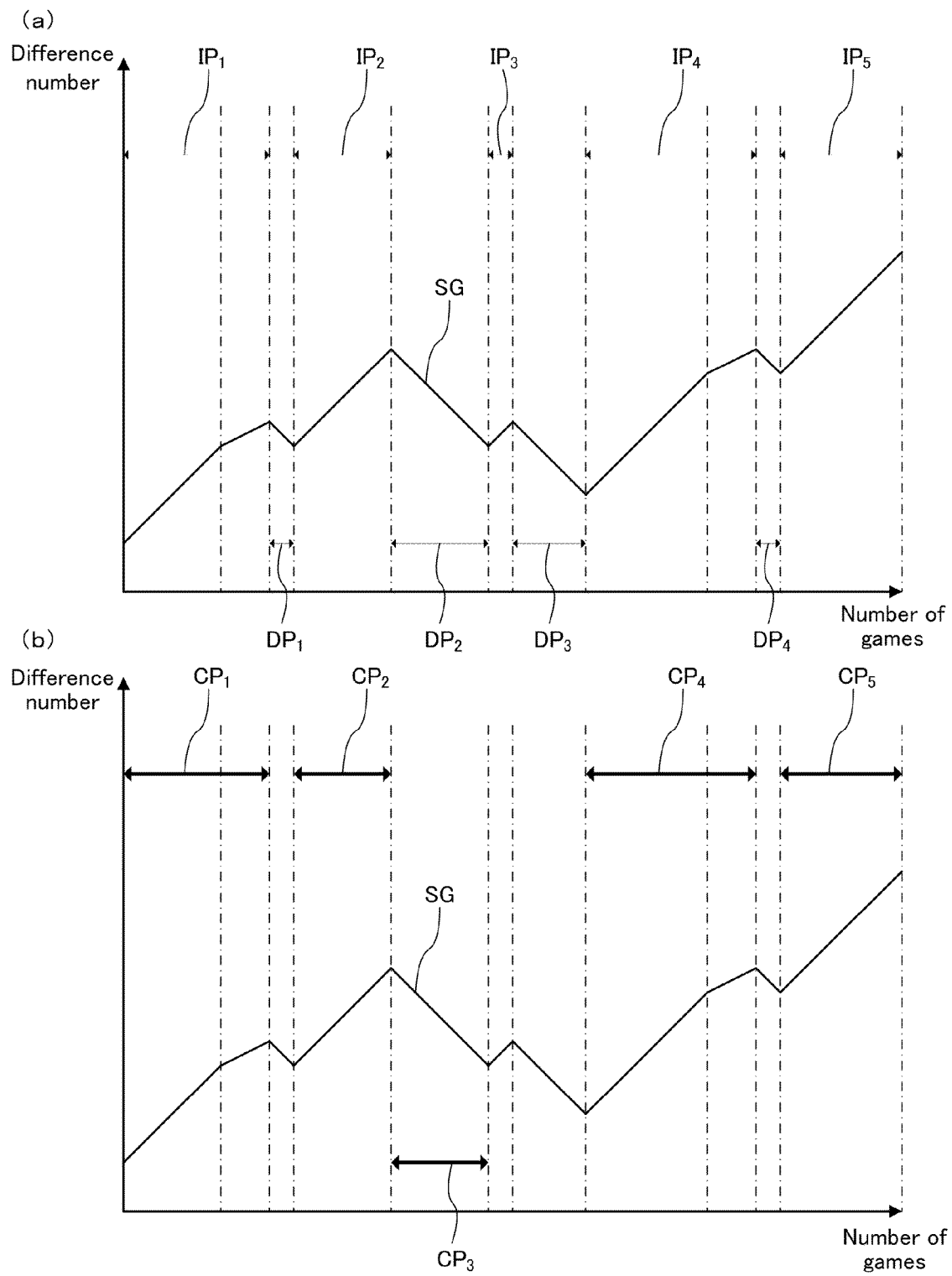
FIG. 59 (a) is a slump graph when extracting a series of period in which an increase trend or decrease trend of dividing number is continuous, and FIG. 59 (b) is a slump graph when a variation trend continuation period is extracted from the slump graph shown in FIG. 59 (a).

FIG. 59 (*a*) is a slump graph when extracting a series of period in which either one of increase trend and decrease trend of difference number is continuous; and FIG. 59 (*b*) is a slump graph when a variation trend continuation period is extracted from the slump graph shown in FIG. 59 (*a*). When the processing shown in FIG. 58 is executed, the control portion 62 functions as an analysis means.

First, the control portion 62 of the hall conserver 60 sums data as to one gaming machine unit 1, based on data stored in the game playing status database 66 (refer to FIG. 14B) (step S1001). The summation of data is equivalent to plotting of slump graph, and however, such slump graph does not always need to be plotted on display. For example, performing processing of computing difference number every predetermined period and then based on a relationship between period and difference number computing a plurality of X-Y coordinate (X-coordinate: time or number of games and Y-coordinate: difference number) is processing equivalent to summation of data in step S1001. The processing of step S1001 is performed, whereby data capable of plotting a slump graph SG shown in FIG. 59 (*a*) is generated.

Next, the control portion 62 of the hall conserver 60 extracts a series of period in which either one of increase trend and decrease tend of difference number is continuous, from the slump graph SG (step S1002). For example, with the slum graph SG shown in FIG. 59 (*a*), IP$_1$ to IP$_5$ are a series of period in which increase trend of dividing number is continuous, and DP$_1$ to DP$_4$ are a series of period in which decrease trend of dividing number is continuous. In this manner, a series of period IP or DP is included in the slump graph SG virtually obtained by means of the processing of step S1001, and in step S1002, extraction of the series of period IP or DP is performed.

Next, the control portion 62 of the hall conserver 60 extracts a series of period (variation trend continuation period CP) in which an absolute value of difference number in the whole period is a predetermined reference value or more, from among the series of period IP or DP extracted in step S1002 (step S1003). For example, a period in which the absolute value of difference number is a predetermined reference value (for example, 500 medals) is extracted from among the series of period IP$_1$ to IP$_5$ or DP$_1$ to DP$_4$ shown in FIG. 59*a*, and the extracted period is defined as variation trend continuation period CP$_1$ to CP$_5$. When the processing operations of steps S1001 to S1003 are executed, the control portion 62 functions as a variation trend continuation period extraction means.

Subsequently, the control portion 62 of the hall conserver 60 stores the information related to the variation trend continuation period that is extracted by step S1003 in a hard disk 65 in association with gaming machine unit identification information (step S1004). The information related to variation tend continuation period is not limited in particular, and can include length of variation tend continuation period (time and/or number of games), difference number in variation trend continuation period, and generation time and completion time of variation trend continuation period or the like.

Next, the control portion 62 of the hall conserver 60 performs display of information related to variation trend continuation period, based on the information related to variation trend continuation period, stored in the hand disk 65 (step S1005). The display of the information related to variation trend continuation period may be performed on a display (not shown) which is connected to the hall conserver 60, and its related display target is not limited in particular. Afterwards, this routine is completed.

The extraction processing of variation trend continuation period in the present invention is not limited to the processing operations described with reference to FIG. 58 and FIG. 59, and for example, may be processing operations described with reference to FIG. 60 and FIG. 61.

Figure 60:
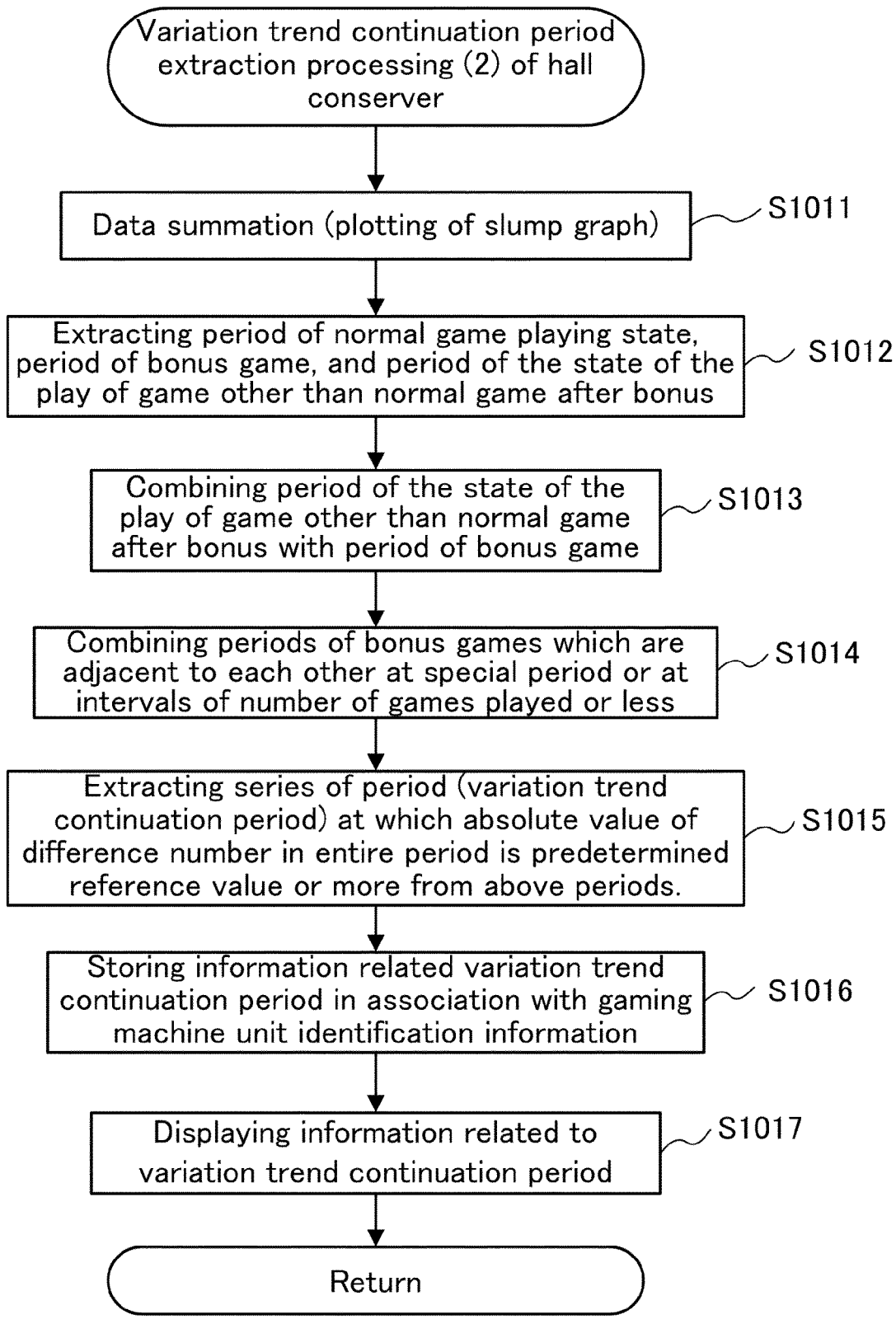
FIG. 60 is a flowchart showing variation trend continuation period extraction processing (2) executed in the hall conserver shown in FIGS. 1A to 1D.

FIG. 60 is a flowchart showing variable trend continuation period extraction processing (2) executed in the hall conserver shown in FIGS. 1A to 1D.

Figure 61:
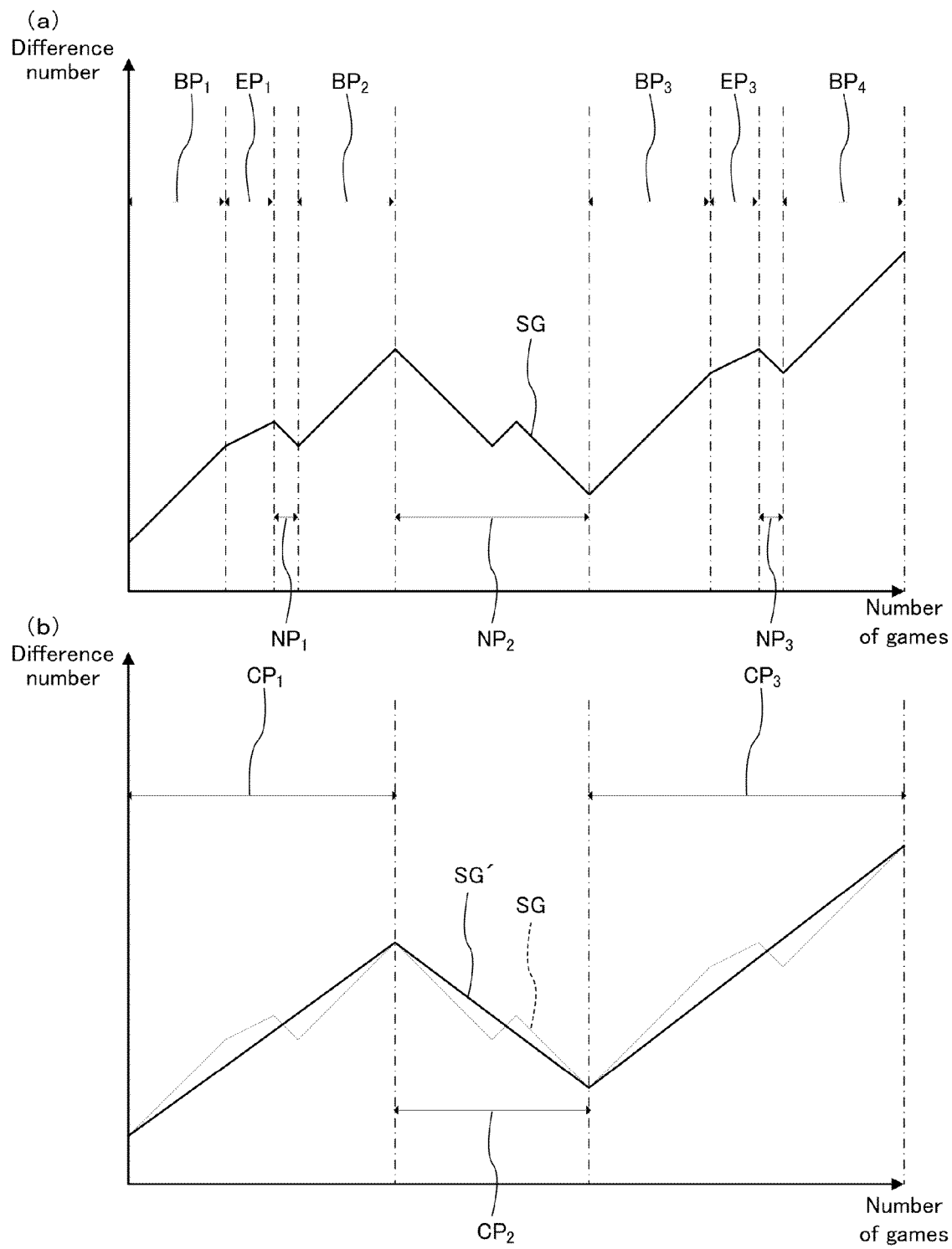
FIG. 61 (a) is a slump graph when extracting a period of normal game playing status, a bonus game period, and a period obtained by combining the bonus game period and a game playing status which is different from a normal game playing status subsequent to the bonus game period, and FIG. 61 (b) is a slump graph when a variation trend continuation period is extracted from the slump graph shown in FIG. 61 (a).

FIG. 61 (*a*) is a slump graph when extracting a period of normal game playing state, a period of bonus game, and a period obtained by combining the bonus game and a game playing state which is different from the normal game plating state subsequent to the bonus game; and FIG. 61 (*b*) is a slump graph when a variation rend continuation period is extracted from the slump graph shown in FIG. 61 (*a*). When the processing shown in FIG. 60 the control portion 62 functions as an analysis means.

First, the control portion 62 of the hall conserver 60 sums data as to one gaming machine unit 1, based on the data described in the game playing status database 66 (refer to FIG. 14B) (step S1011). Since this processing is the same as the processing in step S1001 shown in FIG. 58, a description thereof is omitted.

Next, the control portion 62 of the hall conserver 60 extracts a period of normal game playing state, a period of bonus game, and a period of the play of a game other than normal game after bonus, from the slump graph SG (step S1012). The period of normal game playing state is equivalent to a series of period in which decrease trend of difference number is continuous. The period of bonus game is equivalent to a series of period in which increase tend of difference number is continuous. The state of the play of a game other than normal game after bonus is equivalent to a series of period in which increase trend of difference number is continuous.

For example, if the period of normal game playing state, the period of bonus game, and the period of the play of a game other than normal game after bonus are extracted as a series of period from the slump graph SG shown in FIG. 59 (*a*), the extracted period is as shown in FIG. 61 (*a*). In FIG. 61 (*a*), NP$_1$ to NP$_3$ is the period of normal game playing state; BP$_1$ to BP$_4$ each are the period of bonus game, and EP$_1$ and EP$_3$ each are the period of the state of the play of a game other than normal game after bonus. While the normal game playing state NP2 is not a series of period in which either one of increase trend and decrease trend of difference number is continuous in the slump graph SG, this is caused by the fact that the period employed to compute difference number in the slump graph SG is relatively short. In examples shown in FIG. 60 and FIG. 61, the period of normal game playing state, the period of bonus game, and the period obtained by combining bonus game and a game playing state which is different from a normal game state subsequent to the bonus game are employed to compute difference number, and thus, the normal game playing state $NP_2$ is a series of period in which decrease trend of difference number is continuous.

Next, the control portion 62 of the hall conserver 60 combines the period of the state of the play of a game other than normal game after bonus with the period of bonus game (step S1013). In the slump graph SG shown in FIG. 61 (*a*), from among a series of period $BP_1$ to $BP_4$, $EP_1$, $EP_3$, and $NP_1$ to $NP_3$ extracted from step S1013, the state of the play of a game other than normal game after bonus $EP_1$ and $EP_3$ is combined with bonus games $BP_1$ and $BP_3$ that occur previously.

Next, the control portion 62 of the hall conserver 60 combines the periods of bonus game which are adjacent to each other at special period or at intervals of the number of games played or less (step S1014).

In the slump graph SG shown in FIG. 61 (*a*), the period $BP_1+EP_1$ of bonus game and the period $BP_2$ of bonus game are adjacent to each other while the normal game playing state $NP_1$ is sandwiched. In addition, the period $BP_2$ of bonus game and the period $BP_3$ and $EP_3$ of bonus game are adjacent to each other while the normal game playing state $NP_2$ is sandwiched. Further, the period $BP_3+EP_3$ of bonus game and the $BP_4$ of bonus game are adjacent to each other while the normal game playing state $NP_3$ is sandwiched. Among the normal game playing states $NP_1$ to $NP_3$, a special period or a period corresponding to that of the number of games played are normal game playing states $NP_1$ and $NP_3$. Therefore, the control portion 62 combines the period $BP_1+EP_1$ of bonus game, the normal game playing state $NP_1$, and the period $BP_2$ of bonus game with each other. In addition, the control portion 62 combines the period $BP_3+EP_3$ of bonus game, the normal game playing state $NP_3$, and the period $BP_4$ of bonus game with each other.

By means of the processing leading up to step S1014, the slump graph SG is divided into a period of $BP_1+EP_1+NP_1+BP_2$ of bonus game, the period $NP_2$ of normal game playing state, and a period $BP_3+EP_3+NP_3+BP_4$ of bonus game.

Next, among from the periods obtained in the processing leading up to the step S1014, the control portion 62 of the hall conserver 60 extracts from a period obtained in the processing leading up to step S1014, a series of period (variable trend continuation period CP) in which an absolute value of difference number in the entire period is a predetermined reference number or more (step S1015). For example, all the periods obtained by means of the processing leading up to step S1014, i.e., $BP_1+EP_1+NP_1+BP_2$ and $NP_2$, $BP_3+EP_3+NP_3+BP_4$, reach a predetermined reference value, and therefore, they are extracted as variable trend continuation periods $CP_1$ to $CP_3$ as in a slump graph SG' shown in FIG. 61 (*b*). When the processing operations of steps S1011 to S1015 are executed, the control portion 62 functions as a variation trend continuation period extraction means.

Subsequently, the control portion 62 of the hall conserver 60 stores the information related variable trend continuation period, extracted by means of step S1015, in a hard disk 65, in association with gaming machine unit identification information (step S1016). The information relates to variable trend continuation period is not limited in particular, and for example, can include length of variable trend continuation period (time and/or number of games), difference number in variation trend continuation period, and generation time and completion time of variation trend continuation period or the like. In addition, in a case where the variation trend continuation period of a period of bonus game, information related to period included in variation trend continuation period (such as the presence or absence of the state of the play of a game other than normal game after bonus) and the presence or absence of normal game playing state or the like) may be further stored as information related to variation trend continuation period.

Next, the control portion 62 of the hall conserver 60 performs display of information related to variable trend continuation period, based on the information related to variable trend continuation period, stored in the hard disk 65 (step S1017). Afterwards, this routine is completed.

The processing operations as shown in FIG. 58 to FIG. 61 are performed as to each gaming machine unit 1, thereby making it possible to analyze characteristics by device type and characteristics by settings or the like, for example. Next, data actually acquired by means of the abovementioned game playing information integration network system INS will be described with reference to FIG. 62 to FIG. 73.

Figure 62:
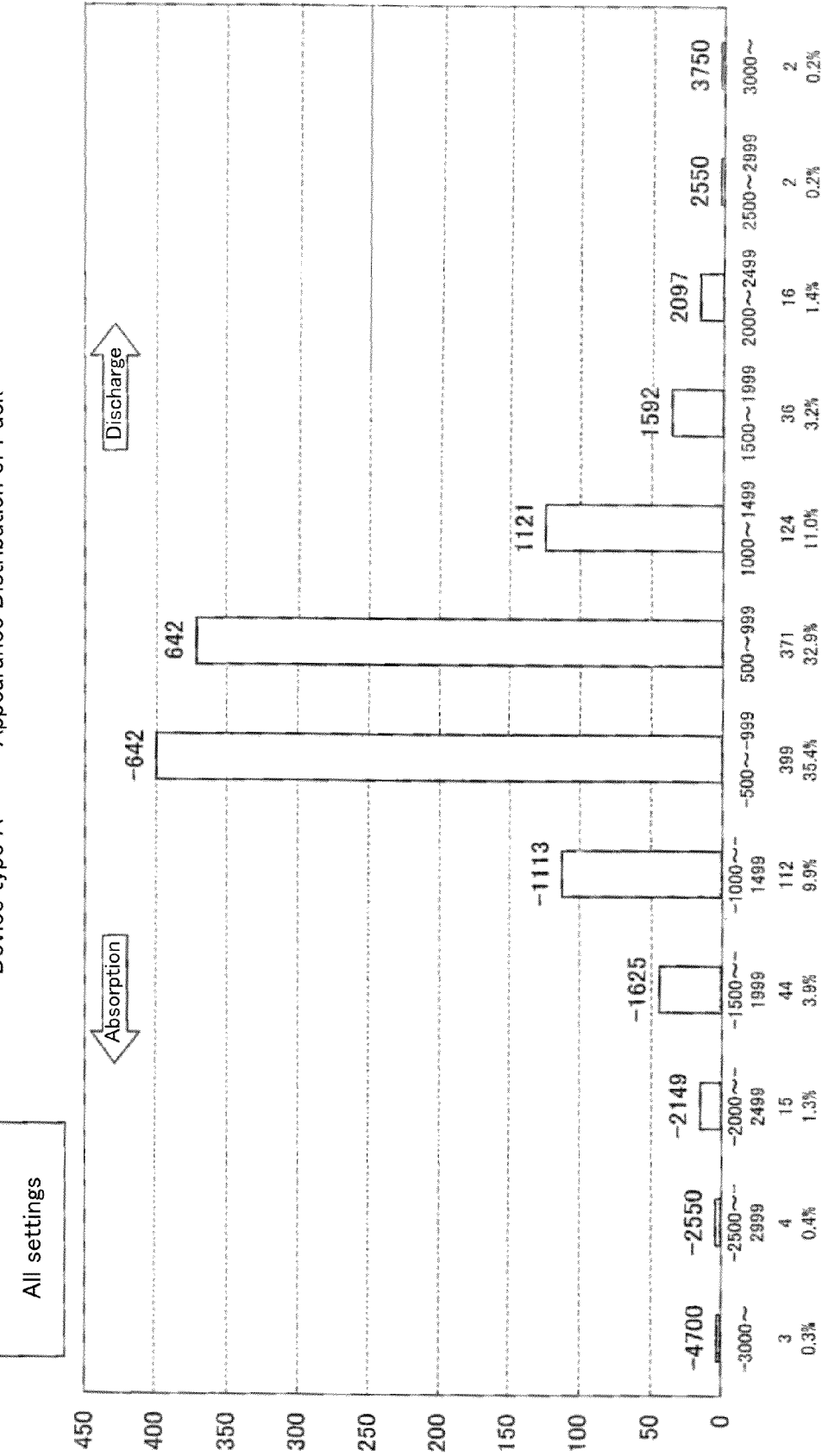
FIG. 62 is a graph depicting appearance distribution of variation trend continuation period (so called "pack") in gaming machines of device type A (all of settings 63 to 6).
Figure 63:
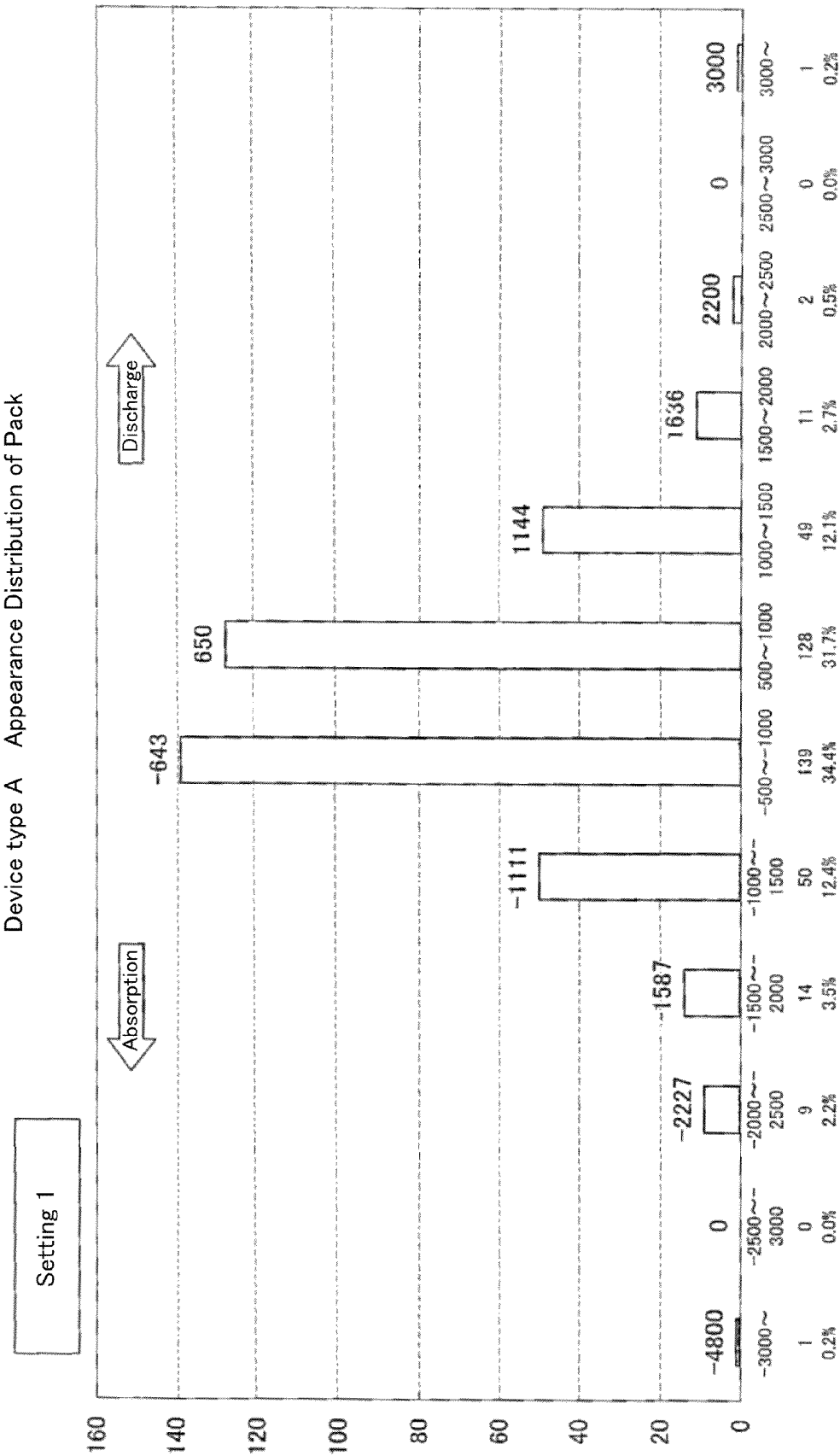
FIG. 63 is a graph depicting appearance distribution of variation trend continuation period in gaming machines of device type A (setting 1).
Figure 64:
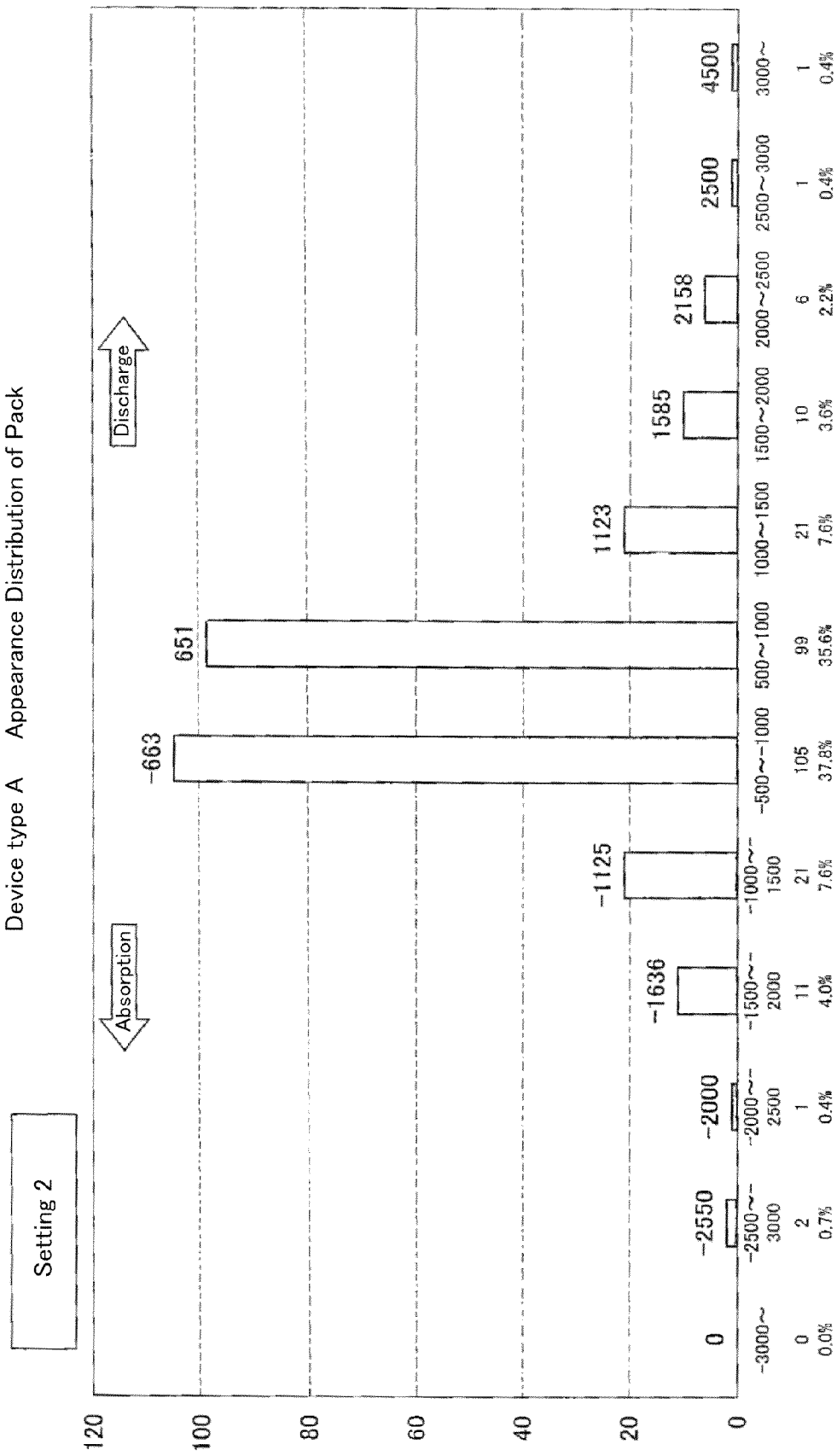
FIG. 64 is a graph depicting appearance distribution of variation trend continuation period in gaming machines of device type A (setting 2).
Figure 65:
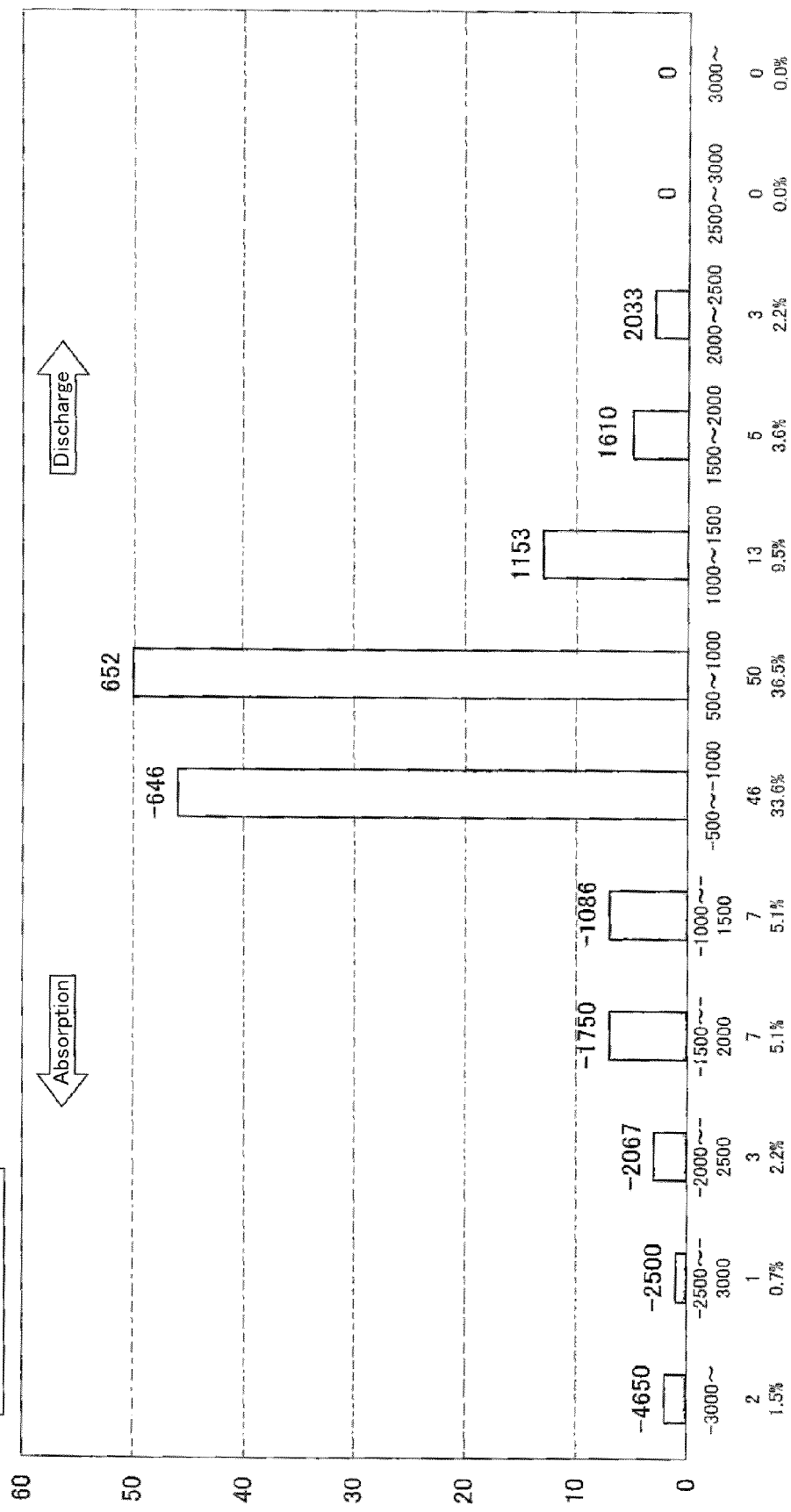
FIG. 65 is a graph depicting appearance distribution of variation trend continuation period in gaming machines of device type A (setting 3).
Figure 66:
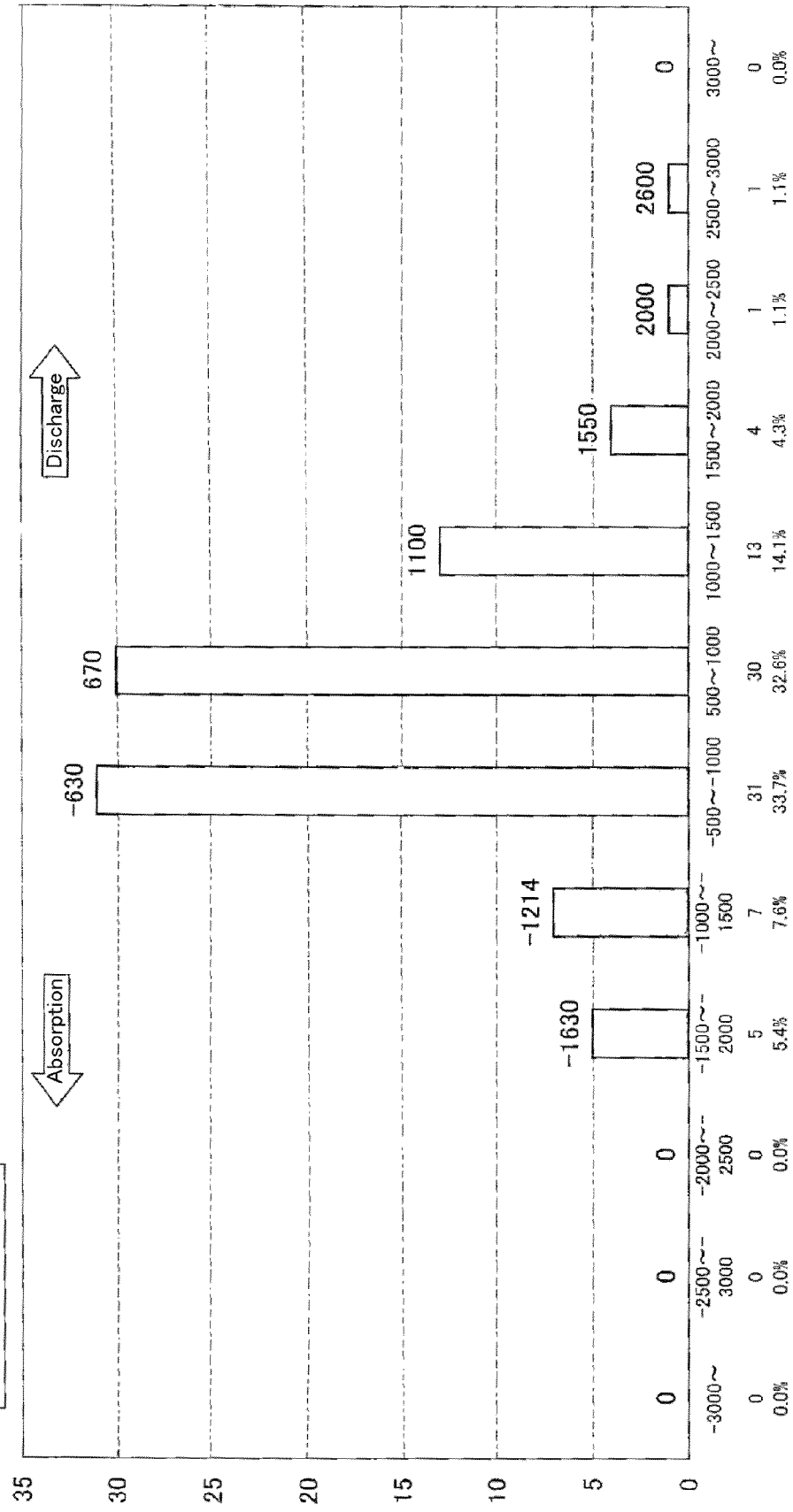
FIG. 66 is a graph depicting appearance distribution of variation trend continuation period in gaming machines of device type A (setting 4).
Figure 67:
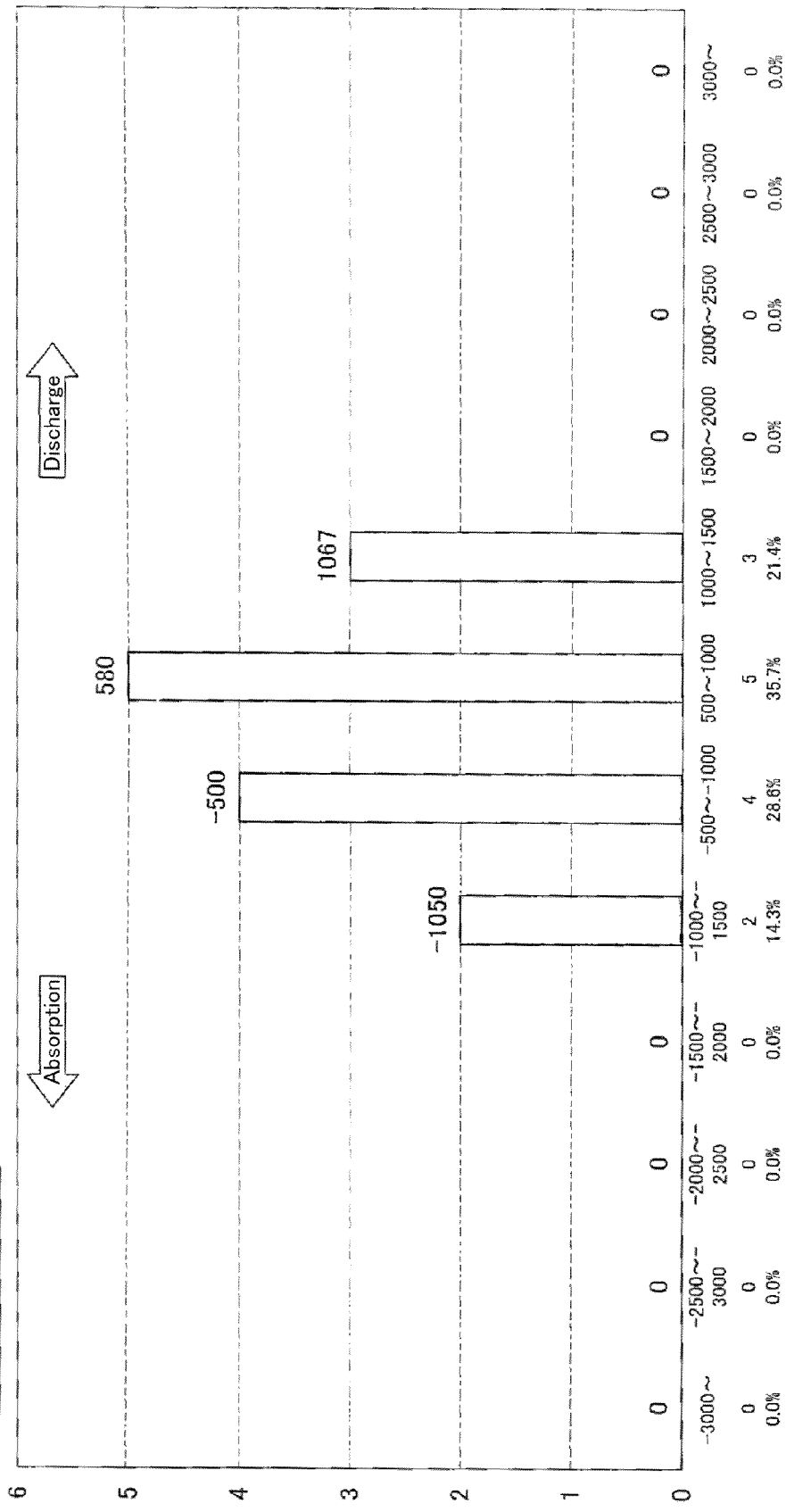
FIG. 67 is a graph depicting appearance distribution of variation trend continuation period in gaming machines of device type A (setting 5).
Figure 68:
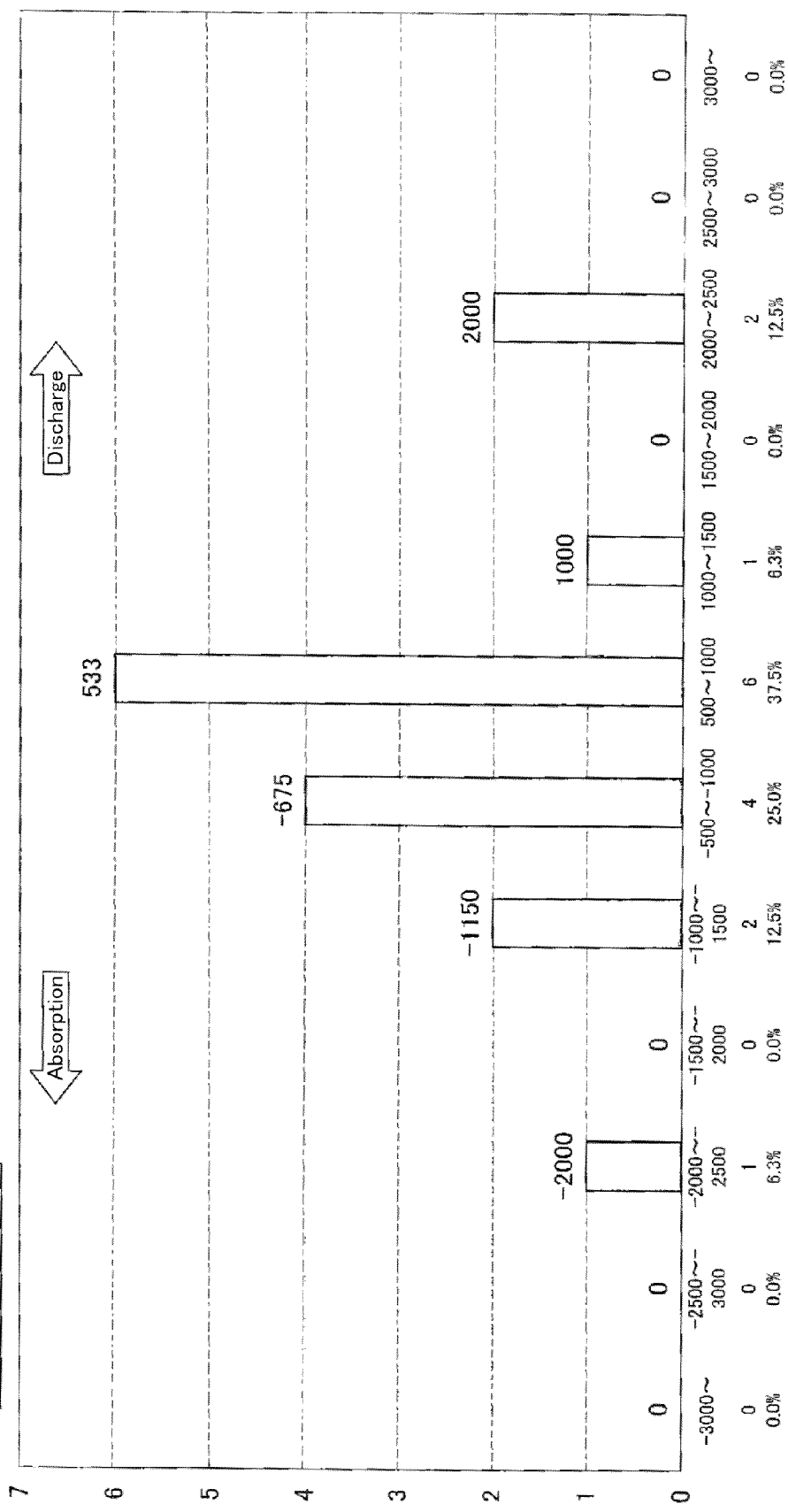
FIG. 68 is a graph depicting appearance distribution of variation trend continuation period in gaming machines of device type A (setting 6).

FIG. 62 is a graph depicting appearance distribution of variation trend continuation period (so called "pack") in gaming machines of device type A (all of settings 1 to 6). FIG. 63 is a graph depicting appearance distribution of variation trend continuation period in gaming machines of device type A (setting 1). FIG. 64 is a graph depicting appearance distribution of variation trend continuation period in gaming machines of device type A (setting 2). FIG. 65 is a graph depicting appearance distribution of variation trend continuation period in gaming machines of device type A (setting 3). FIG. 66 is a graph depicting appearance distribution of variation trend continuation period in gaming machines of device type A (setting 4). FIG. 67 is a graph depicting appearance distribution of variation trend continuation period in gaming machines of device type A (setting 5). FIG. 68 is a graph depicting appearance distribution of variation trend continuation period in gaming machines of device type A (setting 6).

As shown in FIG. 62, if all items of data of settings 1 to 6 are summed as to device type A, distribution of variation trend continuation period between absorption (in a case where difference number is minus) and discharge (in a case where difference number is plus) is substantially identical, and a pack of which difference number is 500 to 999 is the greatest.

The distribution in the graph shown in FIG. 62 is a summation of data in the graphs depicted in FIG. 63 to FIG. 68. As shown in FIG. 63 to FIG. 68, the settings are different from each other in distribution of variable trend continuation period. Specifically, as the setting increases, the number of variation trend continuation period of discharge increases.

Figure 69:
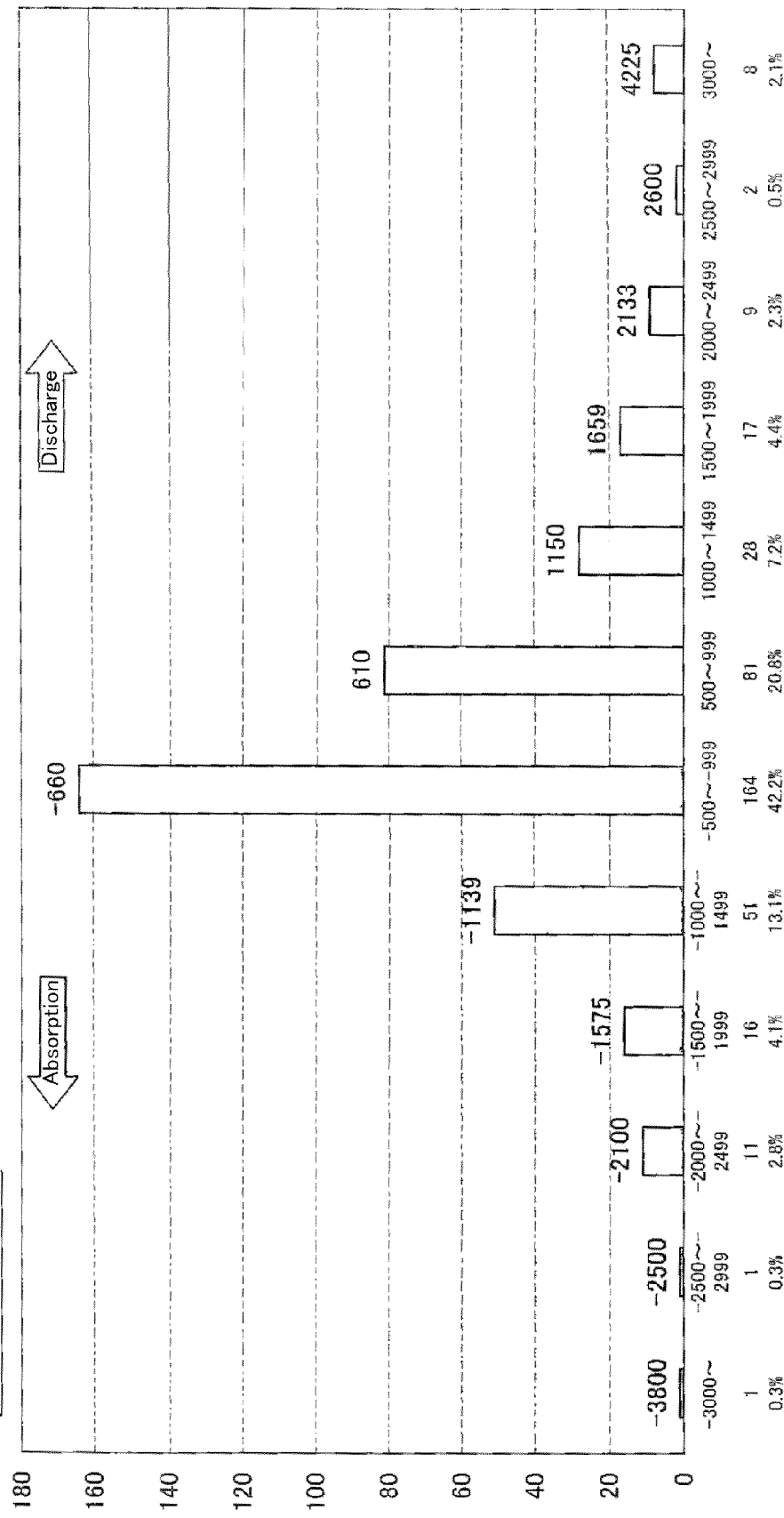
FIG. 69 is a graph depicting appearance distribution of variation trend continuation period in gaming machines of device type B (all of settings 1 to 6).
Figure 70:
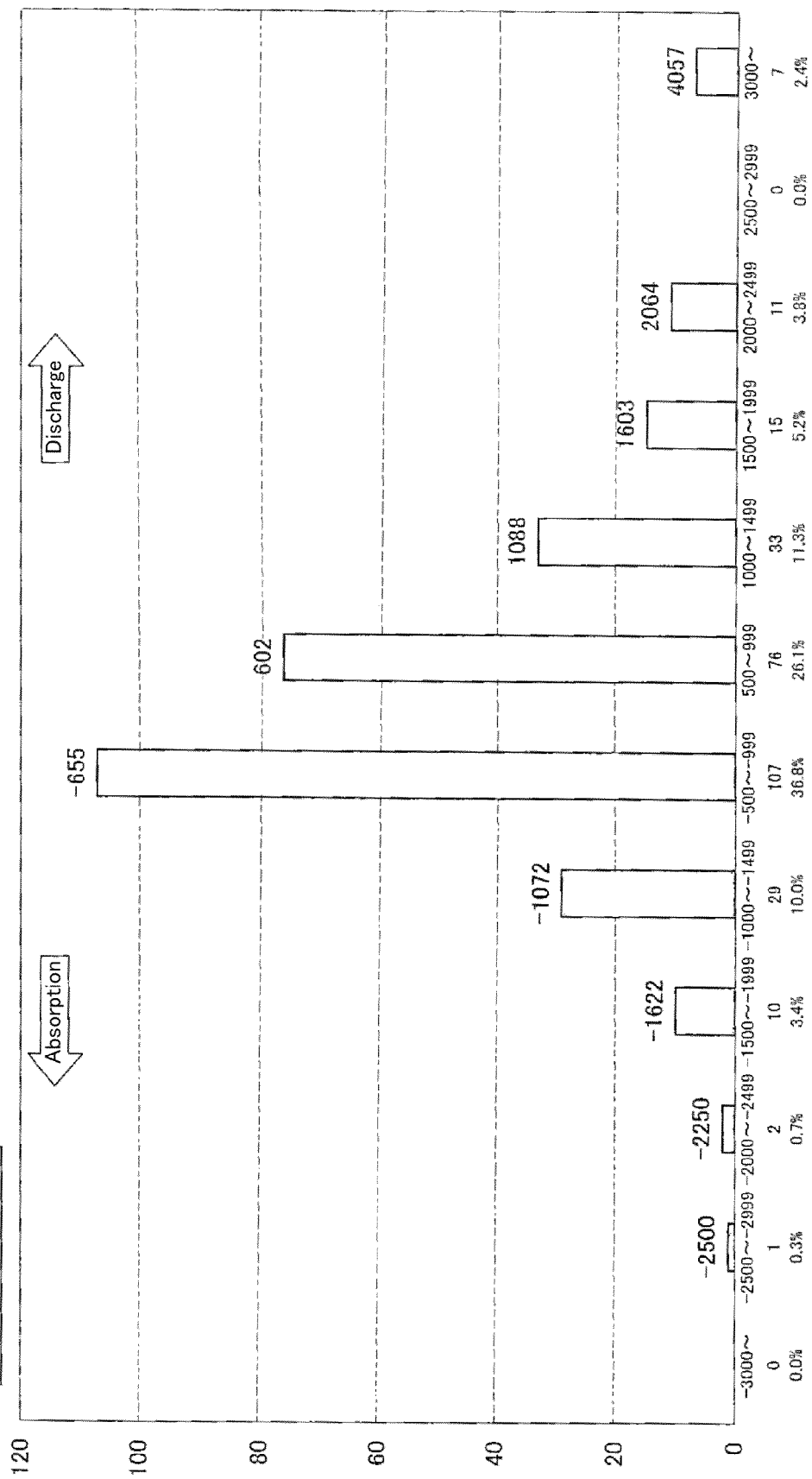
FIG. 70 is a graph depicting appearance distribution of variation trend continuation period in gaming machines of device type C (all of settings 1 to 6).
Figure 71:
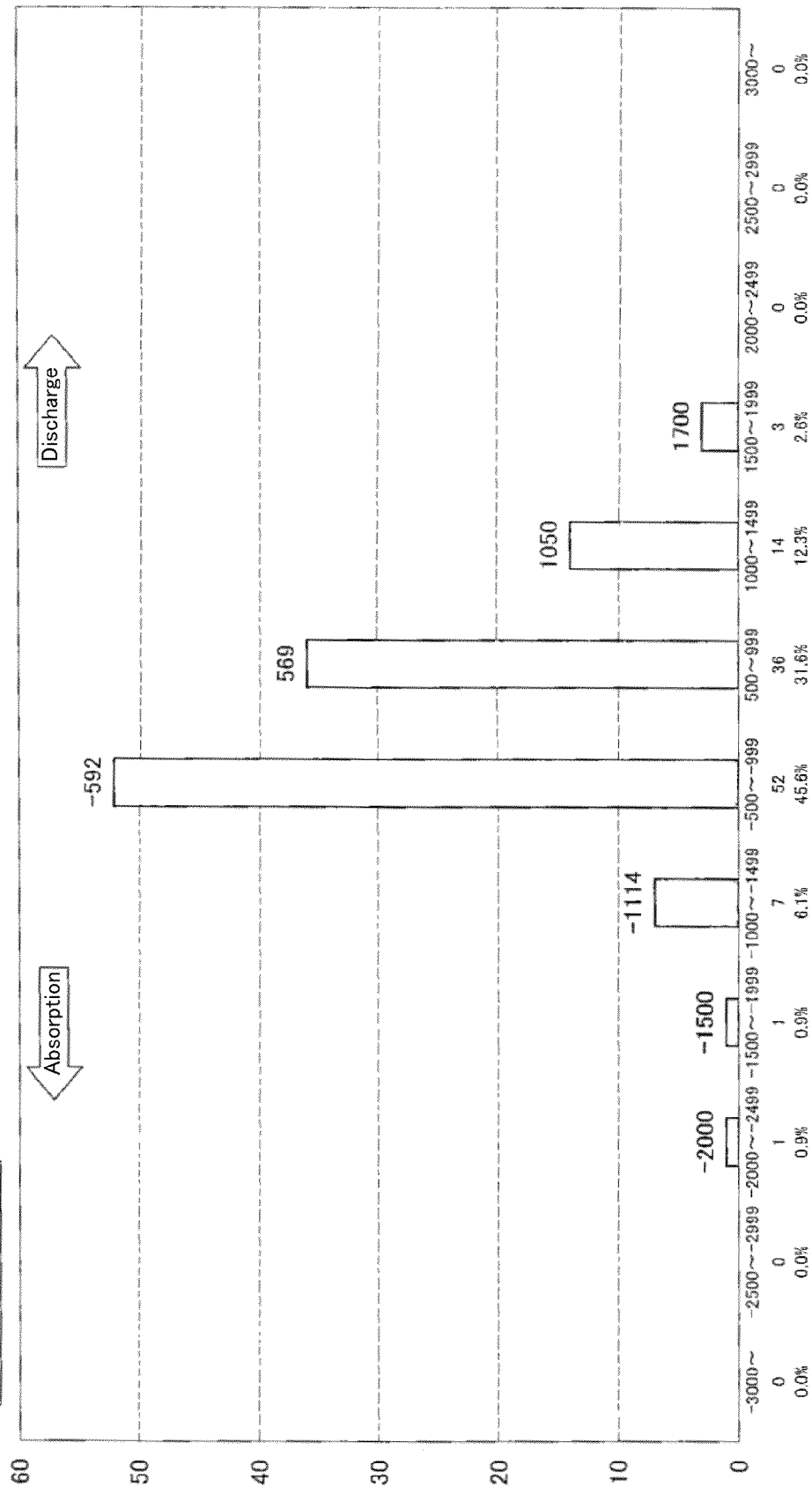
FIG. 71 is a graph depicting appearance distribution of variation trend continuation period in gaming machines of device type D (all of settings 1 to 6).
Figure 72:
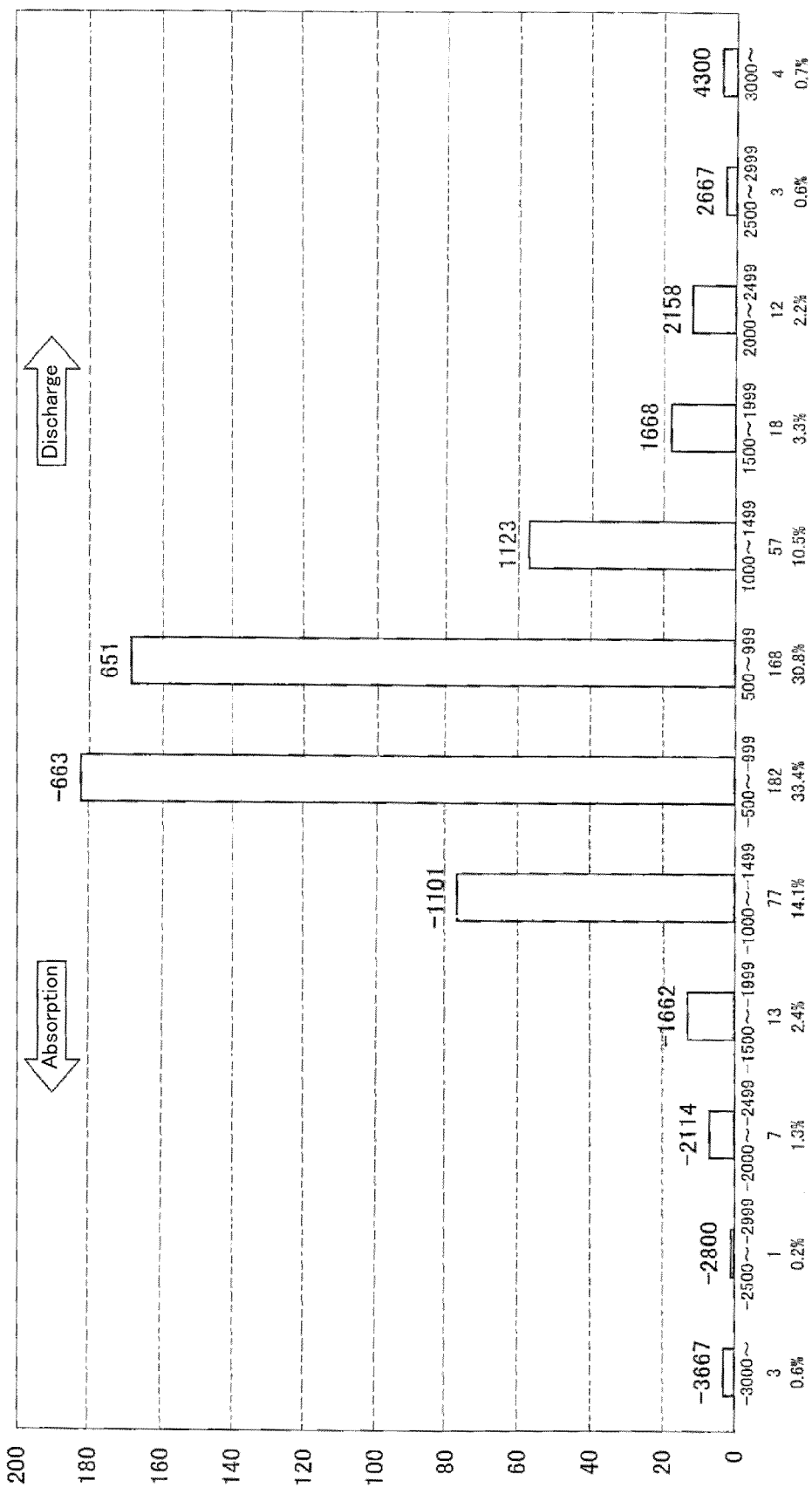
FIG. 72 is a graph depicting appearance distribution of variation trend continuation period in gaming machines of device type E (all of settings 1 to 6).
Figure 73:
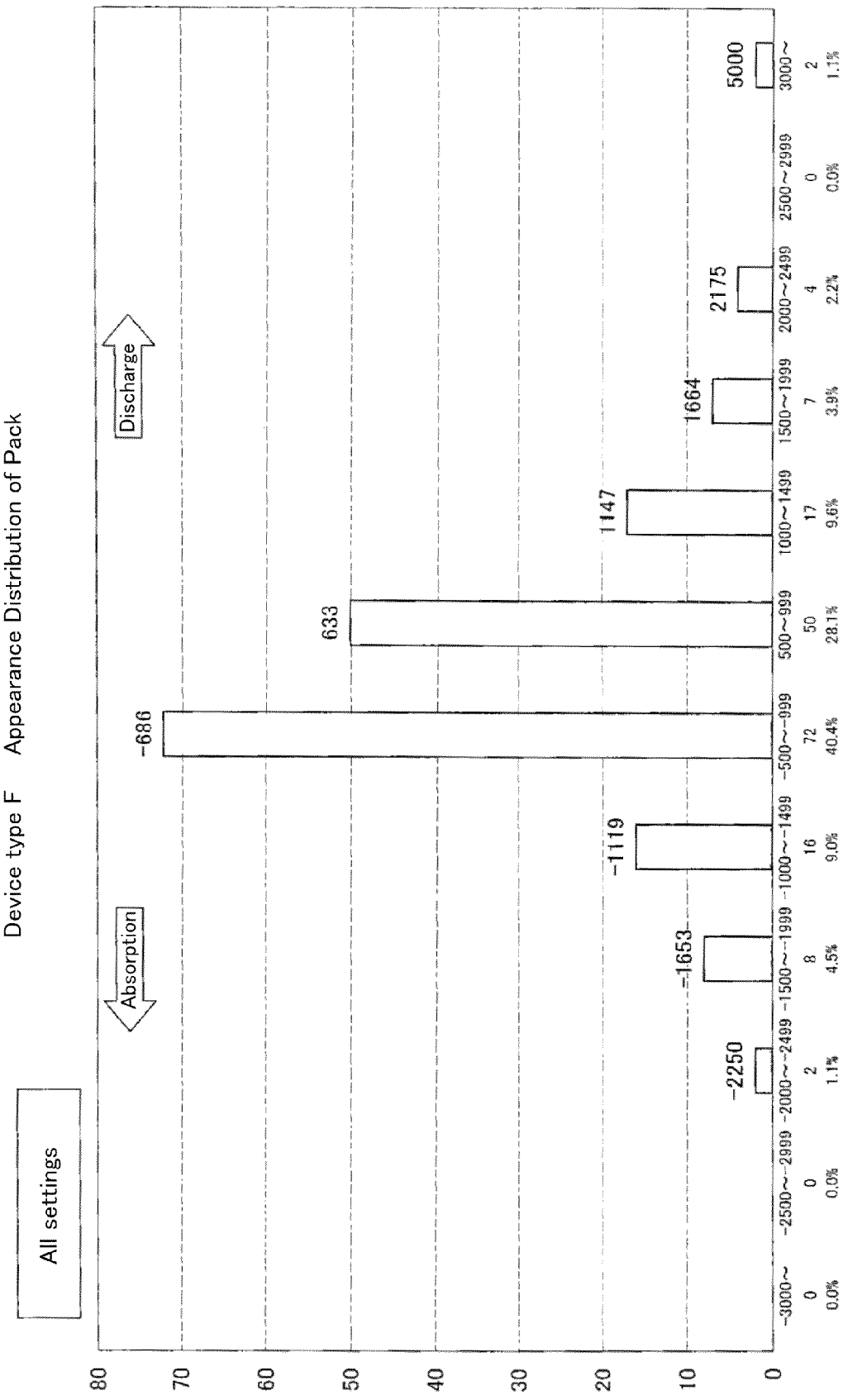
FIG. 73 is a graph depicting appearance distribution of variation trend continuation period in gaming machines of device type F (all of settings 1 to 6).

FIG. 69 is a graph depicting appearance distribution of variation trend continuation period in gaming machines of device type B (all of settings 1 to 6). FIG. 70 is a graph depicting appearance distribution of variation trend continuation period in gaming machines of device type (all of settings 1 to 6). FIG. 71 is a graph depicting appearance distribution of variation trend continuation period in gaming machines of device type D (all of settings 1 to 6). FIG. 72 is a graph depicting appearance distribution of variation trend continuation period in gaming machines of device type E (all of settings 1 to 6). FIG. 73 is a graph depicting appearance distribution of variation trend continuation period in gaming machines of device type F (all of settings 1 to 6).

In comparison of the graphs shown in FIG. 62 and FIG. 69 to FIG. 73, characteristics of the respective device types A to F obtained from actually measured values can be grasped. Specifically, for example, the following characteristics can be grasped.

Device type B has many more variation trend continuation periods of absorption than device type A.

Device type C has many more variation trend continuation periods of discharge of which difference number is 3,000 or more.

In device type D, there hardly takes place variation trend continuation period of which difference number is great.

In device type E, there likely takes place variation trend continuation period of which difference number is great.

In device type F, there hardly takes place variation trend continuation period for absorption of which difference number is great, whereas there likely takes place variation trend continuation period for absorption of which difference number is small. In addition, there can also occur variation trend continuation period for discharge of which difference number is great.

Therefore, according to the game playing information integration system IS, the characteristics of device types as described above can be qualitatively and quantitatively grasped by analyzing the variation trend continuation period. Therefore, in gaming facility, for example, in a case where gaming machines of device type is popular, it is possible to install a device type of which characteristics are similar to those of device type F when new device type is installed in the future.

While the variation trend continuation period has been described so far, analysis of the characteristics of gaming machines in the present invention is not limited to extraction of variation trend continuation period, and for example, can include analysis of variation pattern, for example.

(Analysis of Variation Pattern)

Figure 74:
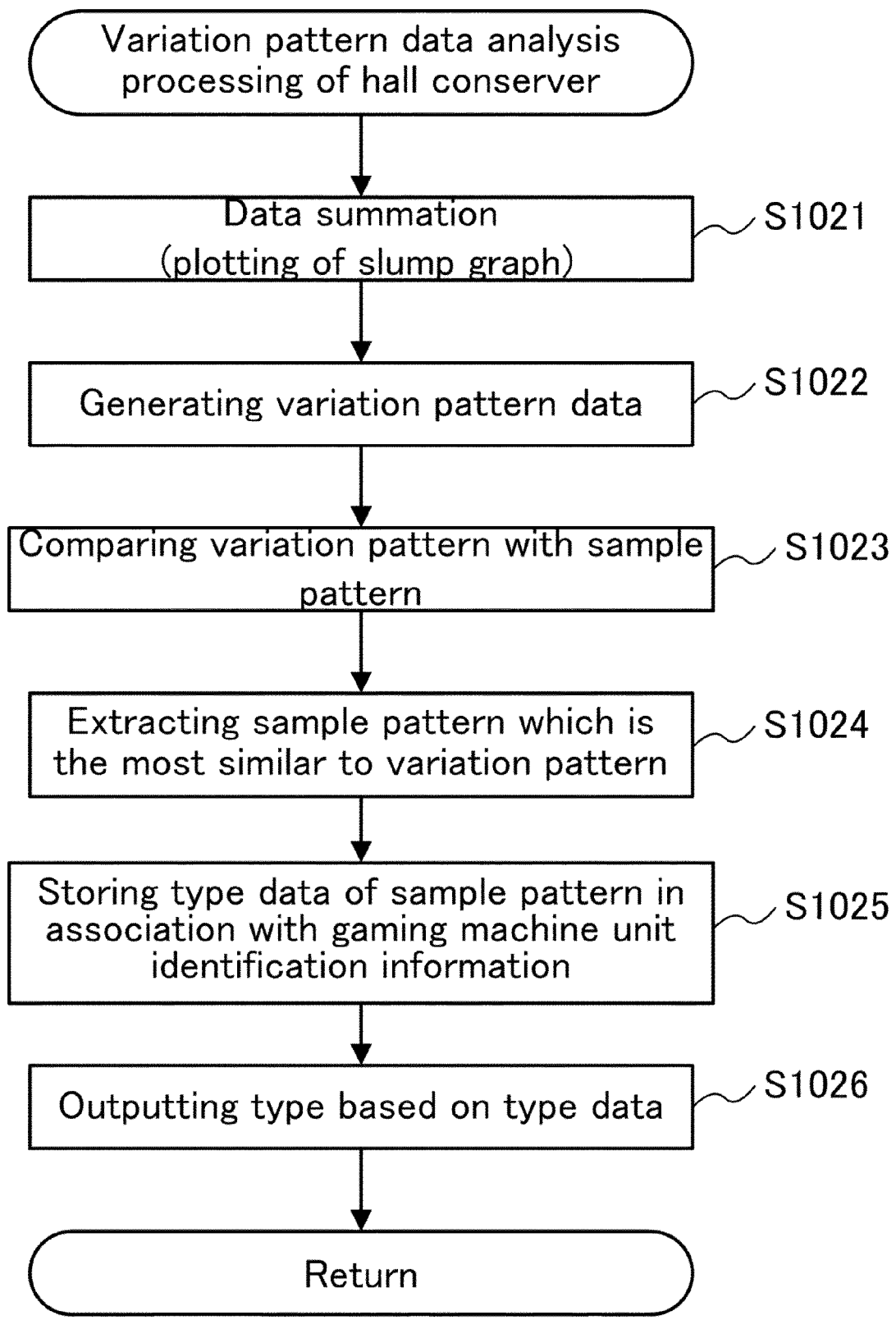
FIG. 74 is a flowchart showing variation pattern data analysis processing executed in the hall conserver shown in FIGS. 1A to 1D.

FIG. 74 is a flowchart showing variation pattern data analysis processing executed in the hall conserver shown in FIGS. 1A to 1D.

Figure 76:
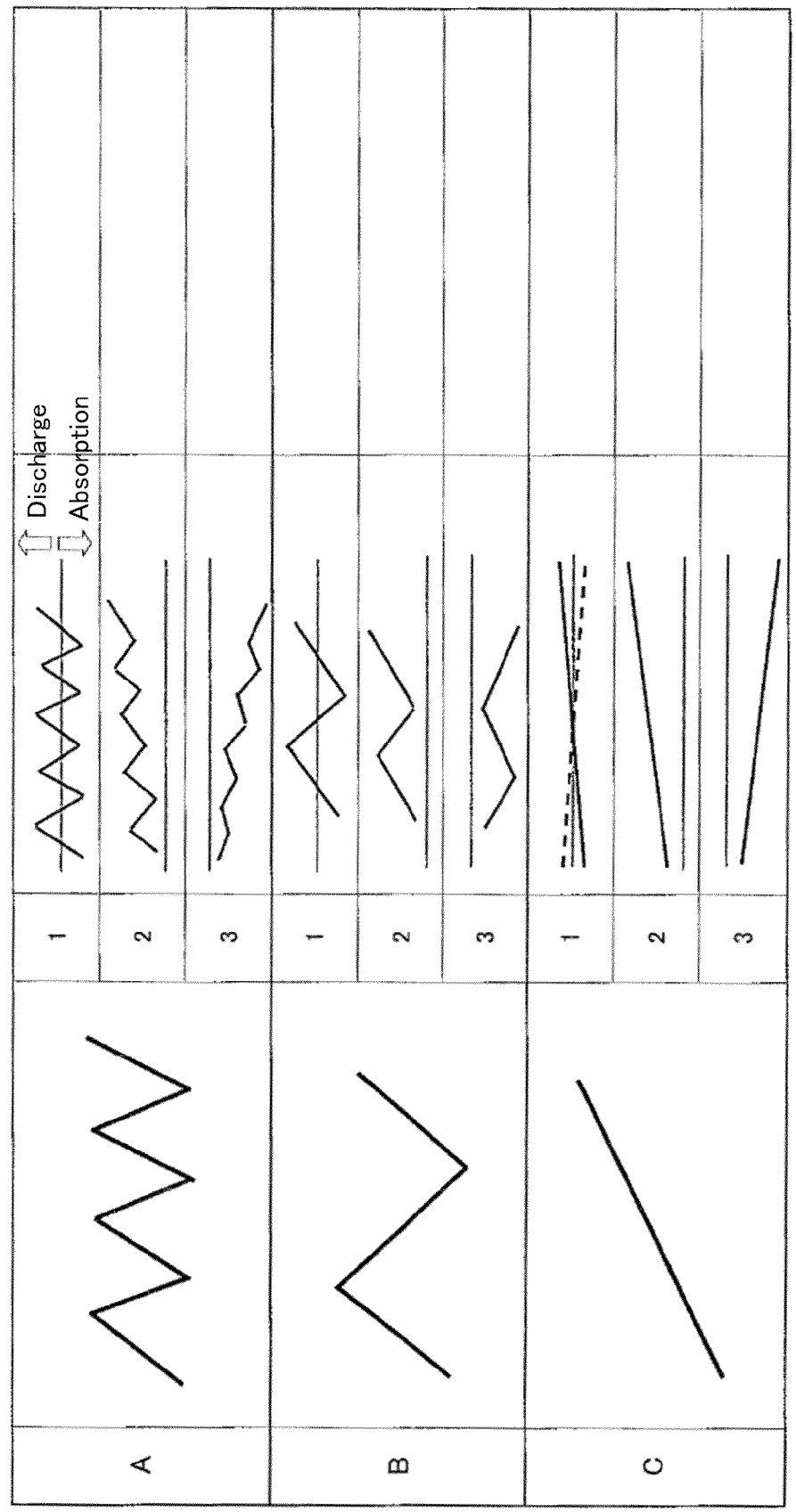
FIG. 76 is a table showing a slump graph waveform type.

FIG. 75 (*a*) and FIG. 75 (*b*) are slump graphs in gaming machines, respectively. FIG. 76 is a table showing slump graph waveform types.

First, the control portion 62 of the hall conserver 60 sums data as to one gaming machine unit 1, based on the data stored in the game playing status database 66 (refer to FIG. 14B (step S1021). The processing is equivalent to step S1001 of the processing shown in FIG. 58. As shown in FIG. 75 (*a*) and FIG. 75 (*b*), in a slump graph a vertical axis indicates difference number, and a horizontal axis indicates the number of game. Such a slump graph itself is conventionally publicly known.

Next, the control portion 62 generates variation pattern data, based on the slump graph obtained by means of step S1021 (step S1022). The variation pattern data is data for comparing sample data to be described later. That is, the slump graph obtained by means of step S1021 entails a problem such as no limitation of length (period) provided, for example, and however, in this situation it is difficult to compare with sample data. Therefore, in step S1022, a plurality of variation pattern data which is capable of being compared with sample data is generated from one slump data. At this time, the control portion 62 functions as a pattern data generation means.

Next, the control portion 62 compares the variation pattern data generated in step S1022 with the sample data stored in advance in the hard disk 65 (step S1023).

The sample data stored in advance in the hard disk 65 can include data shown in FIG. 76, for example. The sample data shown in FIG. 76 indicates waveforms of a slump graph in a predetermined period of time, and as shown in FIG. 76, the waveforms of 9 types indicate different classes of waveforms which are different from each other. In the table shown in FIG. 76, waveform types are classified into three types of class A, class b, and class C. Class A is a waveform pattern in which difference number varies slightly in a stepwise manner. Class B is a waveform pattern in which difference number varies so that a comparatively large wave is drawn. Class C is a linear waveform pattern.

Specifically, period or the number of games is set for waveform pattern in each waveform type. In class A, there are comparatively changes of variation trend in the period or the number of games. In class B, there are comparatively less changes of variation trend in the period or the number of games. In class C, there is no change of variation trend in the period or the number of games, and the trend is continuous. The term "change of variation trend" used here designates switch between increase trend and decrease trend. It is to be noted that the term does not designate a change to an extent of trend in the same trend.

Classes A to C are further classified into the following three categories, and are entirely classified into nine categories.

Class 1 indicates no variation state (including a case in which no change entirely takes place while increase trend and decrease trend repeated).

Class 2 indicates increase trend (including a case in which an increase entirely takes place while increase trend and decrease tread are repeated).

Class 3 indicates decrease trend (including a case in which a decrease entirely takes place while increase trend and decrease trend are repeated).

In the game playing information integration system IS, the abovementioned variation patterns are employed as sample patterns, and evaluation of actual variation pattern is performed. The sample patterns are stored as sample data in the hard disk 65 of the hall conserver 60 in the game playing information integration system IS, for example. The names of classes A to C and 1 to 3 are classes, and class data indicating classes is also stored in the hard disk 65 in association with the sample data.

In addition, in step S1023, comparison between variation pattern and sample pattern is performed focusing on, for example, which of no change (class 1), increase trend (class 2), and decrease trend (class 3) the entire variation trend falls under, or alternatively, which of none (class C), 1 to 4 times (class B), and 5 times or more (class A) the number of times of repetition between increase tend and decrease trend falls under.

Next, the control portion 62 performs extraction of a sample pattern which is the most similar to a variation pattern (step S1024). In the present invention, a plurality of variation patterns are generated from one slump graph SG, and comparison between each variation pattern and sample pattern is performed. Therefore, in step S1024, a plurality of sample patterns are extracted from one slump graph SG. At this time, the control portion 62 functions as a sample data extraction means.

Next, the control portion 62 stores class data of sample pattern in association with gaming machine unit identification information (step S1025). As described above, a plurality of sample patterns are extracted, and thus, a plurality of class data are associated with gaming machine unit identification information. For example, class data associated with gaming machine unit identification information and its related number such as 10 items for class A1 or 5 items for class A2 are stored. Herein, variation pattern data as actually measured data may be stored as sample data in the hard disk 65.

Next, the control portion 62 performs output of class, based on the class data stored in the hard disk 65 (step S1026). At this time, the control portion 62 functions as a class output means. Afterwards, this routine is completed.

The processing shown in FIG. 74 is performed as to each gaming machine unit 1, making it possible to analyze characteristics by device type and characteristics by settings or the like, for example. Next, data actually acquired by means of the game playing information integration network system INS with the use of the abovementioned sample data will be described with reference to FIG. 77.

FIG. 77 is a graph depicting analysis by waveform type in gaming machine of device type A.

According to the graph shown in FIG. 77, in device type A, there are comparatively many cases in which variation pattern falls under class B3 (waveform indicating that an entire decrease takes place while increase trend and decrease trend are repeated so that a comparatively large wave is drawn). In addition, in device type A, class C1 (waveform with no linear variation) does not occur. Further, in device type A, decrease trend is more frequent than increase trend.

In this manner, according to the game playing information integration system IS, the abovementioned characteristics of device type can be qualitatively and quantitatively grasped by analyzing variation pattern of waveform. Therefore, in gaming facility, for example, in a case where gaming machines of device type F are popular, when new device type is introduced in the future, it is possible to introduce device type of which characteristics are similar to those of device type F.

While the embodiment described a case of analyzing variation pattern of waveform, it is to be noted that in the present invention variation pattern is not limited to variation pattern of waveform, and for example, can include appearance pattern of variation trend continuation period or the like. In addition, parameters for quantitatively evaluating appearance pattern of variation trend continuation period can include difference number in variation trend continuation period, appearance number of times of variation trend continuation period in predetermined period of time or in the number of games, and appearance intervals of variation trend continuation period or the like, for example.

(Analysis of Gaming Facility)

Next, in a gaming machine in which the game playing information integration system IS is introduced, there is shown a result obtained by analyzing the gaming facility itself.

FIGS. 78A and 78B are tables showing data related to the number of players and winning rate or the like in shop α.

As shown in FIGS. 78A and 78B, according to the game playing information integration system IS, a variety of data including the number of players or winning rate can be smoothly and precisely obtained. It is to be noted that weather and ambient temperature or the like may be manually input by a manager in gaming facility or may be automatically input via the Internet or the like.

Figure 79:
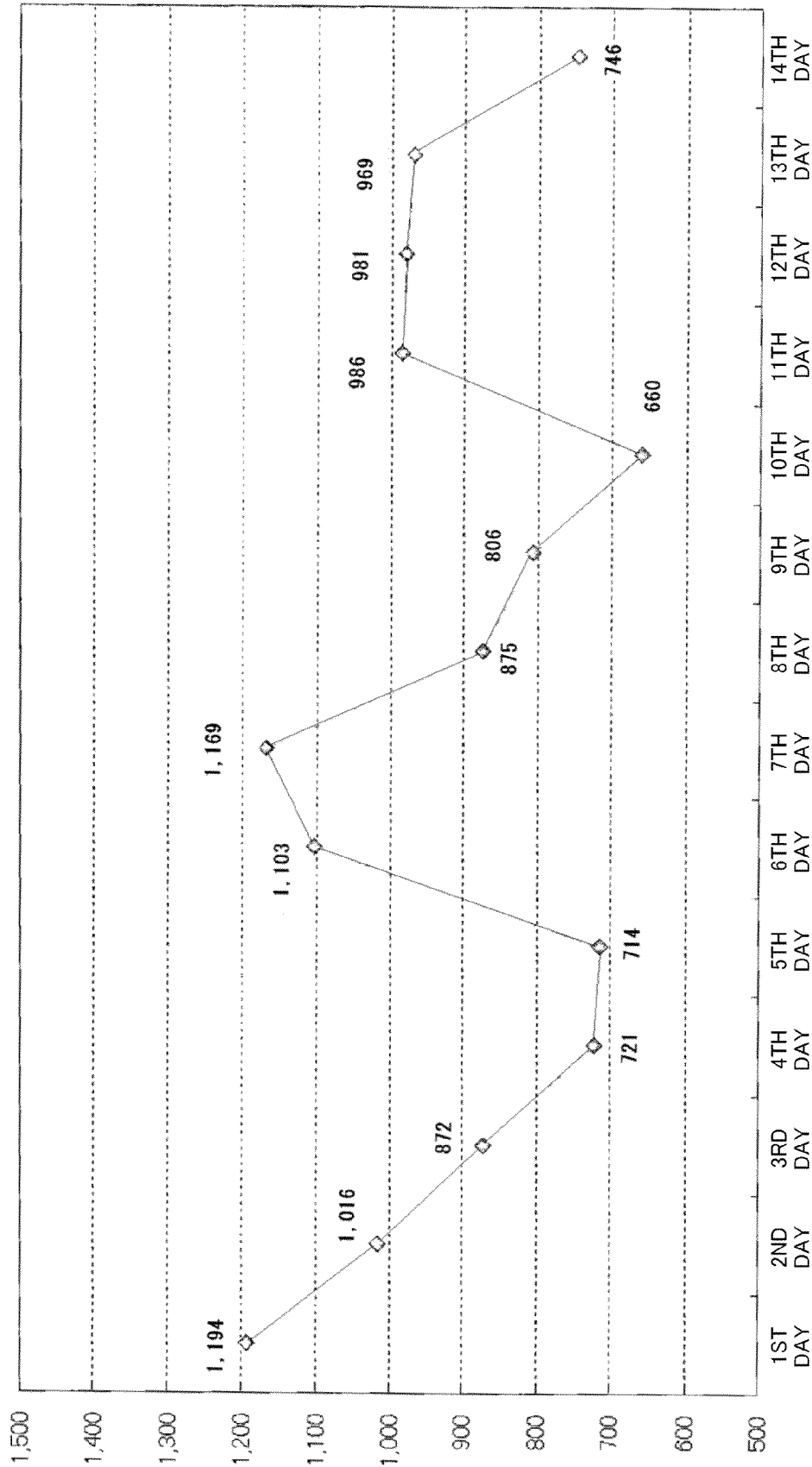
FIG. 79 is a graph depicting data related to an average exchange number of medals in shop α.
Figure 80:
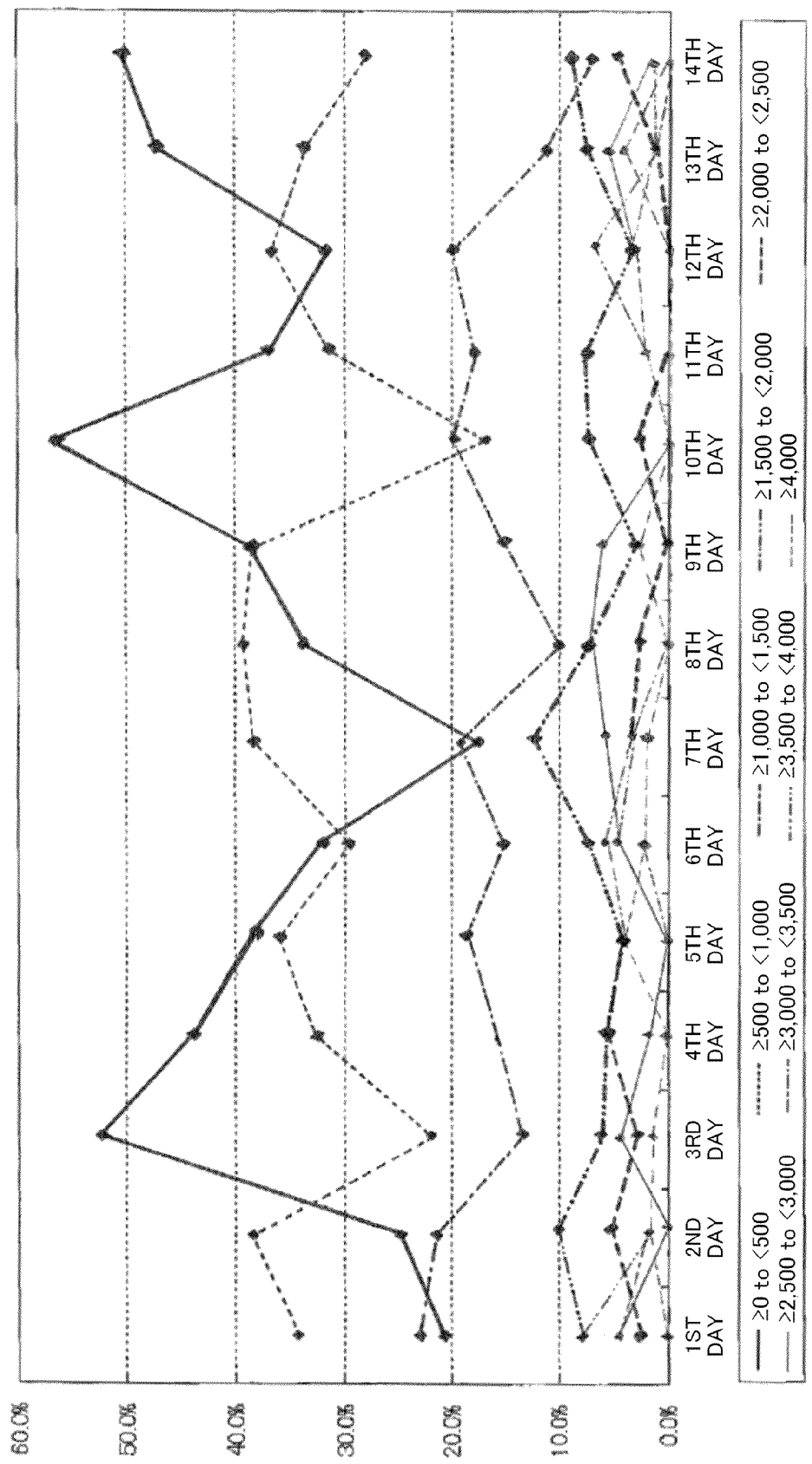
FIG. 80 is a graph depicting metal exchange number distribution by elapse of day in shop α.

In the game playing information integration system IS, the data shown in FIGS. 78A and 78B can be automatically acquired or generated, and the data can be processed and summed as shown in FIG. 79 and FIG. 80, for example.

FIG. 79 is a graph depicting data related to average number of exchange medals in shop α. This graph shows the average number of exchange metals per player.

FIG. 80 is a graph depicting a state of exchange number of medals by elapsed number of days in shop α. This graph shows average number of exchange medals per player by predetermined range by dividing players in predetermined range in accordance with the number of exchange medals.

Figure 81:
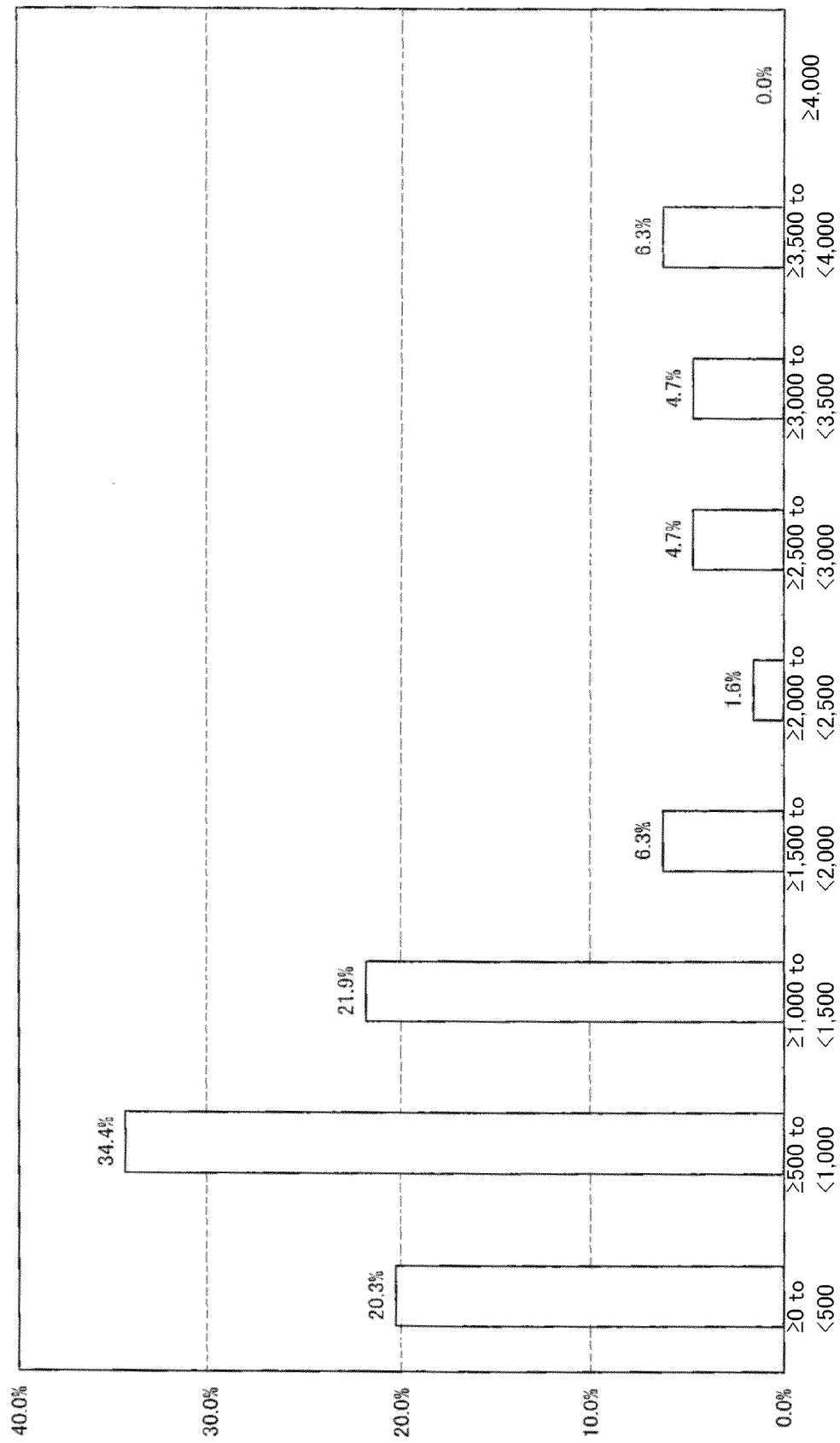
FIG. 81 is a graph depicting medal exchange number distribution by day (first day) in shop α.
Figure 82:
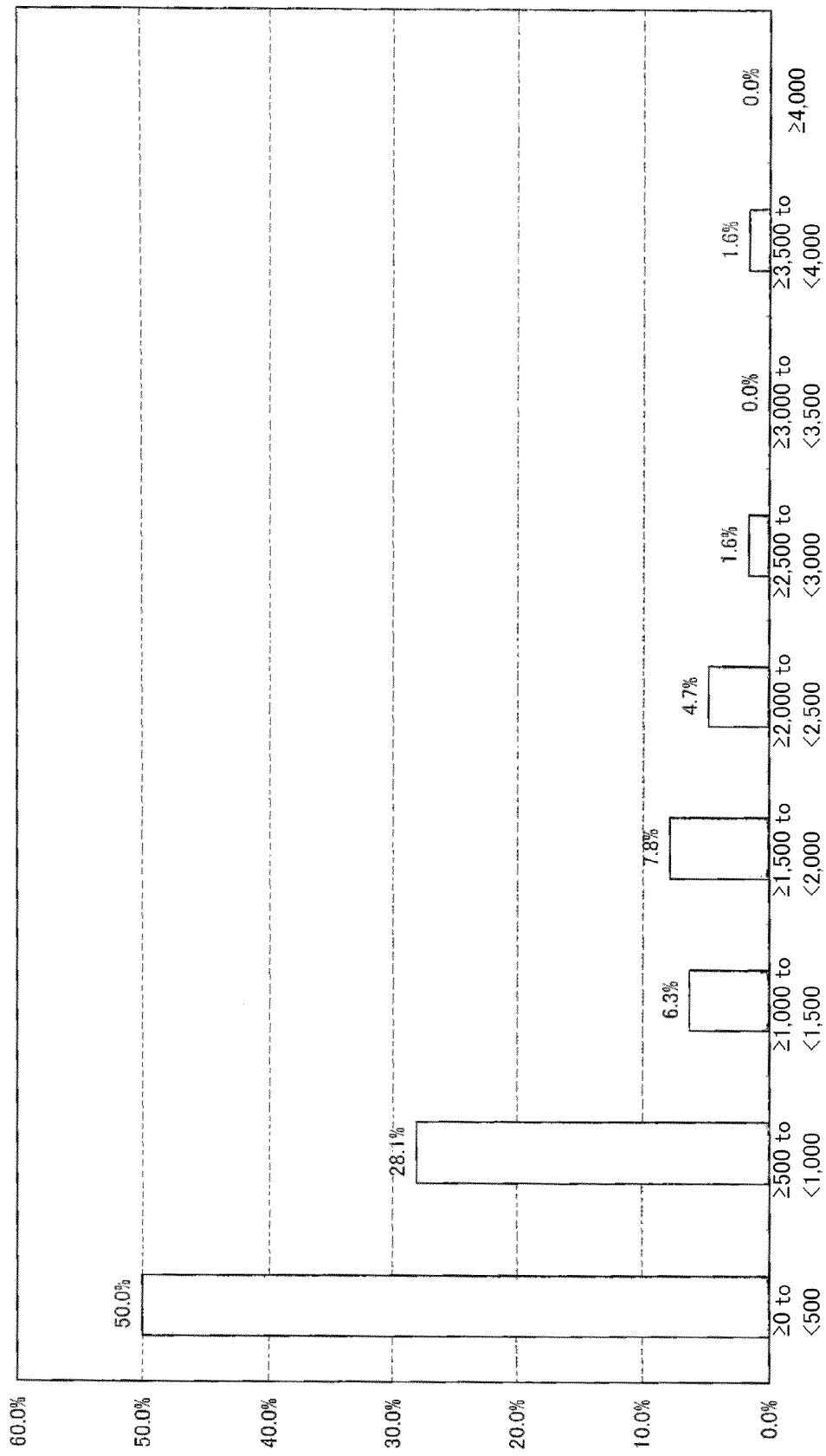
FIG. 82 is a graph depicting medal exchange number distribution by day (last day) in shop α.

FIG. 81 is a graph depicting distribution of the number of exchange metals by day (first day) in shop α. FIG. 82 is a graph depicting distribution of the number of exchange medals by day (last day) in shop α.

In the present specification, the first day designates date when acquisition of data is started by means of the game playing information integration system IS, and device type A is installed as new device type that day. In addition, the last day designates 14 days after starting acquisition of data.

As is evident from comparison between FIG. 81 and FIG. 82, the number of exchanges per player is greater in first day than in last day. According to the game playing information integration system IS, such trend can be quantitatively grasped.

Figure 83:
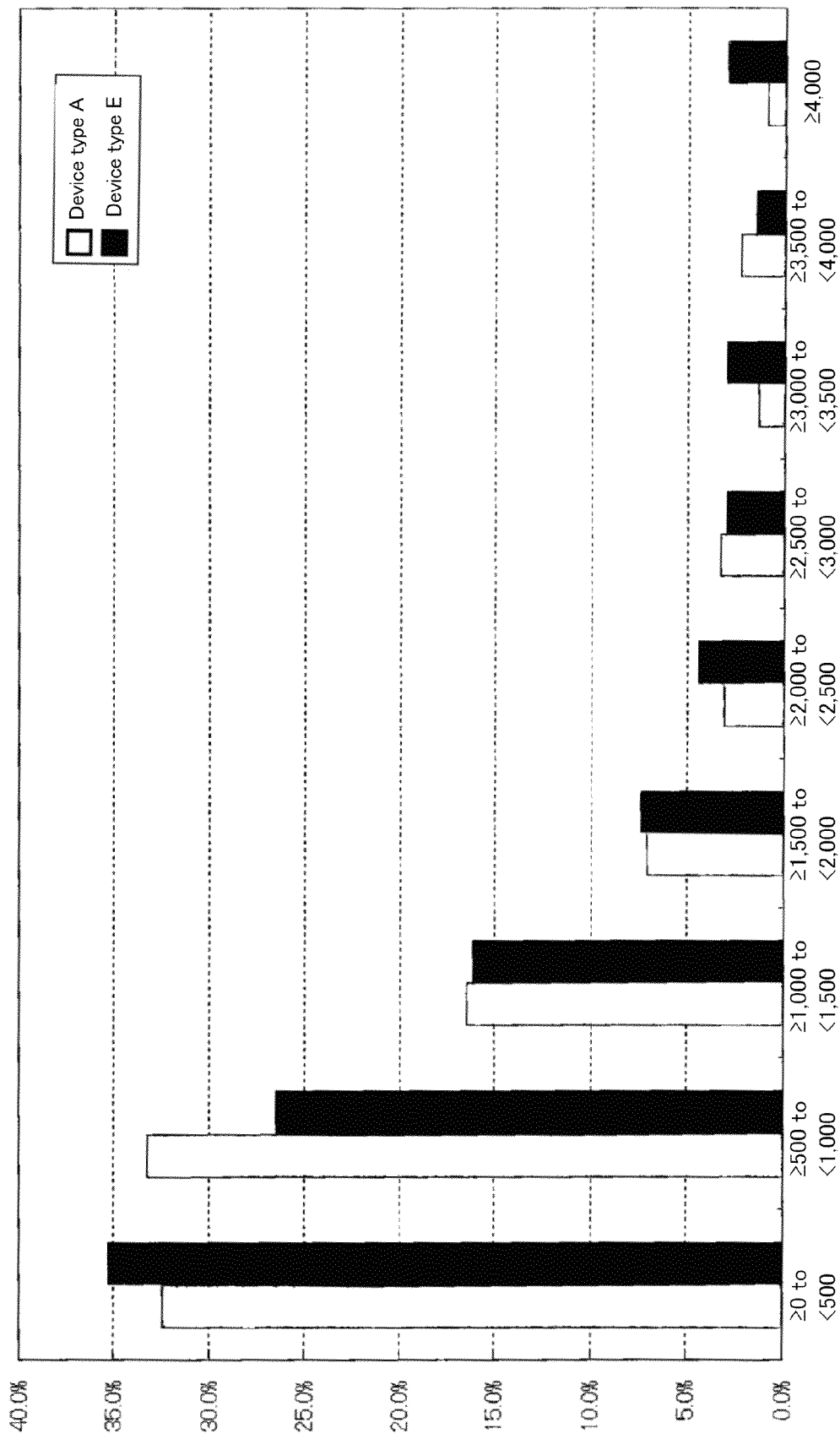

FIG. 83 is a graph depicting rate of the number of exchange medals by device type in shop α.

In this manner, according to the game playing information integration system IS, it is possible to sum rate of the number of exchange medals per player by device type.

FIG. 84 is a graph depicting a status of player use amount of money by elapsed day in shop α. This graph shows average use amount of money per player.

FIG. 85 is a graph depicting rate of use amount of money by elapsed day in shop α. This graph shows average use amount of money per player by predetermined range by dividing players in predetermined range in accordance with use amount of money.

FIG. 86 is a graph depicting player use amount of money by day (first day) in shop α. FIG. 87 is a graph depicting player use amount of money by day (last day) in shop α.

As is evident from comparison between FIG. 86 and FIG. 87, the use amount of money per player is greater in first day than in last day. According to the game playing information system IS, such trend can be quantitatively grasped.

According to the game playing information system IS in shop α, as shown in FIG. 78A to FIG. 87, multi-angled analysis as to shop α is possible. In the present invention, the game playing information integration system IS is applied to a plurality of other shops, each game playing information integration system IS is connected via network, whereby the game playing information integration network system INS can be constructed.

FIG. 88 is a table showing data related to the number of players and winning rate or the like in shop β. FIG. 89 is a table showing data related to the number of players and winning rate or the like in shop γ. FIG. 90 is a table showing data related to the number of players and winning rate or the like in shop δ. FIG. 91 is a table showing data related to the number of players and winning rate or the like in shop ε.

Shop β is positioned in shopping street near university. Shop γ is positioned on road side. Shop δ is positioned in building in busy street near station. Shop ε is positioned in residential street.

According to the present invention, the game playing information integration system IS of each of shops α to ε is connected via network, and the game playing information integration network system INS is constructed, thereby enabling quantitative and objective data comparison between gaming facilities of which local area attributes are different from each other.

(Analysis of Player)

In the game playing information integration system, reception time data, player identification information, and gaming machine unit identification information are stored in association with data output from a gaming machine unit 1. Therefore, customer category data is stored in association with the game playing identification information, thereby making it possible to perform data analysis by game playing time of player, data analysis by player's age, data analysis by player's sex, and analysis by attribute (customer category) or the like, for example.

FIGS. 92 (a) to (d) are pie graphs depicting game playing time per player by day (the first to fourth days), respectively.

FIGS. 93 (a) to (d) are pie graphs showing game playing time per player by day (the fifth to eighth days), respectively.

FIGS. 94 (a) to (d) are pie graphs depicting player's age by day (the first to fourth days), respectively. FIGS. 95 (a) to (d) are pie graphs showing player's age by day (the fifth to eighth days), respectively.

FIGS. 96 (a) to (d) are pie graphs depicting player's sex by day (the first to fourth days), respectively. FIGS. 97 (a) to (d) are pie graphs showing player's sex by day (the fifth to eighth days), respectively.

FIGS. 98 (a) to (d) are pie graphs depicting player's attribute by day (the first to fourth days), respectively. FIGS. 99 (a) to (d) are pie graphs showing player's attribute by day (the fifth to eighth days), respectively.

As shown in FIG. 92 to FIG. 99, according to the game playing information integration system IS, trends of players visiting gaming playing facility can be quantitatively and objectively grasped.

By means of quantitative and objecting grasping of data, if the gaming facility can quantitatively and objectively grasp that 10 players of which customer category is thought to have strong gambling mind, for example, visit the gaming facility at a peak time of one day with the use of data, the gaming facility can perform shop management of which loss is restrained to its required minimum, for example, by introducing 10 gaming machine of device type which is high in appearance probability of variation trend continuation period with its great difference number.

While the manager in gaming facility generally grasps trend or fashion of the business field, information grasped as to one's own gaming facility is not data statistically analyzed in a multi-angled manner. Therefore, for example, the manager is forced to rely on one-sided, qualitative or intuitive information when determining whether or not to require introduction of new device type, introduction number of new device types, timing of withdrawal of gaming machine, adjustment of number of gaming machines by device type, and setting of distribution of settings or the like. In such a situation, grasping of the flow or fashion of the entire business field may function negatively. For example, in a case where gaming machines are introduced which are very popular in the business field of gaming machine, and are evaluated as such excellent machines ruling the times, a gaming facility entailing slugging rise of sales will desire to recover sales by introduction of a large number of new device types. However, depending on a local area attribute (condition of location) of players who visit shop, the number of vacancies may increase by introducing a large amount of device types which are generally referred to as excellent machines. The present invention aims to sum and/or provide quantitative and objective data in order to eliminate such possibility to its required maximum.

(Determination of Identity of Player)

As described above, quantitative and objective data summing and/or provision can be performed by performing analysis of player, some players do not desire that their own information is known to gaming facility. The players who do not desire that their own information is known to gaming facility may not perform member registration, and such players often do not use or own their member cards. In such a situation, in an attempt is made to perform identification of player by means of only player's own card, precise data cannot be occasionally acquired in the strict sense. The present invention aims to identify that at least a player is changed in order to prevent an occurrence of such circumstance.

FIG. 100 is a flowchart showing player identity determination processing (1) executed by means of the gaming machine unit 1 and the hall conserver 60, shown in FIGS. 1A to 1D.

Herein, a CCD camera (not shown) as an image acquisition means is connected to a control portion 11 of a pachinko gaming machine 10, and the CCD camera is capable of perform data communication with the control portion 11 in a bidirectional manner, and is constituted so as to operate by means of an instruction from the control portion 11. Hereinafter, a case in which the gaming machine unit 1 includes the pachinko gaming machine 10 will be described, and however, the present invention is not limited to this example, and for example, can include a pachinko game playing machine and a slot machine or the like. The CCD camera as an image acquisition means functions as a player identification information reading means.

First, the control portion 11 (subsidiary control portion 11b) of the pachinko gaming machine 10 determines whether or not predetermined timing is reached (step S1031). The predetermined timing can include: timing every time predetermined period of time (for example, 10 minutes) elapses; and timing when event in the play of game (such as winning prize or occurrence of bonus game) takes place or the like.

In a case where no predetermined timing is reached, the routine reverts to step S1031, or alternatively, in a case where predetermined timing is reached, the control portion 11 controls the CCD camera to acquire a player as an image (step S1032).

Next, the control portion 11 transmits face data obtained by means of the step S1032 together with gaming machine unit identification information to the hall conserver 60 (step S1033), and the routine is reverted to step S1031.

It is to be noted that in a case where the pachinko gaming machine 10 determines whether or not face data is included in the data obtained by means of step S1032 and then the face data is not included therein, no transmission may be performed. In addition, in a case where before performing the processing of step S1032, whether or not a player's face exists within the field of view of the CCD camera is determined from acquired data in a standby state of the CCD camera, and in a case whether the player's face does not exist, no image acquisition may be performed.

On the other hand, the control portion 62 of the hall conserver 60 compares the face data received from the gaming machine unit 1 with the past face data stored in association with the same items of gaming machine unit identification information, in the hard disk 65 (step S1041). As such a face data comparison technique, a conventional publicly known technique can be employed.

Next, based on a result of comparison in step S1041, the control portion 62 determines whether or not a player is the same (step S1042). In a case where the player is the same, it means that the player continuously plays game. In this case, the routine is reverted to step S1041. When the processing operations of step S1041 and S1042 is executed, the control portion 62 functions as a player identify determination means.

On the other hand, in a case where the player is not the same in step S1042, the control portion 62 stores new face data received from the gaming machine unit 1, in association with gaming machine unit identification information (step S1043). In this manner, the game playing information integration system IS recognizes that the player playing game at the gaming machine unit 1 is a player associated with new face data.

Next, the control portion 62 compares the new device data with a face data group in the database of the hard disk 65 (step S1044). As to the face data comparison technique as well, a conventional publicly known technique can be employed.

Next, based on a result of comparison in step S1044, the control portion 62 determines whether or not face data associated with a player, which is the same as new face data, exists in the database in the hard disk 65 (step S1045).

In a case where it is determined that the face data associated with a same player does not exist in the hard disk 65 in step S1045, the control portion 62 stores new player identification information assigned to that face data, in the database in the hard disk 65 (step S1046). In this manner, the playing identification information is imparted to the player associated with the face data received in step S1041. Afterwards, the routine is shifted to step S1041.

In a case where it is determined that face data associated with a same player is present in the hard disk 65 in step S1045, the control portion 62 adds to that face data, player identification information which is the same as player identification information assigned to face data associated with the same player, and stores the resultant information in the database in the hard disk 65 (step S1047). In this manner, samples of the face data received in step S1041 are assigned. Afterwards, the routine is shifted to step S1041.

As described above, in the processing shown in FIG. 100, a face (face data) of a player is handled like player identification information by adding the player identification information to the face data, whereby even if a player does not perform member registration, start and completion of the play of game can be grasped.

The player identity determination processing in the present invention is not limited to the example shown in FIG. 100, and for example, may be the processing shown in FIG. 101.

FIG. 101 is a flowchart showing player identity determination processing (2) executed in the hall conserver shown in FIGS. 1A to 1D.

First, the control portion 62 of the hall conserver 60 determines whether or not bonus completion data to which gaming machine unit identification information is assigned is received from a gaming machine unit 1 (step S105). The bonus complete data is data output from the gaming machine unit 1 (pachinko gaming machine 10) together with gaming machine unit identification information of the gaming machine unit 1 at the time of completion of bonus game or at the time of completion of the playing state of a game other than normal game playing state after bonus. After bonus game completion data has been output, a normal game playing state is started in the gaming machine unit 1.

In a case where it is determined that the bonus completion data is received in step 1051, the control portion 62 sets a timer in association with gaming machine unit identification information in memory 64 (step S1052). This timer is counted up in accordance with a clock or the like of a CPU 63.

In a case where it is determined that the bonus completion game is not received in step S1051 or in the case where the processing of step S1052 is executed, it is determined whether or not exchange data to which gaming machine unit identification information is assigned is received from the gaming machine unit 1 (step S1053). The exchange data is data output together with gaming machine unit identification information of the gaming machine unit 1 when exchange of gaming media is performed from the gaming machine unit 1 (gaming medium lending device 20). In a case where exchange of gaming media is performed, it is predicted that the play of game is continued.

In a case where it is determined that exchange data is received in step S1053, the control portion 62 clears a timer set to memory 64 (step S1054). In a case where it is determined that exchange data is not received in step S1053 or in a case where the processing of step S1054 is executed, the control portion 62 determines whether or not the timer of the memory 64 reaches predetermined time (step S1055).

In a case where the timer reaches the predetermined time, in the gaming machine unit 1 exchange of gaming media is not performed, a normal game plating state continues over a predetermined period of time, and thus, there is a high possibility that the player completes the play of game. Therefore, the control portion 62 replaces player identification information associated with gaming machine unit identification information, with new player identification information (step S1056).

In a case where it is determined that the timer does not reach the predetermined time in step S1055 or in the case where the processing of step S1056 is executed, the control portion 62 determines whether or not bonus start data to which gaming machine unit identification information is assigned is received from the gaming machine unit 1 (step S1057). The bonus start data is data output together with gaming machine unit identification information of the gaming machine unit 1 at the time of start of bonus game from the gaming machine unit 1 (pachinko gaming machine 10).

In a case where it is determined that the bonus start data is received in step S1057, it means that a normal game playing state completes, and thus, the control portion 62 clears the timer of memory 64 (step S1058). In a case where it is determined that the bonus start data is not received in step S1057 or in a case whether the processing of step S1058 is executed the routine is completed.

As described above, in the processing shown in FIG. 101, in a case where exchange of gaming media is not performed over a predetermined period of time in a normal game playing state, it is determined that a player changes. The present invention can employ the processing shown in FIG. 102 in addition with the processing shown in FIG. 101.

FIG. 102 is a flowchart showing player identity determination processing (3) executed in the hall conserver 60 shown in FIGS. 1A to 1D. In the case of performing the processing shown in FIG. 102, the gaming machine unit 1 included in the game playing information integration system IS includes a pachinko/slot gaming machine (not shown) in place of the pachinko gaming machine 10.

In the processing shown in FIG. 102, first, the control portion 62 determines whether or not a credit start signal to which gaming machine unit identification information is assigned is received from the gaming machine unit 1 (step S1061). The credit start signal is a signal output when crediting is started in the gaming machine unit 1 (pachinko/slot gaming machine). In general, when a player plays game at the pachinko/slot gaming machine, the player enters coin into the pachinko/slot gaming machine to make credit, and then, continues the play of game by appropriately resupplying coins so as not to be 0 credits; and therefore, in a case where the credit increases from 0, it is possible to determine that the play of game is started.

In a case where it is determined that no credit start signal is received in step 1061, the routine is reverted to step S1061. On the other hand, in a case it is determined that the credit start signal is received in step S1061, the control portion 62 replaces player identification information associated with gaming machine unit identification information, with new player identification information (step s1062), and then, the routine is completed.

While the embodiment described a case in which a gaming machine unit 1 includes a pachinko gaming machine 10, a gaming medium lending device 20, and an individual counting device 30, the present invention is not limited to this example. The gaming machine unit may include a pachinko/slot gaming machine and a medal lending machine. In addition, the gaming machine unit may be a gaming machine.

(Modification Example)

In addition, the present invention can employ the following features. The following features can be added to the embodiment.

(3-1) A game playing information integration system is provided, the game playing information integration system including:

a plurality of gaming machine units; and a server connected to enable communication with each of the gaming machine units, wherein the gaming machine units include:

player identification information reading means which is capable of reading player identification information, and outputs the read player identification information;

number-of-consumptions data output means for outputting number-of-consumptions data related to the number of consumptions of gaming media; and number-of-payouts data output means for outputting number-of-payouts data related to the number of payouts of gaming media, the server includes:

data storage means for storing the player identification information, the number-of-consumptions data, the number-of-payouts data and reception time data indicating reception time thereof, and the gaming machine unit identification information in association with each other; and analysis processing means for analyzing data received from the gaming machine units and stored in the data storage means, the analysis processing means is constituted so as to perform processing operations (A) to (C), the processing (A) is processing of, based on the data stored in the data storage means, generating data related to at least items (a) to (d) that follow:

(a) a game playing period per one time of each player in the gaming machine unit;

(b) a change with an elapse of time of a balance of the player in the game playing period;

(c) operation time of the gaming machine unit; and (d) profit of a shop side by the gaming machine, the processing (B) is processing of, based on at least the data related to the items (a) and (b), computing a degree of satisfaction of a player relative to a gaming machine unit, the degree of satisfaction of the player being a variable following meeting conditions (I) and (II):

(I) the longer the game playing time is, the higher the degree of satisfaction of the player is; and (II) a balance of a player in a latter half of the game playing period has a greater influence relative to the degree of satisfaction of the player than a balance of a player in a first half of the game playing period, and the processing (C) is processing of, based on data related to the items at least items (c) and (d), computing a degree of satisfaction on a shop side relative to a gaming machine unit, the degree of satisfaction on the shop side being a variable meeting following conditions (i) and (ii):

(i) the longer the operation time is, the higher the degree of satisfaction on the shop side is; and (ii) the greater a profit on the shop side is, the higher the degree of satisfaction on the shop is.

In view of only a balance relationship, the greater the player's profit is, the greater the loss on the shop side is, and the greater the player's loss is, the greater the profit on the shop side is. Therefore, simply assuming that the degree of satisfaction is determined by only balance, the higher the degree of player's satisfaction is, the lower the degree of satisfaction on the shop side is, and the lower the degree of the player's satisfaction is, the higher the degree of satisfaction on the shop side is. In other words, the degree of the player's satisfaction and the degree of satisfaction on the shop side have a tradeoff relationship. This is a relationship which is conventionally thought to be present in view of common knowledge.

However, in reality, a relationship between the degree of the player's satisfaction and the degree of satisfaction on the shop side is not a tradeoff relationship, and is influence by another element. For example, some players can play a game over long period of time or some player does not feel dissatisfaction even if a slight loss takes place. Conversely, in a case where a player gains great profit in the first half of the play of game, but loses almost of the profit in the last half of the play of game, even if no loss takes place, the player cannot sometimes obtain a sense of satisfaction. That is, the degree of player's satisfaction is not determined by only balance. In the present invention, elements other than the tradeoff relationship mentioned above are objectively evaluated, and the relationship between the degree of the player's satisfaction and the degree of satisfaction on the shop side is provided in a more realistic manner.

Therefore, in the present invention, a player pays his or her attention to timing of stopping the play of game. That is, timing for a player to stop the play of game corresponds to any one of three patterns of 1. No money to play; 2. Big hit (bonus is won); and 3. Interest in gaming machine is lost. The present invention is characterized in that trends for a player to start to complete the play of game are acquired in all by integrating information, whereby the patterns are objectively and logically analyzed and then the data of analysis is utilized for stabilization of management. This puts the brake for the manager in gaming facility to seek an immediate profit, and provides environment in which a fixed customer can enjoy the play of game over a long period of time while the gaming facility obtains a stable profit in long term. An increase of fixed customers is handled as a very important problem to be solved in the field as opening the way against reduction of game market scale which is questioned in future as well as being useful for long-term stable management of the gaming facility.

In order to solve this problem, according to the present invention, integrative acquisition of information is performed from each device in gaming facility (such as gaming machine unit or a variety of servers, for example); based on these items of information, analysis is performed from three points of view made of "customer" analysis, "machine" analysis, and "sales" analysis; and by integrally employing the results of these analyses, useful information is provided for determination as to whether or not to establish the current sales strategy of the gaming facility and planning of the future sales strategy to increase the number of fixed customers.

Therefore, in the present invention, the degree of the player satisfaction and the degree of satisfaction on the shop side are computed and then the computed degrees of satisfaction are visualized as the result of "customer" analysis, "machine" analysis, and "sales" analysis. In this manner, information is provided for reversing a tradeoff relationship between the degree of the player's satisfaction and the degree of satisfaction on the shop side, which has been conventionally thought to be present in view of common knowledge, and then, improving both of the degree of the player's satisfaction and the degree of satisfaction on the shop side.

It is to be noted that reception time data related to reception time of data is not limited to showing reception time itself of data, and includes receiving time intervals of data, for example. Further, the reception time data related to reception time of data may be the one indicating time itself of transmission from a gaming machine unit or may be the one indicating time intervals of transmission from a gaming machine unit.

The present invention can further employ the following features.

(3-1-1) The game playing information integration system of (3-1) is provided, wherein the data storage means further stores model data related to model of gaming machine unit in association with gaming machine unit identification information.

(3-1-2) The game playing information integration system of (3-1) is provided, wherein the data storage means further stores device type data related to device type of gaming machine unit in association with gaming machine unit identification information.

(3-1-3) The game playing information integration system of (3-1) is provided, wherein the game machine unit further includes number-of-games-played data output means for outputting number-of-games-played data related to the number of games played, and the data storage means further stores the number-of-games played data output from the number-of-games-played data output means in association with reception time data related to reception time of data, player identification information, and gaming machine unit identification information.

(3-1-4) The game playing information integration system of (3-1) is provided, wherein the gaming machine unit further includes number-of-times-of-special-prize data output means for outputting number-of-times-of-special-prize data related to the number of times of special prize, and the data storage means further stores the number-of-times-of-special prize data output from the number-of-times-of-special-prize data output means in association with reception time data related to reception time of data, player identification information, and gaming machine unit identification information.

The present invention can further employ the following features.

(3-2) The game playing information integration system of (3-1) is provided, wherein the game playing period includes one or a plurality of variation trend continuation periods, the variation trend continuation periods are a series of period in which either one of increase trend and decrease trend of difference number is continuous, and meets a condition in which an absolute value of difference number in an entire period is a predetermined reference value or more, and the condition (II) is that, among the variation trend continuation periods included in the game playing period, the later a balance in a variation trend continuation period takes place, the greater an influence is imparted to a degree of satisfaction of the player.

According to the feature of (3-2), conventionally, the intuitive and qualitative degree of satisfaction of each player can be numerically (visually) expressed in a more realistic manner.

Conventionally, for example, when players talk with each other about the results of their own play of games, the characteristics of their one play of games are often expressed by the presence or absence of the variation trend continuation period or its related generation timing, such as expression that "no bonus took place for one hour" or "bonus continued for 30 minutes". This is because players understand that the variation trend continuation period is an effective milestone representing characteristics of gaming machines regardless of whether the player takes care or does not take care for the matter, and one's own feeling (satisfaction or dissatisfaction) can be comparatively easily expressed by means of the variation trend continuation period. In particular, a trend of the variation trend continuation period that takes place later (variation trend continuation period that takes place at a time close to completion of the play of game) greatly influences the degree of the player's satisfaction.

For example, among players, there are a quite a few players who determine an upper limit or a lower limit of a balance. In this case, in the latter half of game playing period, a change in balance toward the upper limit or the lower limit takes place, and there is a high possibility that the tread of such change and the changed trend of variation trend continuation period are the same. Therefore, the variation trend of the variation trend continuation period in the latter half of the game playing period indicates that a win or loss that has been determined by a player oneself. Even when a player who does not determine such rule makes determination as to whether or not to stop the play of game, the player often makes such determination on the basis of a result of the play of game at that time (that is, variation trend continuation period that takes place at a time close to completion of the play of game).

According to the feature of (3-2), the degree of the player's satisfaction is computed by employing the variation trend continuation period, thus making it possible to numerically (visually) express the degree of intuitive and qualitative satisfaction of each player in a more realistic manner.

A series of period may be a period in units of time or may be a period in unit of the number of games played.

The present invention can further employ the following features.

(3-3) The game playing information integration system of (3-2) is provided, wherein the condition (II) is that, among the variation trend continuation periods included in the game playing period, the later a balance in a variation trend continuation period takes place, the greater an influence is imparted to a degree of satisfaction of the player.

In a case where a variation trend continuation period having a same trend is continuous at the last of game playing period, such trend greatly influences the degree of the player's satisfaction. Therefore, according to the feature of (3-3), the degree of the player's satisfaction can be numerically (visually) expressed in a more realistic manner.

The present invention can further employ the following features.

(3-4) The game playing information integration system of (3-2) or (3-3) is provided, wherein the series of period is a period of normal game playing state in a game played at the gaming machine unit, a period of bonus game, or a period obtained by combining a bonus game and a game playing state which is different from a normal game state subsequent to the bonus game.

According to the feature of (3-4), a period of normal game playing state, a period of bonus game, or a period obtained by combining a bonus game and a game playing state (state of the play of a game other than normal game after bonus) which is different from a normal game playing state subsequent to the bonus game are handled as a series of period.

These periods are features which are frequently employed when a player evaluates one's own play of game, and thus, these periods are handled as a series of period, thereby making it possible to achieve the degree of the player's satisfaction in a sense which is further closer to players.

The present invention can further employ the following features.

(3-5) The game playing information integration system of (3-4) is provided, wherein the routine moves to a normal game playing state after completion of bonus game as the series of period or after completion of a bonus game as the series of period and a game playing state which is different from a normal game playing state subsequent to the bonus game, and in the normal game playing state, in a case where a next bonus game takes place before exceeding a special period or the number of games played, the next bonus game is included in the series of period.

After completion of bonus game or after completion of bonus game and a game playing state which is different from a normal game playing state subsequent to the bonus game, in a case where a next bonus game takes place before exceeding a special period (for example, 5 minutes) or the number of games played (for example, 20 games), a player often recognizes that these periods are a series of period. Therefore, in the feature of (5), these periods are handled as a series of period, thereby making it possible to achieve the degree of the player's satisfaction in a sense which is further closer to players.

The present invention can further employ the following features.

(3-6) The game playing information integration system of (3-2) is provided, wherein the series of period is a period in which difference number per predetermined unit period of time continuously increases or decreases over a plurality of unit periods of time.

According to the feature of (3-6), the predetermined unit period of time includes both of a period based on time and a period based on the number of games played. The unit period of time may be fixed in advance as a game playing information integration system or may be arbitrarily set at gaming facility.

The present invention can further employ the following features.

(3-7) The game playing information integration system of any one of (3-1) to (3-6) is provided, wherein the analysis processing means is constituted so as to perform processing operations (D) and (E), the processing (D) is processing of, based on the data stored in the data storage means, generating data related to at least items (a') and (b'), that is, (a') visit frequency of player; and (b') consumed amount of money per visit of player, the processing (E) is processing of, based on data related to at least the items (a') and (b'), classifying the player into at least any one of groups of new customer, established customer, dissatisfactory customer, and leaving customer, the group of new customer is a group in which visit frequency is high and a consumed amount of money is small, the group of established customer is a group in which visit frequency is high and a consumed amount of money is large, the group of dissatisfactory customer is a group in which visit frequency is low and a consumed amount of money is large, and the group of leaving customer is a group in which visit frequency is low and a consumed amount of money is small.

The Inventor found out that there is a life cycle viewed from the shop side that a player visiting gaming facility first becomes "new customer" of the gaming facility, becomes "established customer" after gradually established, and then, becomes "dissatisfactory customer" for any reason, and finally becomes "leaving customer". Then, the Inventor found out that the player can be grouped according to which stage of that life cycle the player is positioned at, and the grouping can be performed based on (a') visit frequency and (b') consumed amount of money.

According to the feature of (3-7), it is possible to determine which stage of the life cycle viewed from the shop side the players are positioned, thus making it easy for the gaming facility to plan and establish measures for r increasing the number of established customers.

The present invention can further employ the following features.

(3-8) The game playing information integration system of (3-7) is provided, wherein the storage means stores data indicating history of a group to which the player belongs in association with the player identification information and further stores data for customer life cycle determination, and in the data for customer life cycle determination, a pattern of change of a group to which a player belongs and data indicating advice are associated with each other, the analysis processing means is constituted so as to perform processing operations (F) to (H), the processing (F) is processing of analyzing a pattern of change of a group to which a player belongs, based on data indicating history of a group to which the player belongs, the data being stored in the storage means, the processing (G) is processing of extracting data indicating advice corresponding to a pattern of change of a group to which the player belongs, based on the data for customer life cycle determination, and The processing (H) is processing of outputting advice as to the player, based on the data extracted in the processing (G).

The Inventor found out that there are several patterns as to from which stage to which stage of the life cycle a player moves, and the player's mentality relative to game facility is reflected in that patterns.

According to the feature of (3-8), the player's mentality as to gaming facility is objectively analyzed by determining from which stage to which stage of the life cycle the player moves, making it possible to provide advice which is useful to plan and establish measures for increasing the number of established customers.

The present invention can further employ the following features.

(9) The game playing information integration system of any one of (1) to (8) is provided, wherein the analysis processing means is constituted so as to perform processing operations (I) and (J), the processing (I) is processing of, based on data stored in the data storage means, generating data related to at least items (c') and (d') that follow:

(c') operability of gaming machine; and (d') gross profit by gaming machine, the processing (J) is processing of classifying the player into at least any one of groups of new machine, main device type, less popular, and unpopular, based on data related to at least the items (c') and (d'), the group of new machine is a group in which operability is high and gross profit is less, the group of main device type is a group in which operability is high and gross profit is more, the group of less popular is a group in which operability is low and gross profit is more, and the group of unpopular is operability is low and gross profit is less.

The Inventor found out that there is a life cycle viewed from players, in which gaming machines installed in gaming facility is first introduced as "new machines" in the gaming facility, then become "main device type" of the gaming facility, becomes gradually "less popular", and finally becomes "unpopular". The Inventor further found out that gaming machines can be grouped depending on which stage of the life cycle the gaming machines are positioned, and the grouping can be performed based on the items (c') operability and (d') gross profit.

According to the feature of (3-9), it is possible to determine which stage of the life cycle viewed from players the gaming machines are positioned, thus making it easy for the gaming facility to plan and establish measures for decreasing the number of gaming machines that fall under "less popular" and "unpopular".

The present invention can further employ the following features.

(3-10) The game playing information integration system of (3-9) is provided, wherein the storage means stores data indication history of a group to which the gaming machine unit belongs in association with the gaming machine unit identification information and further stores data for gaming machine life cycle determination, and in the data for gaming machine life cycle determination, a pattern of change of a group to which a gaming machine belongs and data indicating advice are associated with each other, The analysis processing means is constituted so as to perform processing operations (K) to (M), the processing (K) is processing of analyzing a pattern of change of a group to which a gaming machine belongs, based on data indicating history of a group to which the gaming machine belongs, the data being stored in the storage means, the processing (L) is processing of extracting data indicating advice that corresponds to a pattern of change of the group to which the gaming machine belongs, based on the data for gaming machine life cycle determination, and the processing (M) is processing of outputting advice as to the player, based on data extracted in the processing (L).

The Inventor found out that there are several patterns as to from which stage to which stage of the life cycle a gaming machine moves, and the player's mentality relative to game facility is reflected in that patterns.

According to the feature of (3-10), the player's mentality as to gaming facility is objectively analyzed by determining from which stage to which stage of the life cycle the player moves, making it possible to provide advice which is useful to plan and establish action for decreasing less popular device type and/or unpopular device type.

Next, the degree of satisfaction, the life cycle of player's interest, and the gaming machine life cycle will be described.

FIG. 103 is a view showing a relationship between the degree of satisfaction of player and the degree of satisfaction of gaming facility.

In the figure, the vertical axis indicates the degree of satisfaction of gaming facility, and the horizontal axis indicates the degree of satisfaction of player. In FIG. 103, the degree of the player's satisfaction and the degree of satisfaction of gaming machine are expressed by means of deviation values. An average value of the degrees of satisfaction of player and gaming machines is 50.

In this plane, dots are plotted on a coordinate system defining the degrees of satisfaction of gaming facility and player relative to the gaming machine (hereinafter, evaluation dots of the degrees of satisfaction). A star mark indicates the evaluation dots of degrees of satisfaction as to one gaming machine. Therefore, in FIG. 103, the evaluation dots of degrees of satisfaction as to 11 gaming machines are plotted.

The plane shown in FIG. 103 is classified into four areas while the average value is defined as a reference.

Area A is an area in which the degree of satisfaction of gaming machine is high and the degree of player's satisfaction is low.

Area B is an area in which the degree of satisfaction of gaming machine is high and the degree of player's satisfaction is also high.

Area C is an area in which the degree of satisfaction of gaming machine is low and the degree of player's satisfaction is high.

Area D is an area in which the degree of satisfaction of gaming machine is low and the degree of player's satisfaction is low.

As described above, according to a relationship between the degree of player's satisfaction and the degree of satisfaction on the shop side, which conventionally has been thought to be present in common knowledge, the degrees of satisfaction of player and gaming machine are determined depending on balance, and a tradeoff relationship is established.

On the other hand, in the present invention, more realistic analysis is performed as the degrees of satisfaction of player and gaming machine. The elements employed for analysis of the degrees of satisfaction in the present invention are at least four elements that follow:

(a) game playing period of time per one time of each player in gaming machine unit;

(b) change with an elapse of time as to balance of the player in game playing period of time;

(c) operation time of game machine unit; and (d) profit on the shop side by gaming machine unit The items (a) and (b) are employed for analysis of the degree of the player's satisfaction. The items (c) and (d) are employed for analysis of the degree of satisfaction of gaming machine.

(a) Game Playing Period at One Time of Each Player in Gaming Machine Unit

In a case where the game playing time at the gaming machine unit is long, there is a high possibility that a player enjoys the play of game at that gaming machine. This is because, if the player does not have interest therein, there is a high possibility that game will be played at another gaming machine. Namely, even if a slight loss takes place with a player, the player does not move to another gaming machine, and thus, it is thought that the player satisfies a current gaming machine. Therefore, in the present invention, the data related to the item (a) is employed for computation of the degree of the player's satisfaction.

(b) Change with Elapse of Time in Balance of the Player in Game Playing Period of Time The amount of balance itself influences the degree of the player's satisfaction, as indicated by the abovementioned tradeoff relationship. It is to be noted that in the present invention, weighting is performed for the amount of balances so that the balance in the latter half of game playing period has greater influence relative to the degree of the player's satisfaction than that in the first half of gaming machine period, and then, computation of the degree of the player satisfaction is performed.

The present invention focuses on timing with which a player stops the play of game. That is, the timing for the player to stop the play of game corresponds to any one of three patterns of 1. No money to play, 2. Big hit (Bonus is won), and 3. Interest in gaming machine is lost.

1. No money to play means that there is a high possibility that a loss takes place at least in the latter half of game playing period, and there is also a possibility that the player is not satisfied with the gaming machine. Of course, if the game playing time is long, even if no money to play arises, there is also a possibility that the player is satisfied with the gaming machine. Therefore, in the present invention, computation of the degree of the player's satisfaction is performed by employing the item (a) as well as the item (b).

2. Big hit means that there is a high possibility that profit takes place at least in the latter half of game playing period, and there is a possibility that the player is satisfied with the gaming machine.

3. Losing interest in gaming machine means that there is a high possibility that profit does not occur in the latter half of game playing machine, and there is a possibility that the player does not satisfied with the gaming machine.

The weighting method mentioned above is not limited in particular, and for example, the following methods can be employed.

(Weighting Method 1)

Among the variation trend continuation periods included in the game playing period, the later a balance in a variation trend continuation period takes place, the greater an influence is imparted to a degree of satisfaction of the player.

In general, even if an absolute value between the balance of the last variable trend continuation period in game playing period and the balance of the second last variation trend continuation period is the same, a player is prone to feel a loss in balance if the balance of the second last variation trend continuation period is positive and the balance of the last variation trend continuation period is negative. Conversely, a player is prone to feel a profit (no loss) if the balance of the second last variation trend continuation period is negative and the balance of the last variation trend continuation period is positive.

Therefore, it is defined that, among the variation trend continuation periods included in the game playing period, the later a balance in a variation trend continuation period takes place, the greater an influence is imparted to a degree of satisfaction of the player, and data weighting is performed to be thereby able to compute the degree of the player's satisfaction in a more realistic manner.

(Weighting Method 2)

The greater the number of continuous occurrences of variation trend continuation period is, the period having the same variation trend as the variation trend continuation period that occur lastly, the greater the influence on the degree of the player's satisfaction is.

If the balance of variation trend continuation period is positive or negative at a probability of 1/2, the probability at which the variation trend continuation period of which balance is positive or negative continuously takes place N times is obtained as $(1/2)^N$. The occurrence of the variation trend continuation period having the same variation trend is rare. Therefore, the greater the number of continuous occurrences is, the greater the mental impact is imparted to a player.

Therefore, it is defined that the greater the number of continuous occurrences in variation trend continuation period is, the period having the same variation trend as the variation trend continuation period that takes place lastly, the greater the influence is imparted to the degree of the player's satisfaction, and data weighting is performed to be thereby able to compute the degree of the player's satisfaction in a more realistic manner.

(Weighting Method 3)

The greater the absolute value of balance of the last variation trend continuation period in game playing period is, the greater the influence is imparted to the degree of the player's satisfaction.

A player occasionally stops the play of game intentionally. That is, there is a high possibility that the last variation trend continuation period renders the player make a decision to stop the play of game, and the balance of the last variation trend continuation period has great impact on the player's mentality.

Therefore, it is defined that the greater the absolute value of balance of the last variation trend continuation period in game playing period is, the greater the influence is imparted to the degree of the player's satisfaction, and data weighting is performed to be thereby able to compute the degree of the player's satisfaction in a more realistic manner. In a case where the balance is positive, a positive influence is imparted to the degree of the player's satisfaction. If a case where the balance is negative, a negative influence is imparted to the degree of the player's satisfaction.

(c) Operation Time of Gaming Machine Unit

In a case where the operation time of gaming machine unit is long, there is a high possibility that the gaming machine unit contributes to attracting players' interest irrespective of whether or not profit is large or small. Therefore, the data related to the item (c) is employed for computation of the degree of satisfaction of gaming facility.

(d) Profit on the Shop Side by Gaming Machine Unit

The profit on the shop side itself has influence on the degree of satisfaction of gaming facility as shown in the abovementioned tradeoff relationship, and therefore, in the present invention, the data related to the item (d) is employed for computation of the degree of satisfaction of gaming facility.

FIG. 103 shows one example of a result obtained by computing degrees of satisfaction between player and gaming facility by employing the data related to the items (a) to (d). Many evaluations of the degrees of satisfaction sparsely exist in area A and area C. Area Sc is a region in which the evaluation dots of the degree of satisfaction of gaming machine unit are easily positioned which follow the abovementioned tradeoff relationship. However, the evaluation dots of degree of satisfaction of one gaming machine unit are not positioned in area Sc, but are positioned in area Sp. Area Sp is a region in which the degrees of satisfaction between player and gaming machine are high.

In this manner, according to the present invention, computation of the degrees of satisfaction between player and gaming facility is performed based on the data related to the items (a) to (d), whereby the abovementioned tradeoff relationship is eliminated so as to be able to extract a gaming machine unit with its high degrees of satisfaction between player and gaming facility.

According to the present invention, for example, in a manner described below, it is possible to improve a setup balance of the gaming machine units in the gaming facility.

FIG. 104 (a) shows distribution of evaluation dots of the degrees of satisfaction before improvement in gaming machine. The black circle mark, the x-mark, the black triangle mark, and the star mark indicate device types of gaming machine units, respectively. According to FIG. 104 (a), the gaming machine unit with the black circle mark is relatively high in degrees of satisfaction of player and gaming machine. The gaming machine unit with the x-mark is low in degree of satisfaction of gaming facility. The gaming machine with the black triangle mark is low in degree of player's satisfaction.

Since there is a room for improvement as to the gaming machines with the x-mark and black triangle mark, these units were withdrawn from the gaming facility. In place of these gaming machine units, the gaming machine units with the white square mark and black square mark were introduced.

FIG. 104 (b) shows evaluation dots of degrees of satisfaction after improvement in gaming facility.

The degrees of satisfaction of player and gaming facility as to the gaming machine units with the white and black square marks, which were new introduced, are higher than that of the gaming machine units that were installed previously. Entirely, the evaluation dots of degrees of satisfaction in FIG. 104 (*b*) are positioned more upper right than those in FIG. 104 (*a*).

In this manner, in the present invention, for example, the number of gaming machine units with high degrees of satisfaction of player and gaming machine can be increased in the entire shop by replacing the gaming machine units of device type with low degrees of satisfaction with those of other device type. An action for improvement is not limited to this example. Another action for improvement can include change of dividing number or settings and change of the number of setups by device type or the like, for example.

FIG. 105 is a view showing the life cycle of player's interest and its related pattern.

In the figure, the vertical axis indicates the visit frequency of player, and the horizontal axis indicates the consumed amount of money per visit by a player. In FIG. 105, the visit frequency of player and the consumed amount of money per visit of player are expressed by means of deviation values. The average value of the visit frequency of player and the consumed amount of money per visit of player is 50.

In this plane, dots are plotted on a coordinate system defining the degrees of satisfaction of gaming facility and player relative to the gaming machine (hereinafter, evaluation dots of the degrees of satisfaction).

The plane shown in FIG. 105 is classified into four group while the average value is defined as a reference.

Group A indicates a group of new customers. In general, a new customer is prone to be high in visit frequency and small in consumed amount of money.

Group B indicates a group of fixed customers. In general, a fixed customer is prone to be high in visit frequency and large in consumed amount of money.

Group C indicates a group of dissatisfactory customers. In general, a dissatisfactory customer is prone to be low in visit frequency and large in consumed amount of money.

Group D indicates a group of leaving customers. In general, a leaving customer is prone to be low in visit frequency and low in consumed amount of money.

In the embodiment, evaluation dots of life cycle of player are plotted based on data related to (a') visit frequency and (b') consumed amount of money per visit by player, thereby determining a group to which a player belongs. Further, in the embodiment, evaluation dots of life cycle of payer are plotted with an elapse of time, thereby indicating trajectory of evaluation dots of life cycle of player. In this manner, change of a group to which a player belongs is determined.

Patterns of change of group to which player belongs include patterns 1 to 4 shown in FIG. 105 as follows, for example.

Pattern 1 is a pattern in which the visit frequency is high, but the consumed amount of money gradually lowers. In the case of pattern 1, lowered attraction power of device type of gaming machine unit is presupposed as customer's mentality.

Patent 2 is a pattern in which the consumed amount of money is large, but the visit frequency lowers. In the case of pattern 2, the outflow to another gaming machine is presupposed as customer's mentality.

Patent 3 is a pattern in which both of the consumed amount of money and the visit frequency lower. In the case of pattern 3, lowered reliability of gaming facility is presupposed as customer's mentality.

Patent 4 is a pattern in which the consumed amount of money is small, and the visit frequency lowers. In the case of pattern 4, lowered attractive power of gaming facility is presupposed as customer's mentality.

In the present embodiment, data indicating advice is associated with each pattern. A pattern of change of a group to which a player belongs is determined; the advice associate with that pattern is extracted; and based on the extracted data, an image indicating the advice is displayed.

The above advices are exemplified as follows, for instance.

The advice associated with pattern 1 includes replacement of gaming machine unit or change of the number of dispositions for improving the attraction force of device type of gaming machine units.

The advice associated with pattern 2 includes holding of event for strengthening customer's interest in gaming facility or the like.

The advice associated with pattern 3 includes setting change of dividing number for recovering reliability of gaming facility.

The advice associated with pattern 4 includes replacement of gaming machine unit or change of the number of dispositions for enhancing the attraction power of gaming facility and setting change of dividing number or the like.

FIGS. 106 (*a*) and (*b*) are views showing transition of life cycle of player. In the figure, the arrow mark with white circle indicates transition history of evaluation dots of life cycle of player.

In FIG. 106 (*a*), three players belonging to group A move to group B; nine players belonging to group B move to group C; and two players belonging to group C moves to group D. Movement of nine players falls into pattern 2. Therefore, in the embodiment, holding an event for strengthening customer's interest in gaming facility is displayed as the advice.

FIG. 106 (*b*) shows transition of life cycle of player after action based on the above advice has been taken. In FIG. 106 (*b*), all players move to group B. In view of the fact, it is found that the action based on the advice is successful.

FIG. 107 is a view showing a life cycle of gaming machine and its related pattern.

In the figure, the vertical axis indicates operability of gaming machine, and the horizontal axis indicates gross profit by gaming machine. In FIG. 107, the operability of gaming machine and the gross profit by gaming machine, are expressed by means of deviation values. The average value of the operability of gaming machine and the gross profit by gaming machine is 50.

In this plane, dots (evaluation dots of life cycle of gaming machine) are plotted on a coordinate system between operability and gross profit of gaming machine.

The plane shown in FIG. 107 is classified into four groups as follows while the average value is defined as reference.

Group A indicates a group of new machines. In general, a new machine is probe to be high in operability and low in gross profit.

Group B indicates of group of main device types. In general, a main device type is prone to high in operability and high in gross profit.

Group C indicates of group of less popular device types. In general, a less popular device type is prone to low in operability and high in gross profit.

Group D indicates of group of unpopular device types. In general, an unpopular device type is prone to high in operability and high in gross profit.

In the embodiment, evaluation dots of life cycle of gaming machine are plotted based on data related to (c') operability and (d') gross profit by gaming machine, thereby determining a group to which a gaming machine belongs. For example, in the embodiment, the evaluation dots of life cycle of gaming machine are plotted with an elapsed of time, indicating trajectory of evaluation points of life cycle of gaming machine. In this manner, change of group to which gaming machine belongs is determined.

The patterns of change of group to which gaming machine belongs include patterns 1 to 5 shown in FIG. 107 as follows, for example.

Pattern 1 is a pattern in which operability is maintained to be high, but gross profit lowers.

Pattern 2 is a pattern in which gross profit is maintained, but operability lowers.

Pattern 3 is a pattern in which operability changes to be low, but gross profit lowers.

Pattern 4 is a pattern in which operability lowers and gross profit rises.

Pattern 5 is a pattern in which gross profit changes to be low, and operability lowers.

In the present embodiment, data indicating advice is associated with each pattern. A pattern of change of a group to which a player belongs is determined; the advice associate with that pattern is extracted; and based on the extracted data, an image indicating the advice is displayed.

The above advices, for instance, include the following examples.

The advice associated with pattern 1 includes revisal of dividing number or the like.

The advice associated with pattern 2 includes revisal of dividing number or the like.

The advice associated with pattern 3 includes discussion of withdrawal of machine.

The advice associated with pattern 4 includes revisal of dividing number or the like.

The advice associated with pattern 5 includes discussion of withdrawal of machine.

FIGS. 108 (*a*) and (*b*) are views showing transition of life cycle of gaming machine. In the figure, the arrow provided with mark indicates transition history of evaluation dots of life cycle of gaming machine. Types of mark correspond to device types of gaming machine units.

In FIG. 108 (*a*), eight evaluation points of life cycle of gaming machine with black circle mark belong to group B; nine evaluation dots of life cycle of gaming machine with x-mark move from group B to group D; eight evaluation dots of life cycle of gaming machine with star mark move from group B to group C; and five evaluation points of life cycle of gaming machine with black triangle mark move from group C to group D.

Movement of evaluation dots of life cycle of gaming machine with star mark falls under pattern 2. Movement of evaluation dots of life cycle of gaming machine with black triangle mark falls under pattern 3. Therefore, in the embodiment, revisal of dividing number and discussion of withdrawal of machine are displayed as the advice.

FIG. 108 (*b*) shows transition of life cycle of player after the action based on the advice has taken. Withdrawal of gaming machine units with black triangle mark and x-mark is performed, and gaming machine units of white and black square marks are newly introduced. The gaming machine units of white and black square marks are positioned in group B, and the gaming machine with start mark moves to group B. In this manner, it is found that the action based on advice is successful.

While the embodiments of the present invention have been described hereinbefore, these embodiments are merely exemplified as specific examples, and do not limit the present invention in particular, and specific features of means or the like can be appropriately changed in design. In addition, the advantageous effects described in the embodiments of the present invention are merely enumerated as the most preferred advantageous effects derived from the present invention, and the advantageous effects according to the present invention are not limited to those described in the embodiments of the present invention.

In addition, in the foregoing detailed description, characterizing portions have been mainly set forth so as to understand the present invention more easily. The present invention is not limited to the embodiments set forth in the foregoing detailed description, and can be applied to other embodiments, and its applicable scope is various. Further, the terms and expressions used in the present specification are intended to appropriately describe the present invention, and is not intended to limit the interpretation of the present invention. In addition, in view of the concept of the invention described in the present specification, it would have been obvious to one skilled in the art to conceive other features, systems, and methods or the like included in the concept of the present invention. Therefore, recitations of the claims must be regarded to be inclusive of equivalent features from deviating from the scope of technical idea of the present invention. Furthermore, an object of Abstract is for patent office and its related general public organizations or engineers or the like belonging to the technical field, which are familiar with patent, legal terms or terminologies to be able to readily determine the technical contents of the present application and its essence in simplified search. Accordingly, the Abstract is not intended to limit the scope of the invention to be evaluated by the recitations of the claims. Moreover, it is desired that object(s) of the present invention and advantageous effect(s) specific to the present invention be construed in full consideration of the already disclosed literature or the like in order to fully understand them.

The foregoing detailed description includes processing executed by computer. The above statements and expressions are set forth for one skilled in the art to understand them most effectively. In the present specification, each of the steps employed to derive a result is to be understood as processing free of self-contradiction. In addition, in each of the steps, an electric or magnetic signal is transmitted and received, recorded, and so on. In the processing in each of the steps, such a signal is expressed by way of bit, value, symbol, character, term, and numeral or the like, it should be kept in mind that these expressions are employed for the sake of clarity. In addition, while the processing in each of the steps may be described in expression common to human act, the processing described in the present specification is executed by means of a variety of devices in principle. Further, other features required to perform each of the steps would have been self-evident from the foregoing description.

The invention claimed is:

1. A game playing information integration system comprising:
   a plurality of gaming machine units; and
   a server connected to enable communication with each of the gaming machine units, wherein
   the gaming machine unit includes:
   a player identification information reading device which is capable of reading player identification information, and outputs the read player identification information;
   a number-of-consumptions data output device for outputting number-of-consumptions data related to a number-of-consumptions of game media;
   a number-of-payouts data output device for outputting number-of-payouts data related to a number-of-payouts of game media; and a use-amount-of-money data output device for outputting use-amount-of-money data related to an amount of money used to lend a gaming medium, wherein gaming machine unit identification information is assigned for each of the gaming machine units, the server includes data storage device for storing each of the number-of-consumptions data output from the number-of-consumptions data output device and the number-of-payouts data output from the number-of-payouts data output device in association with reception time data related to data reception time, player identification information, and gaming machine unit identification information, the data storage device further stores the use-amount-of-money data output from the use-amount-of-money data output device in association with reception time data related to reception time of data, player identification information, and gaming machine unit identification information, and the sever further comprises:

a game playing trend parameter computation device for, based on data stored in the data storage device in association with one item of player identification information, computing a game playing trend parameter indicating a game playing trend per predetermined reference unit as to a player to which the player identification information is assigned;

a customer category determination device for determining a customer category of the player to which the player identification information is assigned, based on the game playing trend parameter computed by the game playing trend parameter computation device;

an analysis processing device for analyzing data received from the gaming machine unit and stored in the data storage device;

a comparison table in which criteria for stability is set;

a stability determination device for determining stability per predetermined reference unit, based on analysis result data indicating a result of analysis of the data and the comparison table;

a target dividing number computation device for computing target dividing number per predetermined reference unit, based on analysis result data indicating a result of analysis by the analysis processing device and/or stability determined by the stability determination device; and an alarm broadcasting device for performing broadcasting of alarm in a case where the number of fixed customers relative to a predetermined reference unit, which is computed based on customer category data as a result of determination by the customer category determination device, fails to meet a condition defined based on the target dividing number computed by the target dividing number computation device.

2. The game playing information integration system according to claim 1, wherein the server further comprises:

an analysis processing device for performing analysis of data received from the gaming machine unit and then stored in the data storage device;

a comparison table in which a criteria of stability is set; and a stability determination device for determining stability per predetermined reference unit, based on analysis result data indicating a result of analysis of the data and the comparison table.

3. The game playing information integration system according to claim 2, wherein the server further comprises a target dividing number computation device for computing target dividing number per predetermined reference unit, based on analysis result data indicating a result of analysis by the analysis processing device and/or stability determined by the stability determination device.

4. The game playing information integration system according to claim 1, wherein the data storage device, in association with gaming machine unit identification information, stores a new device type identification flag for determining whether or not a gaming machine unit to which the gaming machine unit identification information is assigned, the server further comprises:

a new device type analysis processing device for, among data received from the gaming machine unit and stored in the data storage device, analyzing data associated with gaming machine unit identification information to which gaming machine unit identification information is assigned with which a new device type identification flag set to ON is associated; and an appropriate condition determination device for, based on new device type analysis result data as a result of analysis by the new device type analysis processing device, determining whether or not a setup number of gaming machine units to which gaming machine unit identification information is assigned with which a new device type identification flag set to ON is associated meets a predetermined appropriate condition.

5. The game playing information integration system according to claim 1, wherein the server further comprises an analysis device for analyzing data received from the gaming machine unit and stored in the data storage device, the analysis device comprises a variation trend continuation period extraction device for extracting a variation trend continuation period, based on number-of-consumptions data and number-of-payouts data stored in the data storage device and reception time data associated with the number-of-consumptions data and the number-of-payouts data, the variation trend continuation period being a series of period in which either one of an increase trend and a decrease trend of a difference number is continuous, an absolute value of a difference number in an entire period being a predetermined reference value or more, and the data storage device stores information related to the variation trend continuation period extracted by the variation trend continuation period extraction device in association with at least one of items of player identification information and gaming machine unit identification information.

6. The game playing information integration system according to claim 5, wherein the series of period is a period of a normal game playing state in a game played at the gaming machine unit, a bonus game period, or a period obtained by combining a bonus game and a game playing state which is subsequent to the bonus game and is different from the normal game playing state.

7. The game playing information integration system according to claim 6, wherein when a state is shifted into the normal gaming state after completion of the bonus game as the series of period or after completion of both the bonus game as the series of period and the game playing state which is subsequent to the bonus game and is different from the normal game playing state, the variation trend continuation period extraction device, in a case where a next bonus game takes place before exceeding a specific period or the number of games played in the normal game playing state, includes the next bonus game in the series of period, and extracts a variation trend continuation period.

8. The game playing information integration system according to claim 5, wherein the series of period is a period in which a difference number per predetermined unit period continuously increases or decreases over a plurality of unit periods.

9. A game playing information integration system comprising:
 a plurality of gaming machine units; and
 a server connected to enable communication with each of the gaming machine units, wherein
 the gaming machine unit includes:
 a player identification information reading device which is capable of reading player identification information, and outputs the read player identification information;
 a number-of-consumptions data output device for outputting number-of-consumptions data related to a number-of-consumptions of game media; and
 a number-of-payouts data output device for outputting number-of-payouts data related to a number-of-payouts of game media, wherein
 gaming machine unit identification information is assigned for each of the gaming machine units,
 the server includes data storage device for storing each of the number-of-consumptions data output from the number-of-consumptions data output device and the number-of-payouts data output from the number-of-payouts data output device in association with reception time data related to data reception time, player identification information, and gaming machine unit identification information,
 the data storage device stores sample data indicating a sample pattern to be compared with a variation pattern of a difference number according to an elapse of time or the number of games in association with type data indicating a type of the sample pattern,
 the server further comprises an analysis device for analyzing data received from the gaming machine unit and stored in the data storage device, and
 the analysis device comprises:
 a pattern data generation device for generating variation pattern data indicating a variation pattern of a difference number according to an elapse of time or the number of games, based on number-of-consumptions data and number-of-payouts data stored in the data storage device and reception time data associated with the number-of-consumptions data and the number-of-payouts data;
 a sample data extraction device for performing comparison between a variation pattern of a difference number indicated by the variation pattern data and a sample pattern indicated by sample data, and extracting sample data indicating a sample pattern which is the most similar to a variation pattern of the difference number; and
 a type output device for performing an output indicating a type, based on type data associated with the sample data extracted by the sample data extraction device.

10. The game playing information integration system according to claim 9, wherein the analysis device further comprises a sample data generation device for storing as sample data in the data storage device, variation pattern data generated by the pattern data generation device in association with type data indicating a type which is identical to that of type data associated with sample data extracted by the extraction device.

11. A game playing information integration system comprising:
 a plurality of gaming machine units; and
 a server connected to enable communication with each of the gaming machine units, wherein
 the gaming machine unit includes:
 a player identification information reading device which is capable of reading player identification information, and outputs the read player identification information;
 a number-of-consumptions data output device for outputting number-of-consumptions data related to a number-of-consumptions of game media; and
 a number-of-payouts data output device for outputting number-of-payouts data related to a number-of-payouts of game media, wherein
 gaming machine unit identification information is assigned for each of the gaming machine units,
 the server includes data storage device for storing each of the number-of-consumptions data output from the number-of-consumptions data output device and the number-of-payouts data output from the number-of-payouts data output device in association with reception time data related to data reception time, player identification information, and gaming machine unit identification information,
 the player identification information reading device intermittently or continuously reads a face of a player, and outputs obtained face data,
 the server comprises a player identity determination device for determining identity of a player who plays a game at the gaming machine unit, based on the face data intermittently or continuously output from the gaming machine unit, and
 while the player identity determination device determines that a game is played by a same player, the data storage device stores each of number-of-consumptions data output from the number-of-consumptions data output device and number-of-payouts data output from the number-of-payouts data output device in association with a same item of player identification informant, and when the player identity determination device determines a player is changed, the data storage device stores said each data in association with a different item of player identification information.

* * * * *